United States Patent
Sant'Anselmo et al.

(10) Patent No.: US 9,422,922 B2
(45) Date of Patent: Aug. 23, 2016

(54) SYSTEMS, METHODS, AND DEVICES INCLUDING MODULAR, FIXED AND TRANSPORTABLE STRUCTURES INCORPORATING SOLAR AND WIND GENERATION TECHNOLOGIES FOR PRODUCTION OF ELECTRICITY

(76) Inventors: Robert Sant'Anselmo, Chatsworth, CA (US); Arnold Stephen Arch, Woodland Hills, CA (US)

( * ) Notice: Subject to any disclaimer, the term of this patent is extended or adjusted under 35 U.S.C. 154(b) by 797 days.

(21) Appl. No.: 12/870,399

(22) Filed: Aug. 27, 2010

(65) Prior Publication Data
US 2011/0049992 A1    Mar. 3, 2011

Related U.S. Application Data

(60) Provisional application No. 61/237,961, filed on Aug. 28, 2009, provisional application No. 61/260,516, filed on Nov. 12, 2009.

(51) Int. Cl.
| | |
|---|---|
| H02J 1/00 | (2006.01) |
| F03D 9/00 | (2016.01) |
| H02J 3/38 | (2006.01) |
| F03D 1/00 | (2006.01) |
| H02S 10/10 | (2014.01) |

(Continued)

(52) U.S. Cl.
CPC ............... *F03D 9/007* (2013.01); *F03D 1/005* (2013.01); *F24J 2/523* (2013.01); *F24J 2/5237* (2013.01); *H02J 3/38* (2013.01); *H02S 10/10* (2014.12); *F03D 9/003* (2013.01); *F05B 2240/142* (2013.01); *F24J 2002/5277* (2013.01); *F24J 2002/5486* (2013.01); *Y02E 10/47* (2013.01); *Y02E 10/72* (2013.01); *Y10T 307/615* (2015.04)

(58) Field of Classification Search
CPC ................ H02J 7/35; H02J 1/10; H02J 3/38; Y02E 60/12; G06F 1/26; H01M 8/04; H01M 8/06; F03D 9/003; F03D 7/0284
USPC ..... 307/43, 22, 26, 72, 65; 290/2, 44, 1, 43, 290/45, 54, 55; 361/601, 825; 415/4.3, 4.1, 415/905, 2, 75, 127, 157; 320/101; 416/197; 429/25, 19, 21, 17
See application file for complete search history.

(56) References Cited

U.S. PATENT DOCUMENTS

| | | | |
|---|---|---|---|
| 2,860,493 A | 6/1952 | Capps et al. | |
| 3,979,597 A | * 9/1976 | Drucker | F03D 1/04 126/651 |

(Continued)

OTHER PUBLICATIONS www.electricityforum.com/electricity-windmill.html.
(Continued)

*Primary Examiner* — Rexford Barnie
*Assistant Examiner* — Jagdeep Dhillon
(74) *Attorney, Agent, or Firm* — Staas & Halsey LLP

(57) ABSTRACT

Disclosed are systems, methods, and devices related to fixed and transportable structures and vehicles utilizing the integration of solar and wind technologies for generation of electricity. The system generates electricity using solar panels (and/or solar thermal units) and wind turbines, stores and converts electricity, and can be located in various locations either as fixed or portable embodiments including on land, on water, underwater, air and space and may also be housed in a structure to provide electricity for various facilities and uses.

20 Claims, 176 Drawing Sheets

One Embodiment is for Solar Panels to Co-exist with Existing Wind Turbine Generator Wind Farms. (Energy Storage System(s) not shown.)

(51) Int. Cl.
*F24J 2/52* (2006.01)
*F24J 2/54* (2006.01)

(56) References Cited

U.S. PATENT DOCUMENTS

| | | | |
|---|---|---|---|
| 3,996,741 A | 12/1976 | Herberg | |
| 4,059,969 A | 11/1977 | Awalt, Jr. | |
| 4,118,637 A | 10/1978 | Tackett | |
| 4,178,124 A * | 12/1979 | Puskas | F03D 1/04 415/127 |
| 4,200,904 A | 4/1980 | Doan | |
| 4,224,528 A | 9/1980 | Argo | |
| 5,206,537 A | 4/1993 | Alejandro et al. | |
| 5,463,257 A | 10/1995 | Yea | |
| 6,590,363 B2 | 7/2003 | Teramoto | |
| 6,671,585 B2 | 12/2003 | Lof et al. | |
| 7,098,553 B2 | 8/2006 | Wiegel et al. | |
| 7,172,386 B2 | 2/2007 | Truong et al. | |
| 7,230,819 B2 * | 6/2007 | Muchow | F03D 9/007 307/22 |
| 7,276,809 B2 | 10/2007 | Zambrano et al. | |
| 7,331,303 B2 | 2/2008 | Park | |
| 7,492,053 B2 | 2/2009 | Fein et al. | |
| 7,495,351 B2 | 2/2009 | Fein et al. | |
| 7,498,684 B2 | 3/2009 | Fein et al. | |
| 7,501,713 B2 | 3/2009 | Fein et al. | |
| 7,566,980 B2 * | 7/2009 | Fein | F03D 9/002 165/45 |
| 7,918,650 B2 * | 4/2011 | Papp | F03D 9/028 415/4.1 |
| 8,299,645 B2 * | 10/2012 | Muchow | F03D 1/001 290/55 |
| 8,330,296 B2 * | 12/2012 | Ottman | F03D 9/007 307/72 |
| 8,823,194 B2 | 9/2014 | Bates et al. | |
| 2004/0013923 A1 * | 1/2004 | Molter et al. | 429/25 |
| 2004/0027004 A1 * | 2/2004 | Bayoumi | H02J 3/38 307/43 |
| 2005/0138867 A1 | 6/2005 | Zhao | |
| 2007/0264116 A1 | 11/2007 | Dempster | |
| 2008/0150295 A1 | 6/2008 | Fein et al. | |
| 2008/0178926 A1 | 7/2008 | Wu | |
| 2008/0179114 A1 | 7/2008 | Chen | |
| 2009/0015019 A1 | 1/2009 | Donaghey | |
| 2009/0039705 A1 | 2/2009 | Lyman et al. | |
| 2009/0079161 A1 | 3/2009 | Muchow et al. | |
| 2009/0080182 A1 | 3/2009 | Huang | |
| 2010/0133820 A1 * | 6/2010 | Tsao | F03D 3/00 290/44 |
| 2010/0270808 A1 | 10/2010 | Bates et al. | |
| 2014/0097622 A1 | 4/2014 | Bates et al. | |
| 2015/0021922 A1 | 1/2015 | Bates et al. | |

OTHER PUBLICATIONS www.electricityforum.com/solar-electricity.html.
The Electricity Forum, Electricity/Generators.
Popular Science Magazine article, p. 54, Jul. 2015.

* cited by examiner

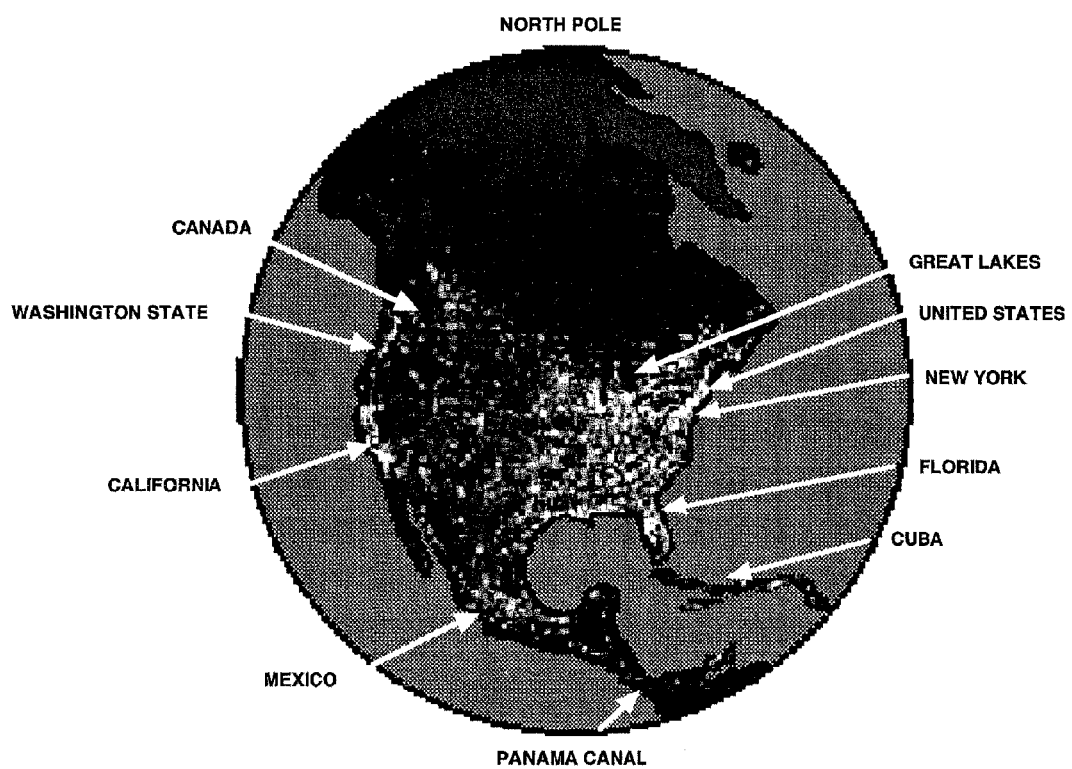
Figure 1 A Country's Energy Usage, when Viewed a Night from Outer Space, Outlines the General Shape of the Borders and Major Cities of the United States and Central America.

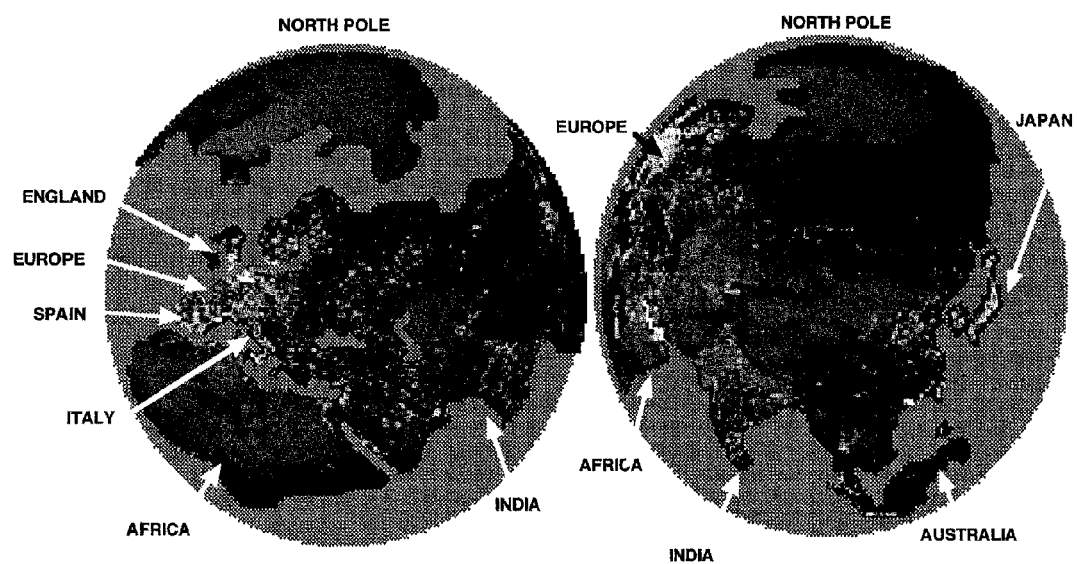
Figure 2 Europe and Asian Energy Usage at Night as seen from Outer Space.

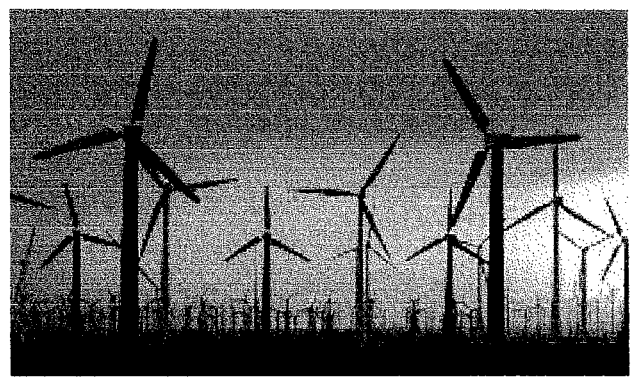
Figure 3 Wind Power Turbines in a "Wind Farm"

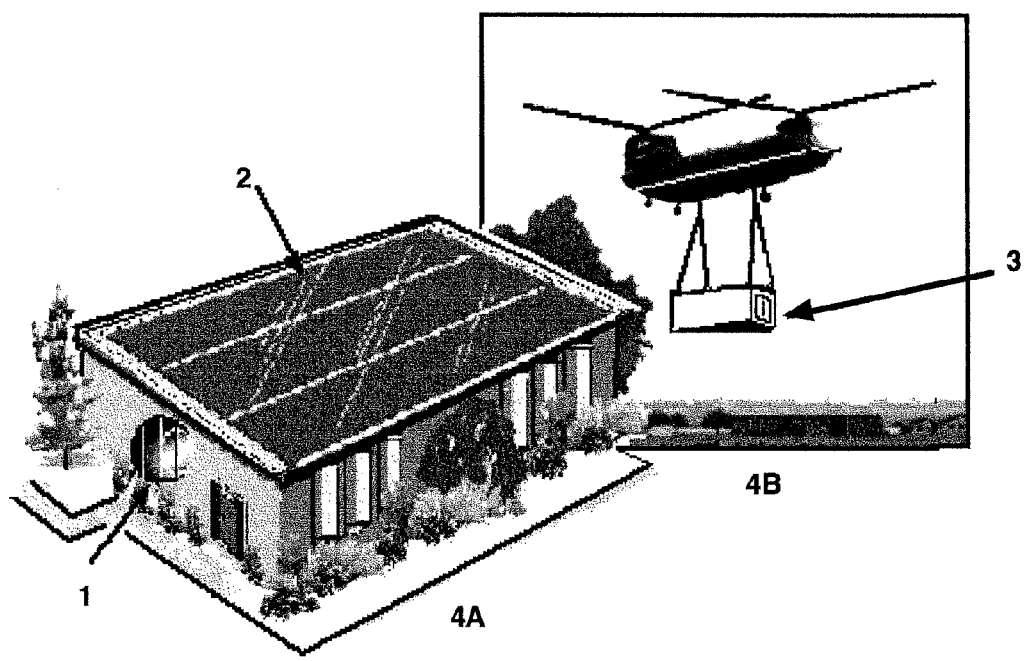
Figure 4 Energy Generation Embodiments: Permanent and Portable

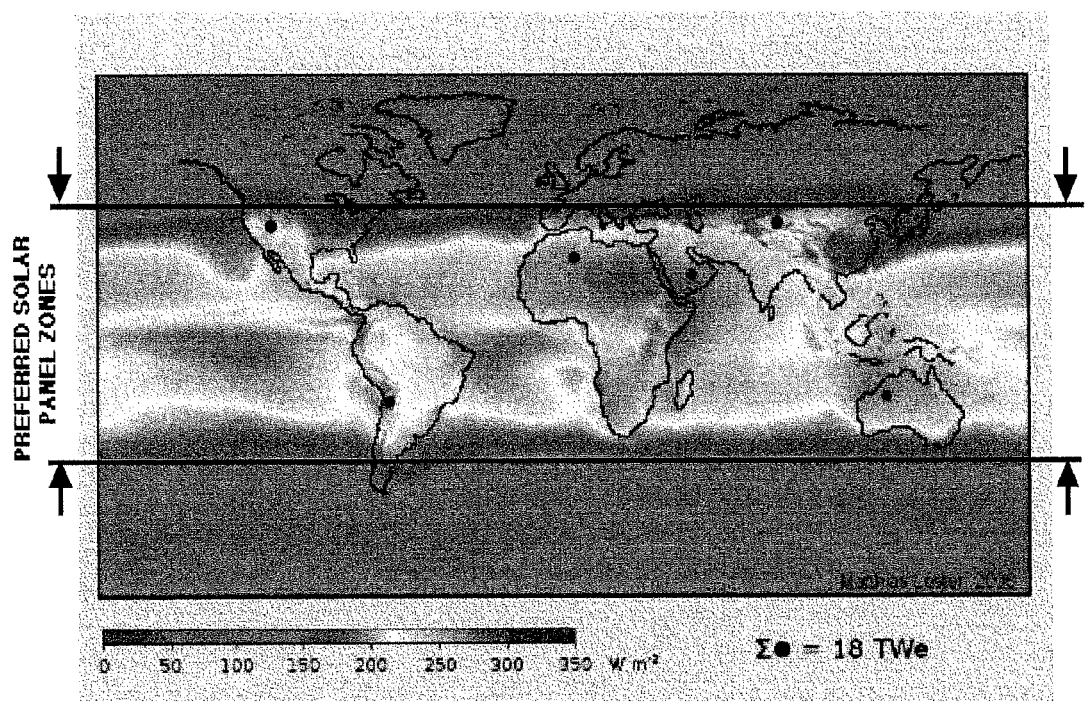
Figure 5  Sun as an Energy Source: Ranges of Solar Temperature

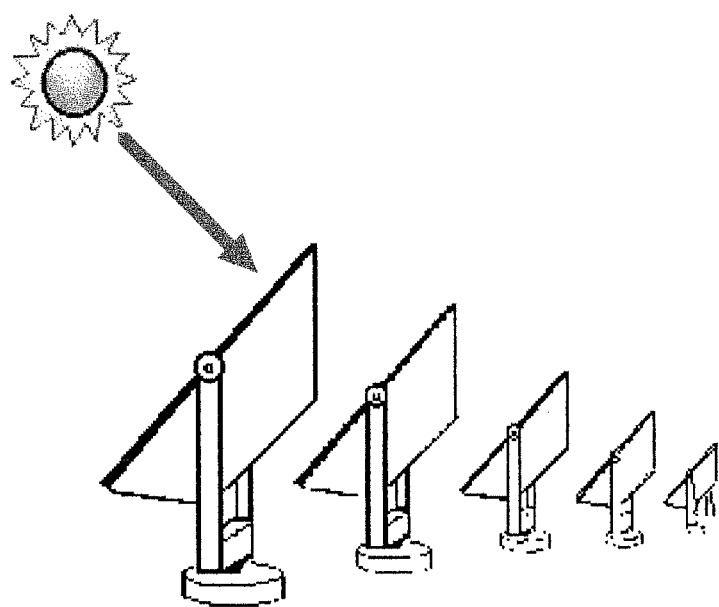
Figure 6  Solar Farms Produce Electrical Power

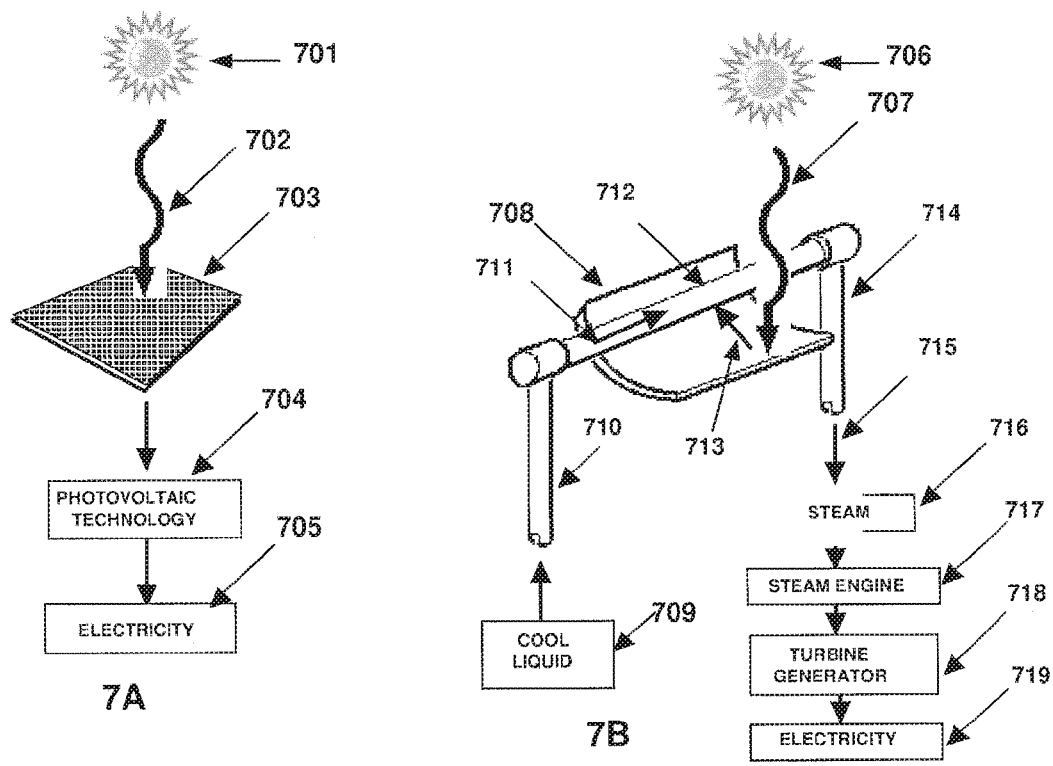
Figure 7 Two Major Forms of Converting Solar Energy
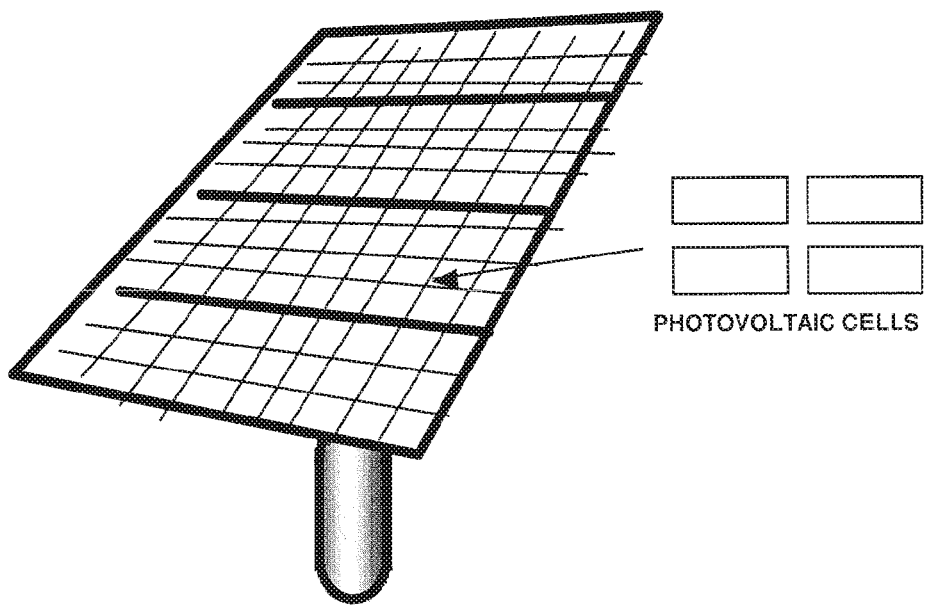
Figure 8 Photovoltaic Cells in a Solar Panel Array

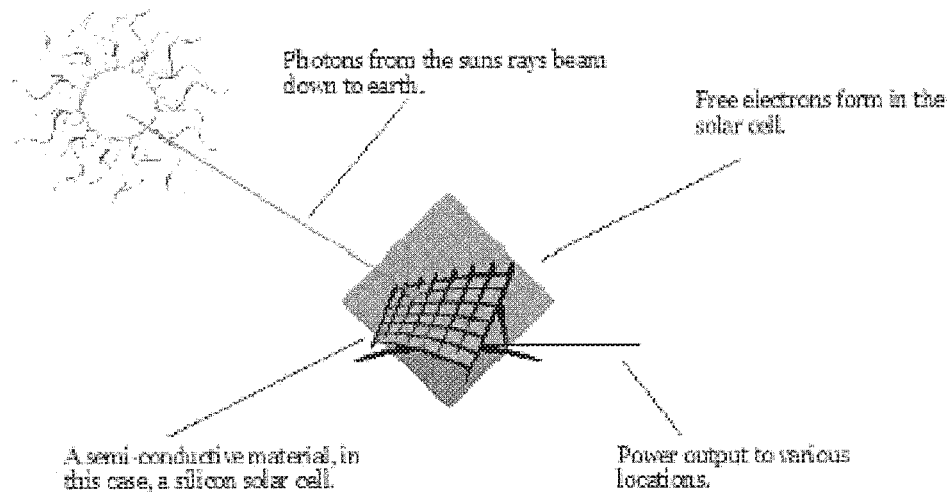
Figure 9 Basic Solar Energy Capture Concept
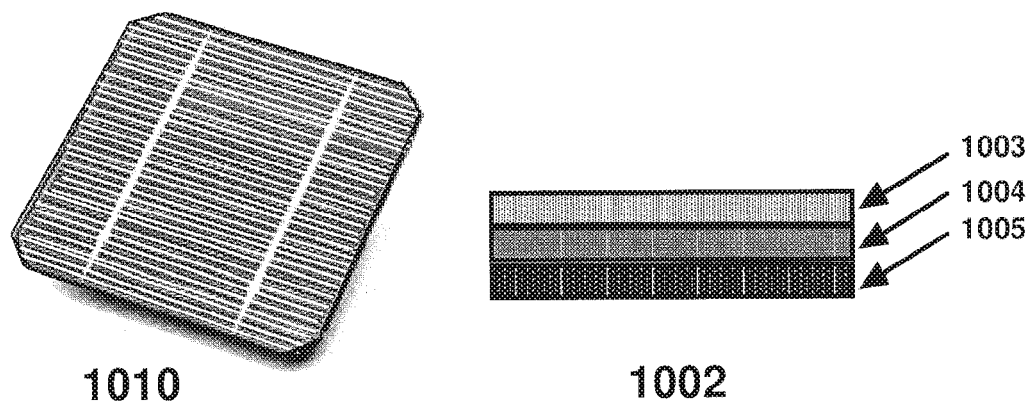
Figure 10 Thin-film Construction: Exploded View
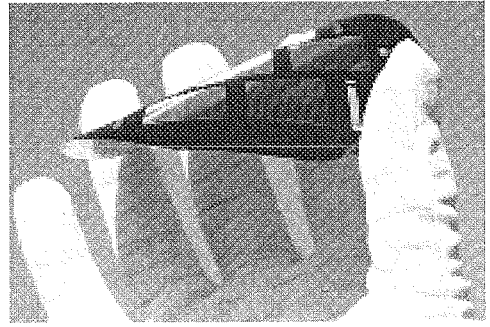
Figure 11 Thin Film Photovoltaic Cells

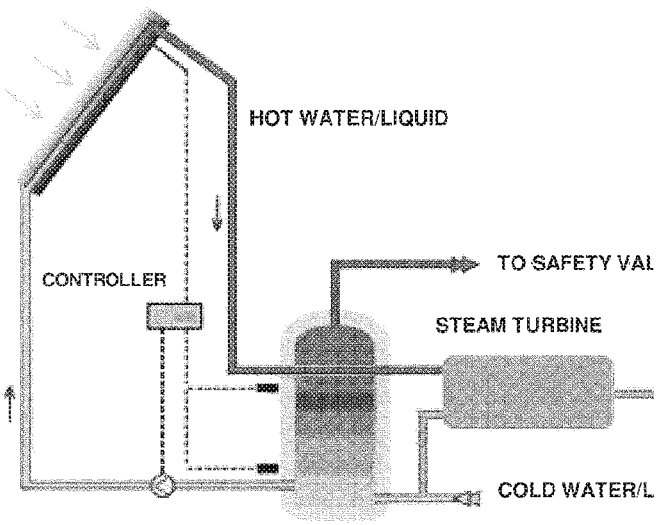
Figure 12 Solar Collector Panels for Heat Generation
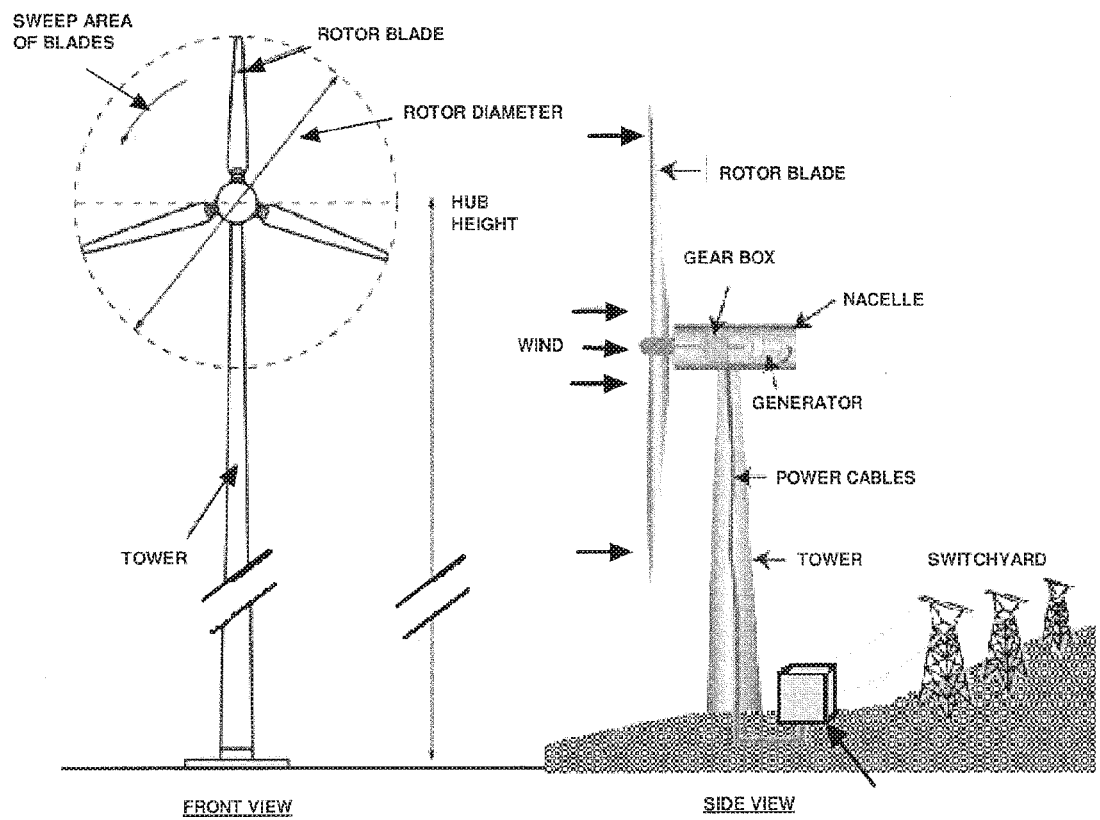
Figure 13 Wind Turbine Electricity Generators

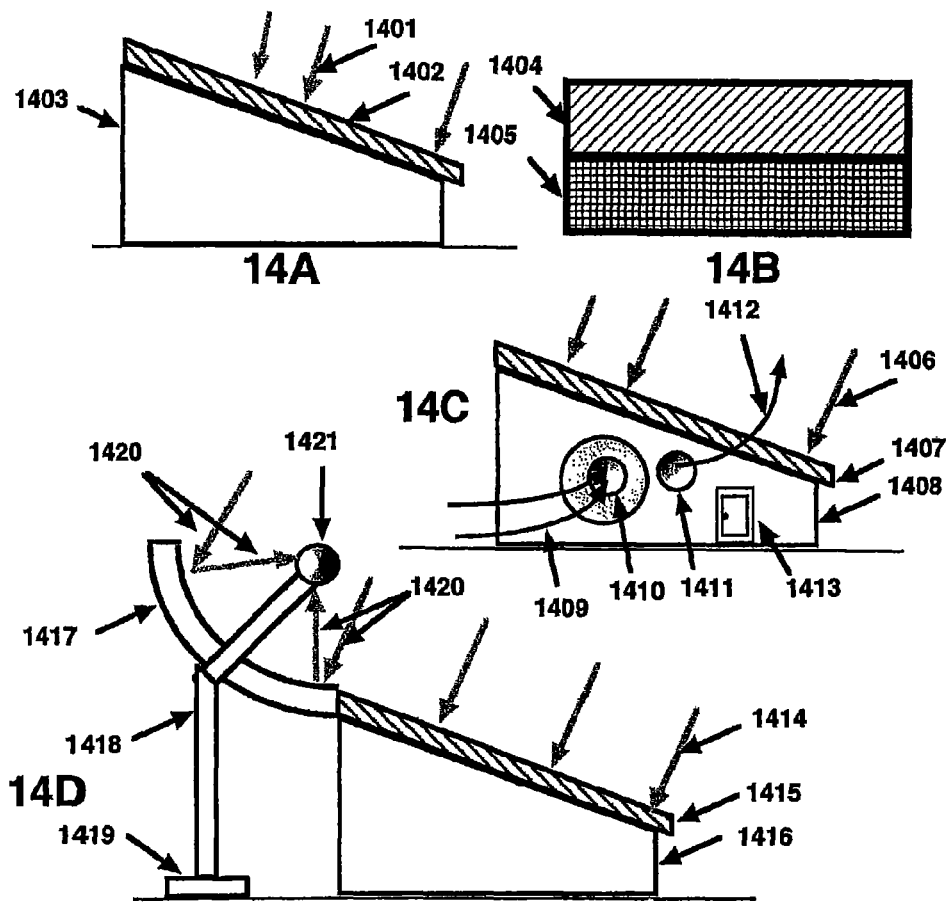
Figure 14 Different Configurations
| SOURCE | METHOD | ITEM GENERATED | CONFIGURATION | | |
|---|---|---|---|---|---|
| | | | SOLAR ONLY | WIND ONLY | SOLAR & WIND COMBINATION |
| SUN | SOLAR PANEL | HEAT/COOLING | ● | | ● |
| SUN | SOLAR PANEL | WATER | ● | | ● |
| SUN | SOLAR COLLECTOR | STEAM/ELECTRICITY | ● | | ● |
| SUN | PHOTOVOLTAIC | ELECTRICITY | ● | | ● |
| WIND | TURBINE | ELECTRICITY | | ● | ● |
Figure 14E      Different Application-Dependent Embodiments

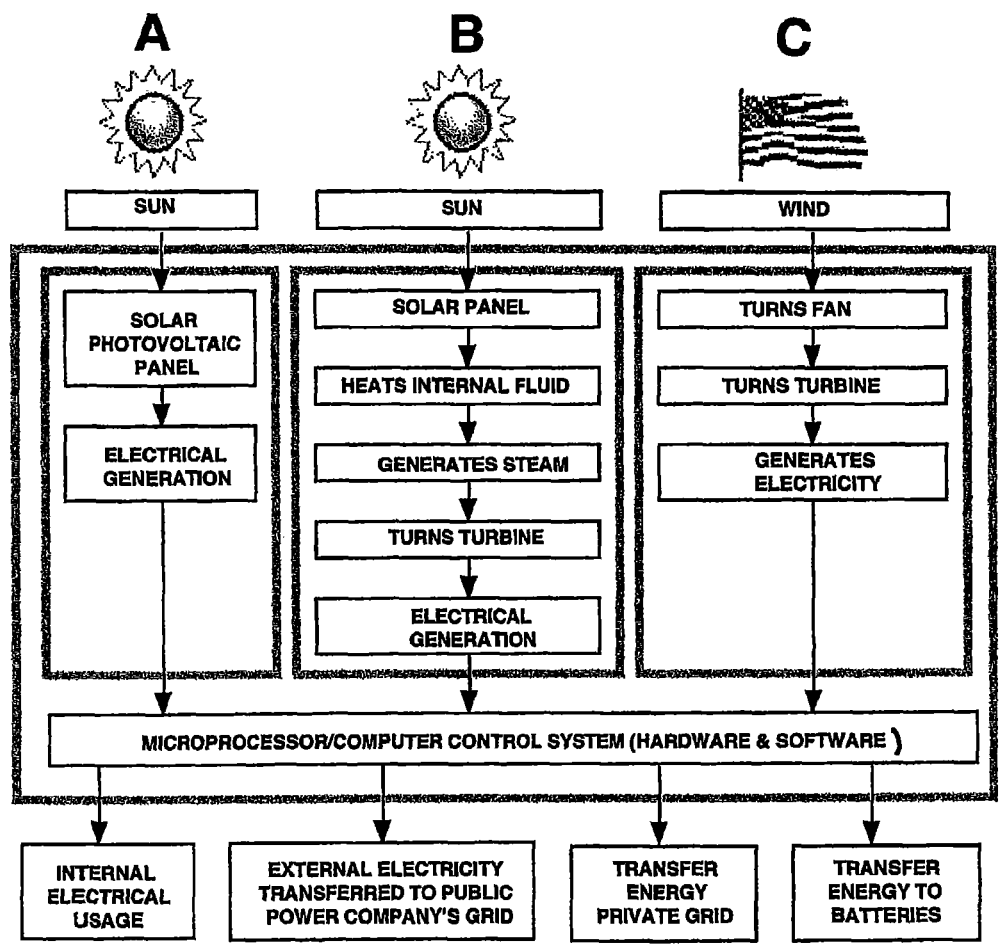
Figure 14F System Configuration

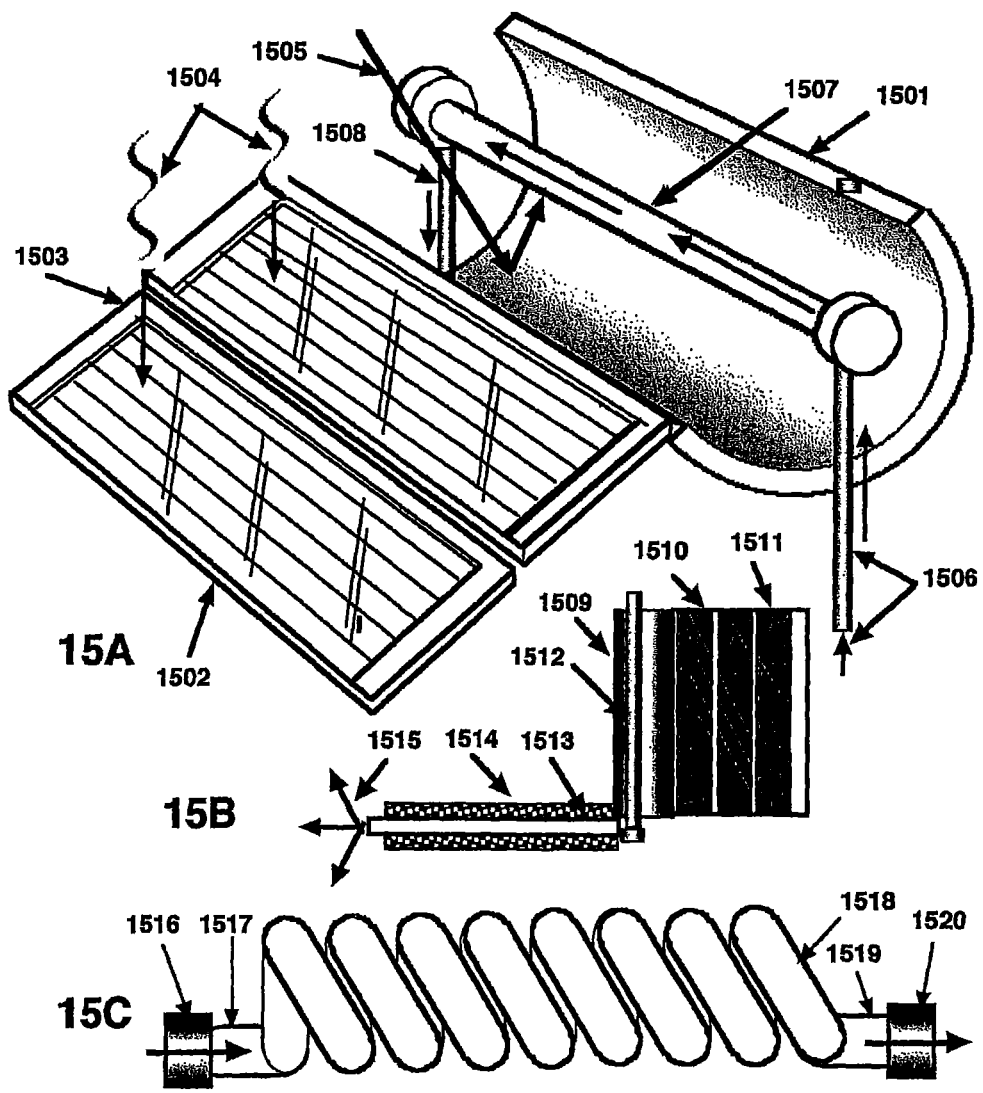
Figure 15 Detail of Solar Collector Configuration

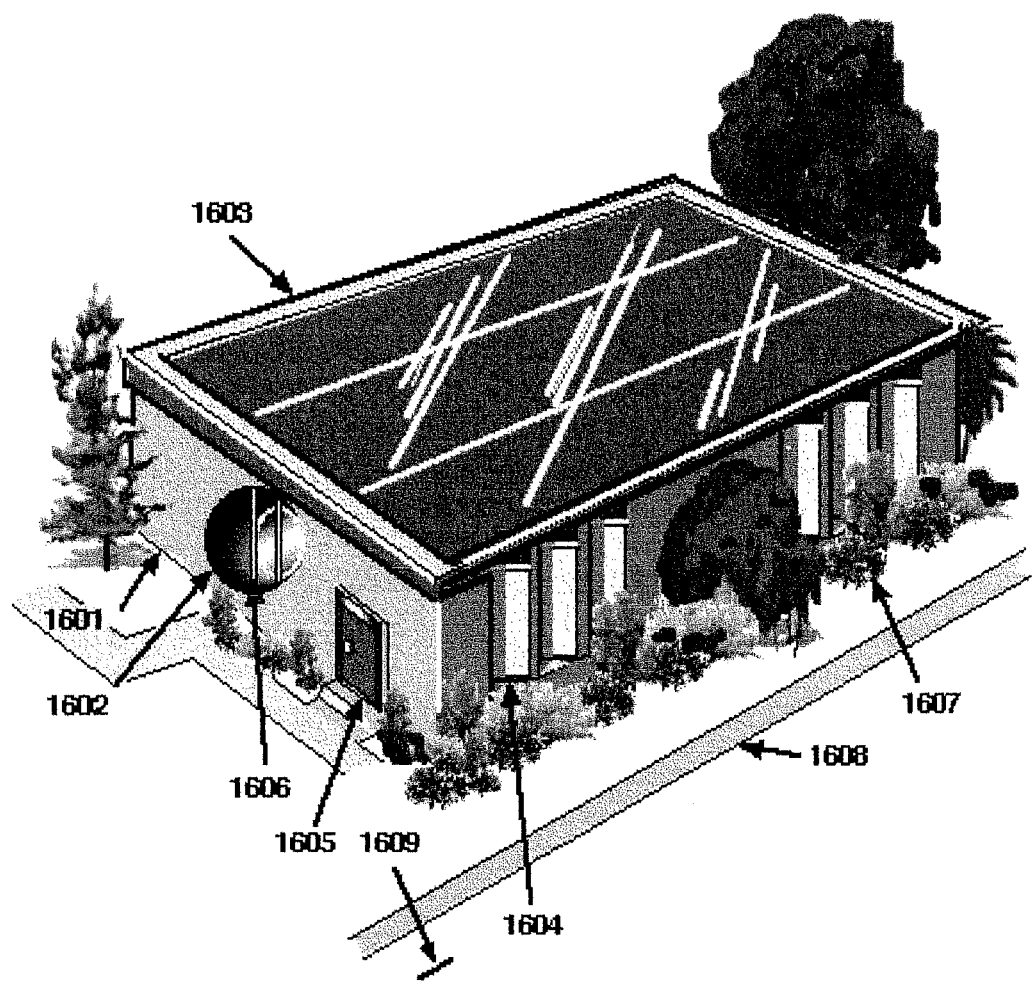
Figure 16 Multiple Energy Generation System

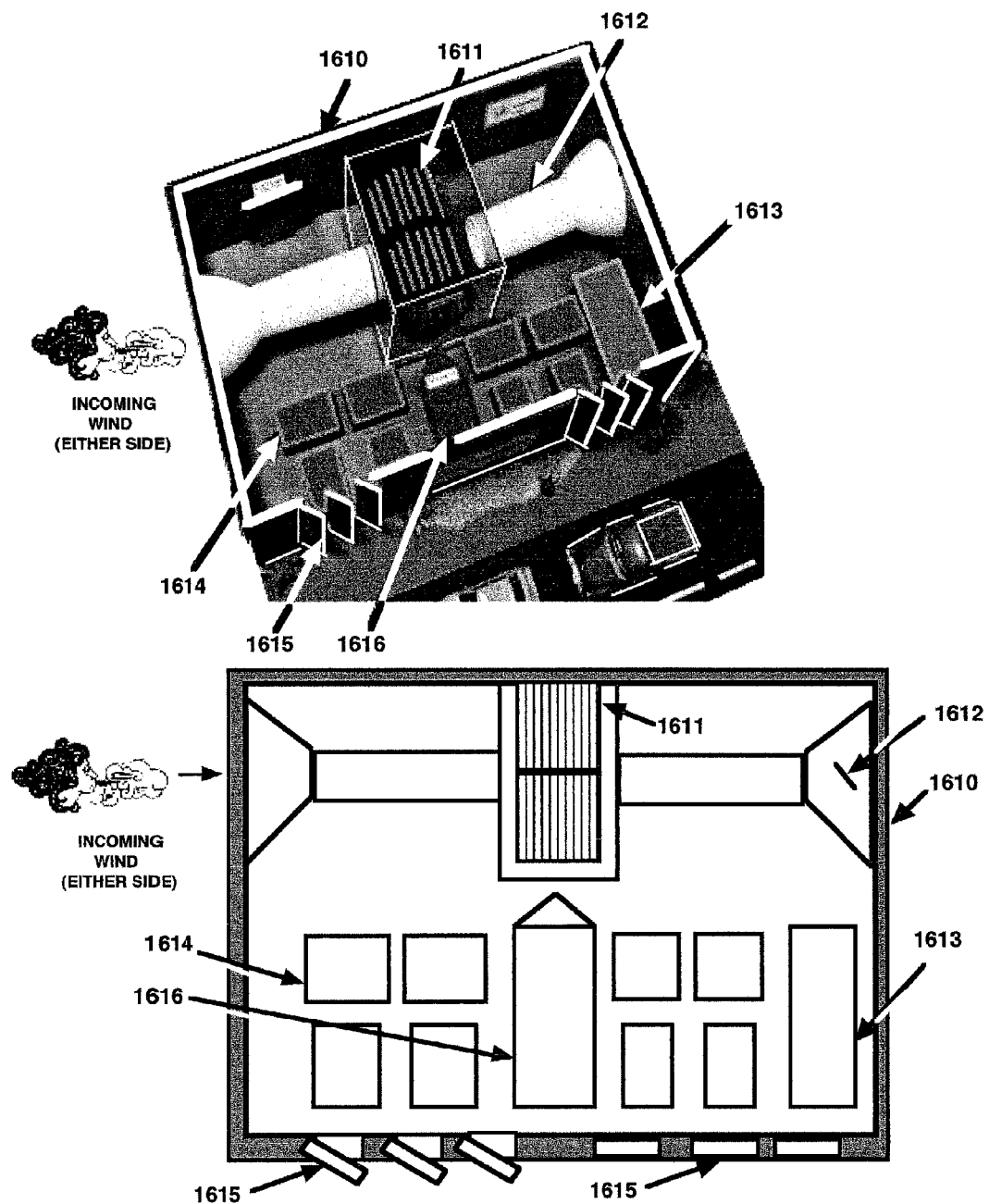
Figure 16A Inside View of Multiple Energy Generation System
With the Solar Panels Removed

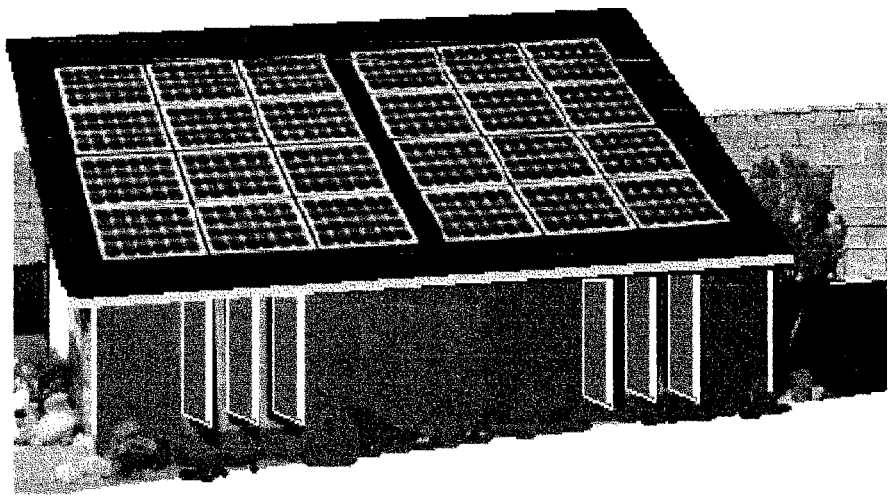
Figure 16B One Configuration of the Multiple Energy Generation System
(Model)

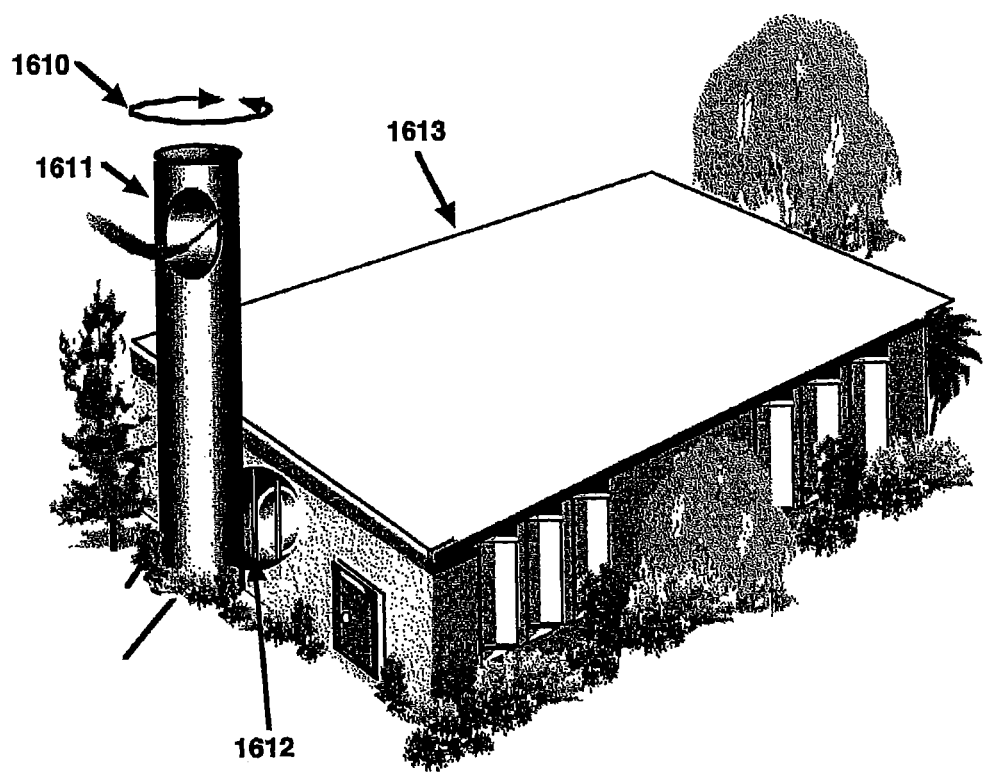
Figure 16C Fixed Station Wind Intake Extension System

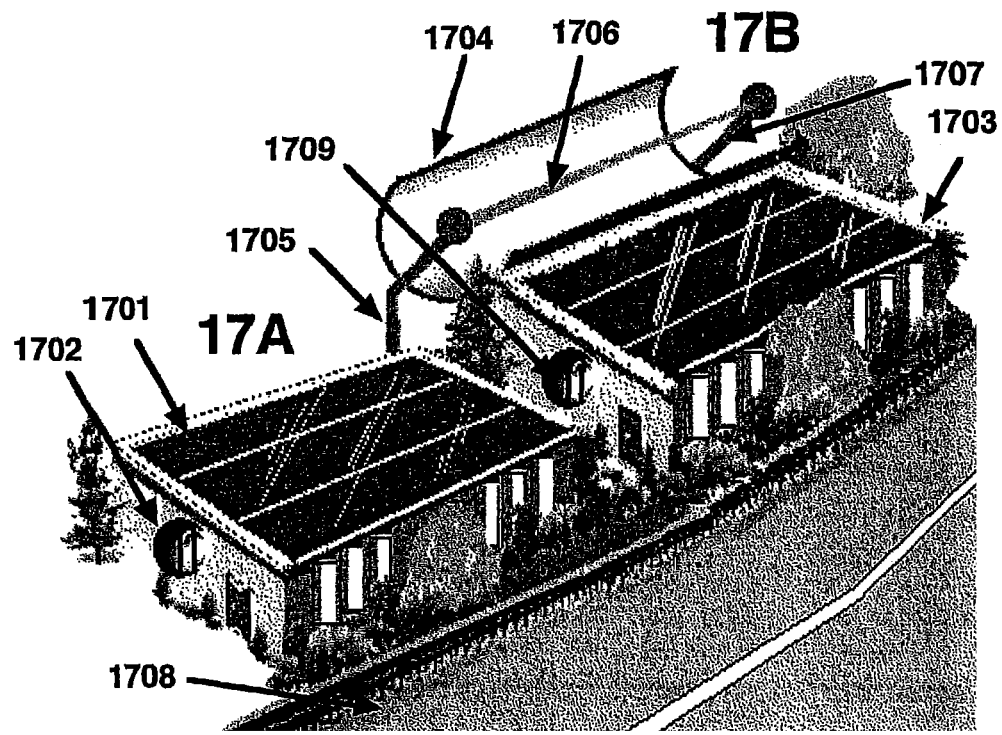
Figure 17 Solar Collector Configuration
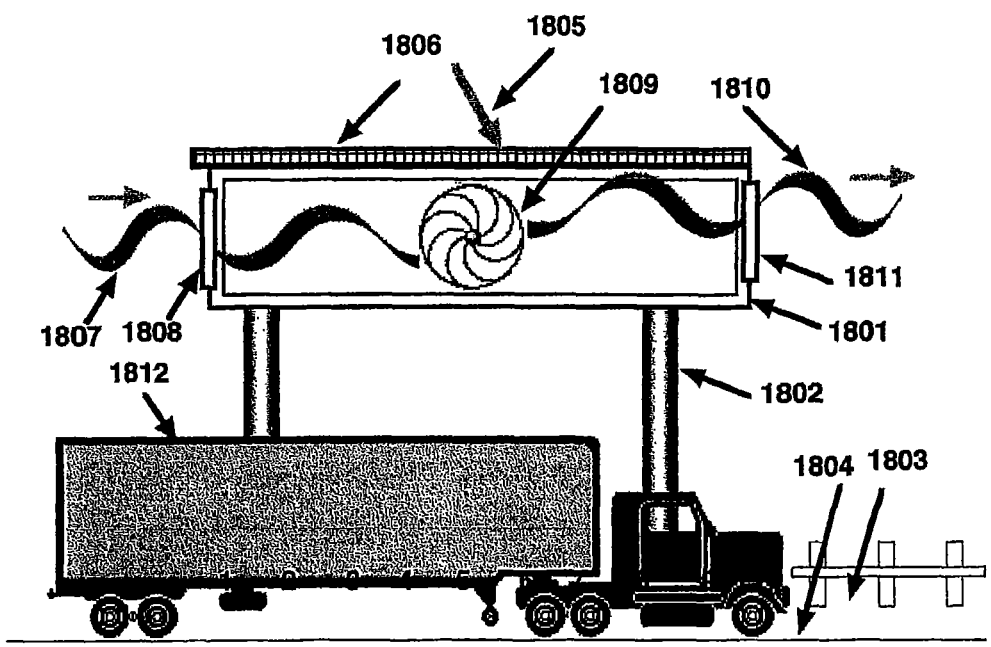
Figure 18 Center Divider Freeway Configuration

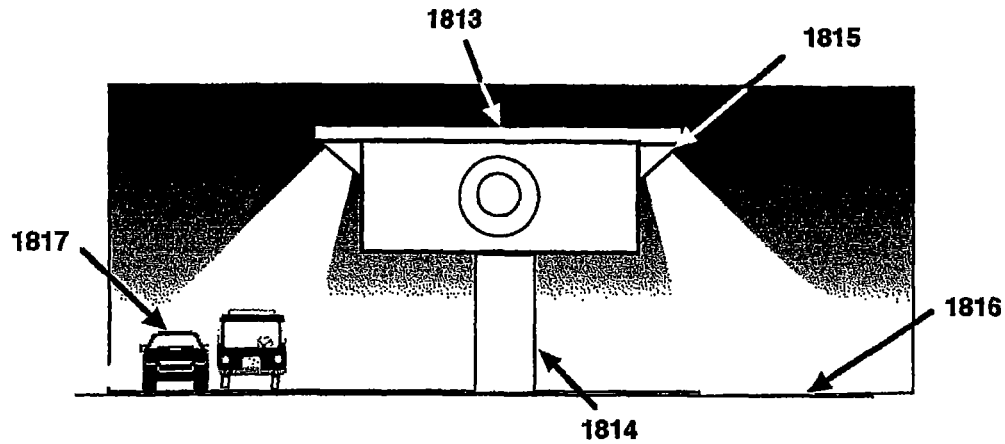
Figure 18A Center Divider Freeway Illumination
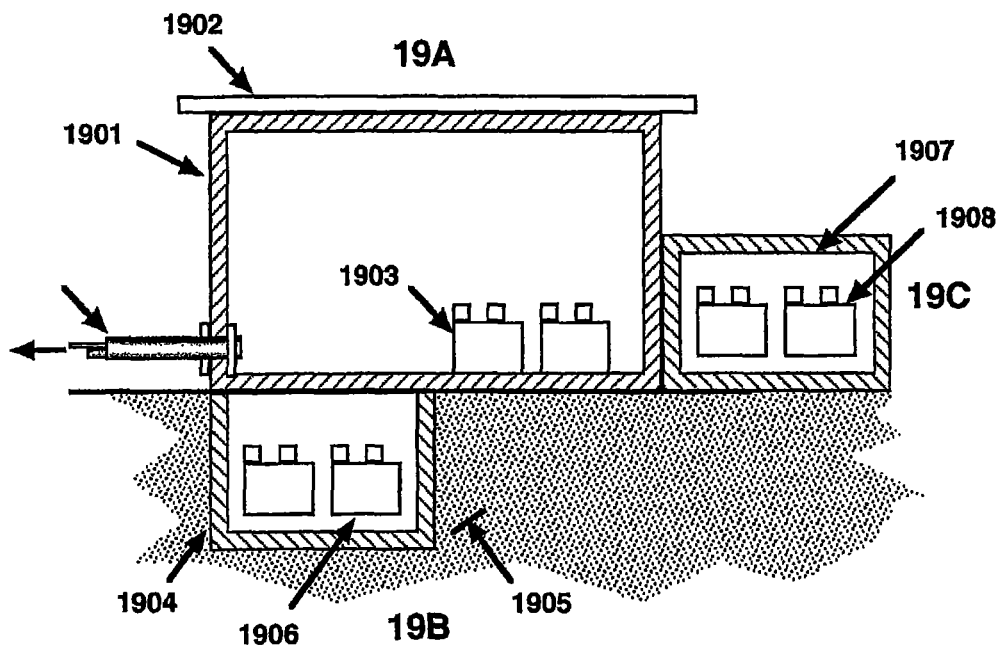
Figure 19 Power Storage and/or Transmission Options

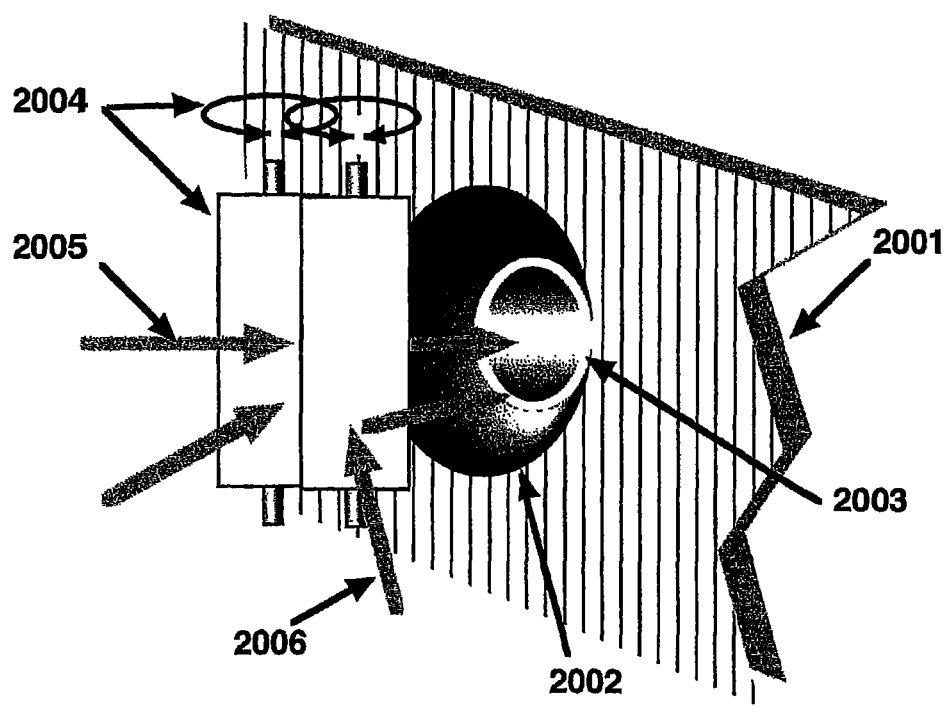
Figure 20 . Wind Directional Louver Panels

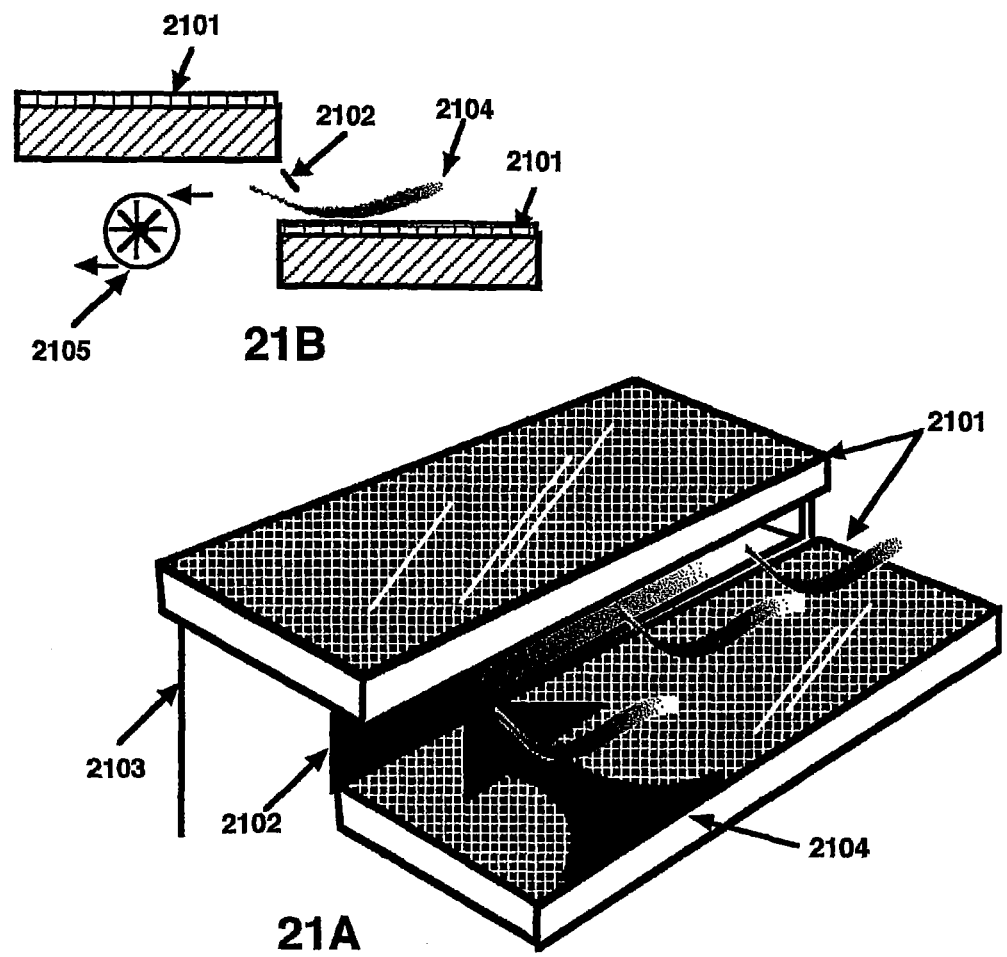
Figure 21 Under Solar Panel Vents

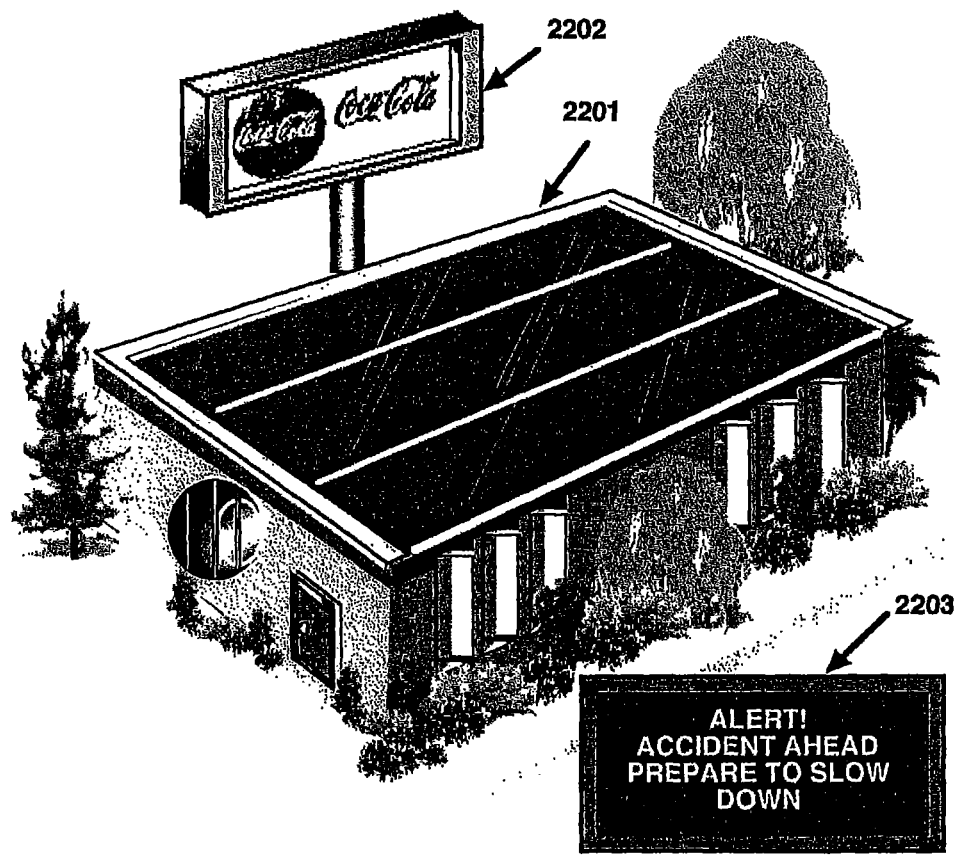
Figure 22 Associated Digital Signage Applications

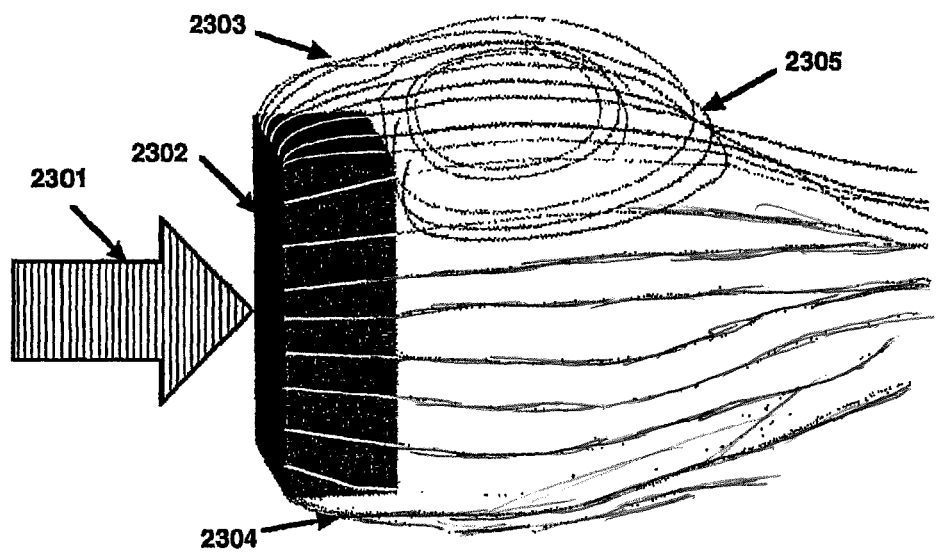
Figure 23 Wind Turbulence Patterns Created by Buildings

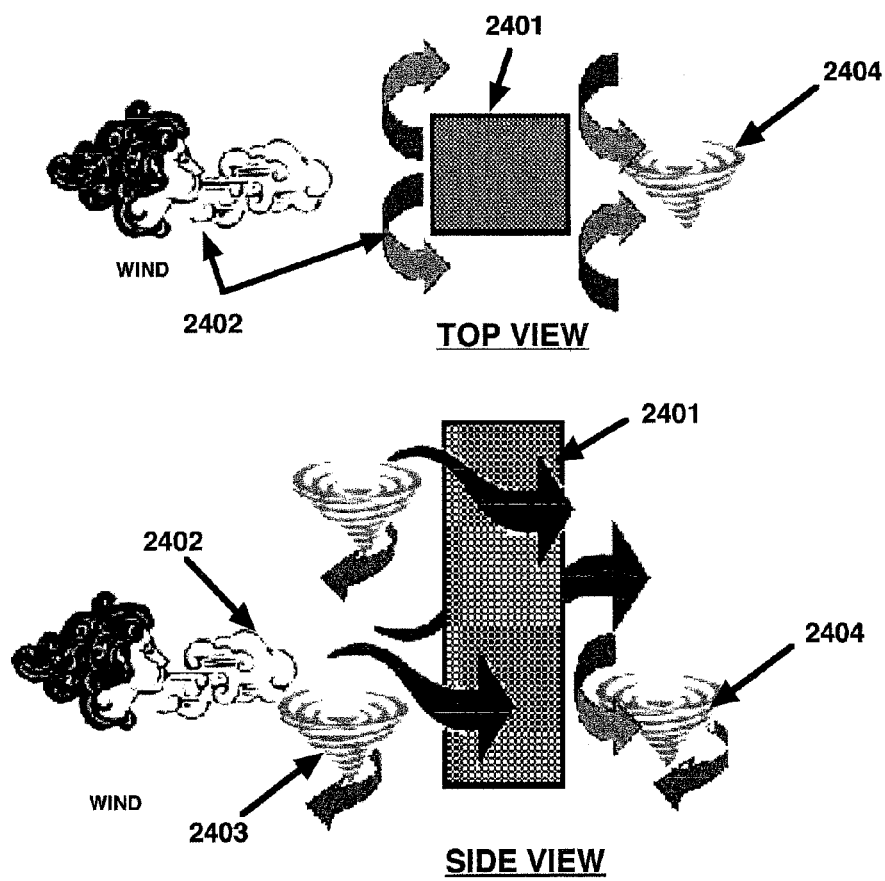
Figure 24 Simulation of a Wind's Force and Turbulence Patterns Upon a Building.

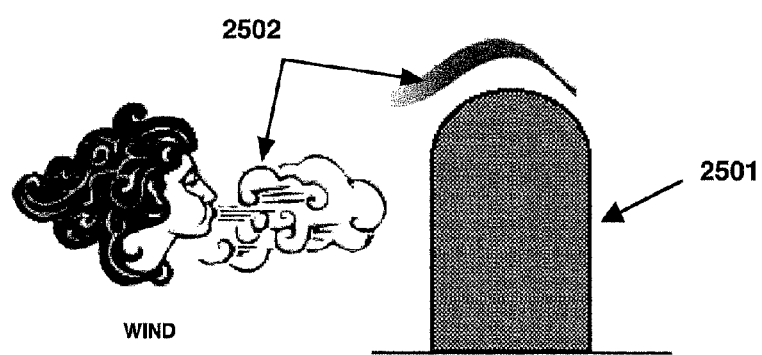
Figure 25  Specially Designed Buildings Allow the Force of the Wind to Flow Around and Over the Structure.

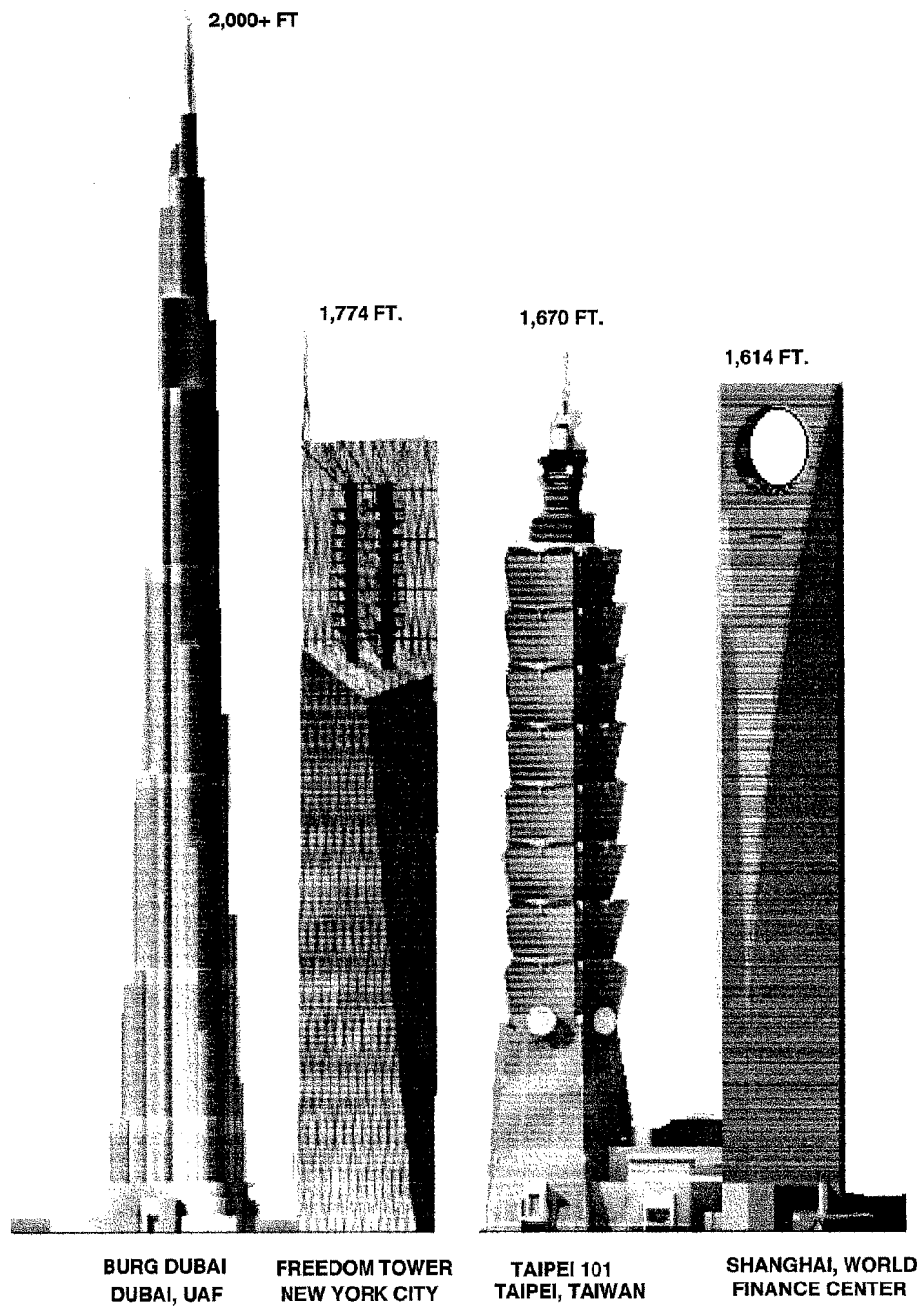
Figure 26 Various Shapes of Buildings take into Account the Pressure of the Wind's Force Against the Building.

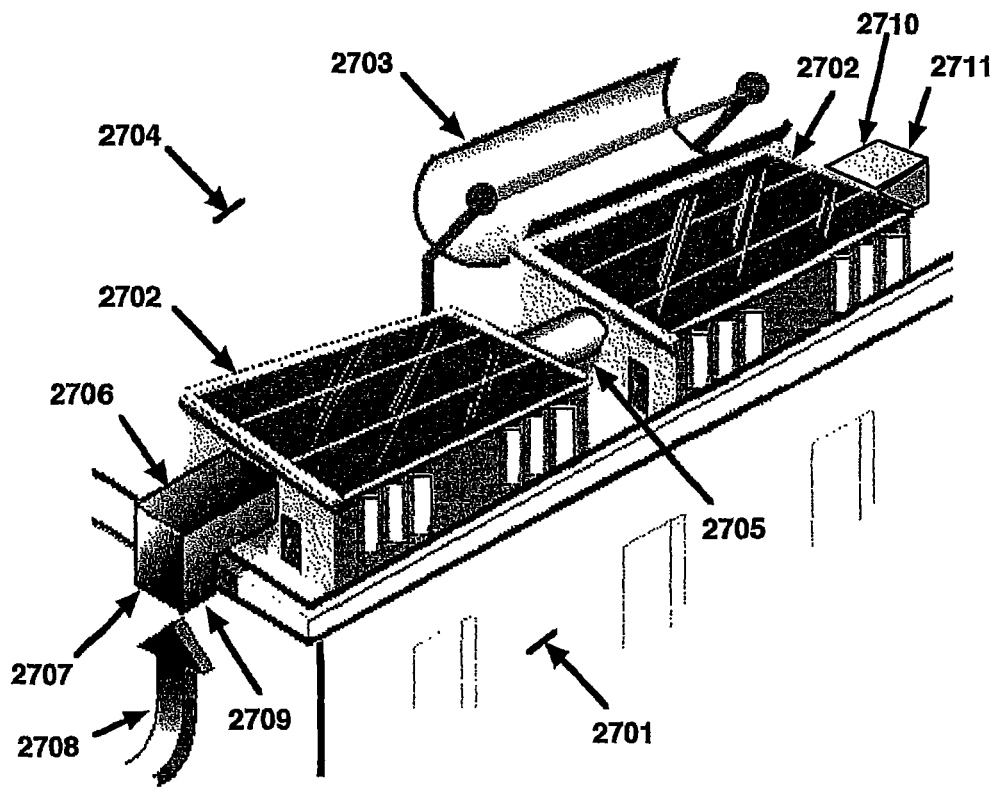
Figure 27  Building Rooftop Multiple Energy Generation System.
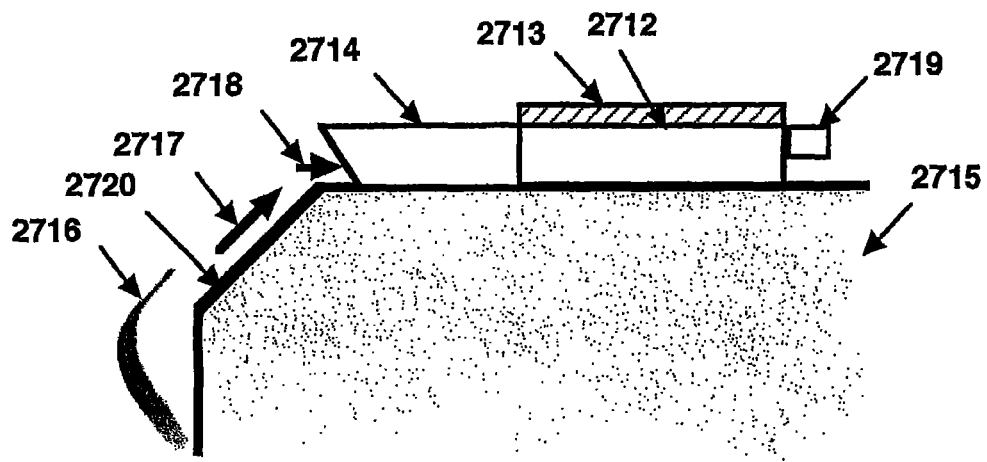
Figure 27A  Building Corner Set Back

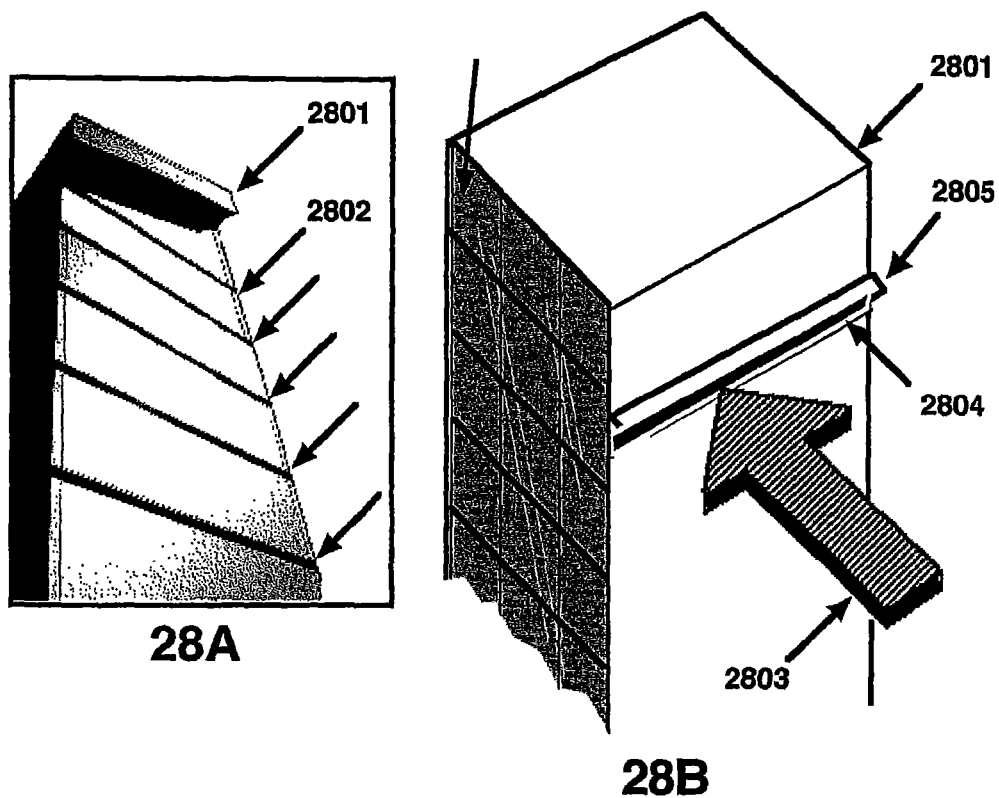
Figure 28 System to Allow Wind Pressure to Pass through the Building Generating Electricity in the Process

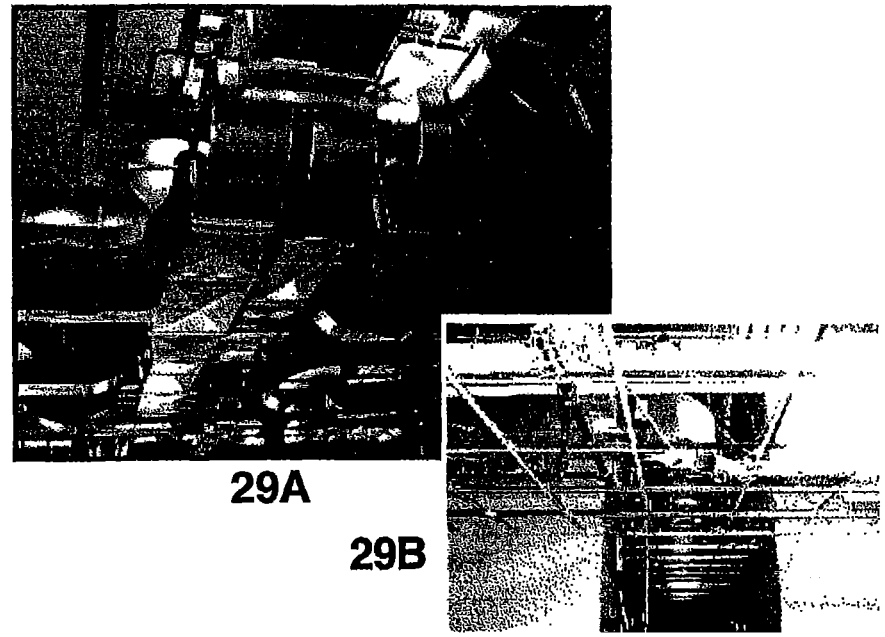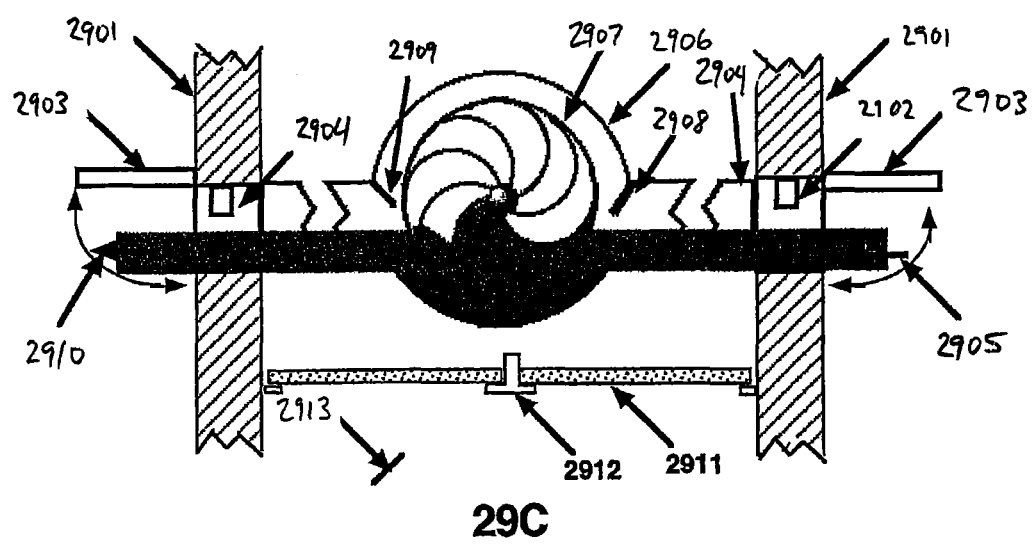
Figure 29 Flow Diagram of the Wind Through the Building

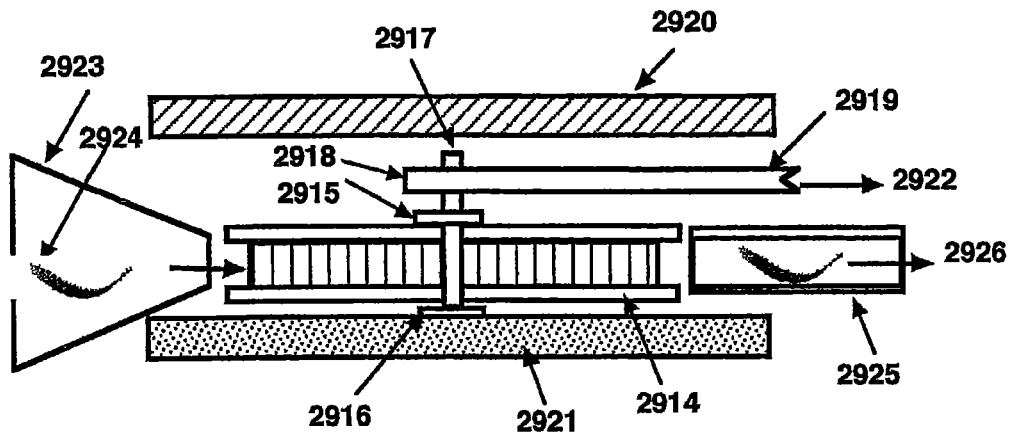
Figure 29D Wind Turbine Generation System for Between-the – Ceiling Applications
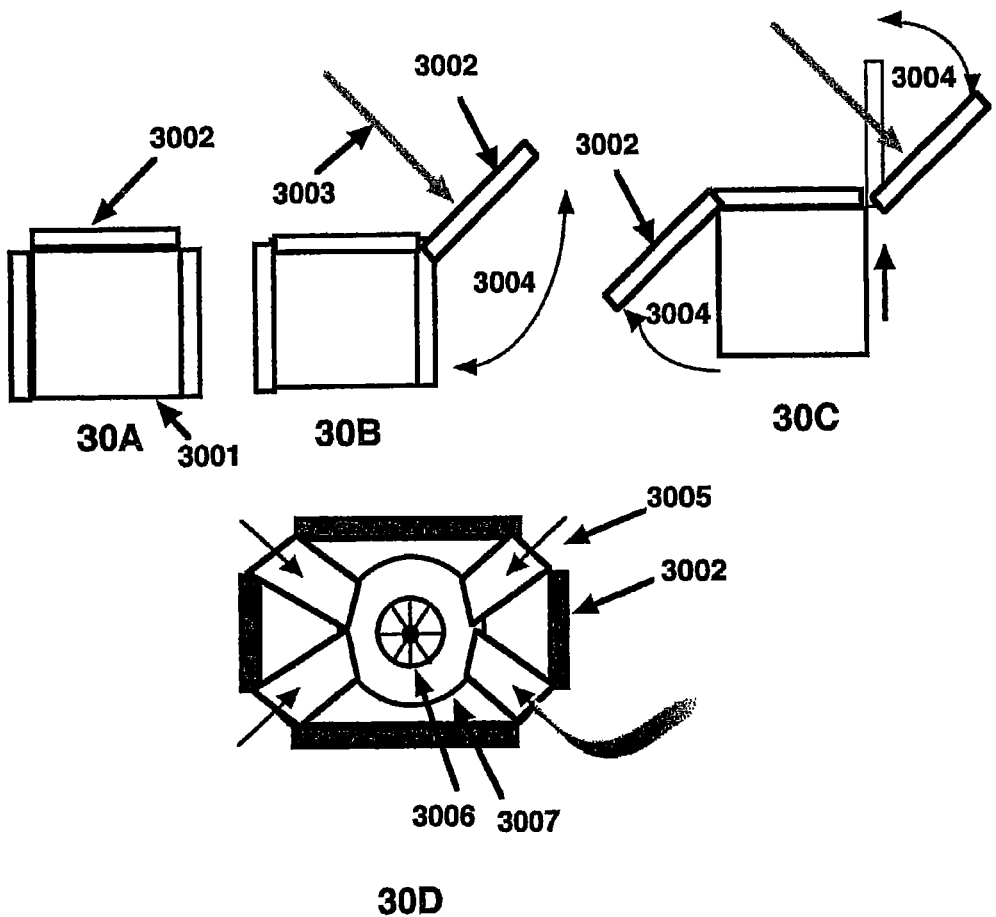
Figure 30 Modular Configuration for Solar Panel Placement

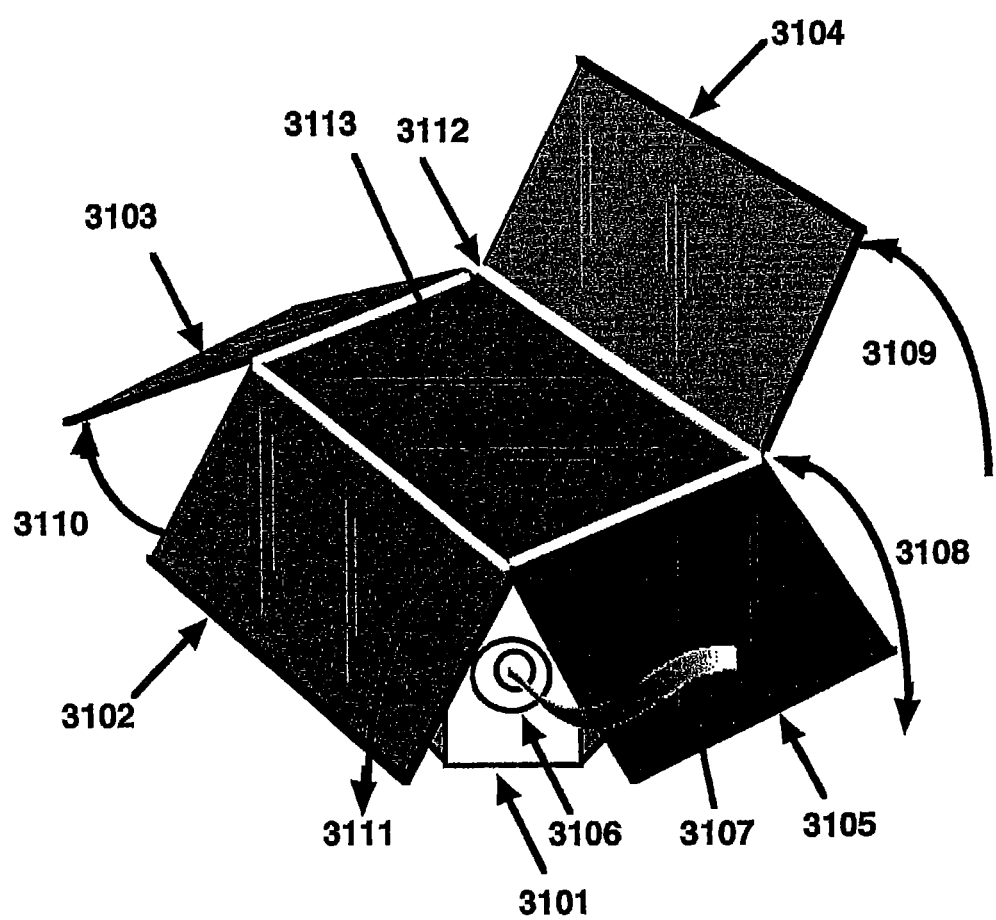
Figure 31 Modular Configuration for Solar Panels

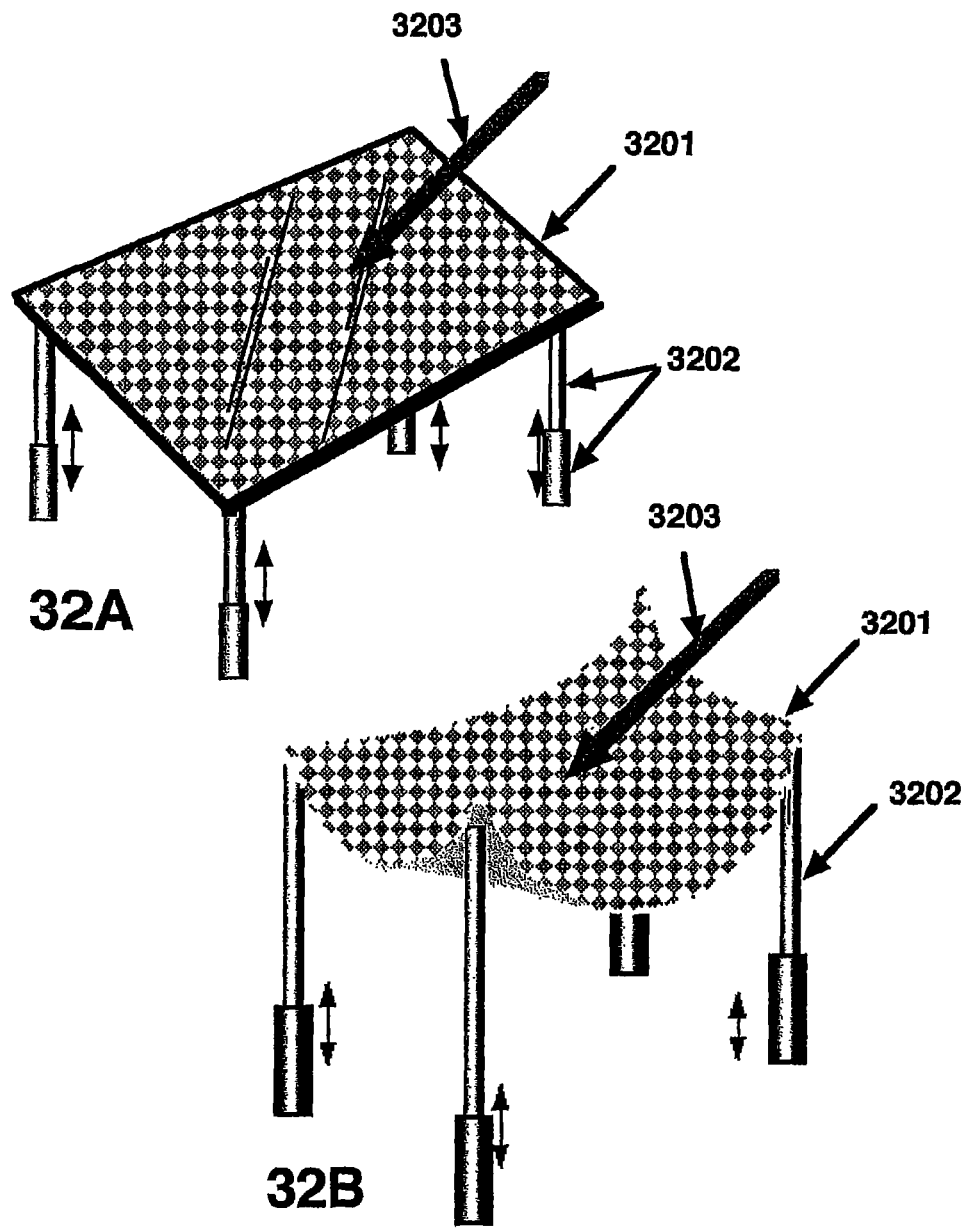
Figure 32 Flexible and Deformable Solar Panels

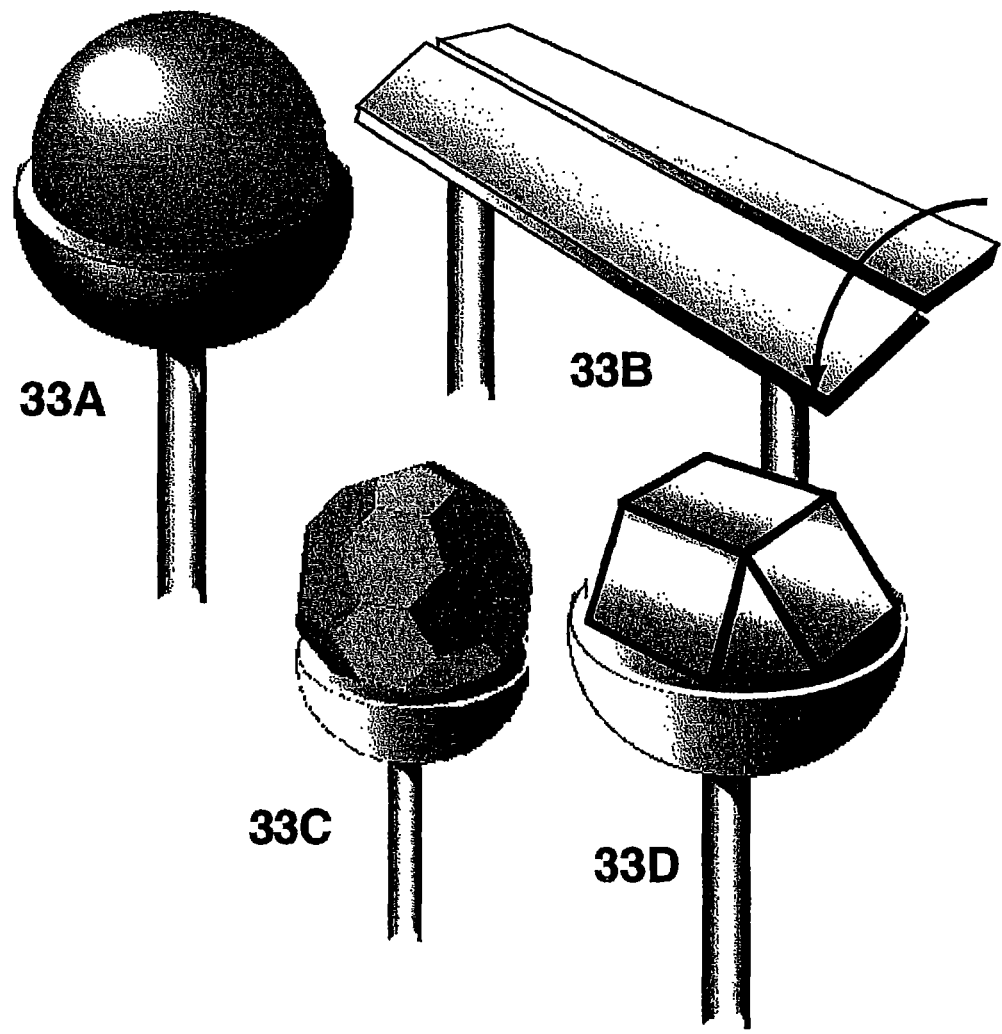
Figure 33 Solar Panel Configurations

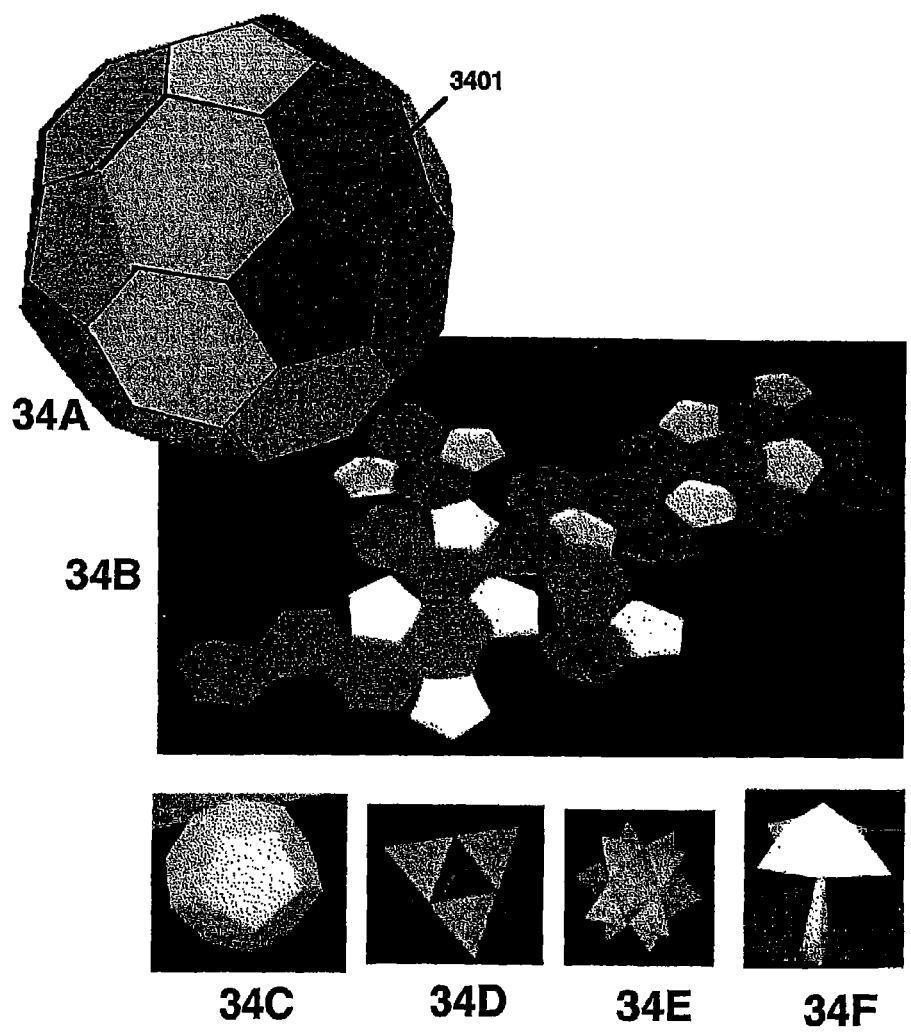
Figure 34 Other Geometric Solar Panel Configurations

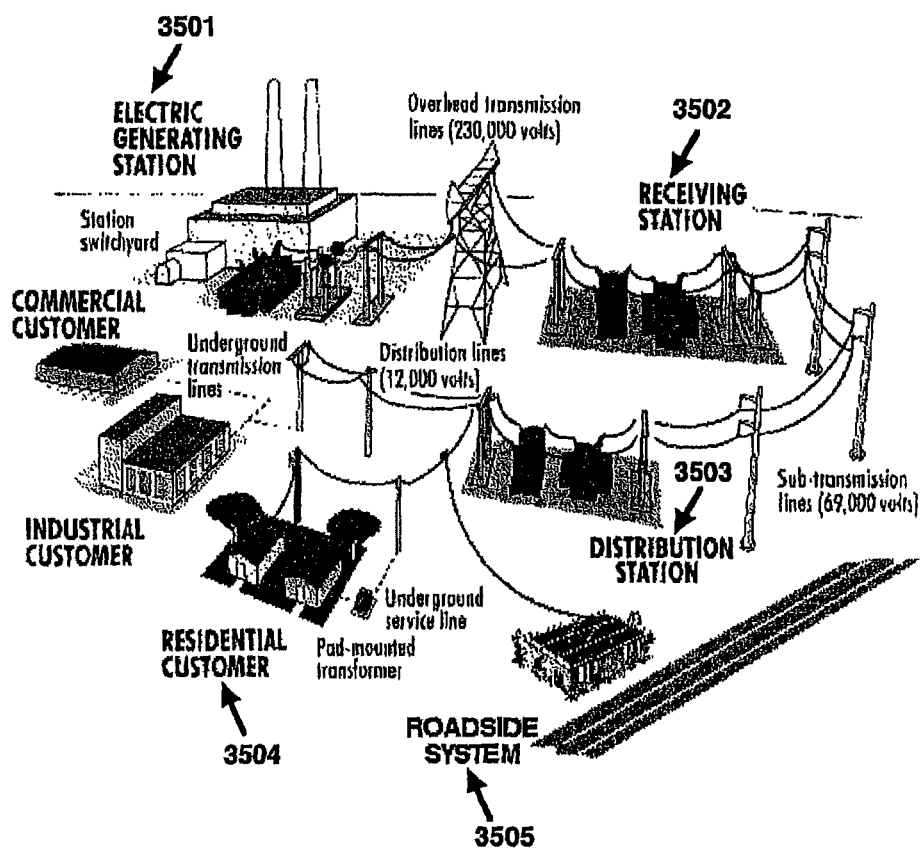
Figure 35 Electricity Grid Distribution

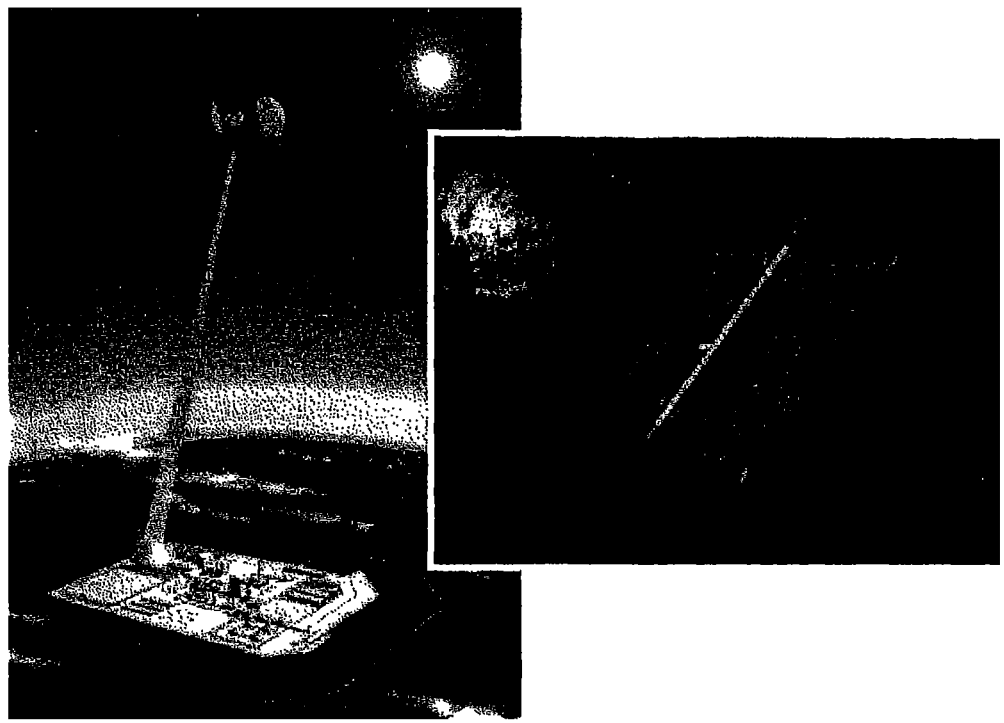
Figure 36 Illustration of Space Generated Electrical Energy Sent to Earthbound Power Grid.
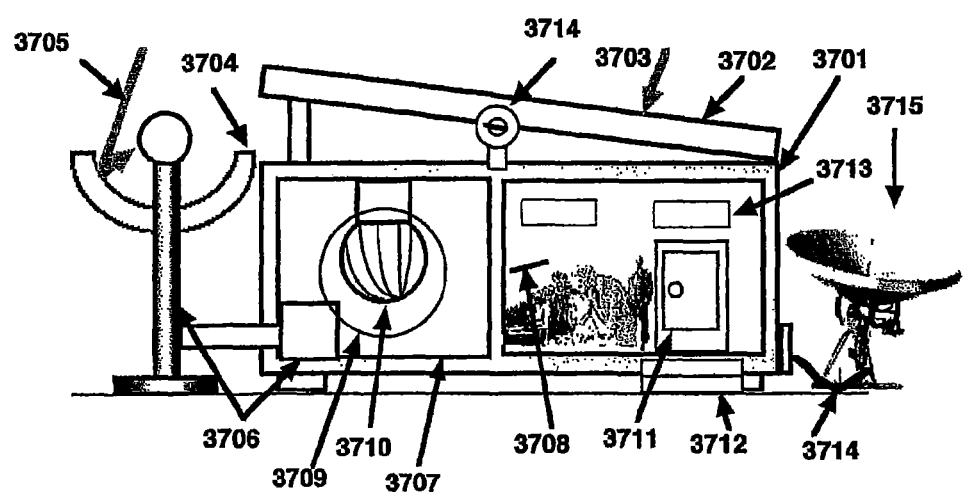
Figure 37 Portable Energy System

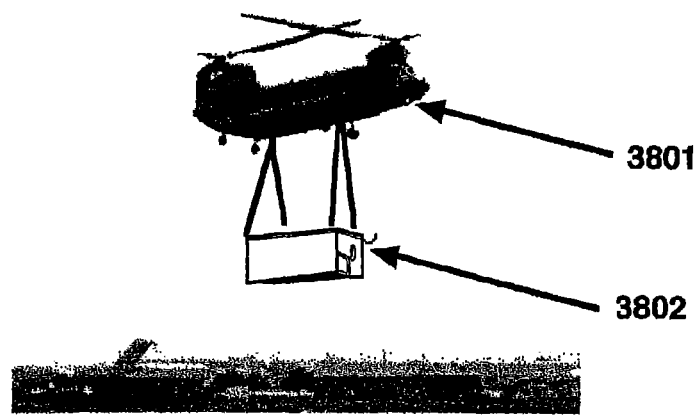
Figure 38 Portability of the Energy Generation Module (Artist's Conception)
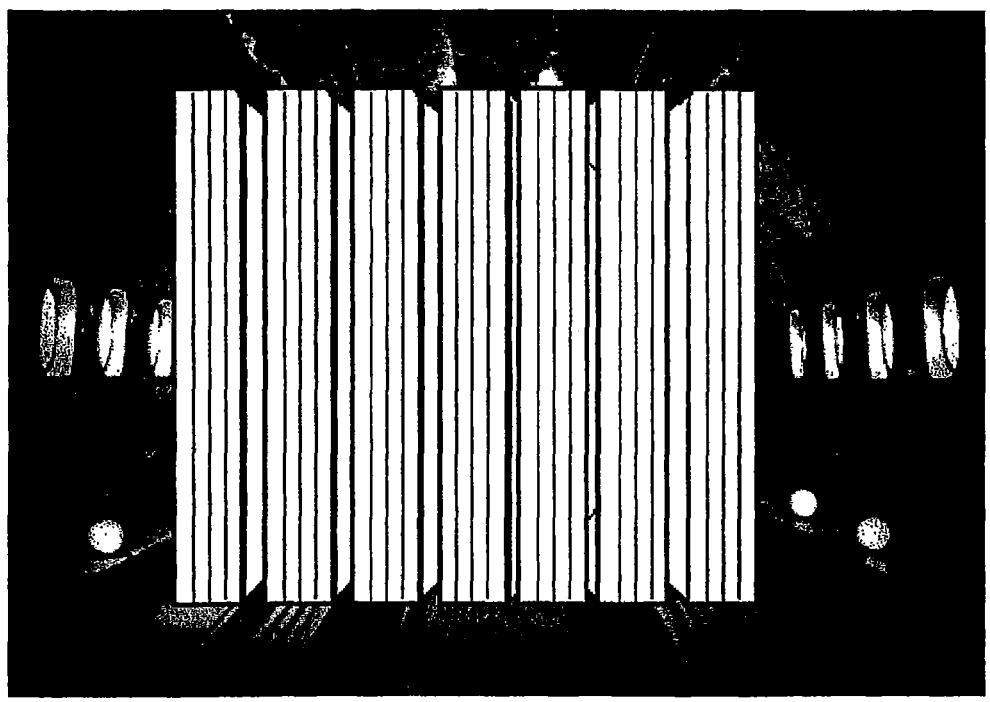
Figure 39 Folded Modules Aboard a C-130 Cargo Plane (Artist's Conception)

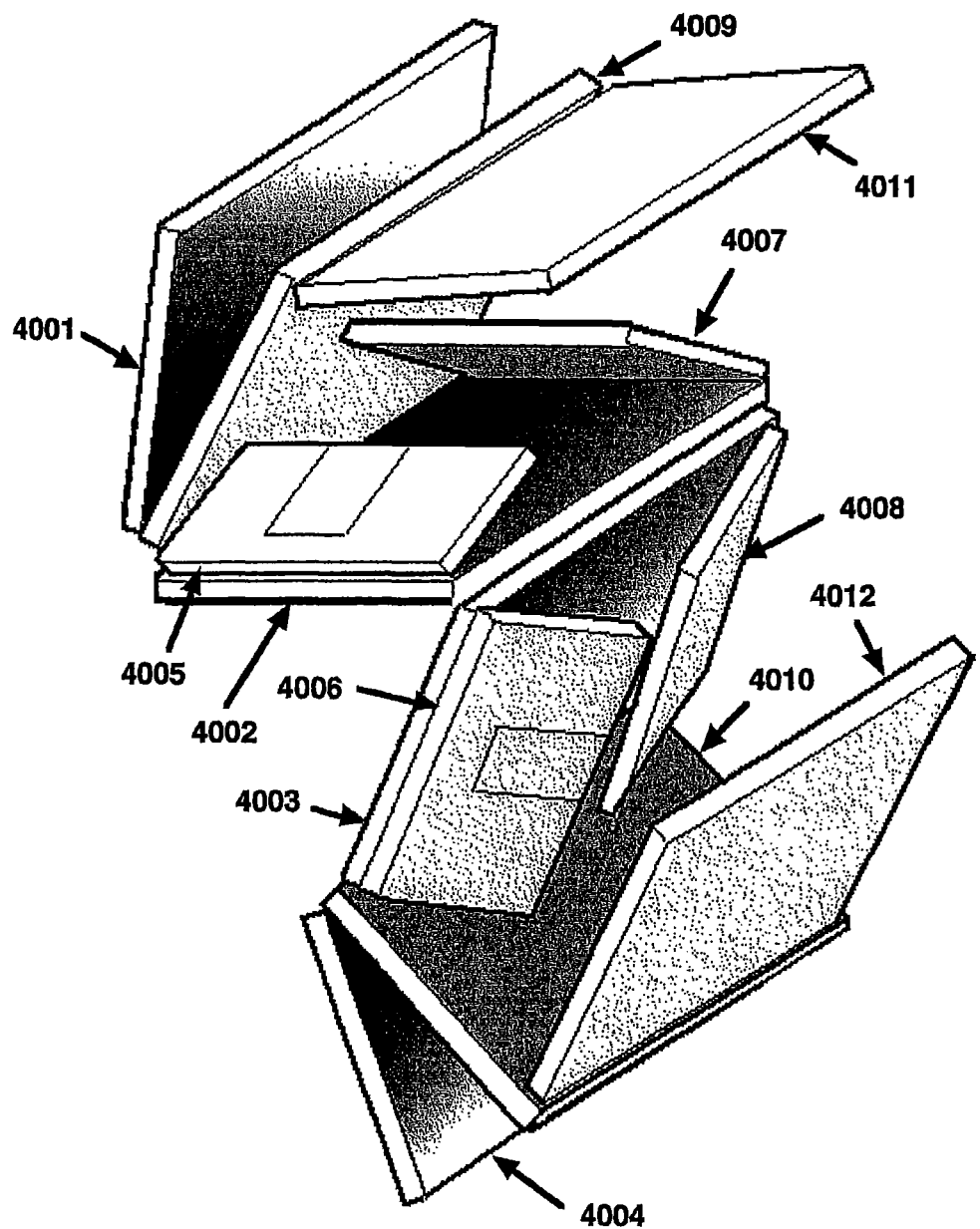
Figure 40 Bottom View of the Portable Structure Assembly

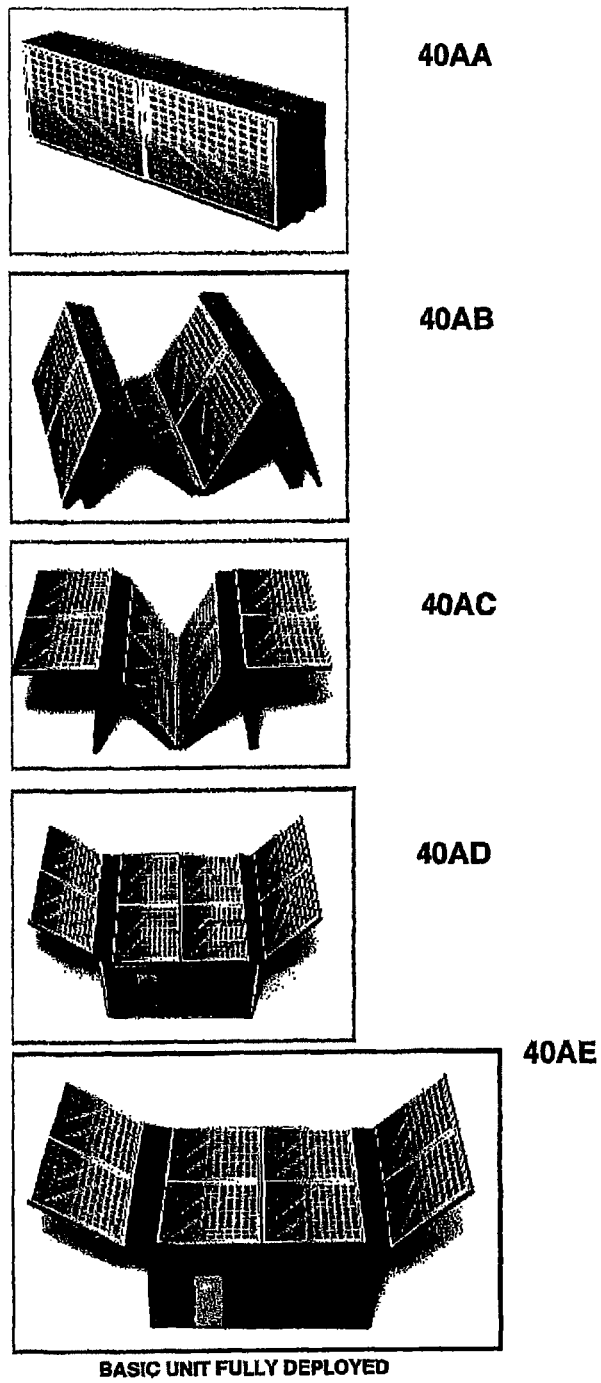
Figure 40A Model of the Portable Structure Assembly

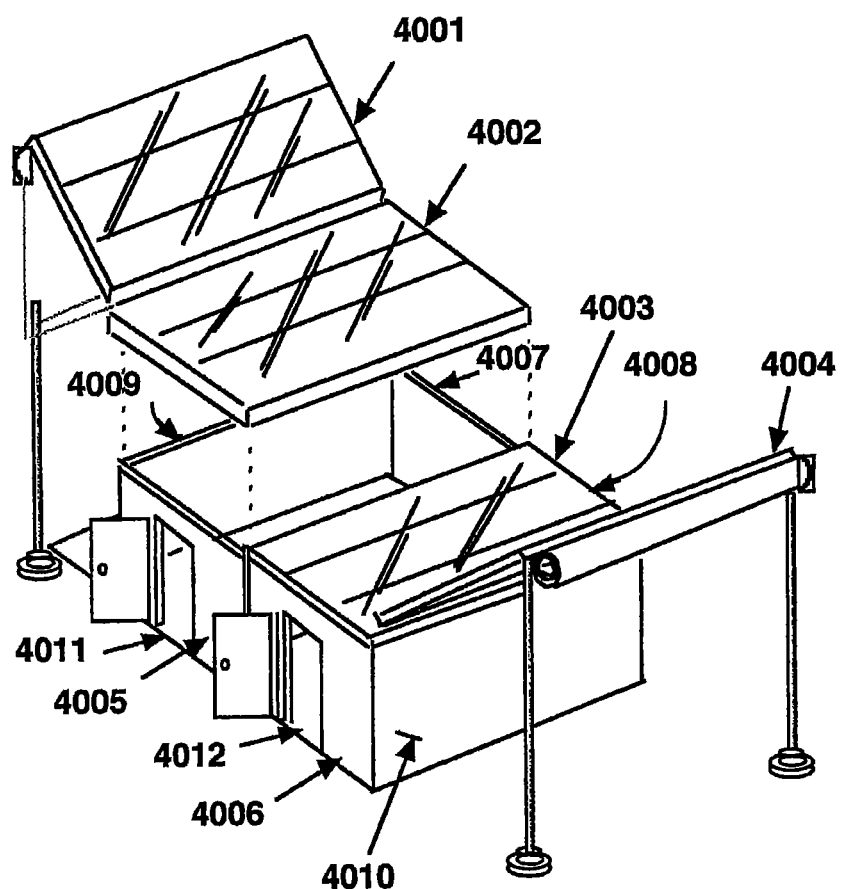
Figure 41 Is an Exploded View of the Assembled Panels and Structure

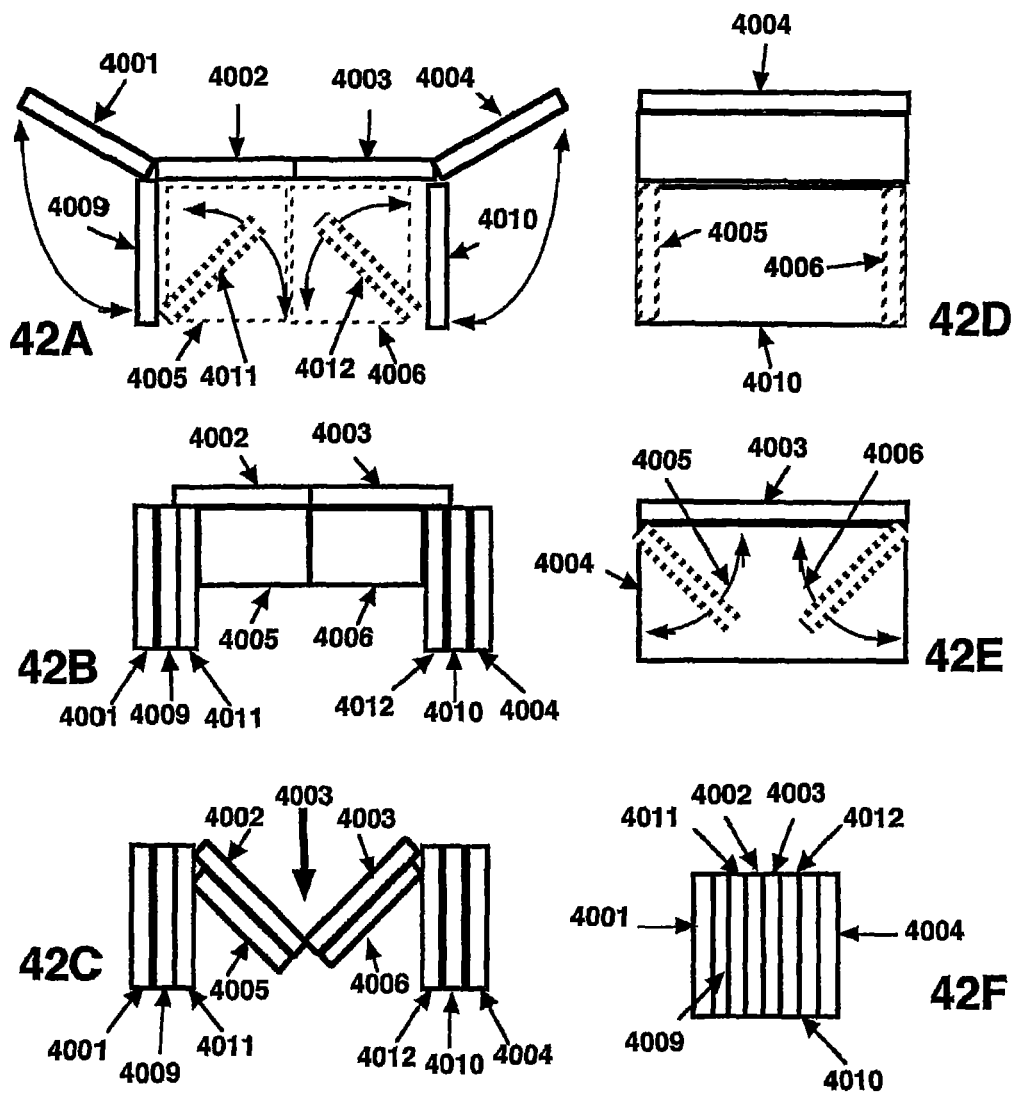
Figure 42 The Assembly/DisAssembly Sequence of the Portable Unit

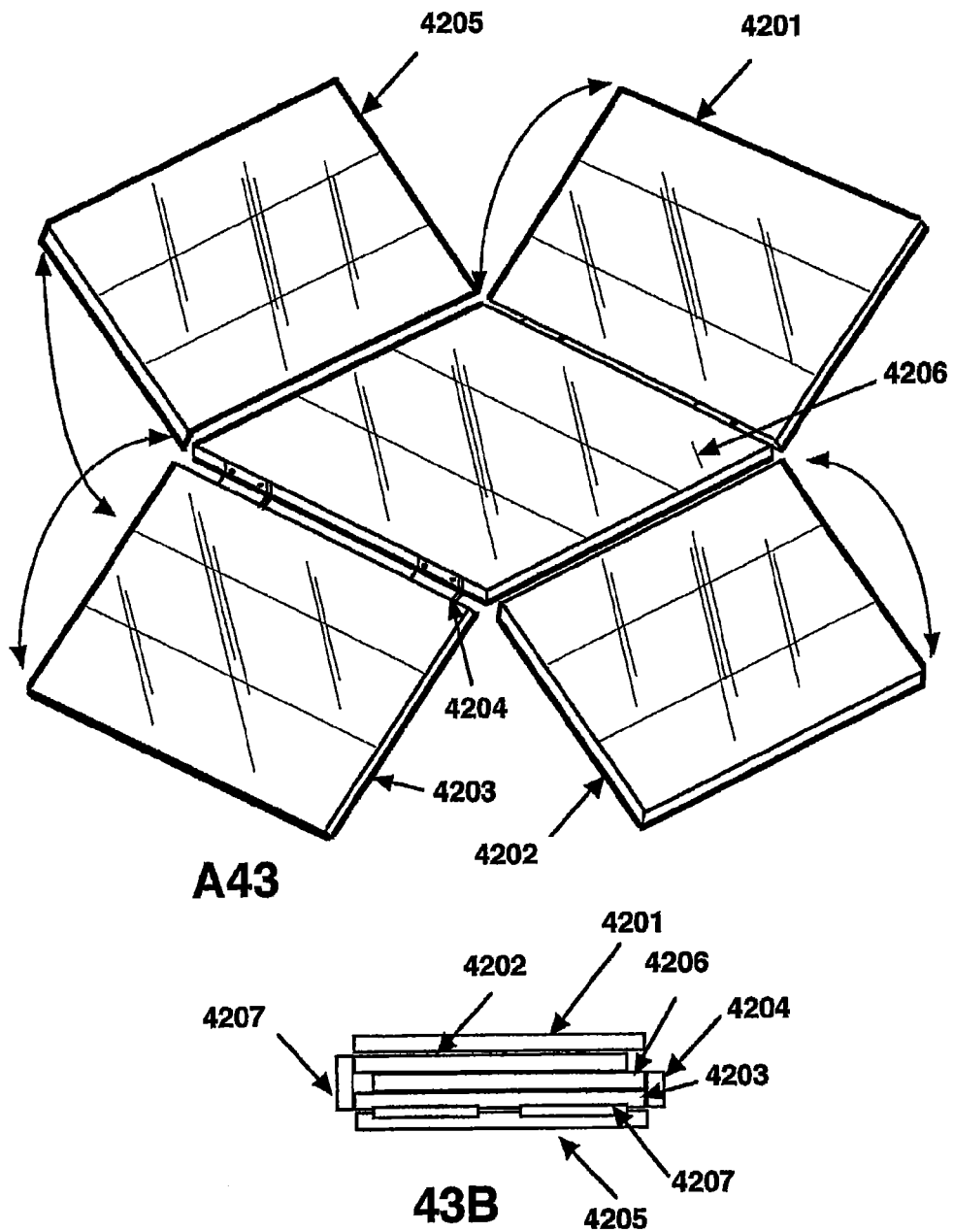
Figure 43 Another Embodiment

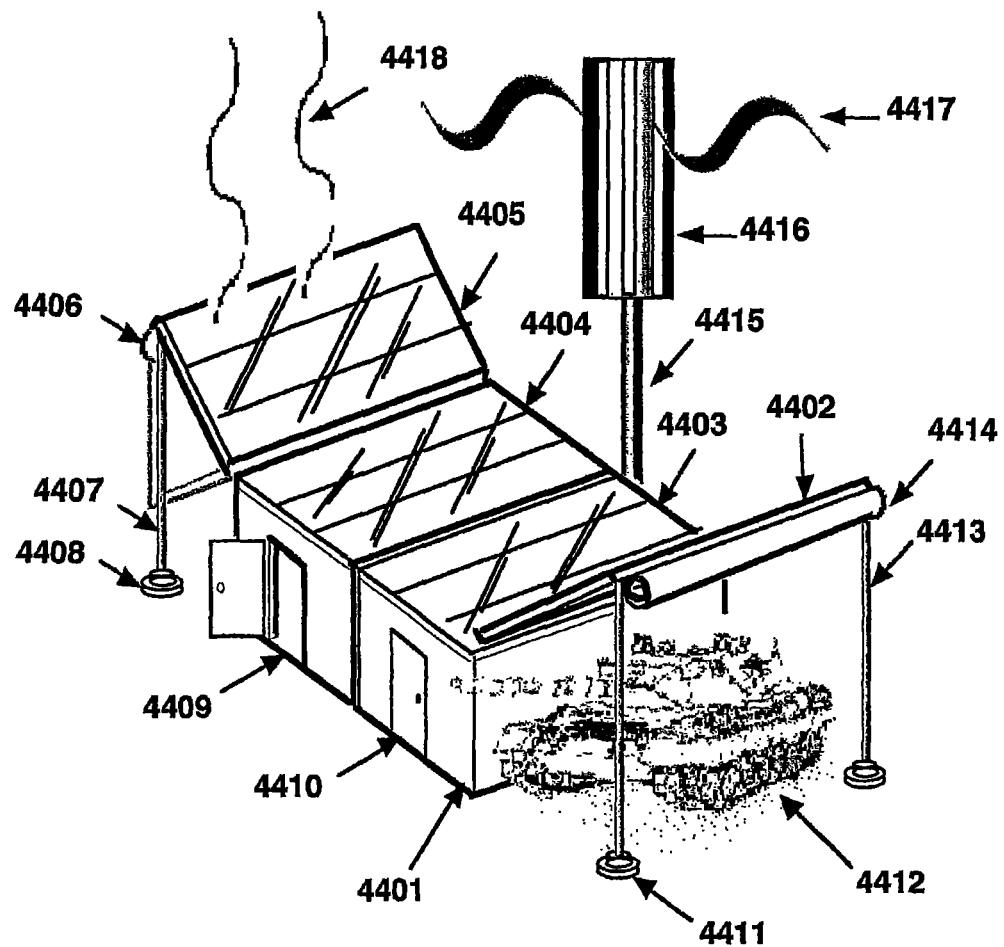
Figure 44 Fully Deployed Solar /Wind Units with Solar Panel Shade Work Area and Operational Quarters.

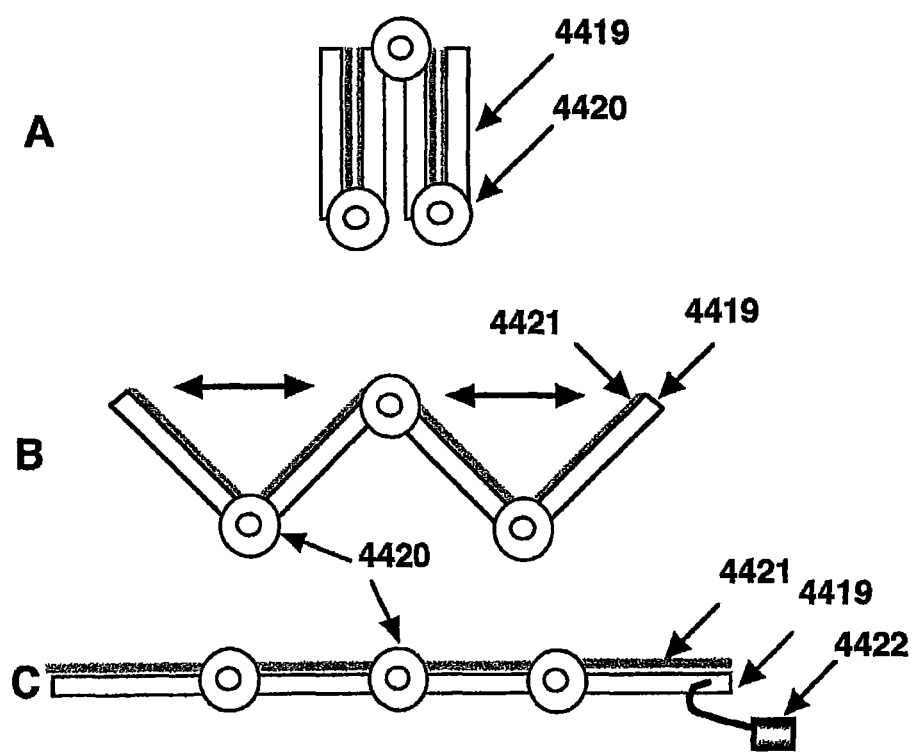
Figure 44A Manual/Semi-automatic Portable Module Set-up.

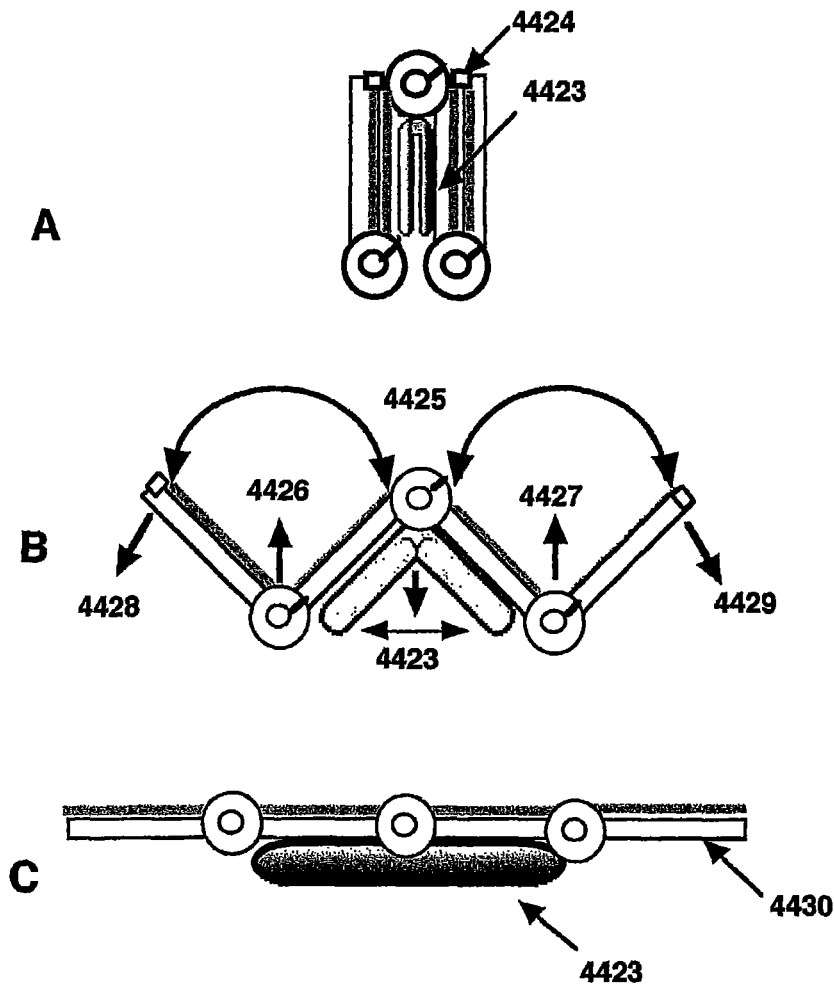
Figure 44B Inflatable Balloon Functions as a Flexing "Muscle" to Open the solar Module.
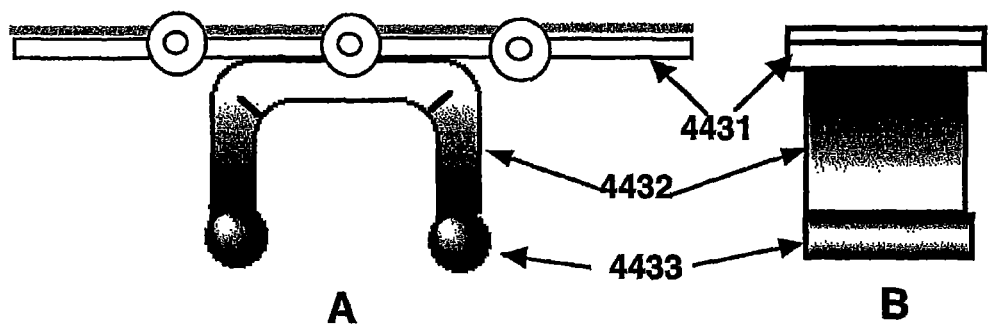
Figure 44C Inflatable "Legs and Feet"

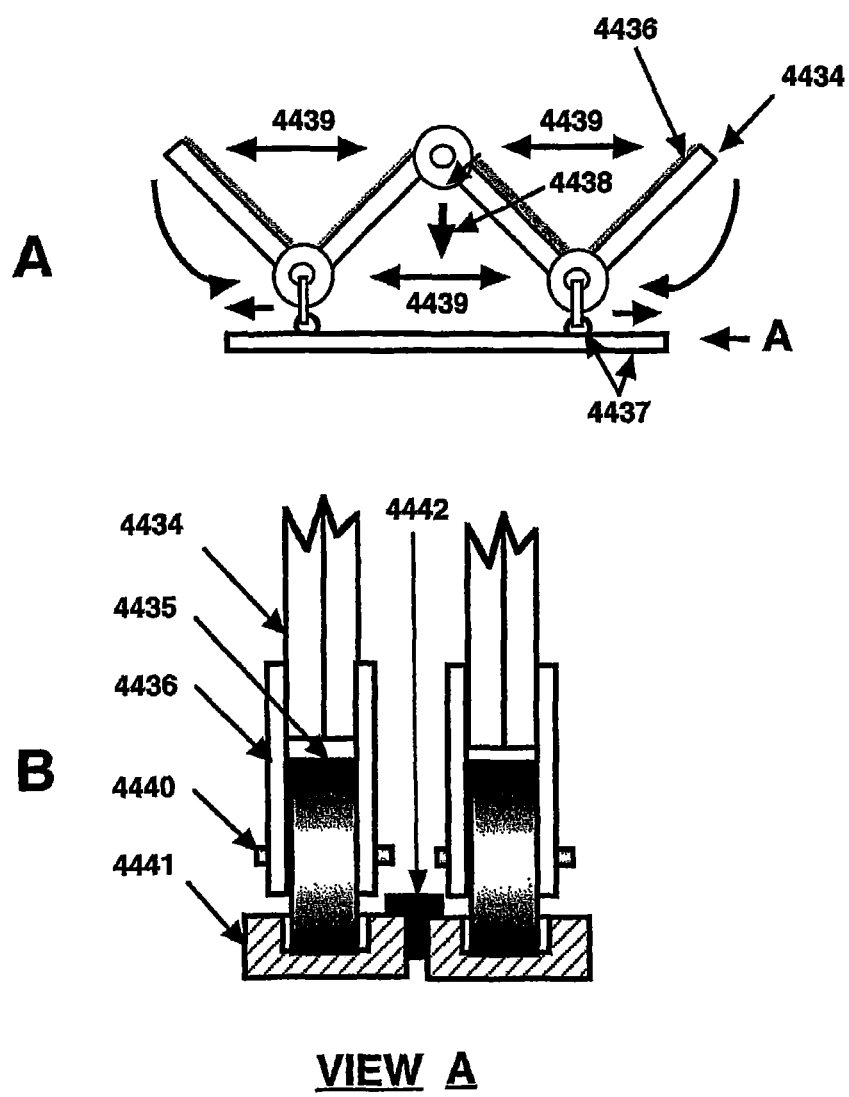
Figure 44D Rail Support Embodiments

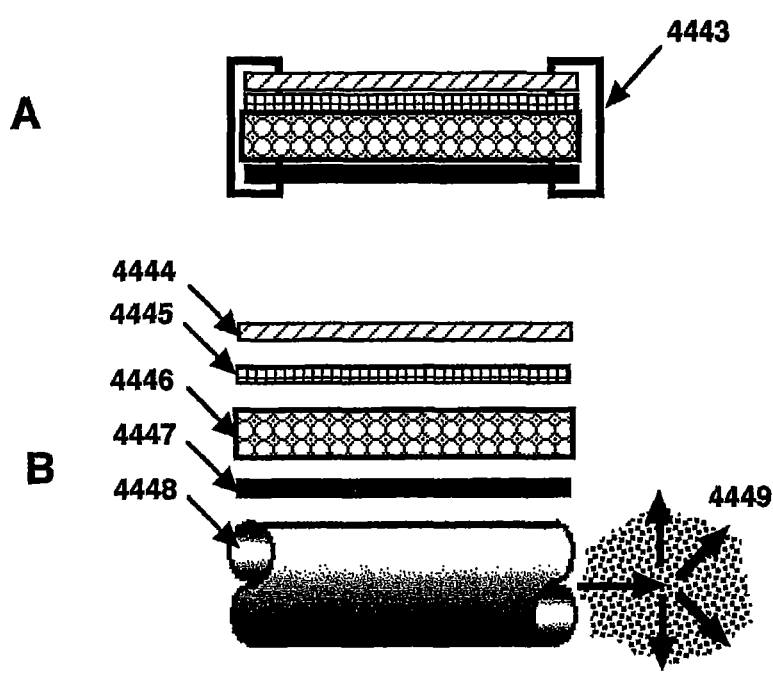
Figure 44E Typical Construction of the Expandable Solar panels

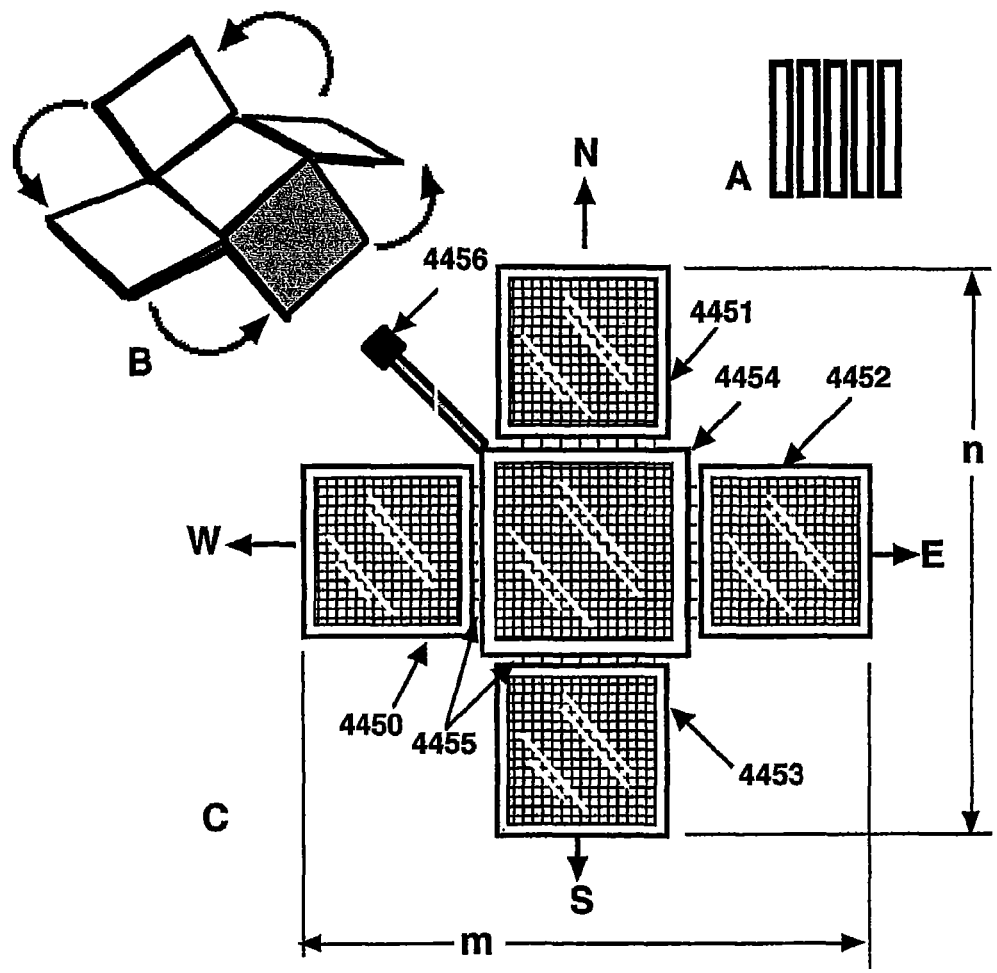
Figure 44F Unfolded Solar Panels

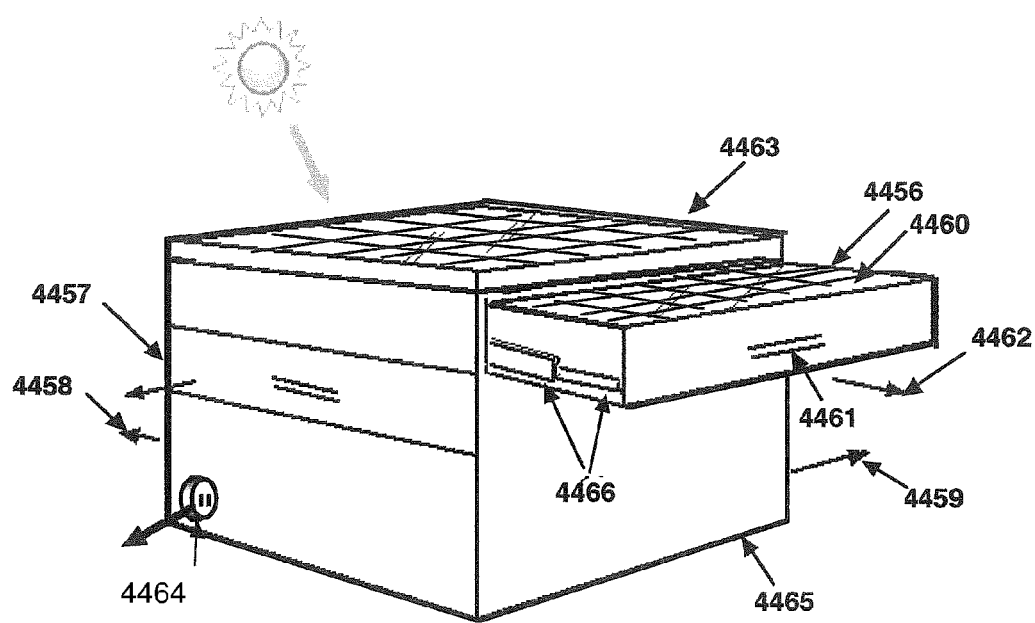
Figure 44G Solar Cube™ (Lifting Hooks not shown-Inverter is and Batteries are inside unit)
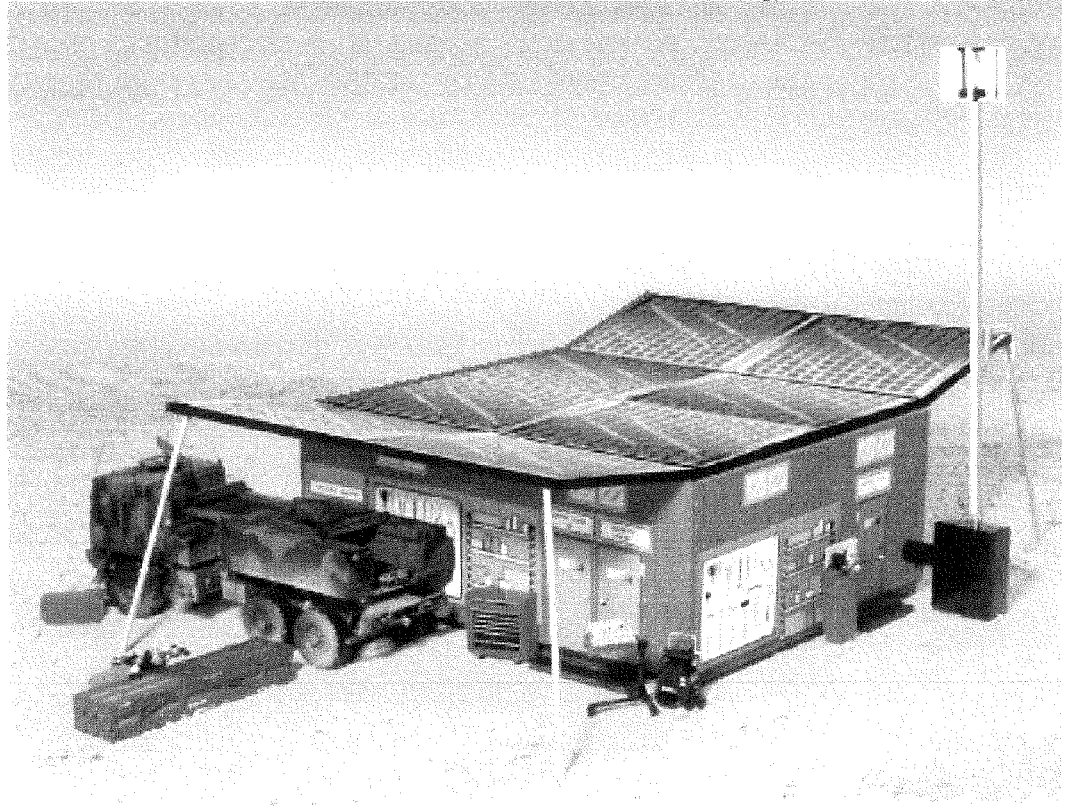
Figure 44H Model of a Fully Deployed Solar /Wind Portable Housing Units Configured as a Military Field Repair Facility with Solar Panel Shaded Work Area and Operational Quarters.

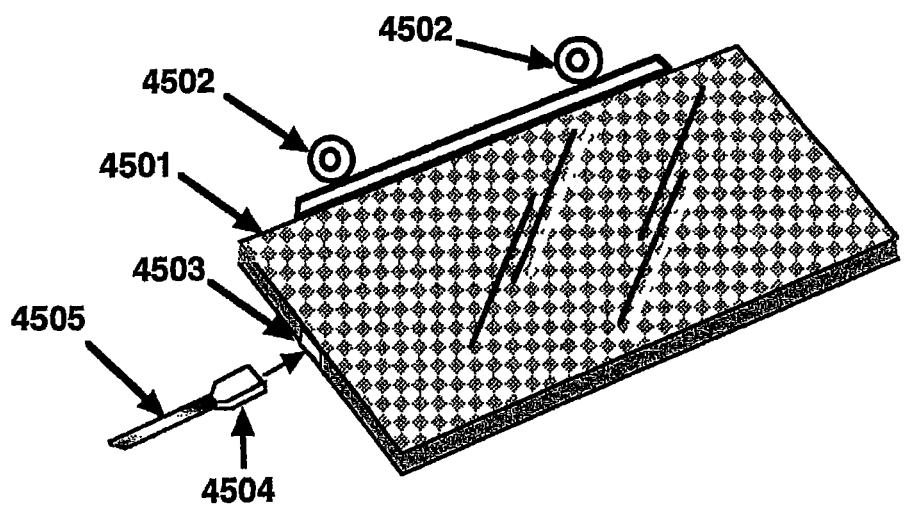
Figure 45 Portable Solar Panels

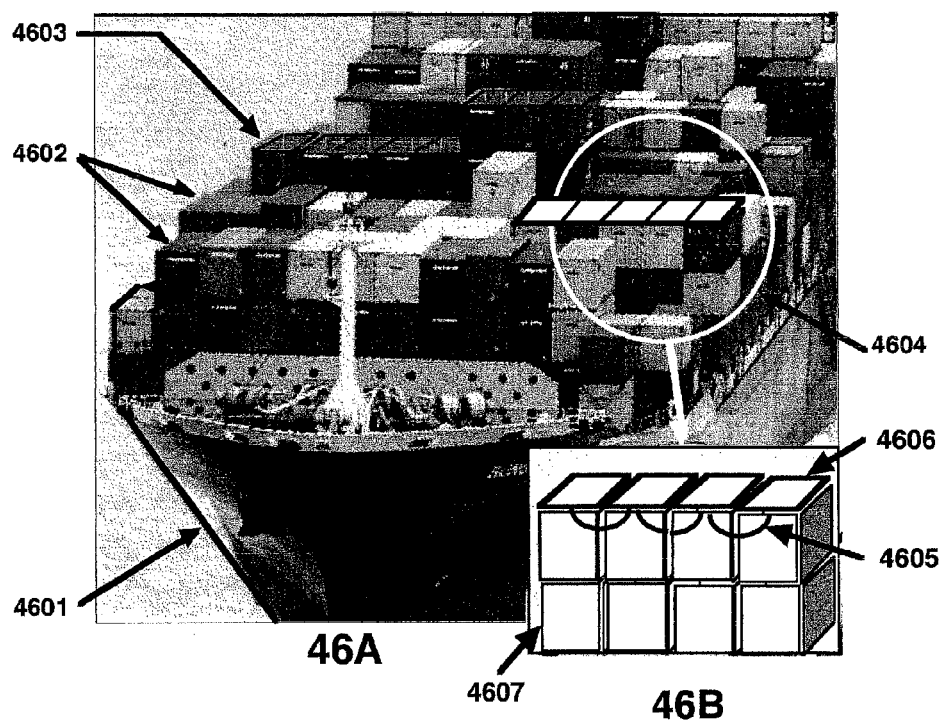
Figure 46 Portable Solar Panels Covering Containers Generate Electricity at Sea (Not shown are the wind systems).

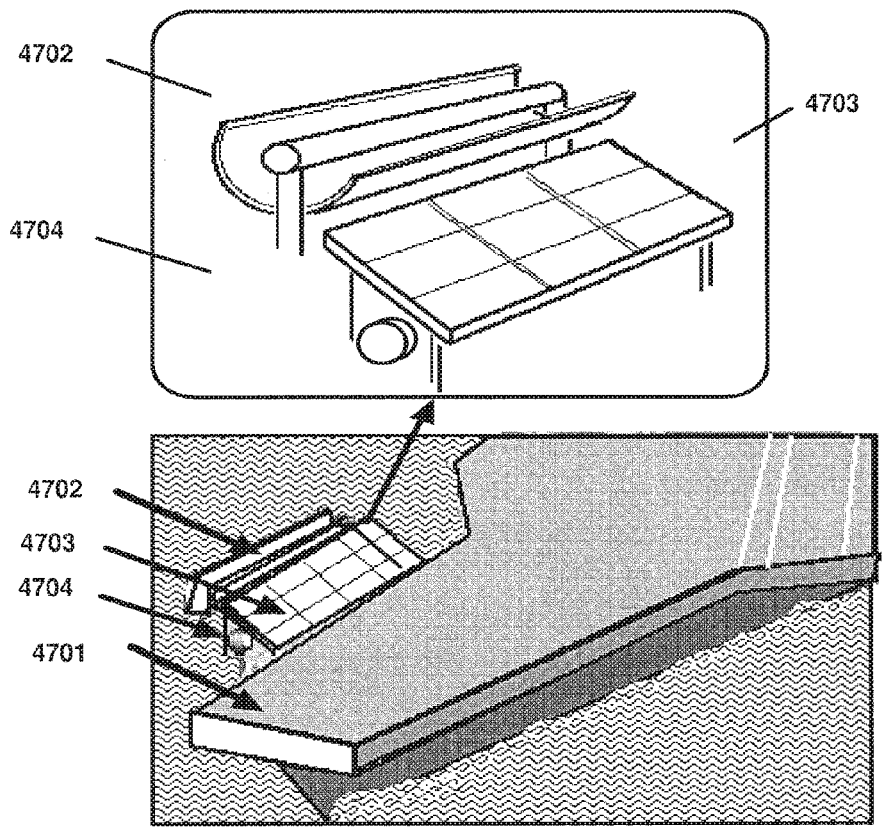
Figure 47 System Attached to an Aircraft Carrier that Generates Additional Electrical and Heating Energy (Artist's Conception).
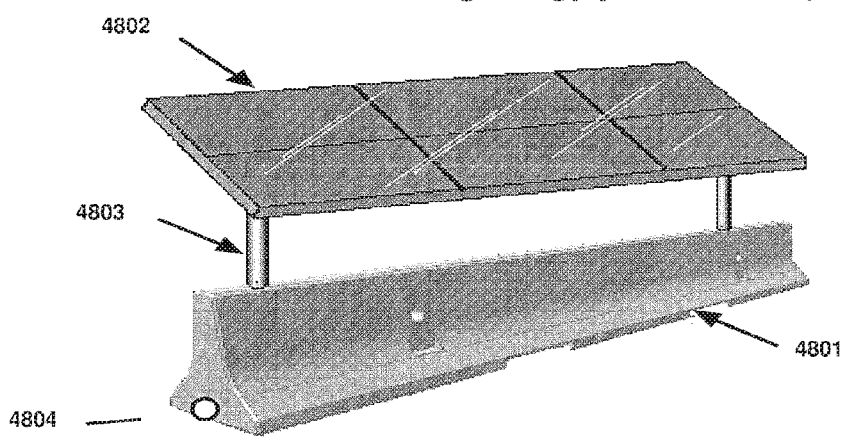
Figure 48 Extended Solar Paneled Roadside
(Barriers Optional Wind System not illustrated)

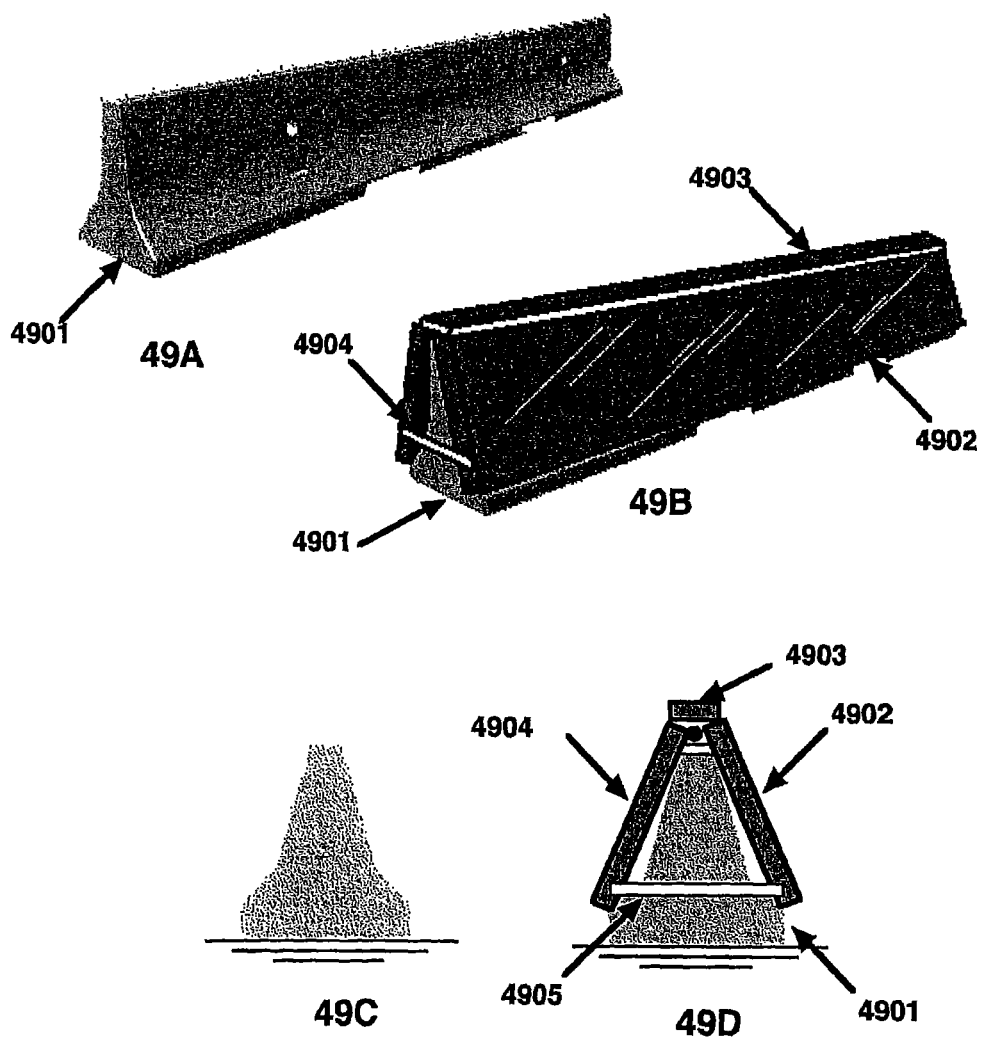
Figure 49 Solar Paneled Concrete Barriers

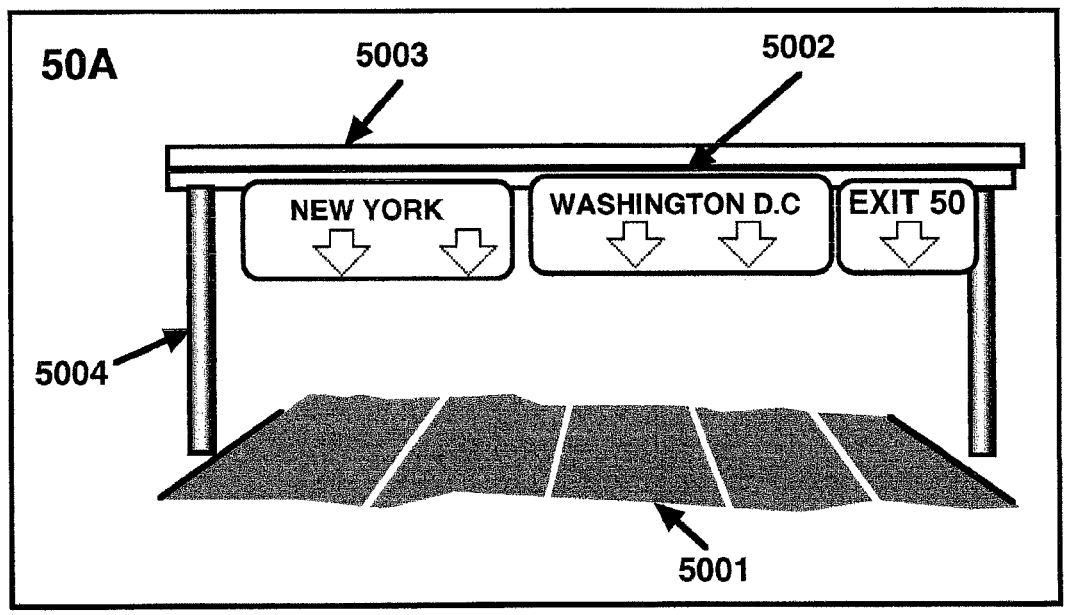
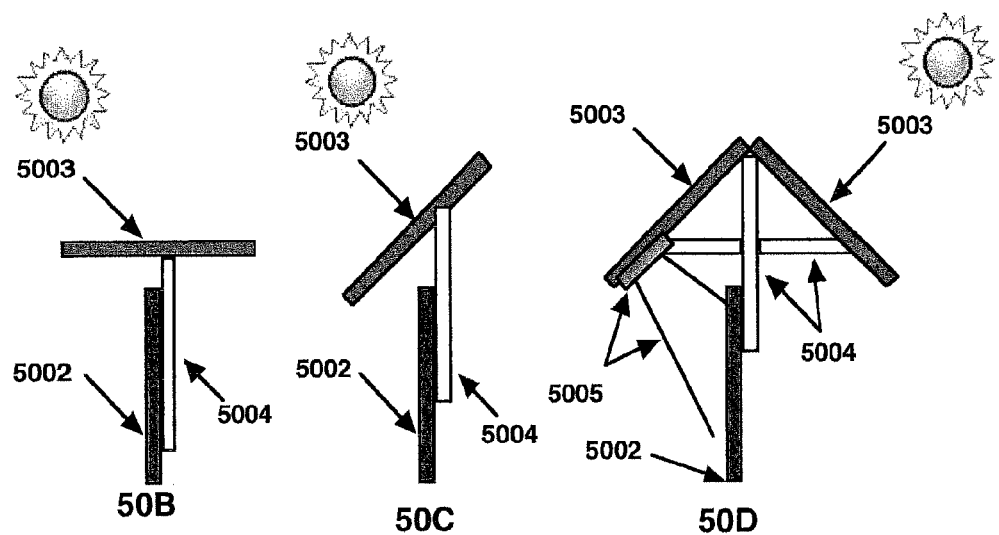
Figure 50 Signage Structure Solar Panels

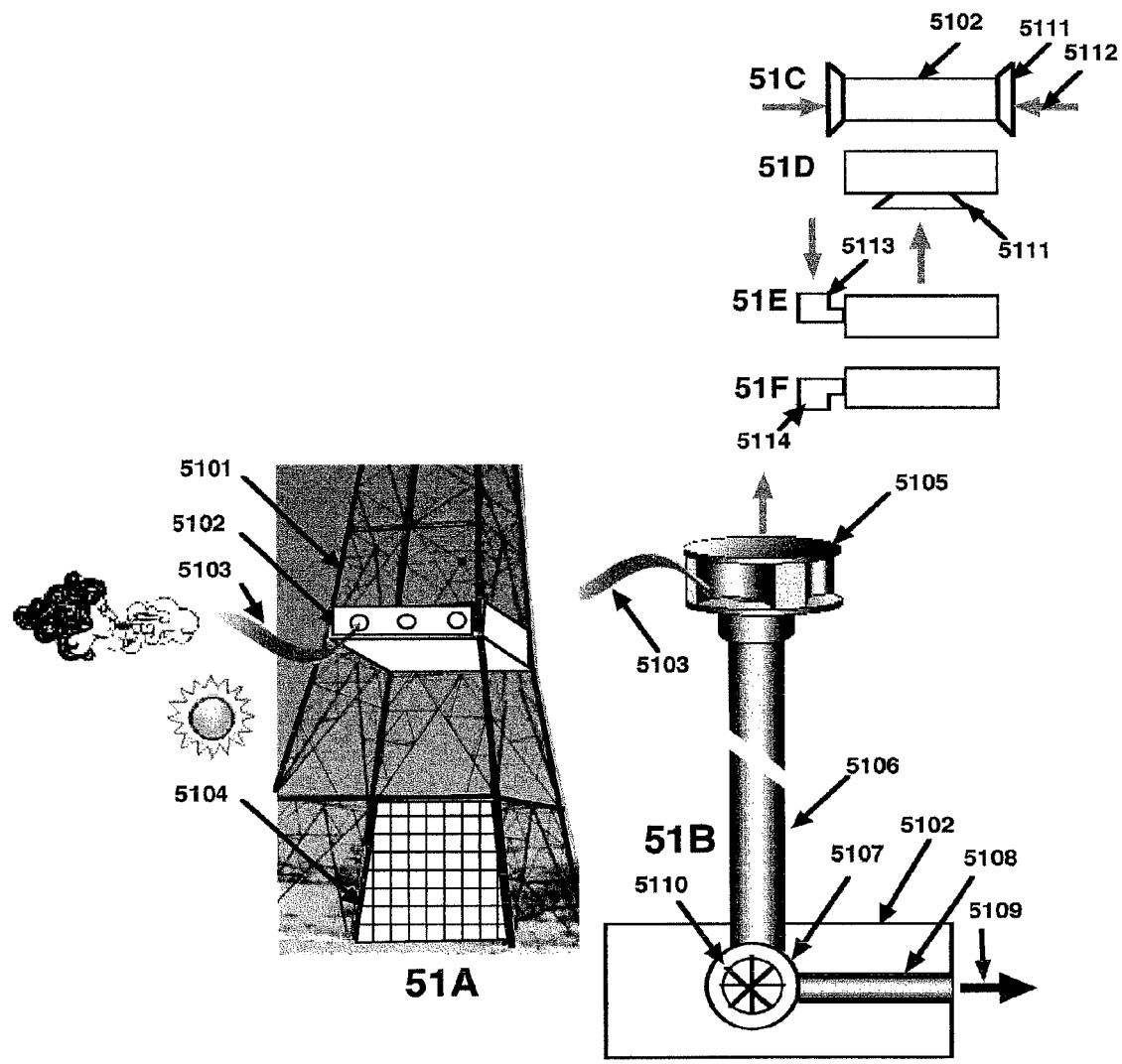
Figure 51 Transmission Tower System Utilization Application

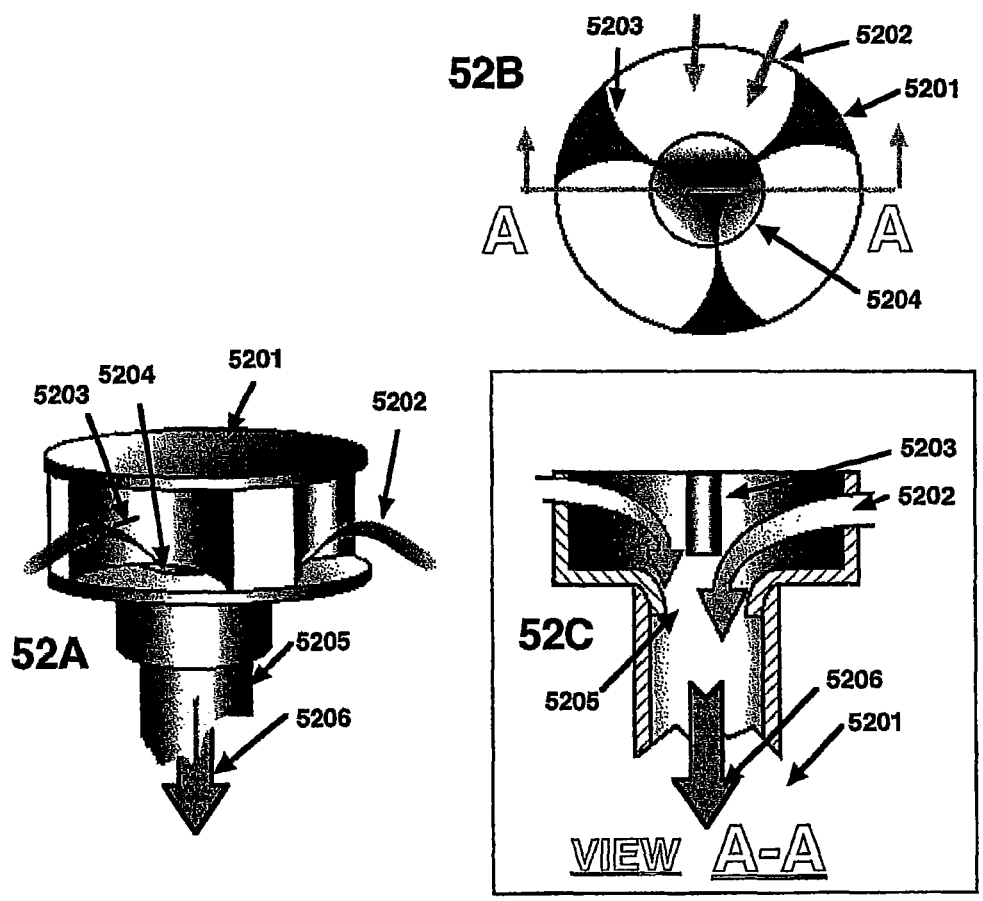
Figure 52 Wind Gathering System

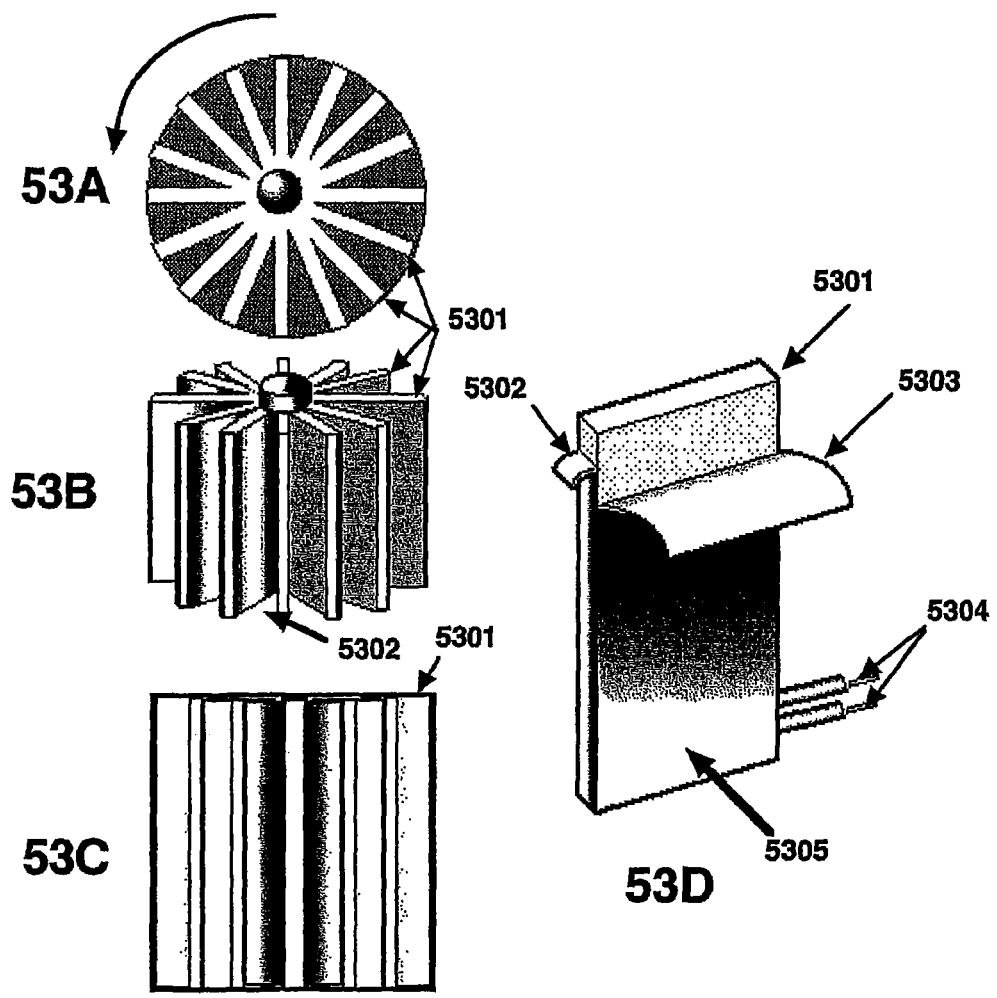
Figure 53 Photovoltaic Wind Turbine Blades

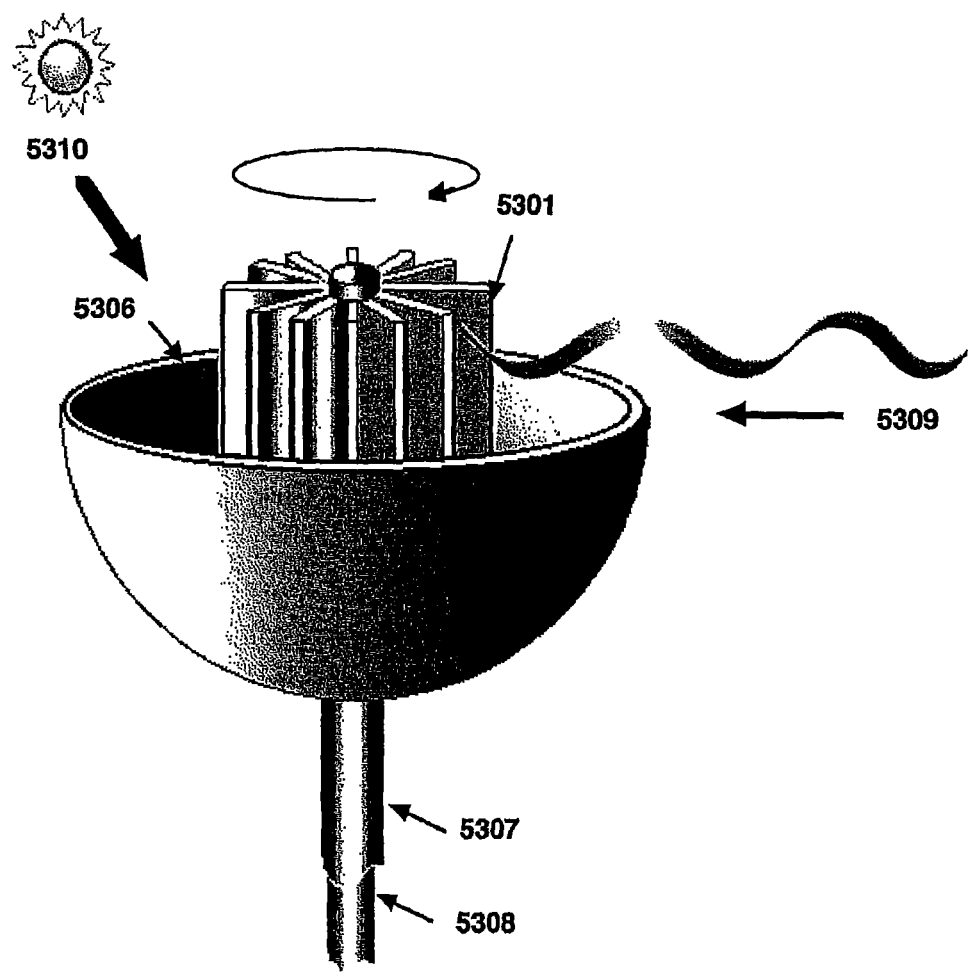
Figure 53E A Parabolic Reflecting Surface and Photovoltaic Covered Turbine Blades

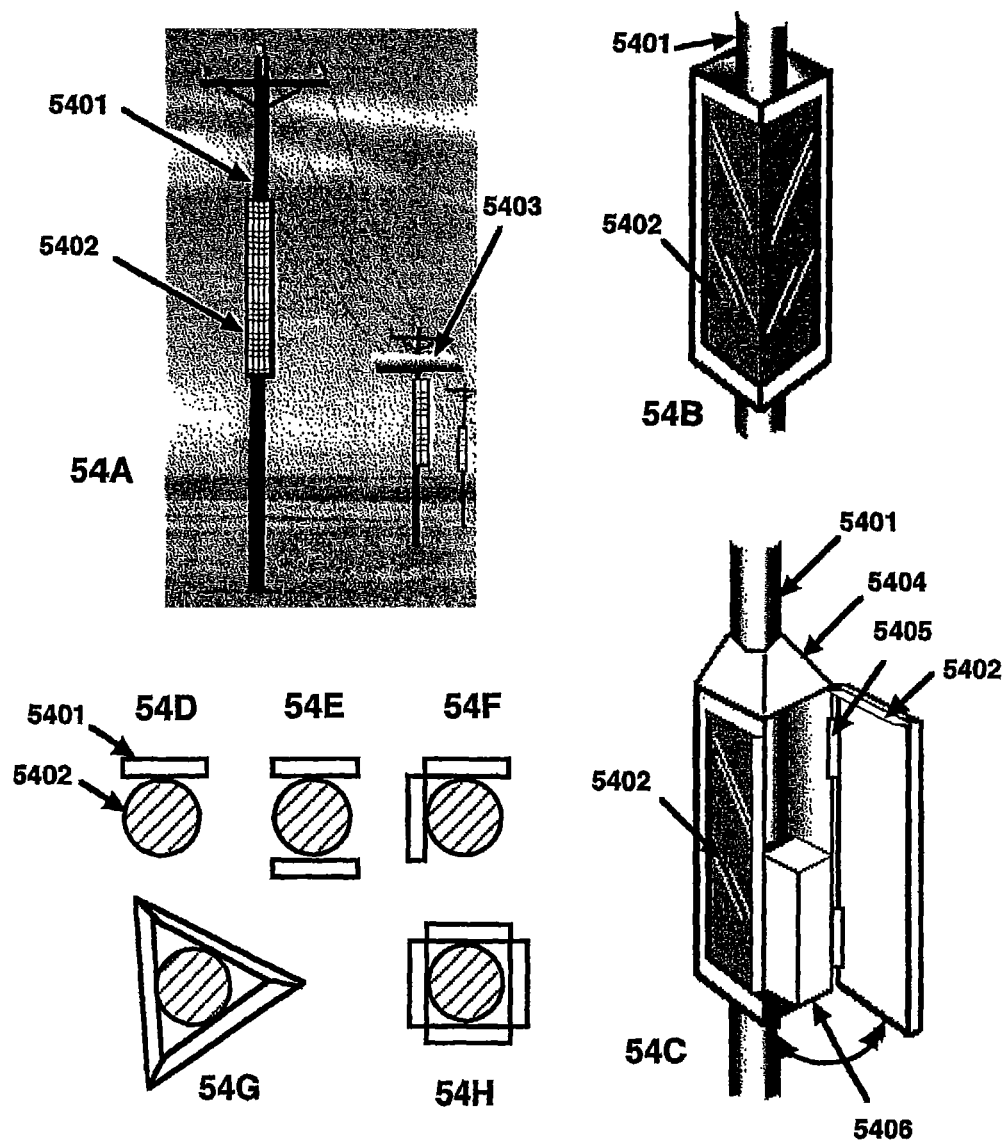
Figure 54 Photovoltaic Cells Generating Electricity from Telephone Poles

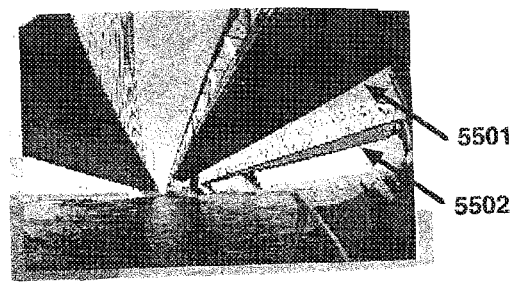
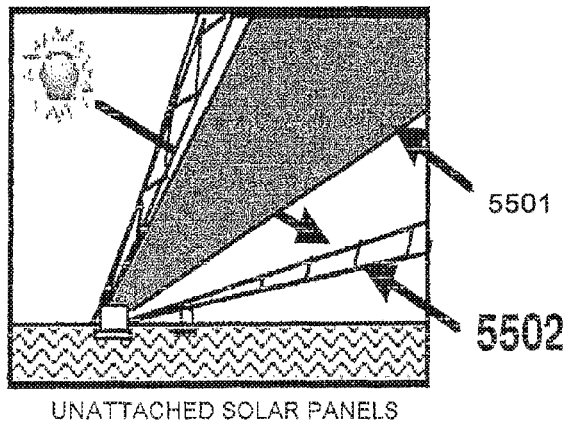
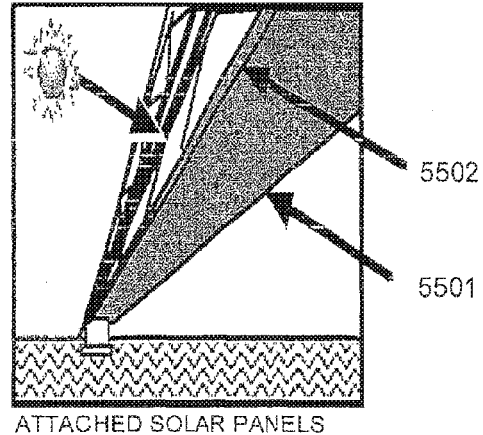
FIGURE 55A

Application of the Invention Utilizing Railroad Track Areas as Sites for Electrical Power Generation (Wind Systems not Illustrated)

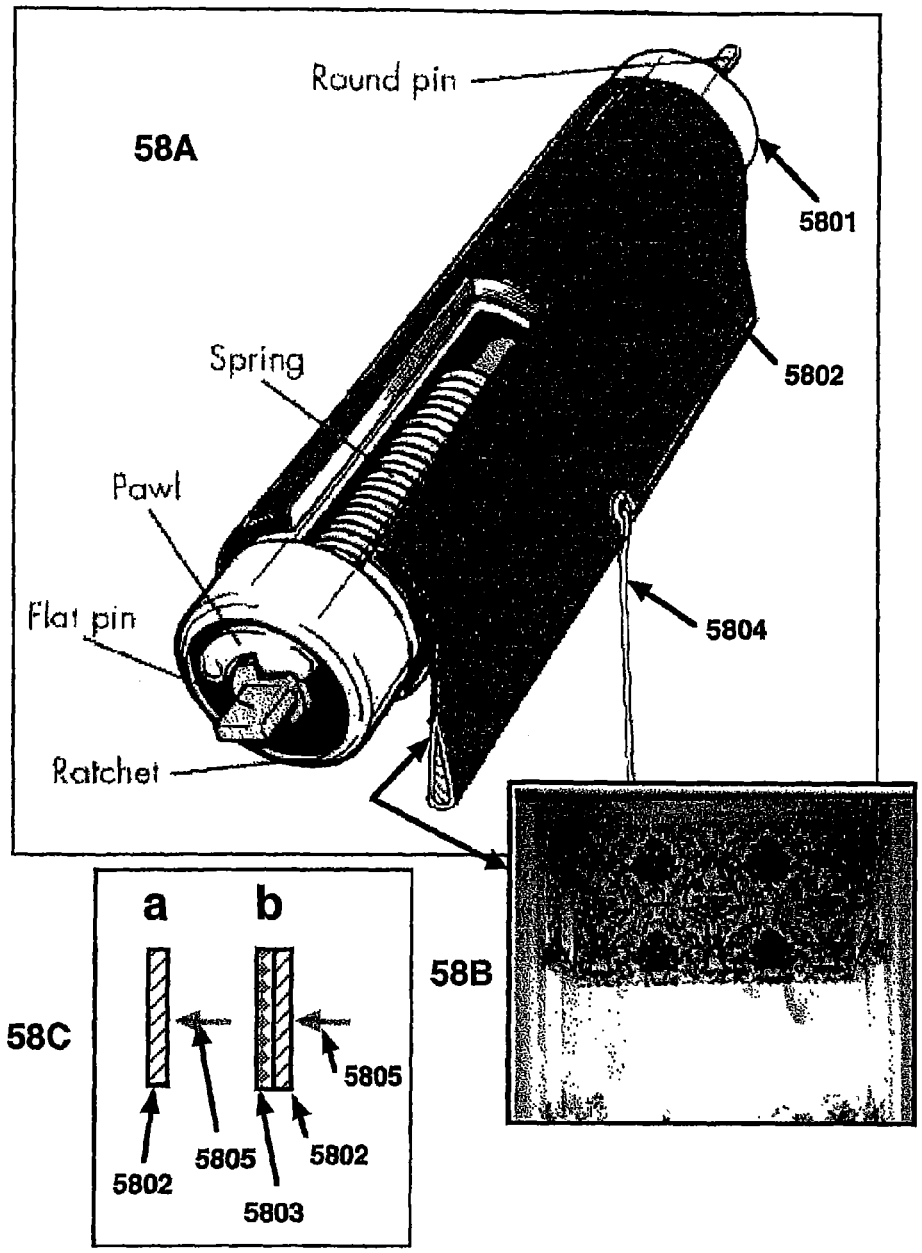
Figure 58 Solar Shade

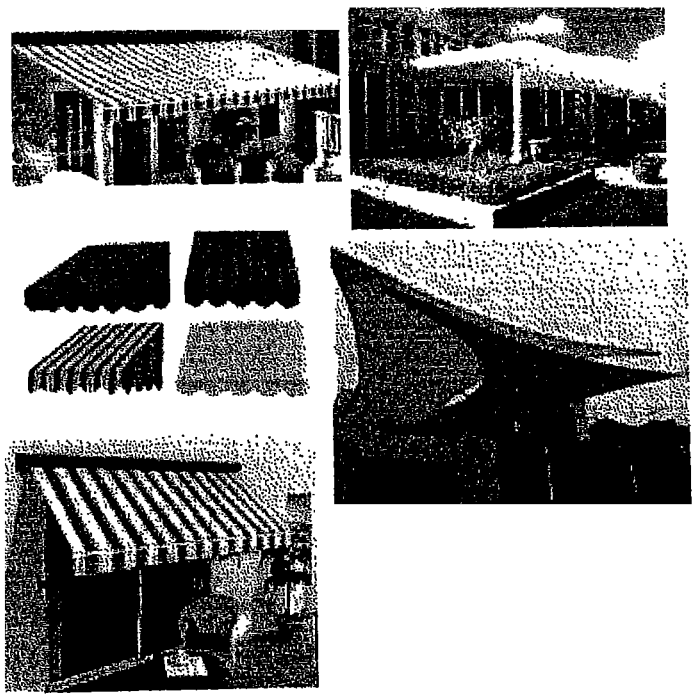
Figure 59 Solar Awnings (Artist's Conception)

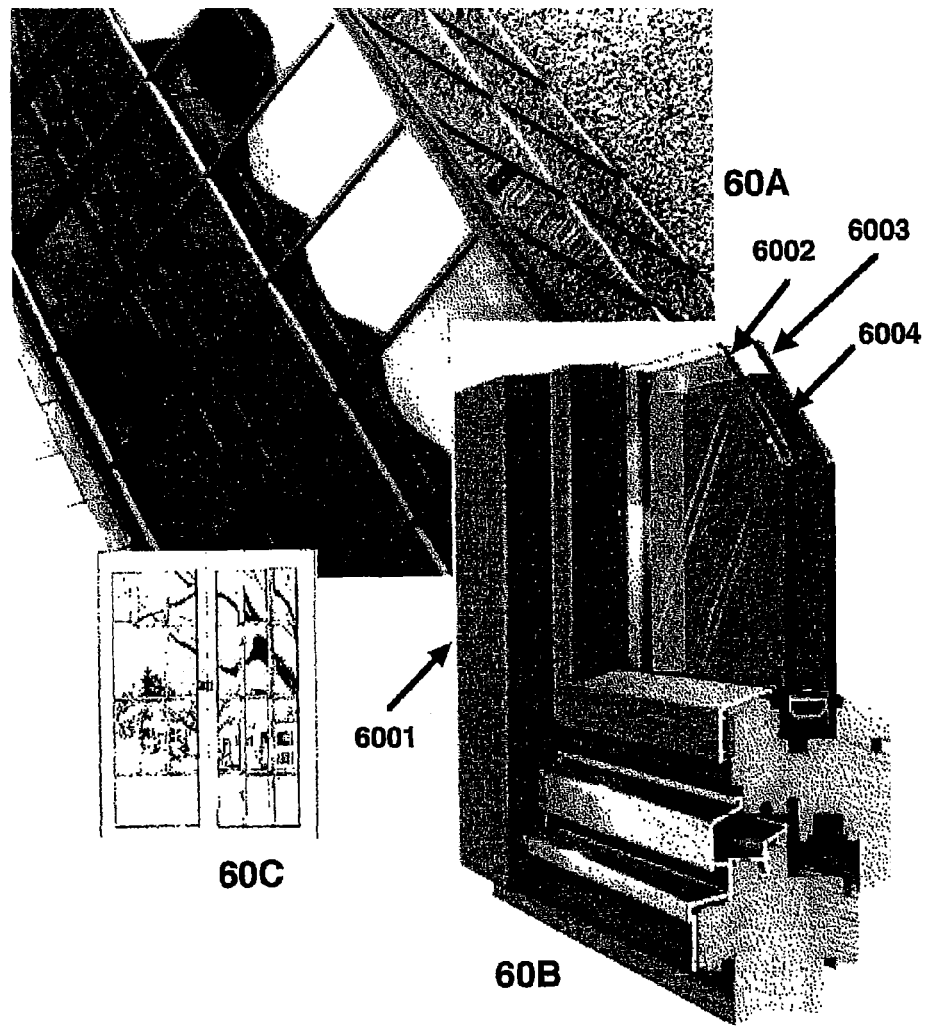
Figure 60 Solar/Photovoltaic Window/Door Panes
(Electrical connection not shown)

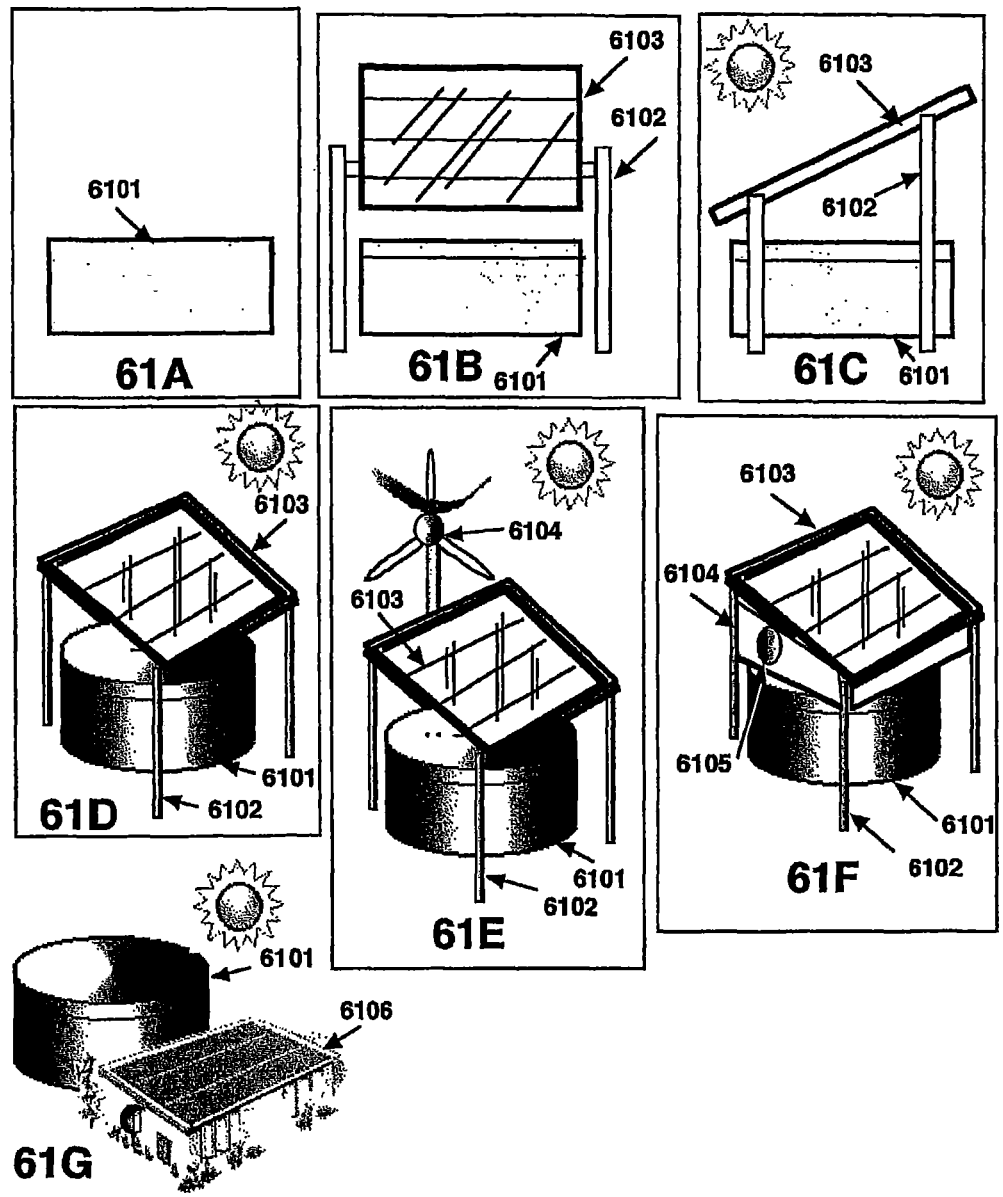
Figure 61 Water Tank Solar/Wind Embodiment.

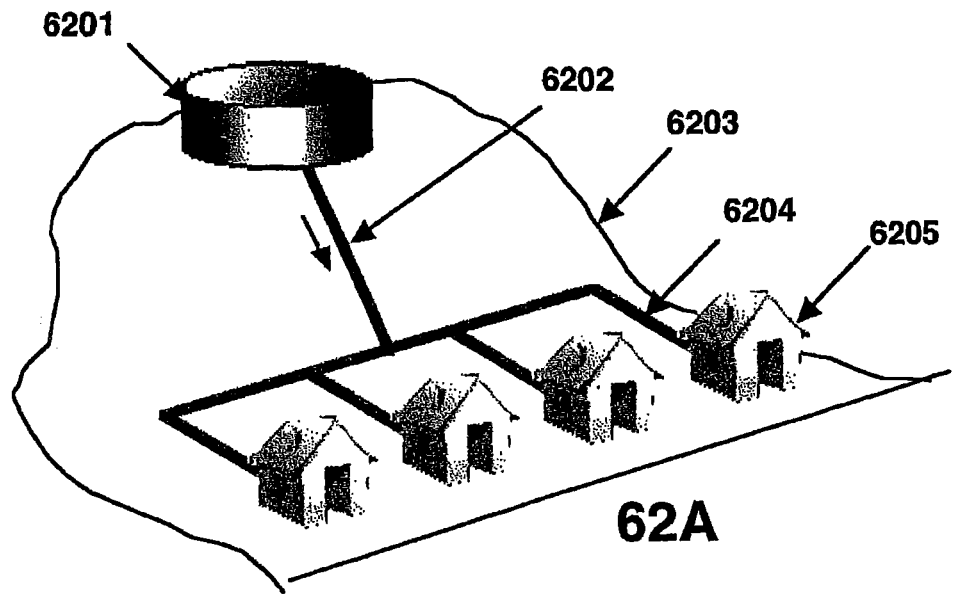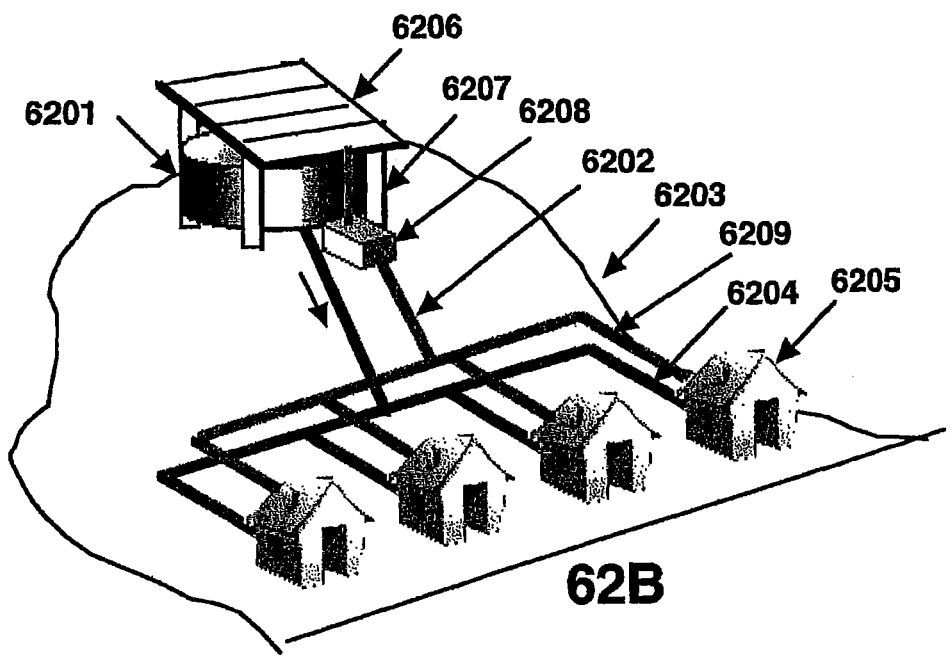
Figure 62 Rural Embodiment (Optional Wind System Not illustrated)

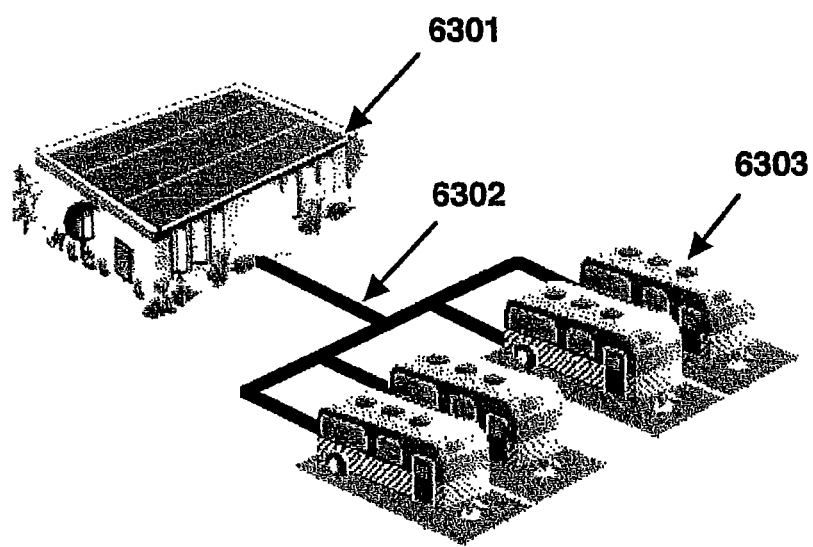
Figure 63 Trailer Park Embodiment

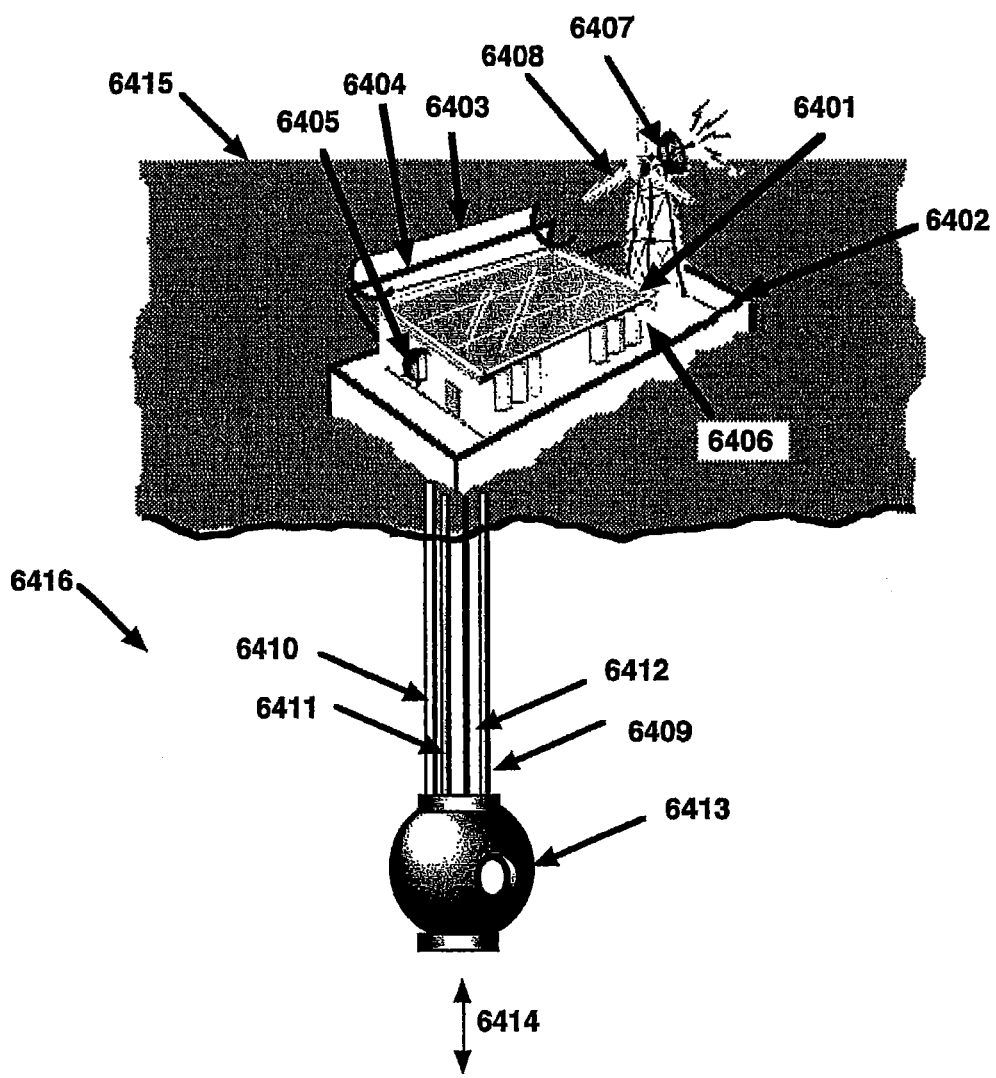
Figure 64 Underwater Operation Being Supplied by a Portable Floating Solar/Wind Embodiment.

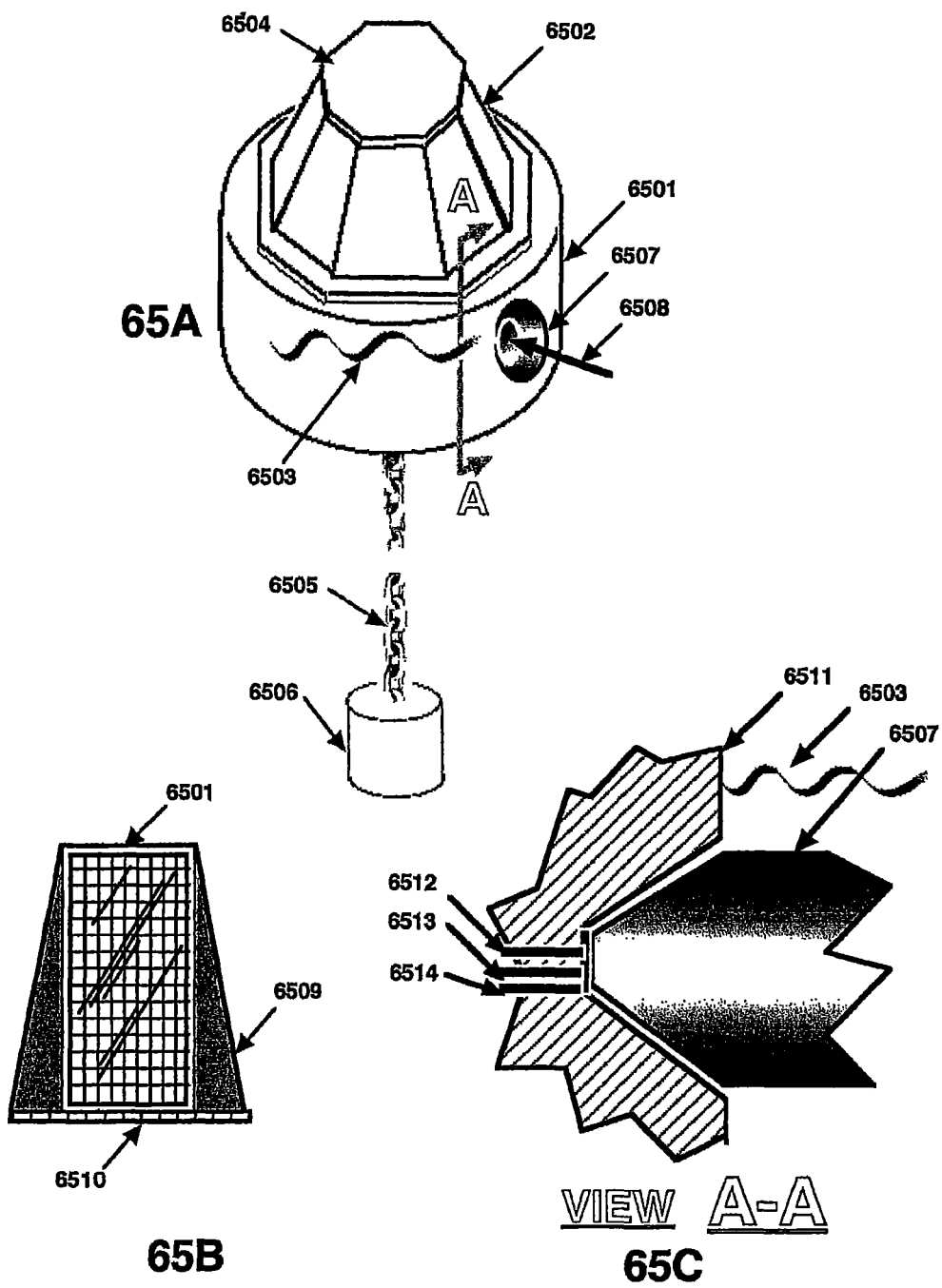
Figure 65 Aquatic Solar-Powered Recharging Station – Closed Position

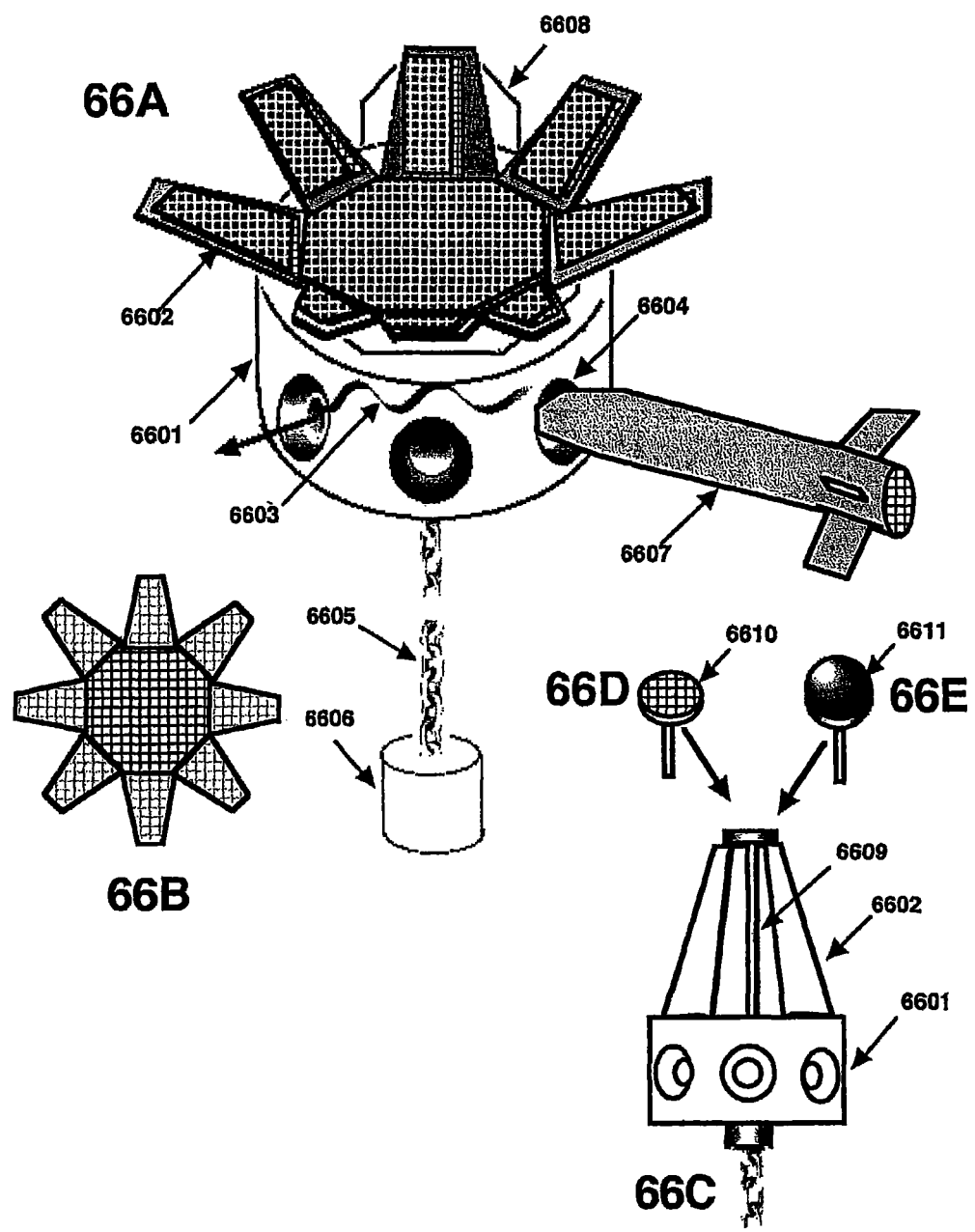
Figure 66 Aquatic Solar-Powered Recharging Station-Opened Position

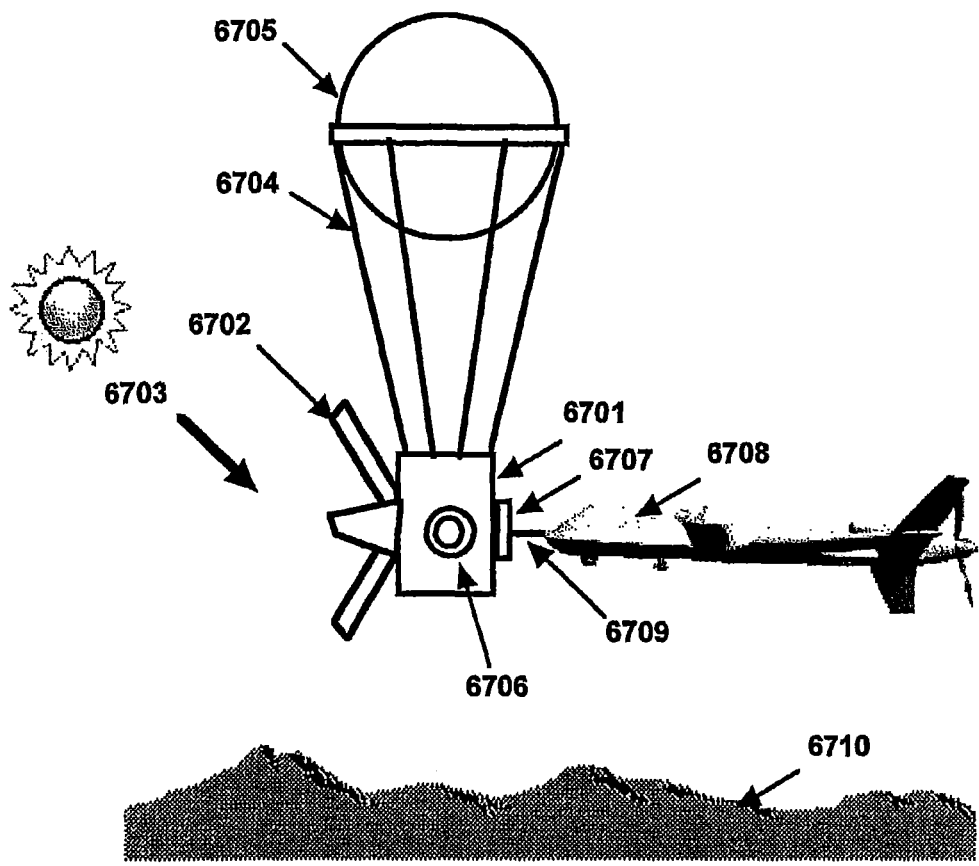
Figure 67 The Helium-filled Balloon Embodiment for Solar-Powered Mid-air Recharging of Airborne Systems
Figure 68 Air Tanker Electrical Recharging of Drones

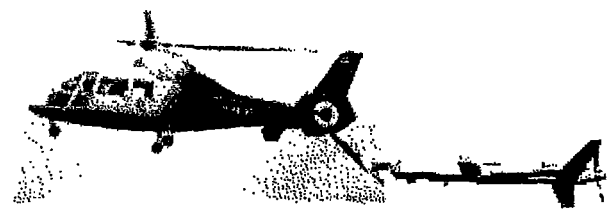
Figure 69 Mid-air Helicopter Electrical Recharging of Drone Systems
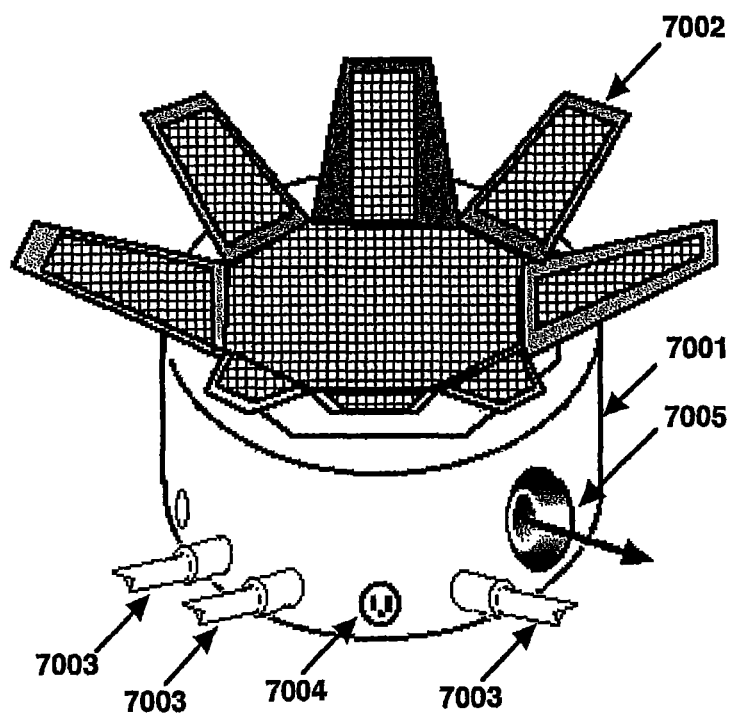
Figure 70 Surface Power Source and Recharging of Robotic or Drone Systems

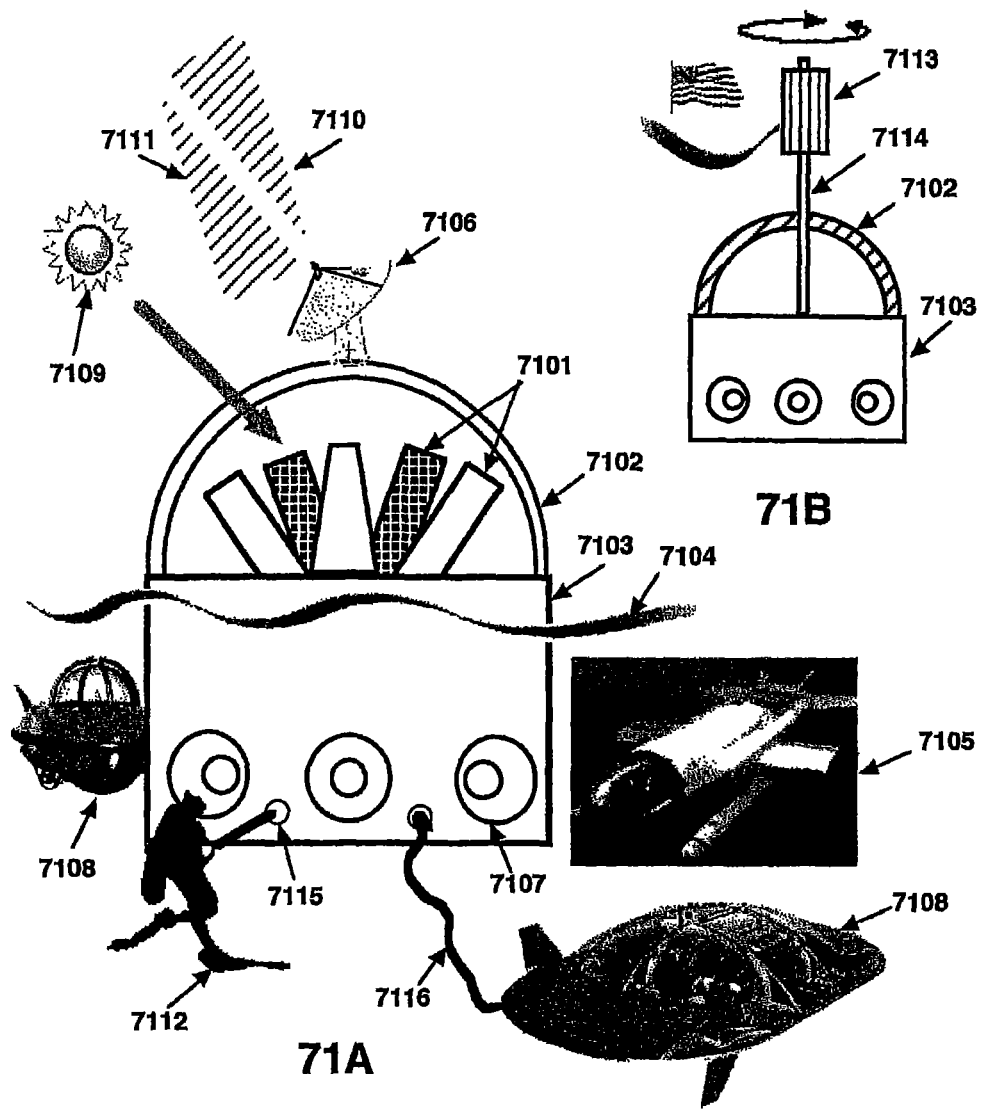
Figure 71 Aquatic Power Recharging Module/Station

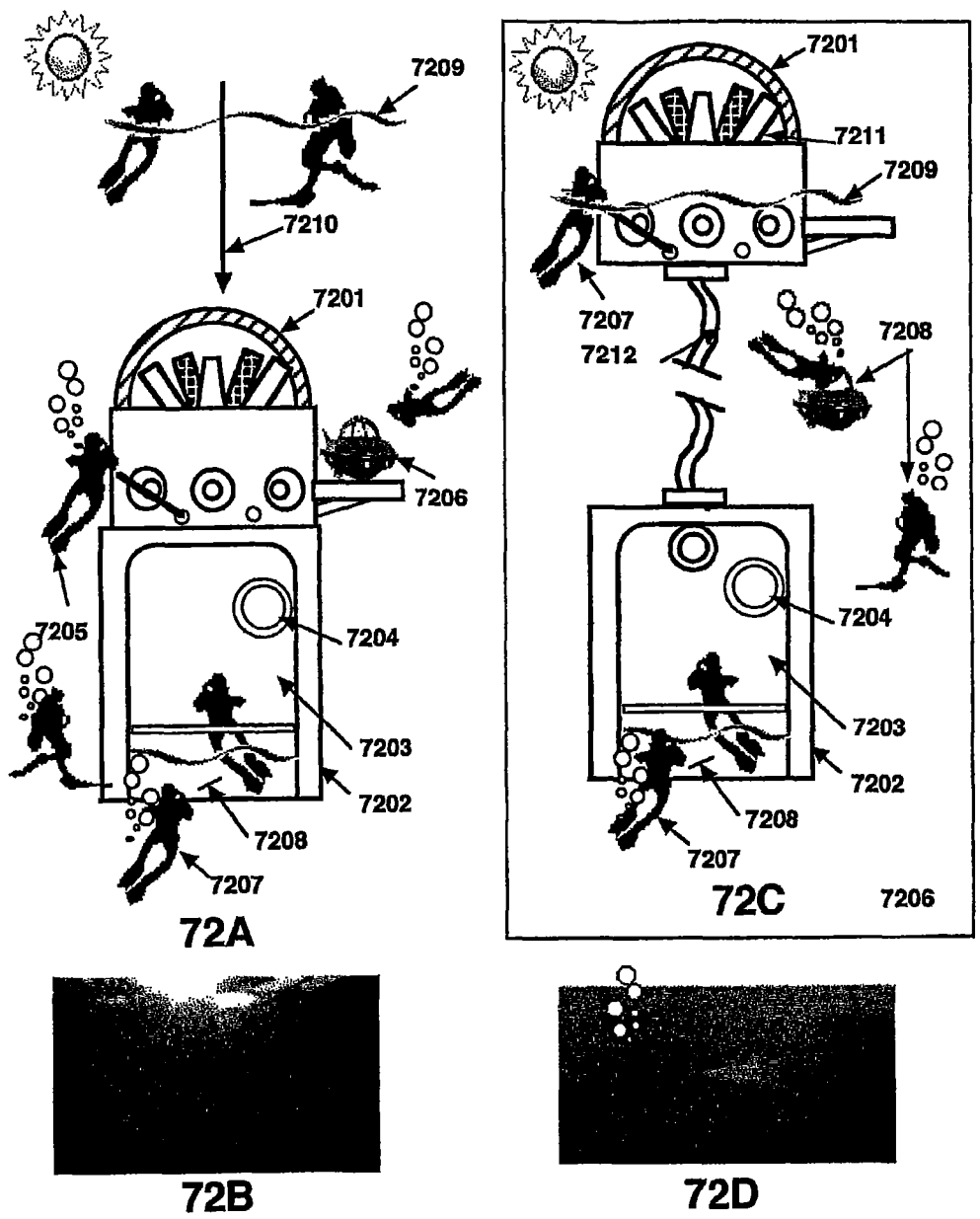
Figure 72 Submersible Solar Power Station

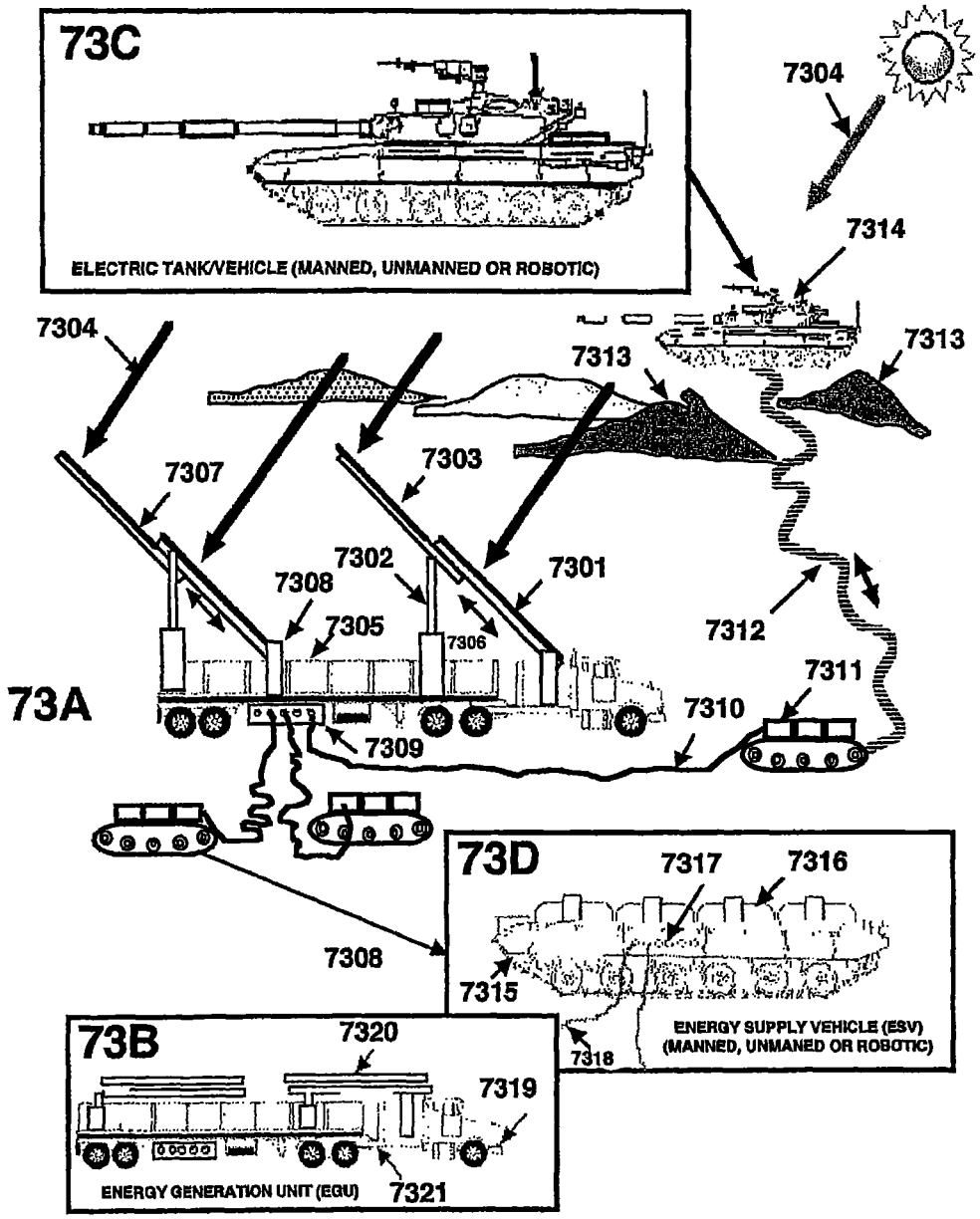
Figure 73 Portable and Extendable Solar Panels in a Military Application

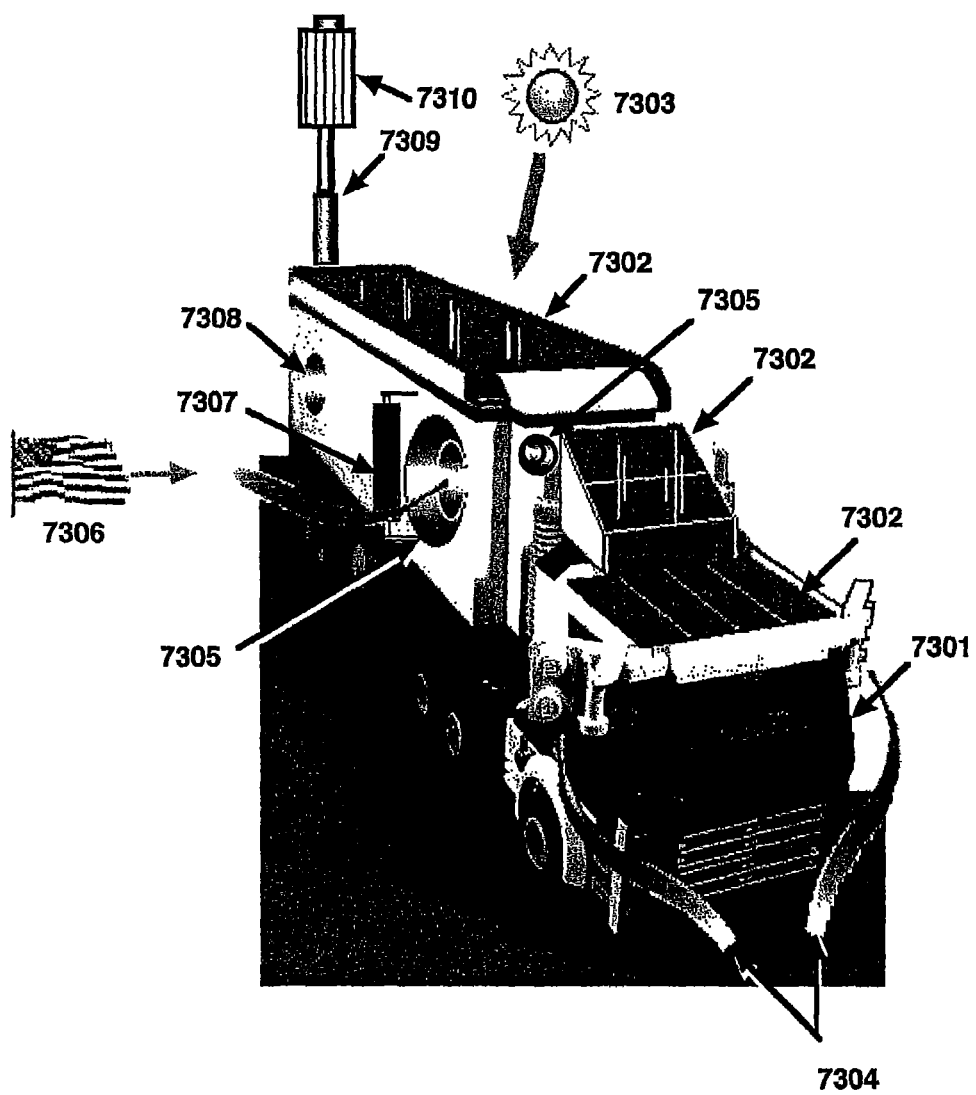
Figure 73E Truck Mounted Mobile Solar and Wind Generation System

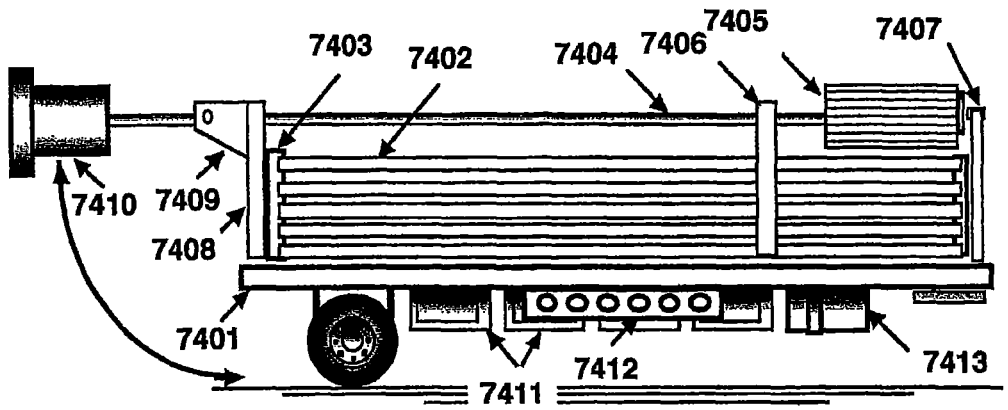
Figure 74 Side View of Vehicle -Mounted Solar Panels in Stowed and Extended Positions
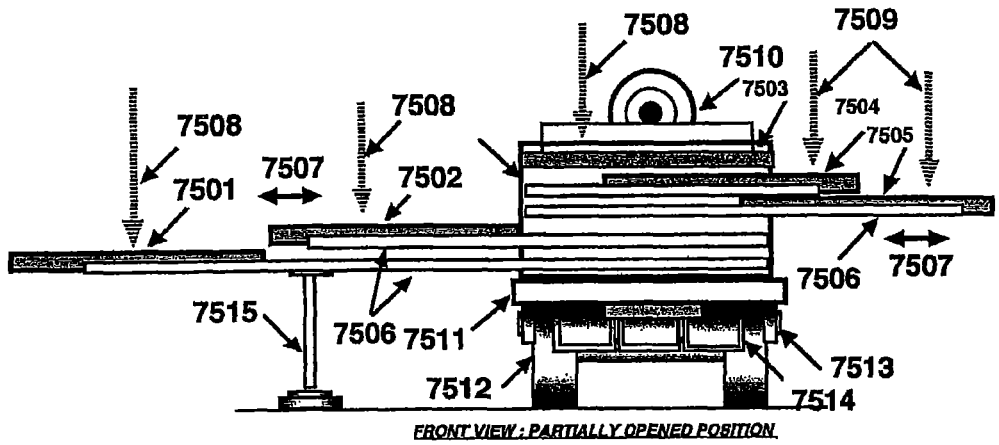
Figure 75 Front End View of Vehicle -Mounted Solar Panels in Stowed and Extended Positions
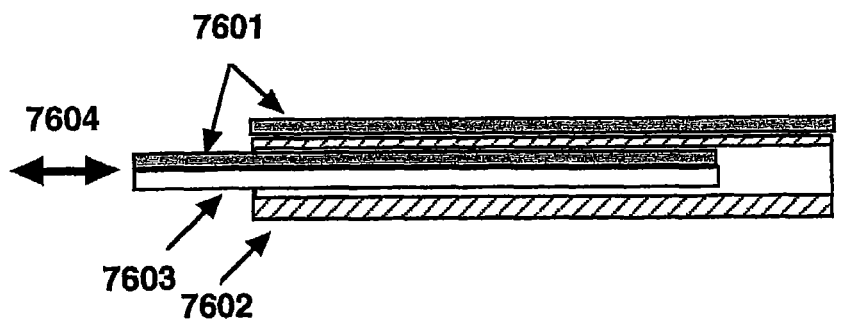
Figure 76 Cutaway Drawing of Telescoping Solar Panels

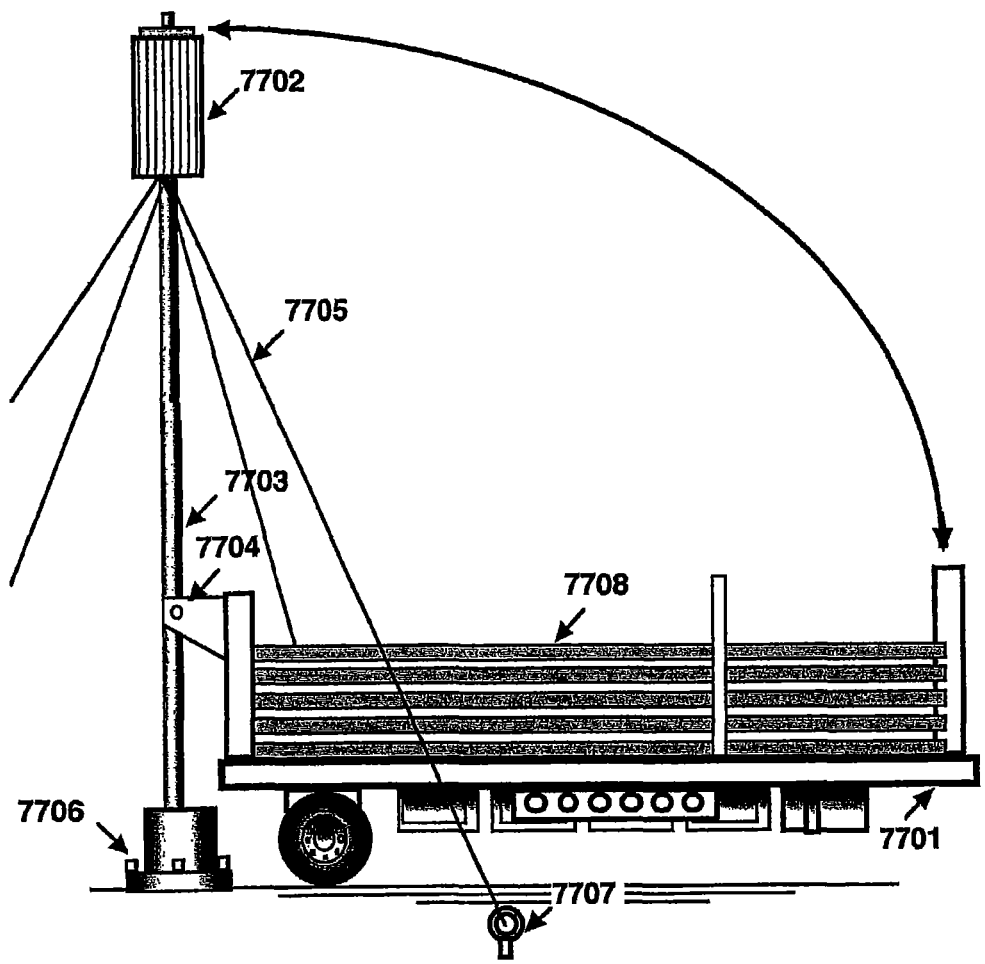
Figure 77 Side View of Vehicle -Mounted Solar Panels with Trailer-Mounted Erect Wind Turbine Generation System

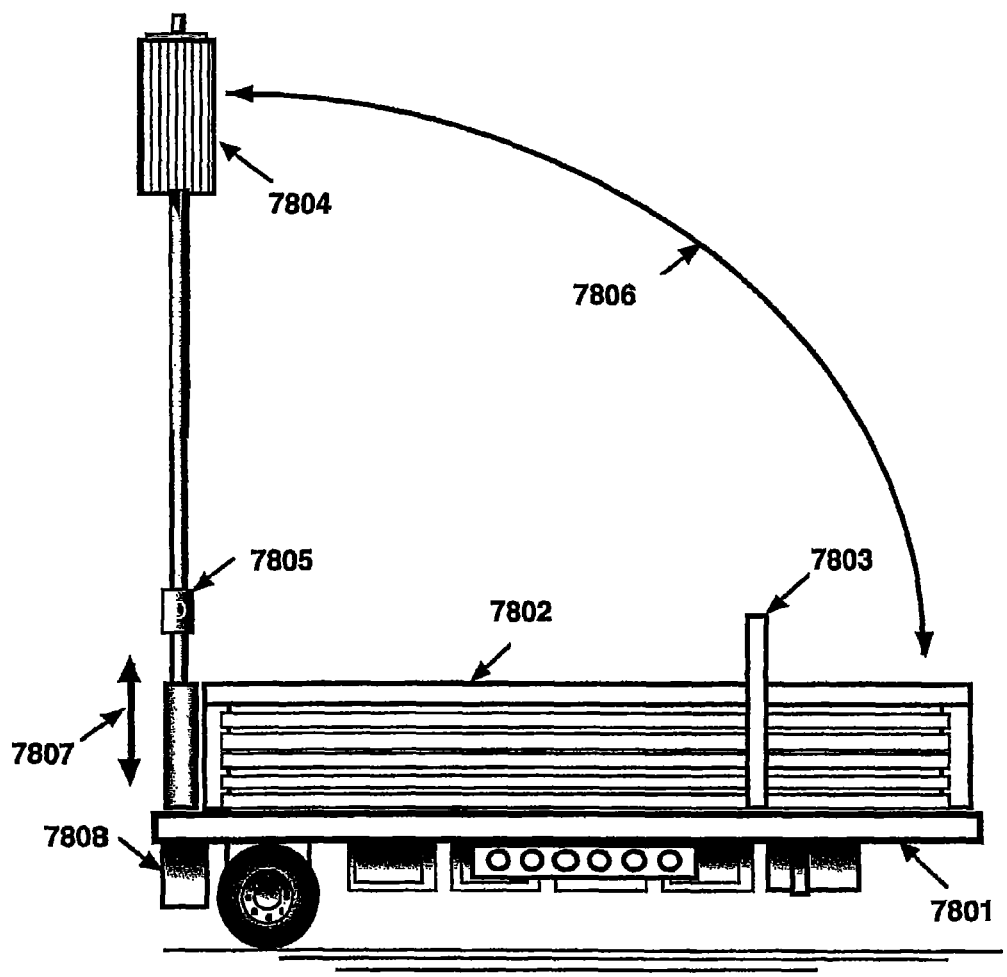
Figure 78 Side View of Vehicle -Mounted Solar Panels with Extended and Erect Wind Turbine Generation System

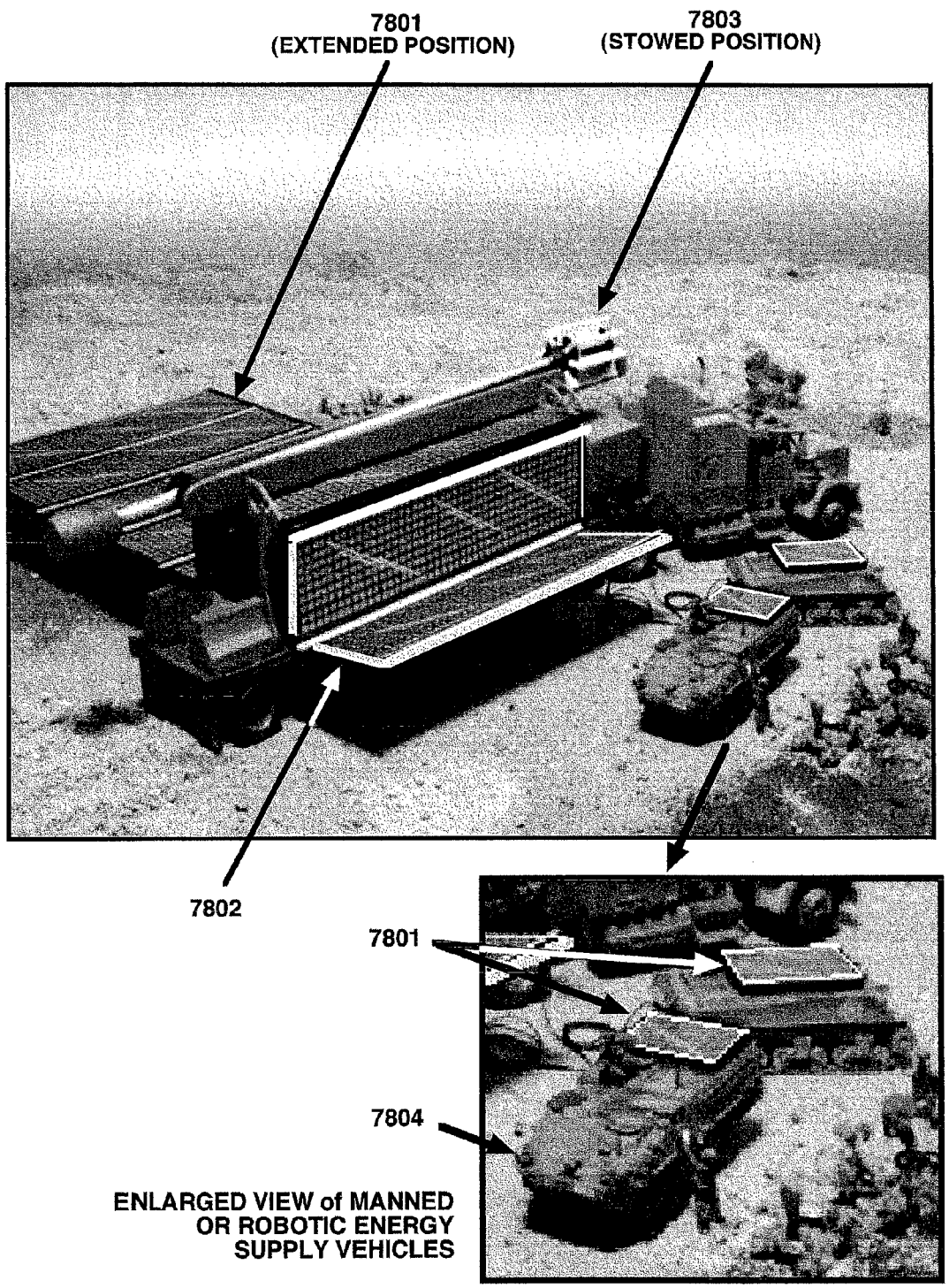
Figure 78A Portable and Extendable Solar Panels in a Military Application. Wind Turbine System in Stowed Position (Scale Model)

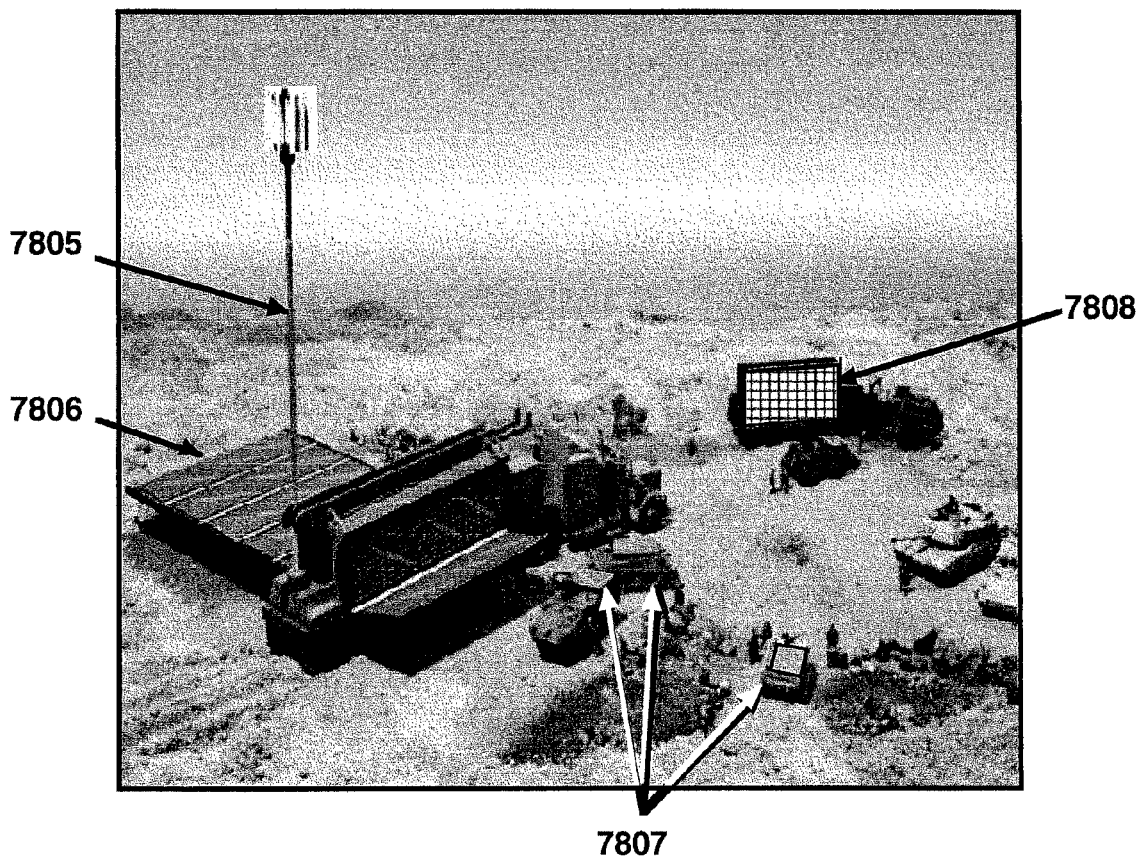
Figure 78B Portable and Extendable Solar Panels in a Military Application with Wind Turbine System in Operational Position and Mobile Energy Supply Carriers (Scale Model)

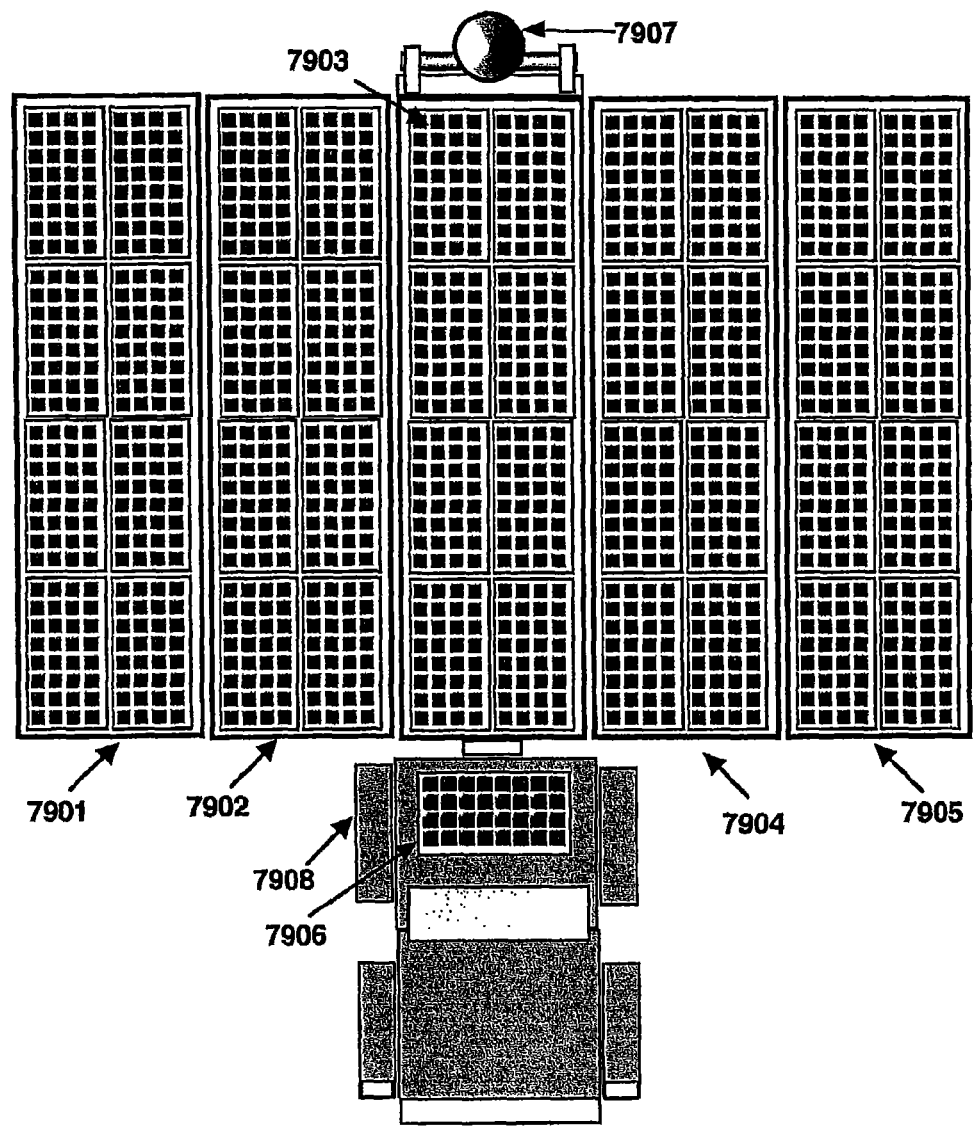
Figure 79 Top View of Vehicle-Mounted Solar Panels in Extended Position

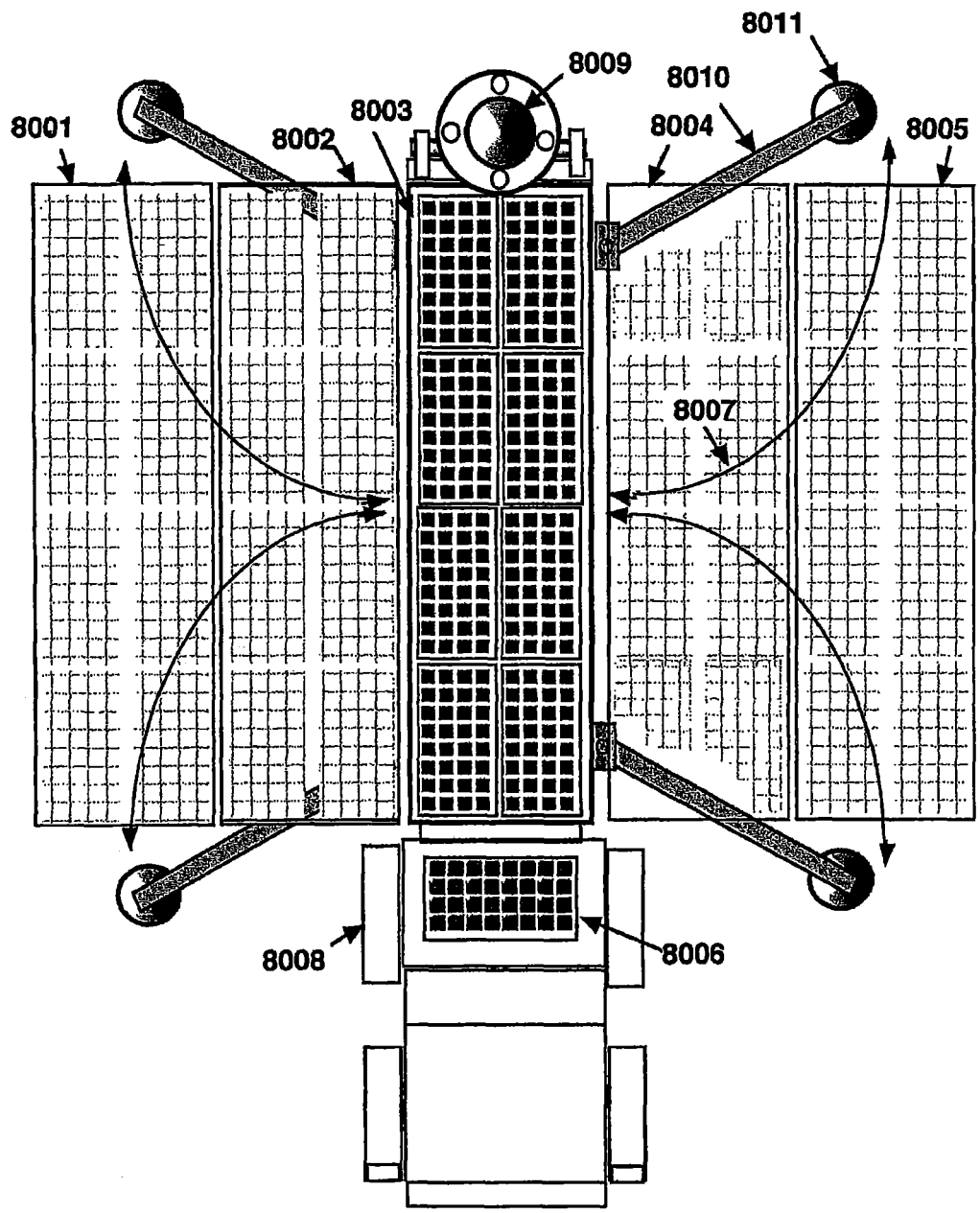
Figure 80 Top View of Vehicle -Mounted Solar Panels with Extended and Stabilization Legs

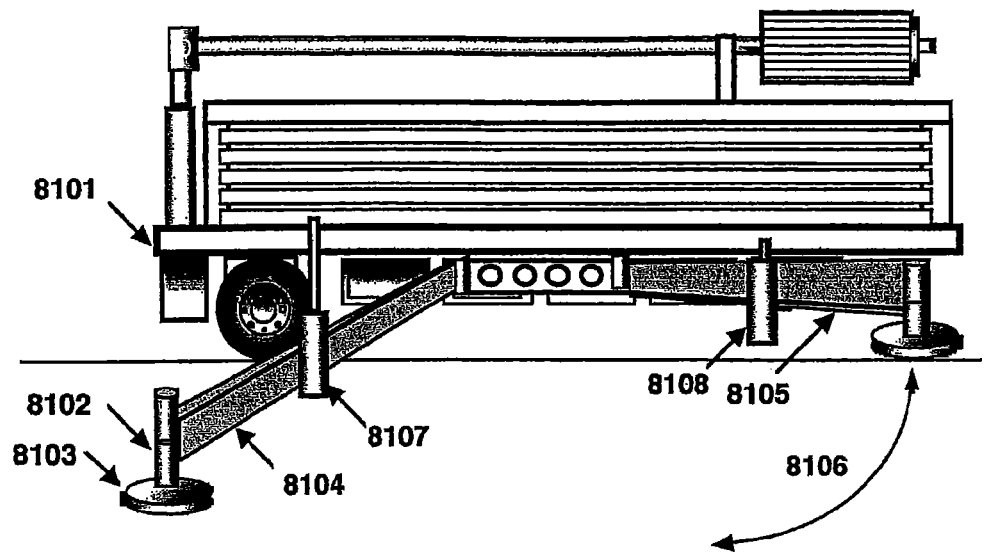
Figure 81 Side View of Vehicle -Mounted Solar Panels with Extended Stabilization Legs
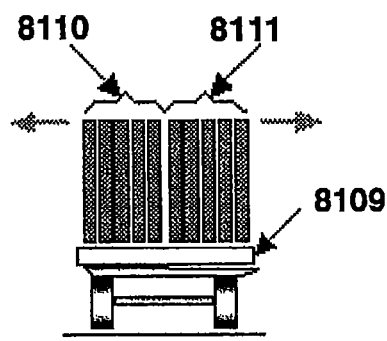
Figure 81A Vehicle-Mounted Accordion-Style Folding Solar Panels

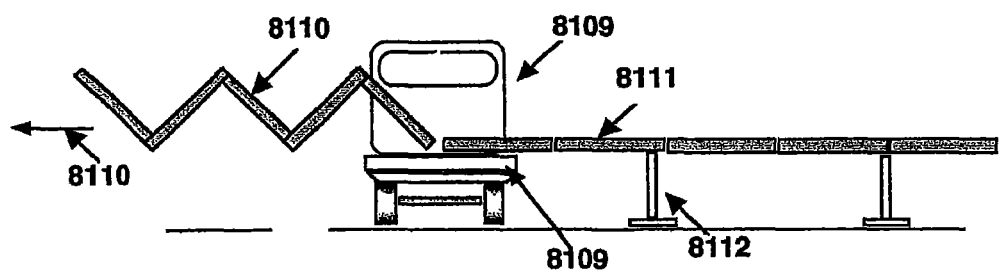
Figure 81B  Vehicle-Mounted Accordion-Style Folding Solar Panels

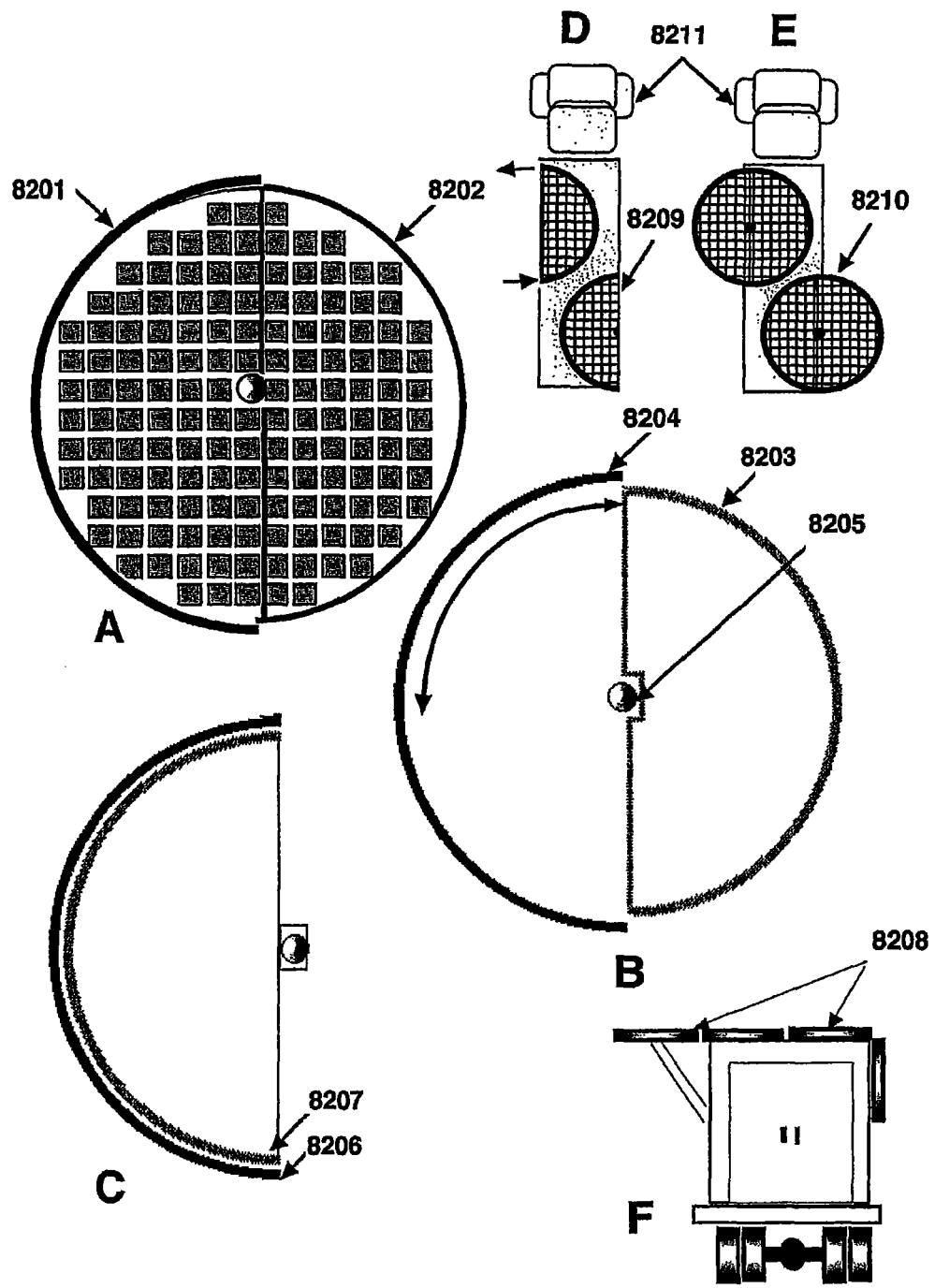
Figure 82 Foldable Parabolic Solar Panel(s)

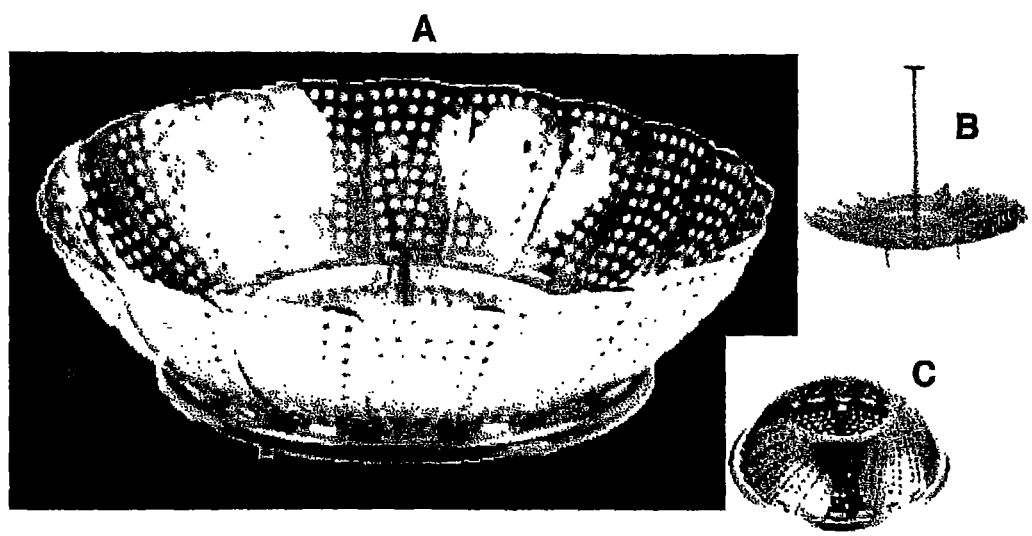
Figure 83 Interleaved Solar Panels
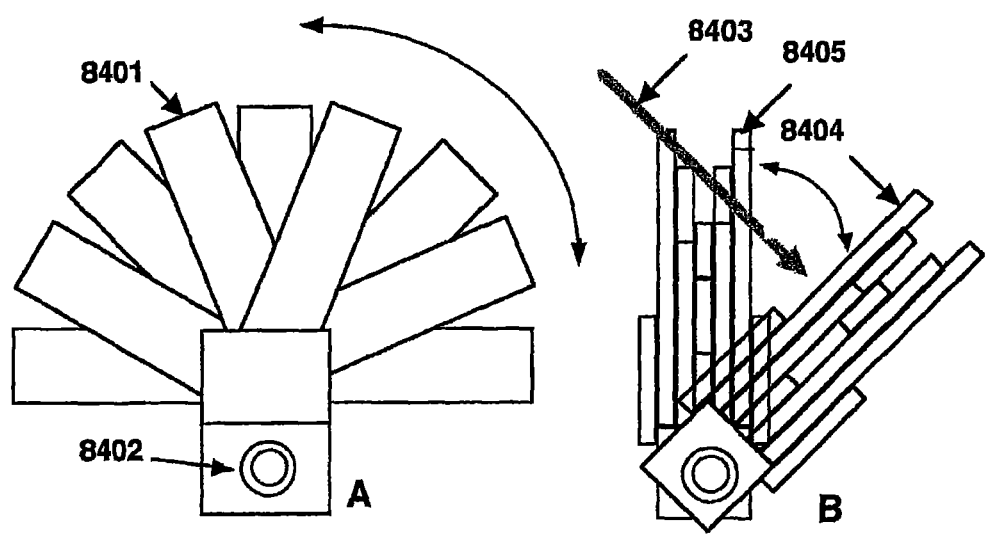
Figure 84 "Fanable" Solar Panels

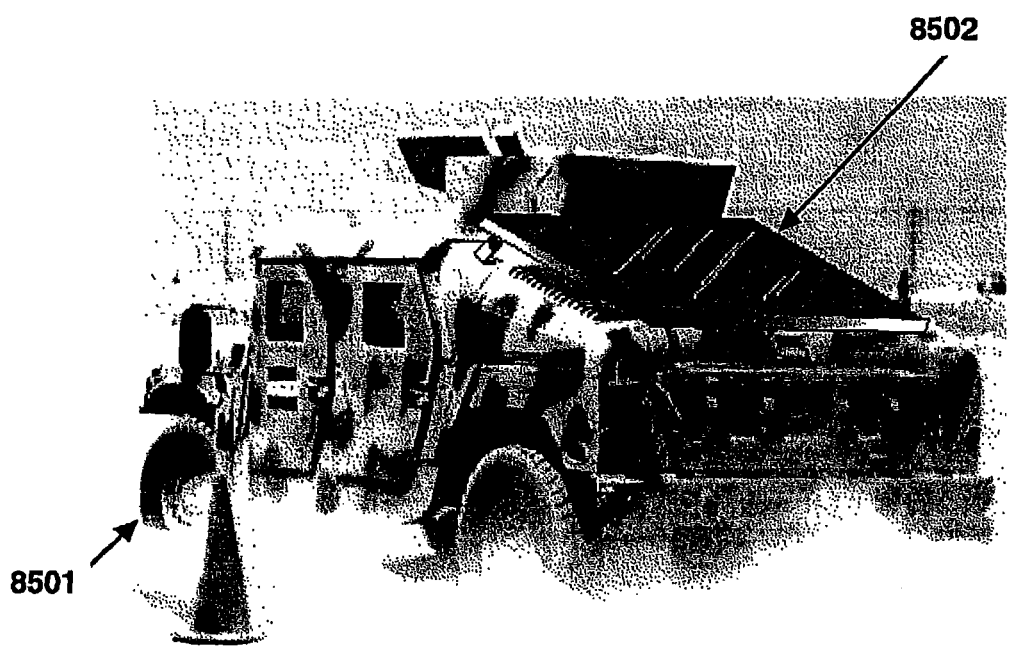
Figure 85 Military Application for Generating and/or Delivering Electricity to Battlefield Applications

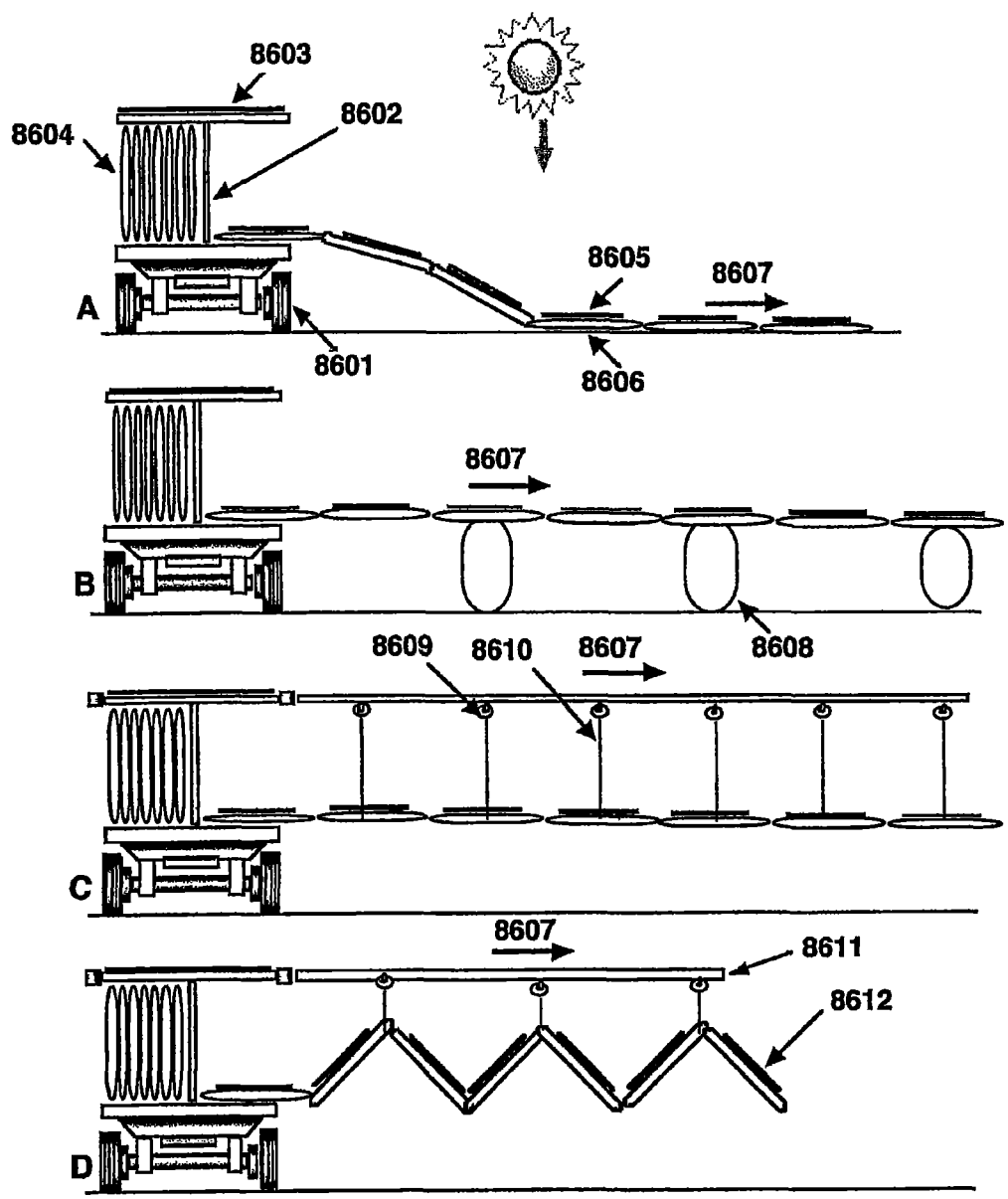
Figure 86 Various Embodiments for Deploying Solar Panels

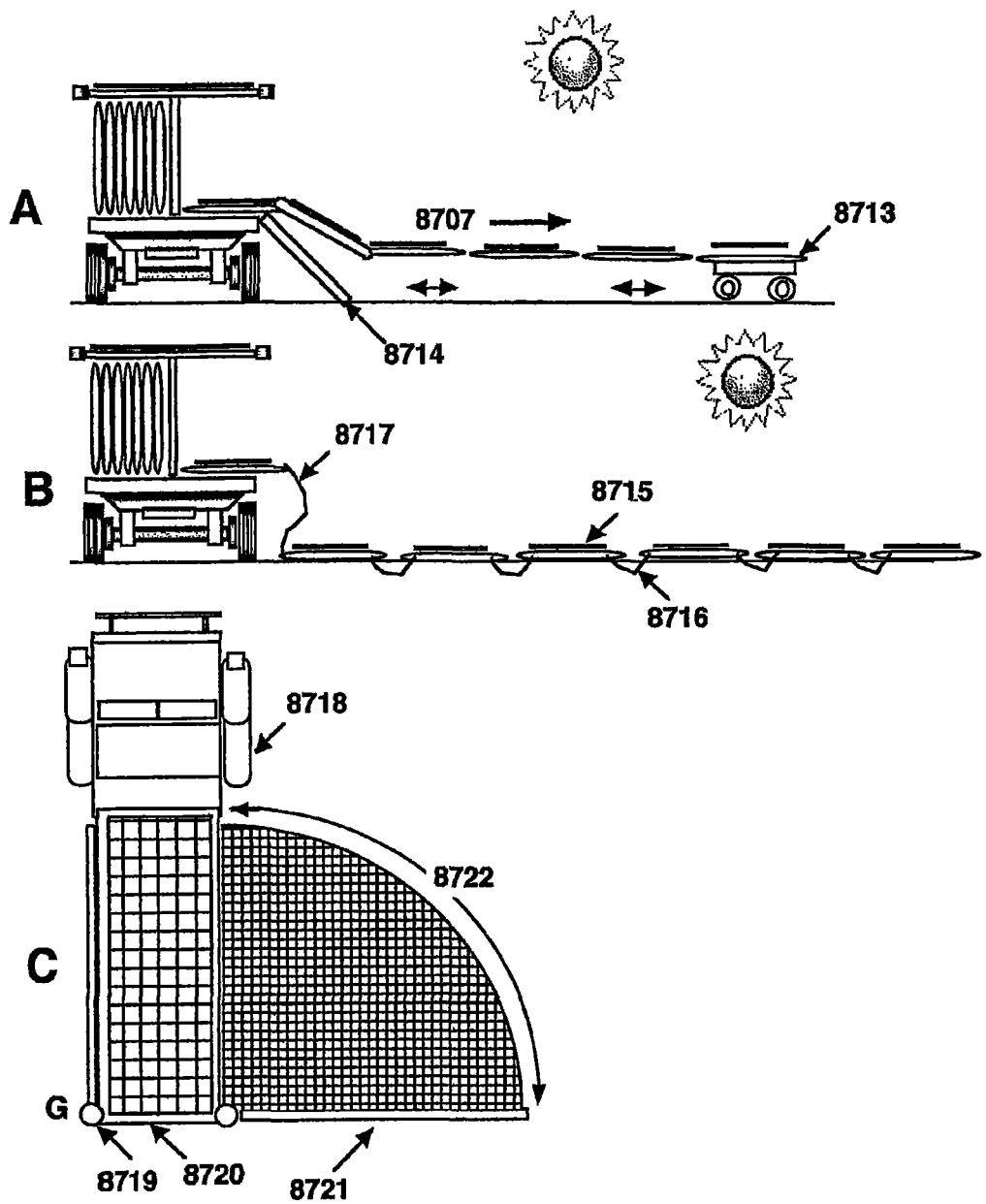
Figure 87 Various Embodiments for Deploying Solar Panels

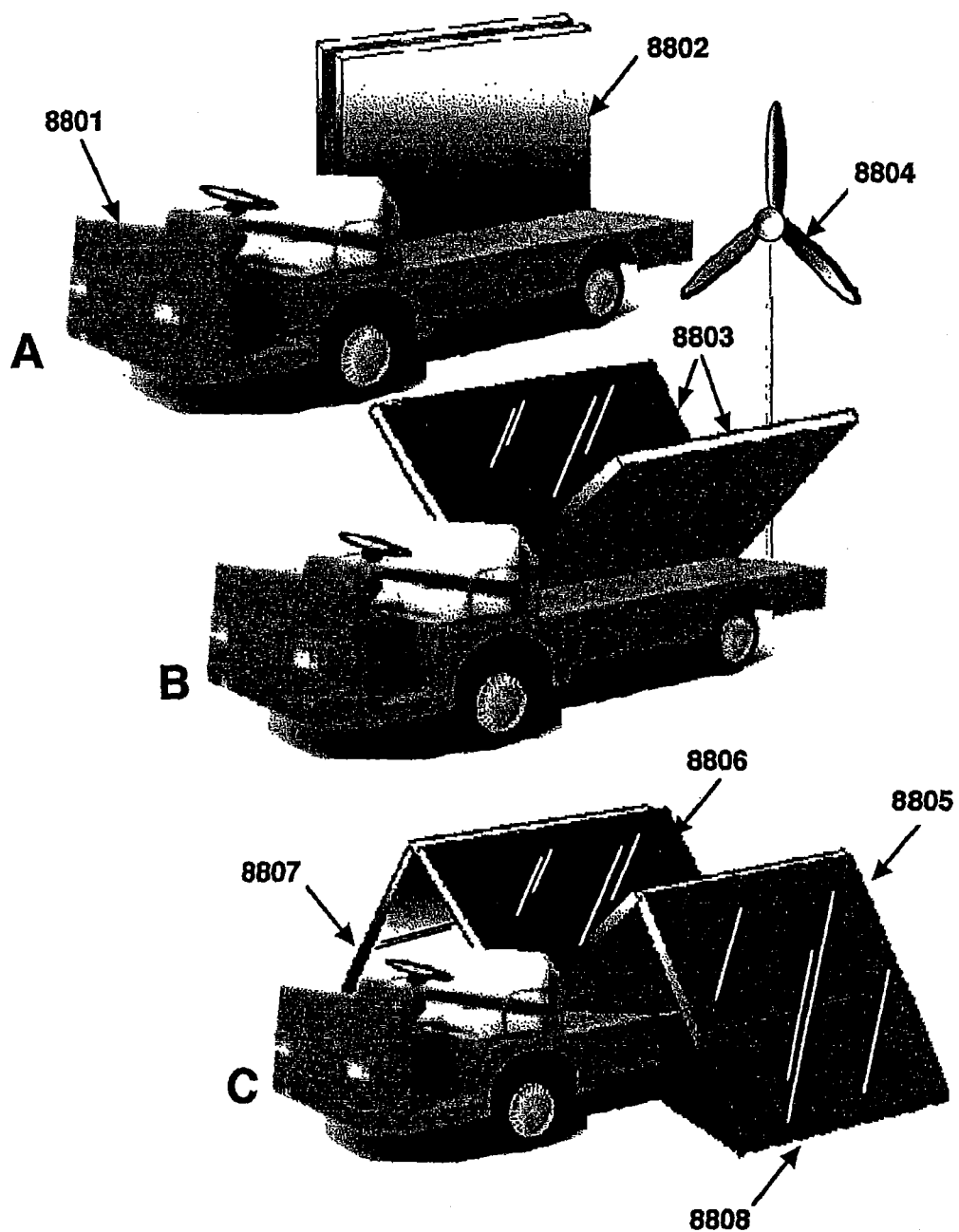
Figure 88 Represents a Utility Vehicle that Function as a Platform for the Transportation of Electricity Generation using Solar Panels

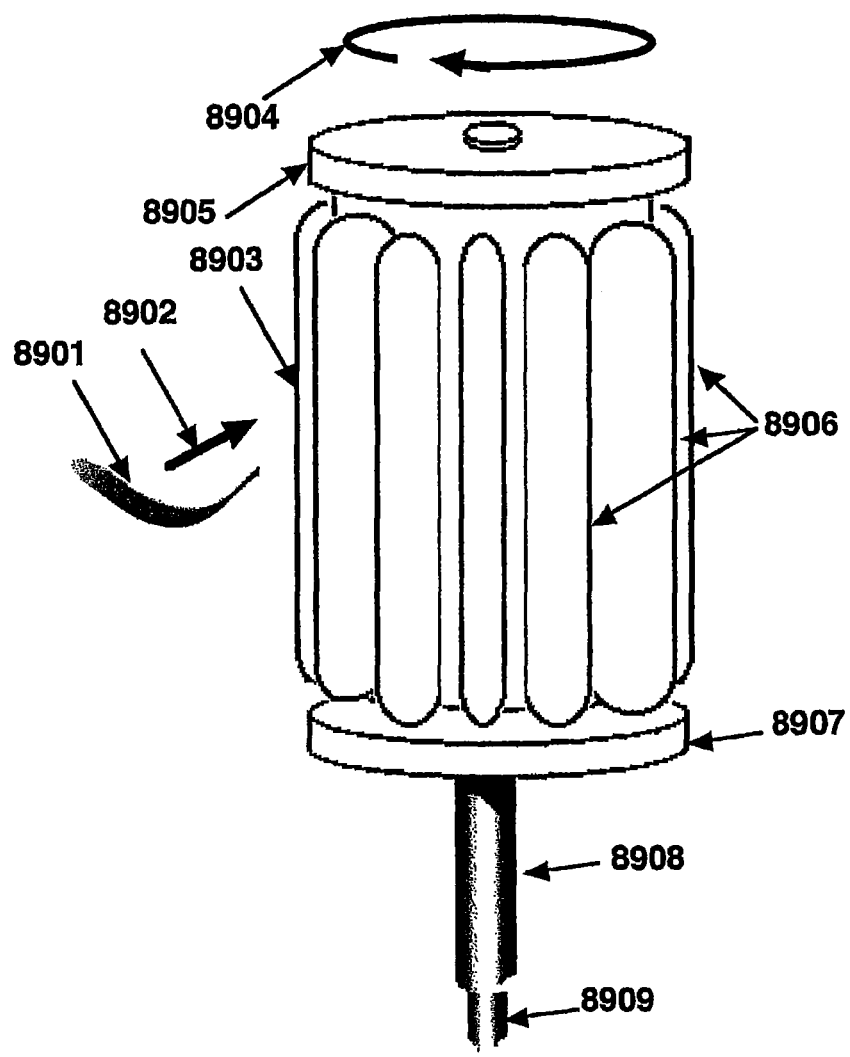
Figure 89 One Embodiment of an Inflatable Turbine Blade Assembly
(Protective Wind Shield not Shown)

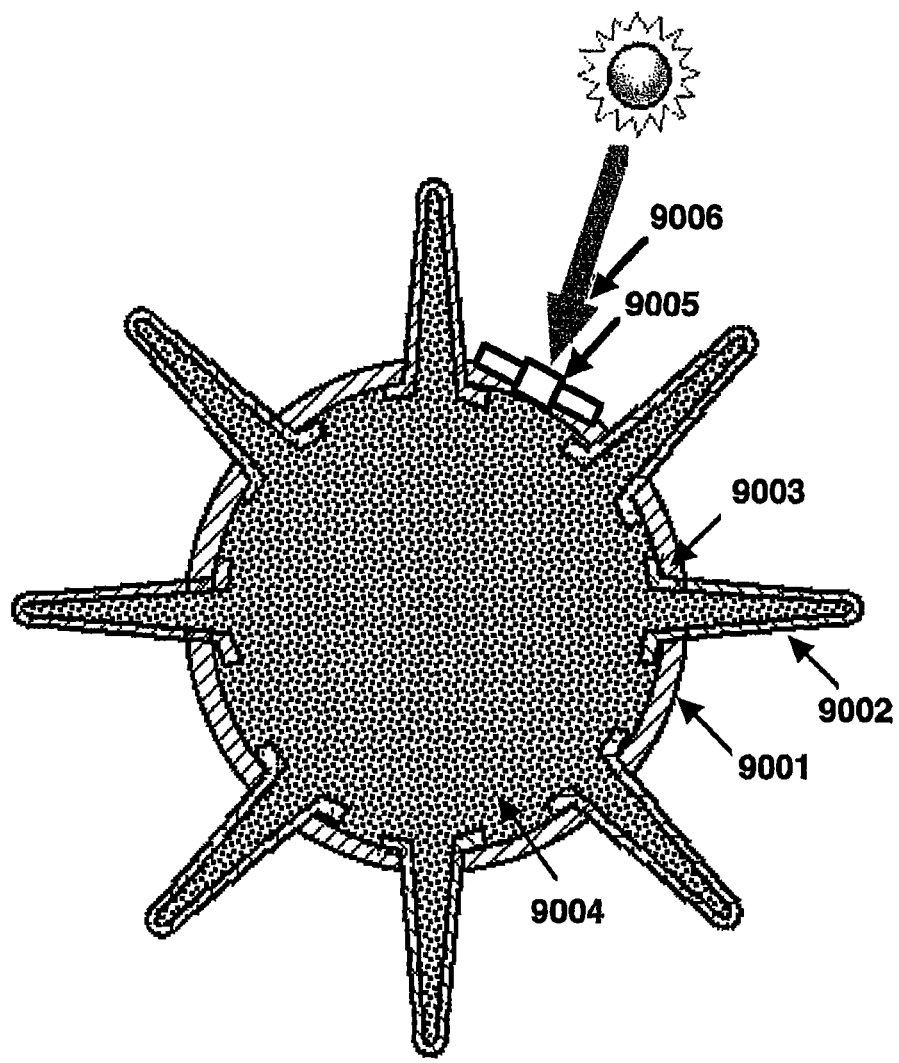
Figure 90 Cross-Section of Inflatable Turbine Blade Assembly

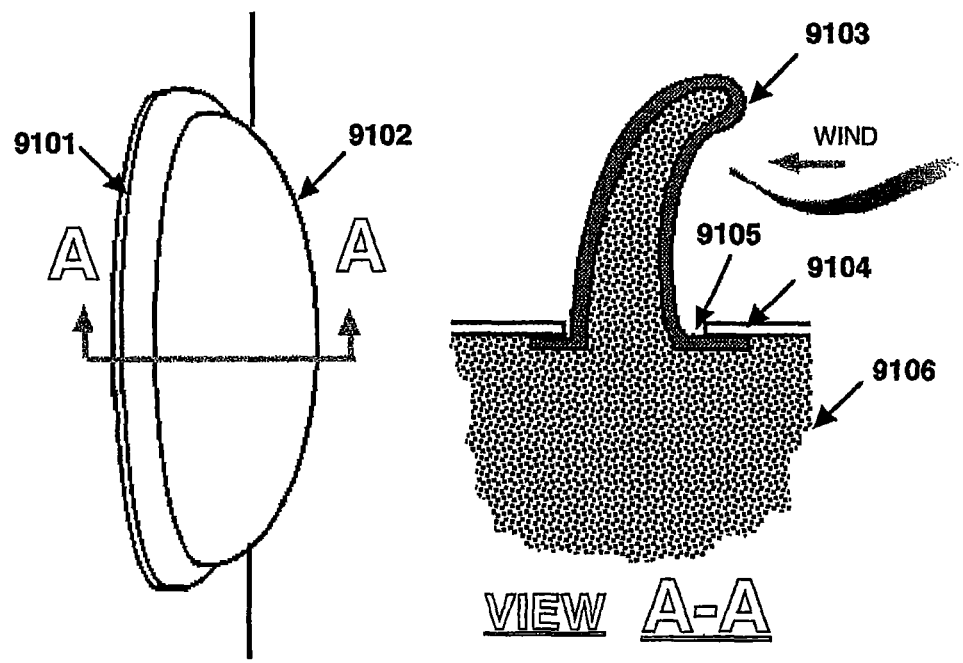
Figure 91 Single Inflatable Turbine Blade Construction
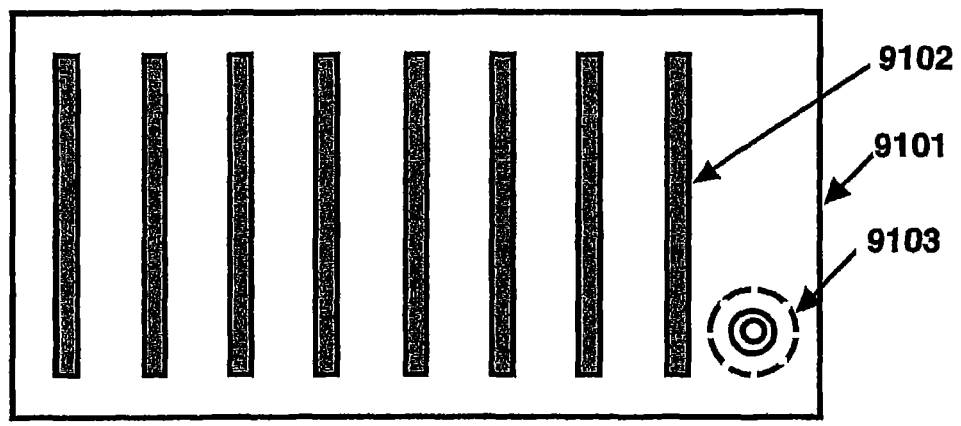
Figure 92 Single Inflatable Turbine Blade Construction

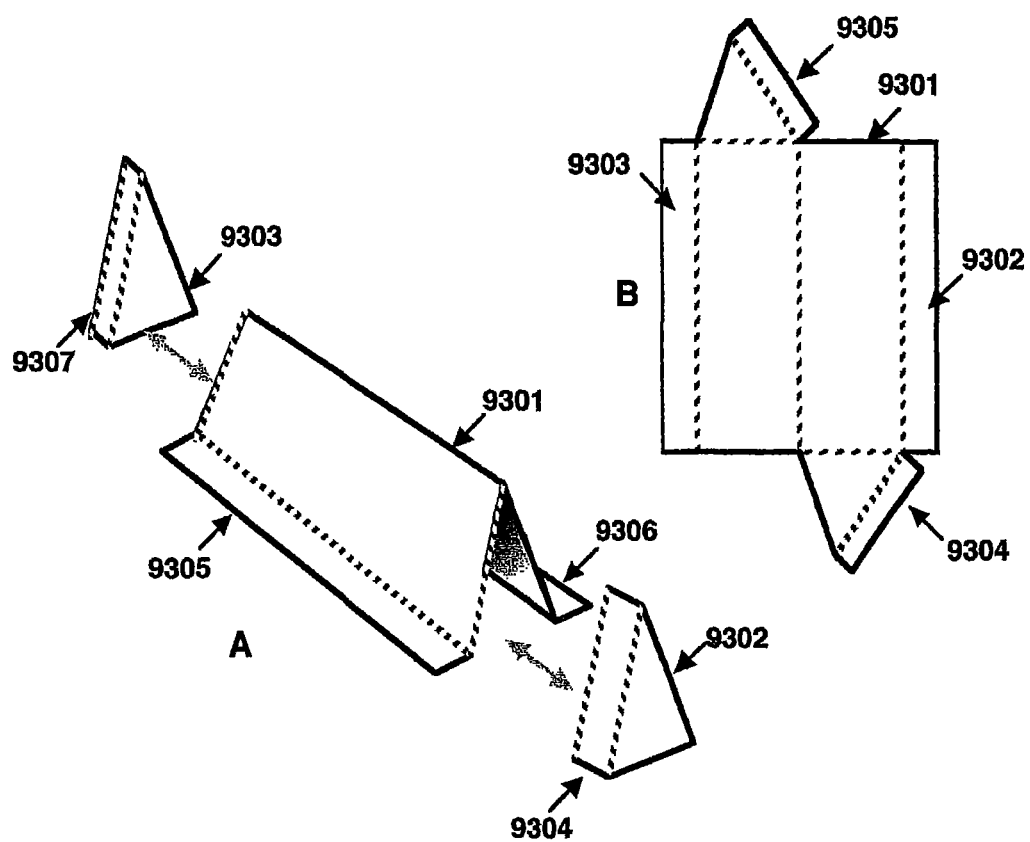
Figure 93 Single Inflatable Turbine Blade Construction

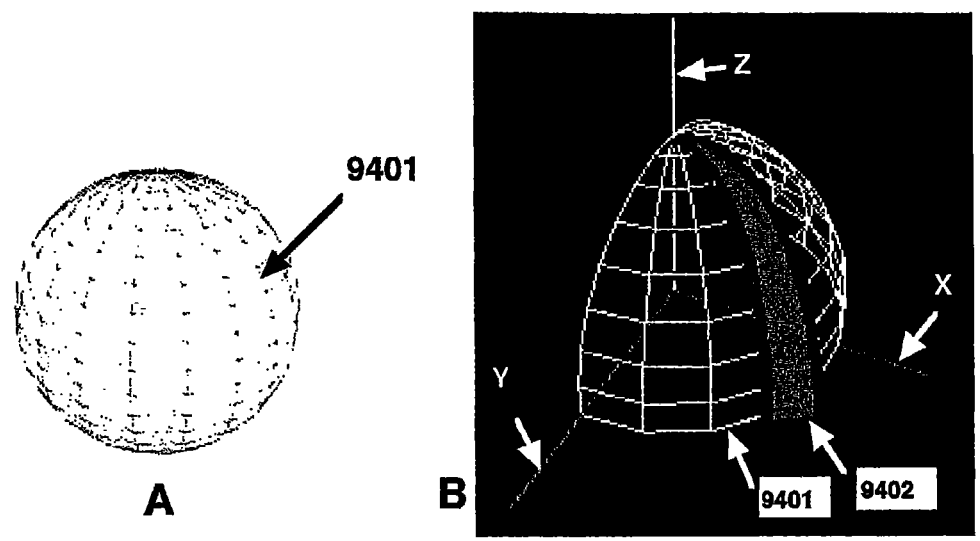
Figure 94 Inflatable Turbine Blade Construction

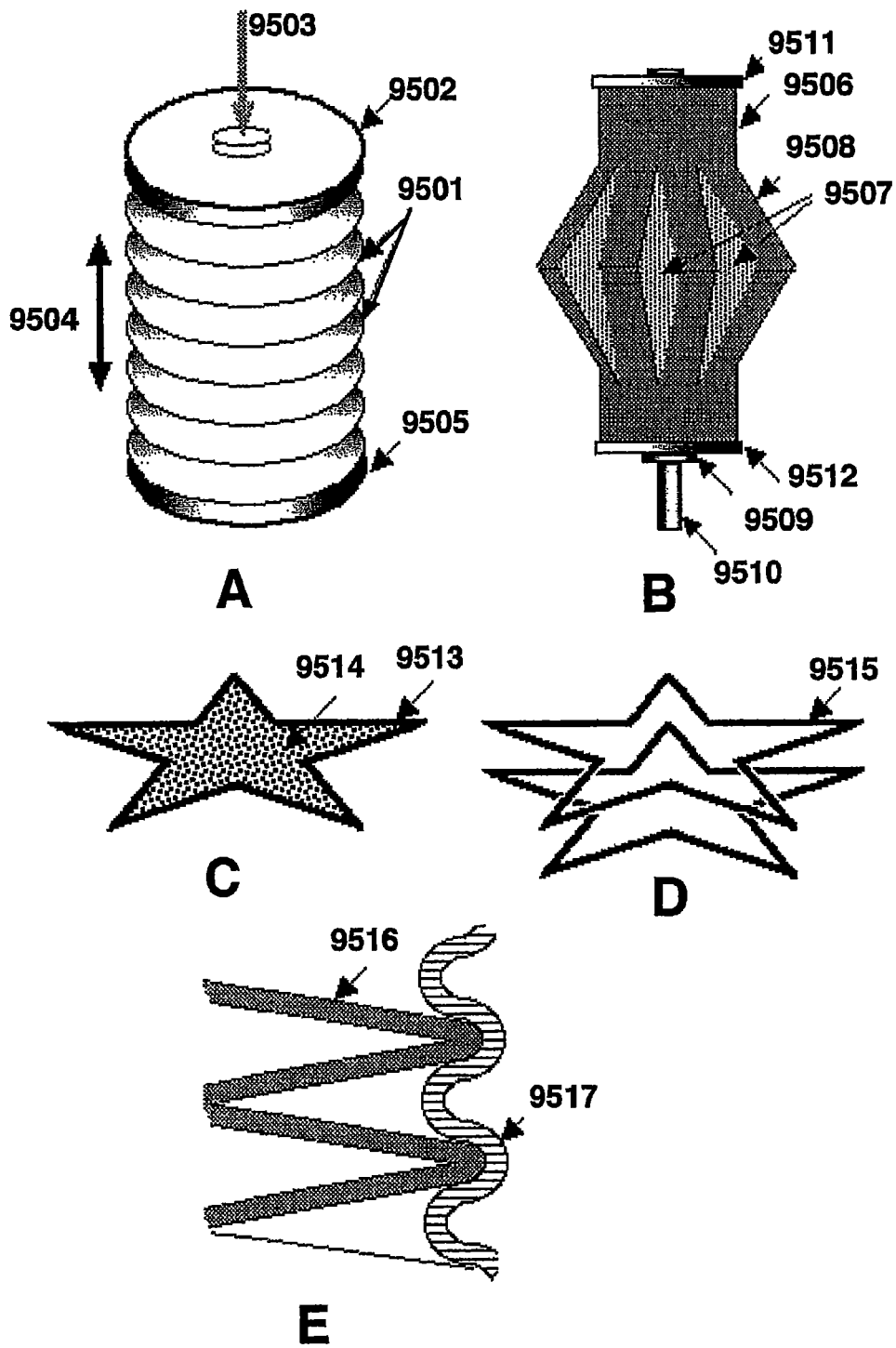
Figure 95 Types of Inflatable Turbine Blade Construction

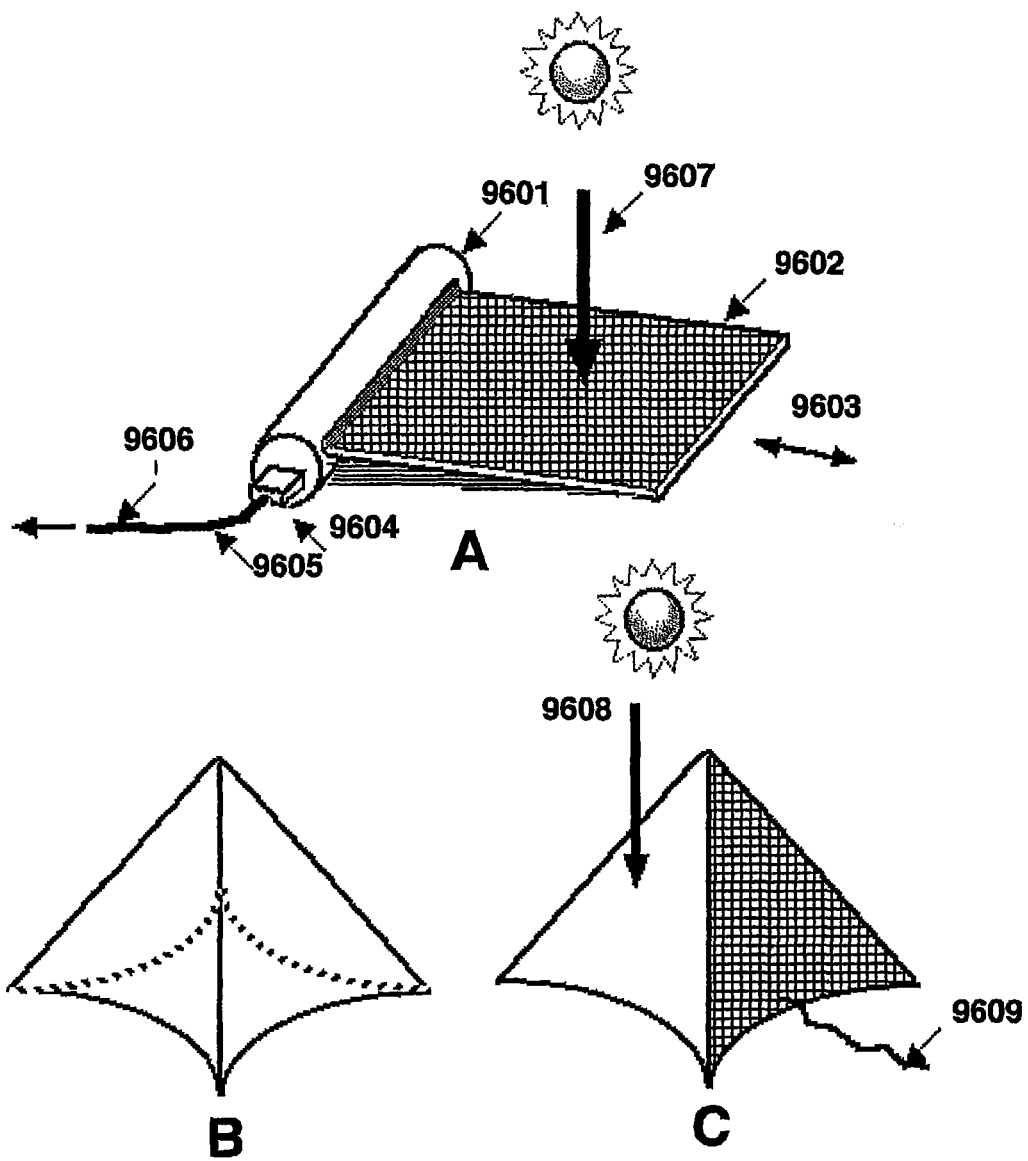
Figure 96 Personal Solar Electricity Generator

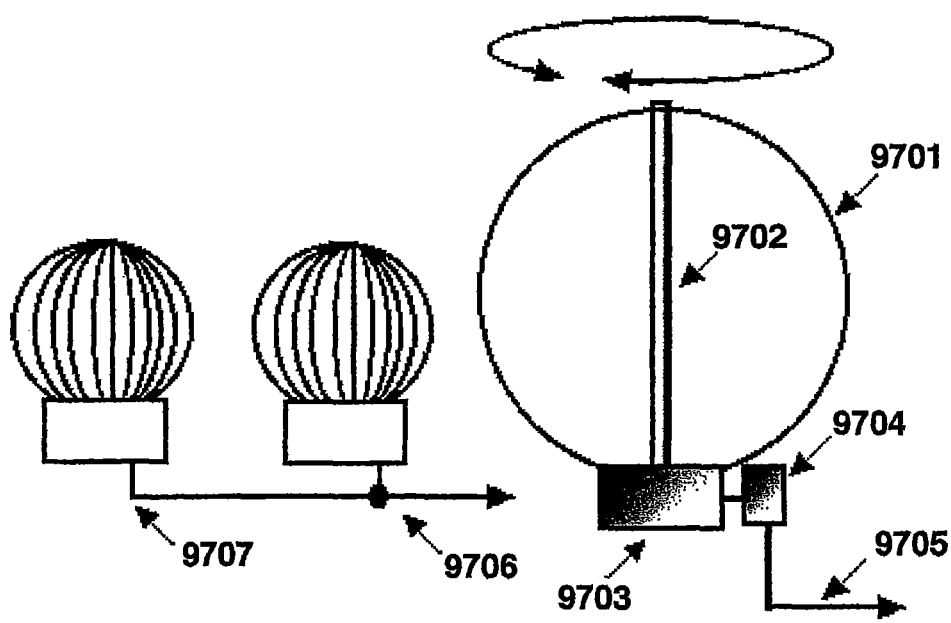
Figure 97  Wind Turbine Electricity Generator for Buildings or Residential Applications

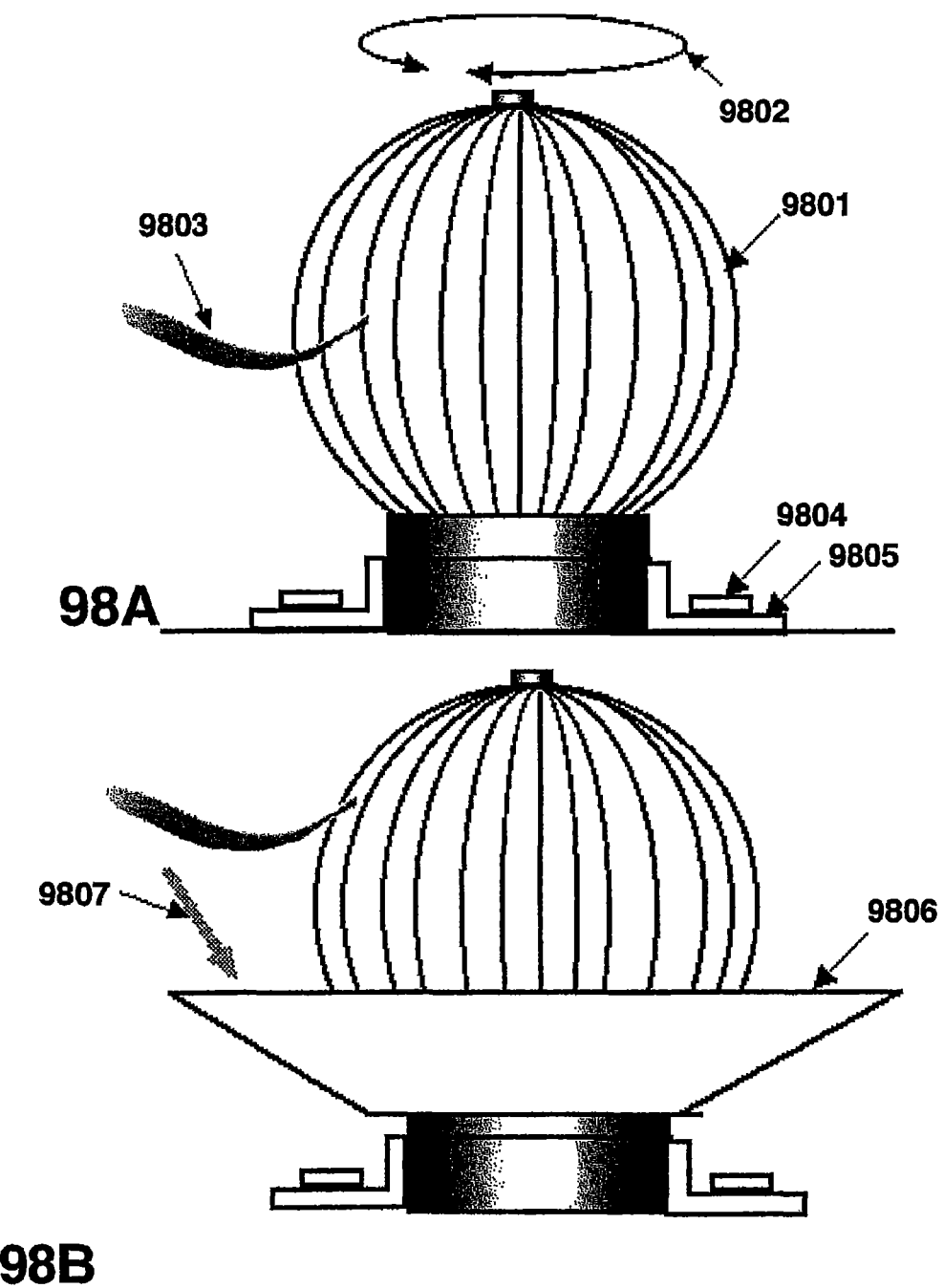
Figure 98 Wind Turbine Electricity Generator with Solar Panel Additions

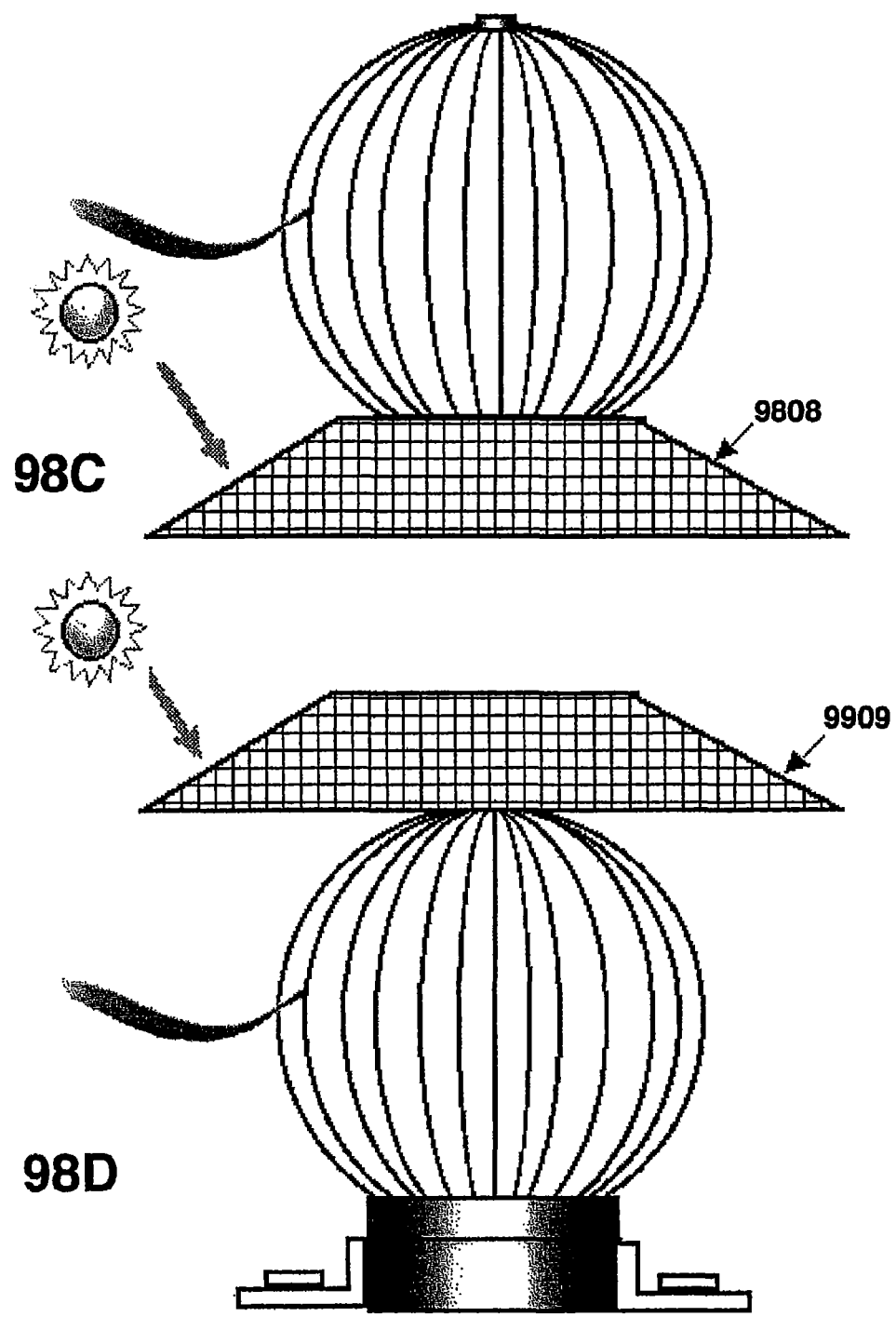
Figure 98 Wind Turbine Electricity Generator for Buildings/Homes

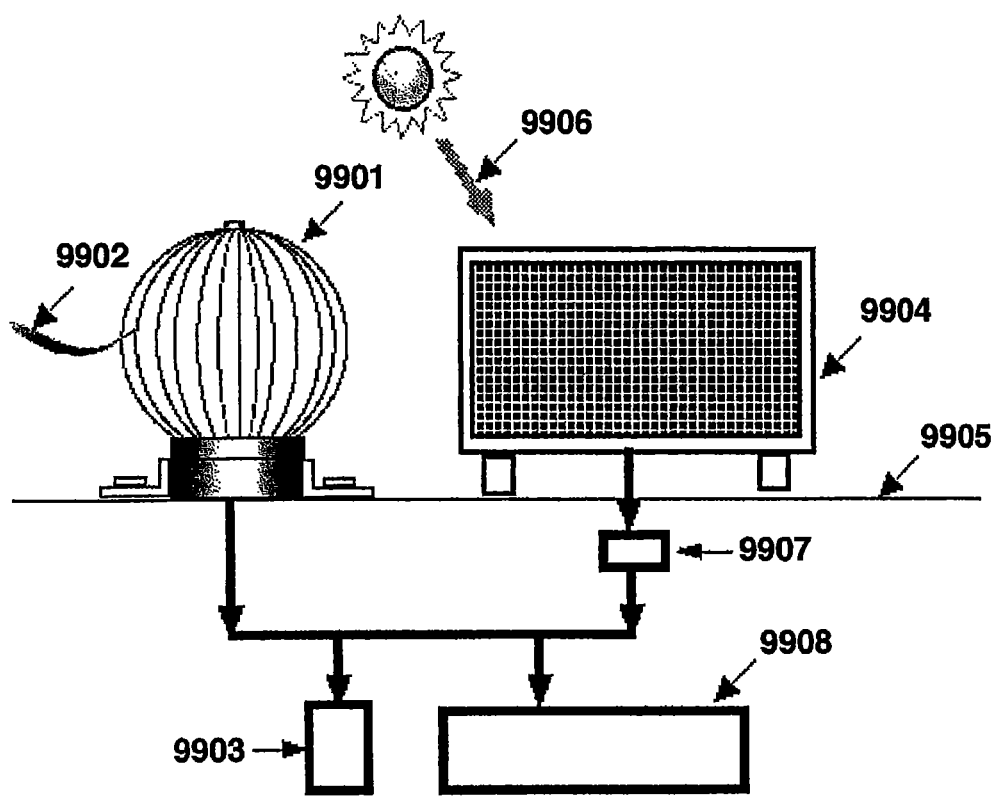
Figure 99 Separate Solar Photovoltaic Panel Addition

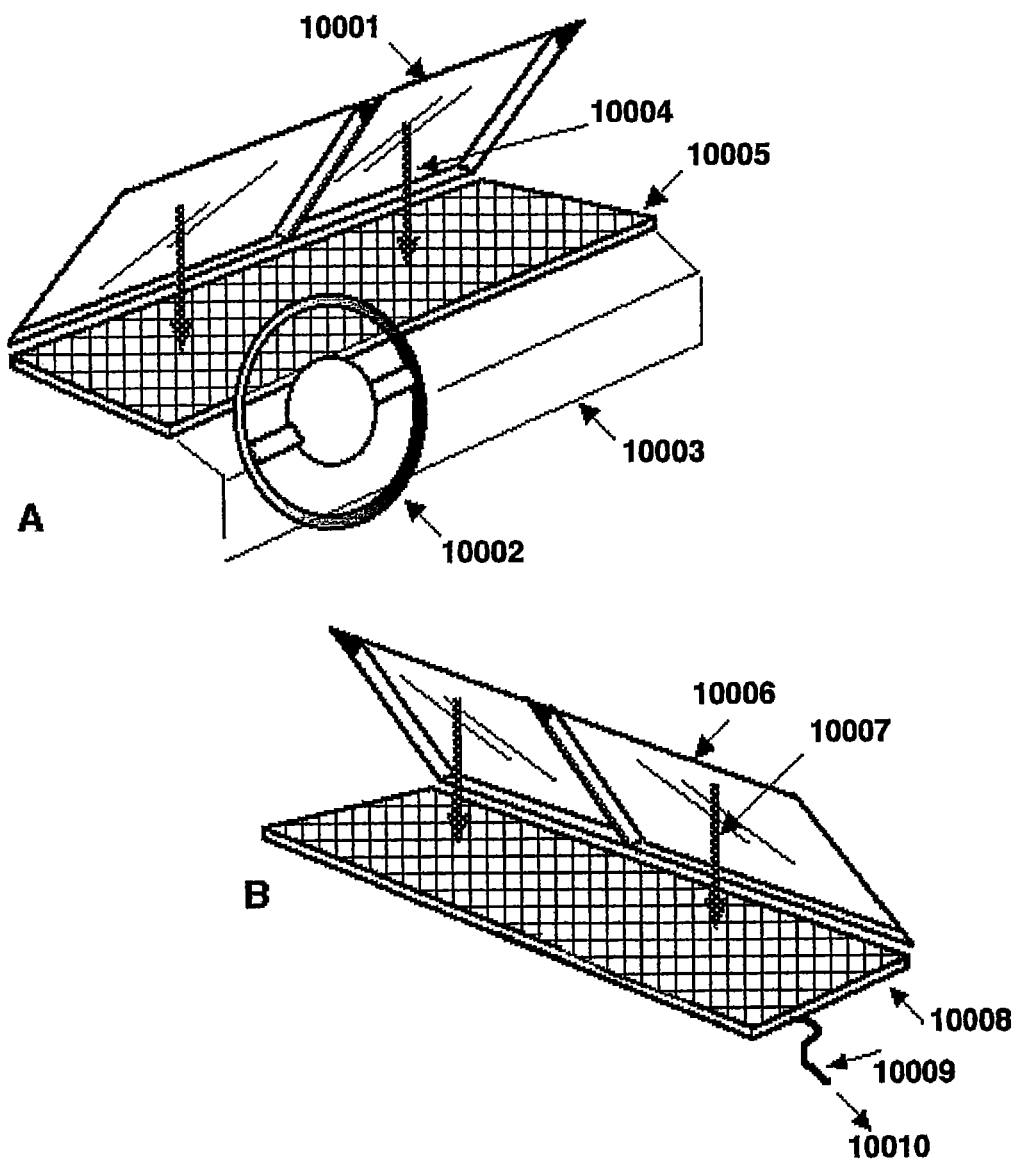
Figure 100   Solar Panels Inside the Vehicle

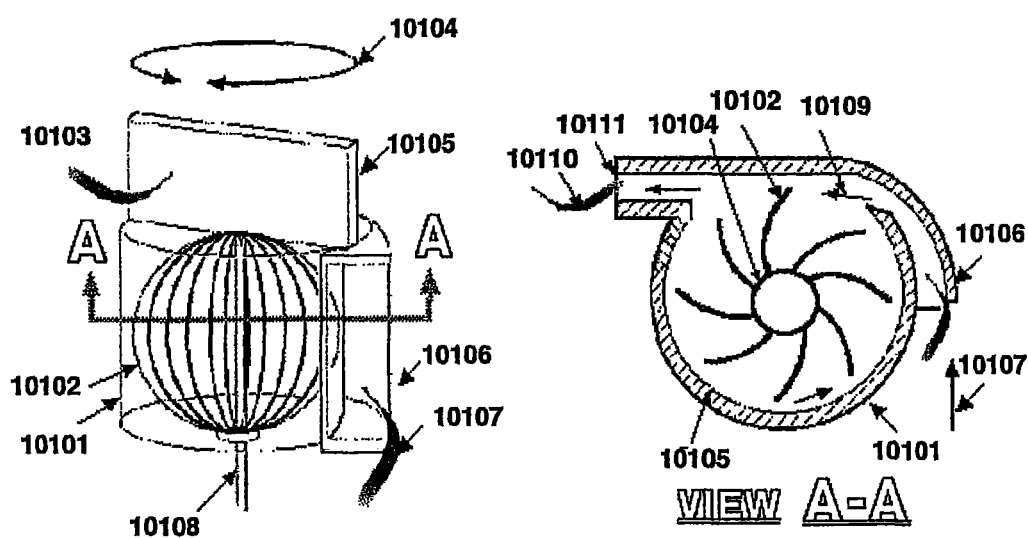
Figure 101 Turbine Assembly Rotatable Shroud

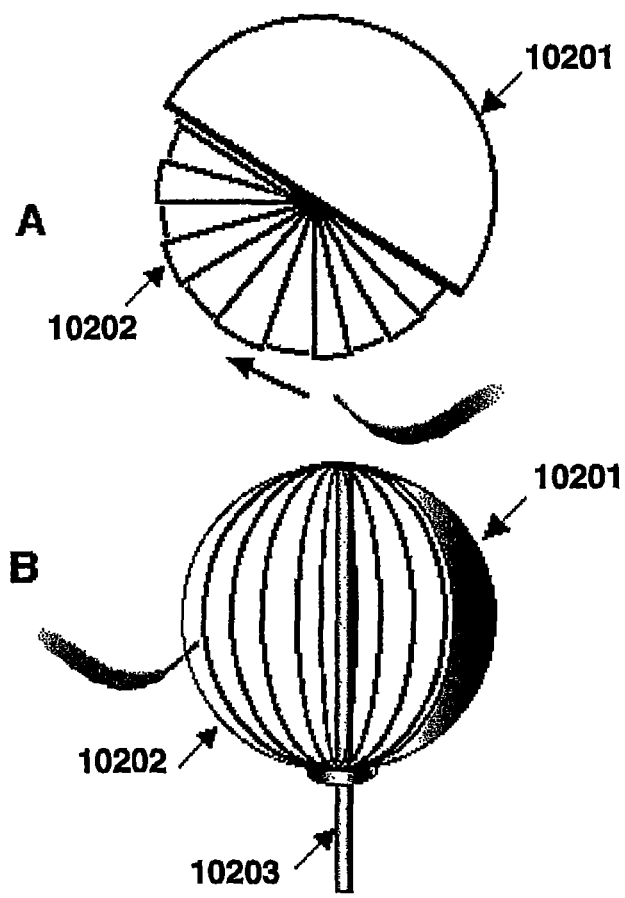
Figure 102 Turbine Assembly Fixed Shroud

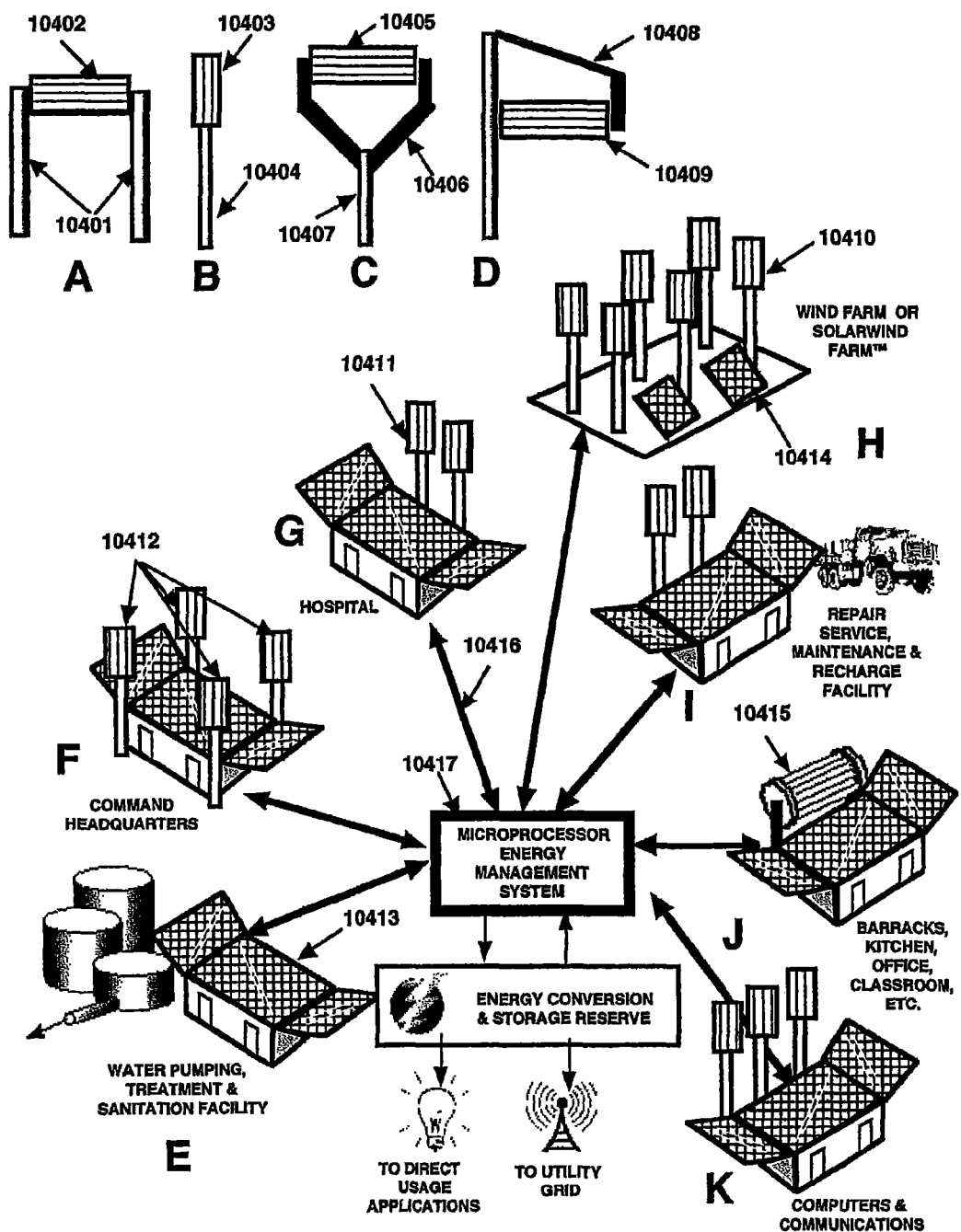
Figure 104 Different Configurations of Embodiments for Local Area Energy Distribution and Management System

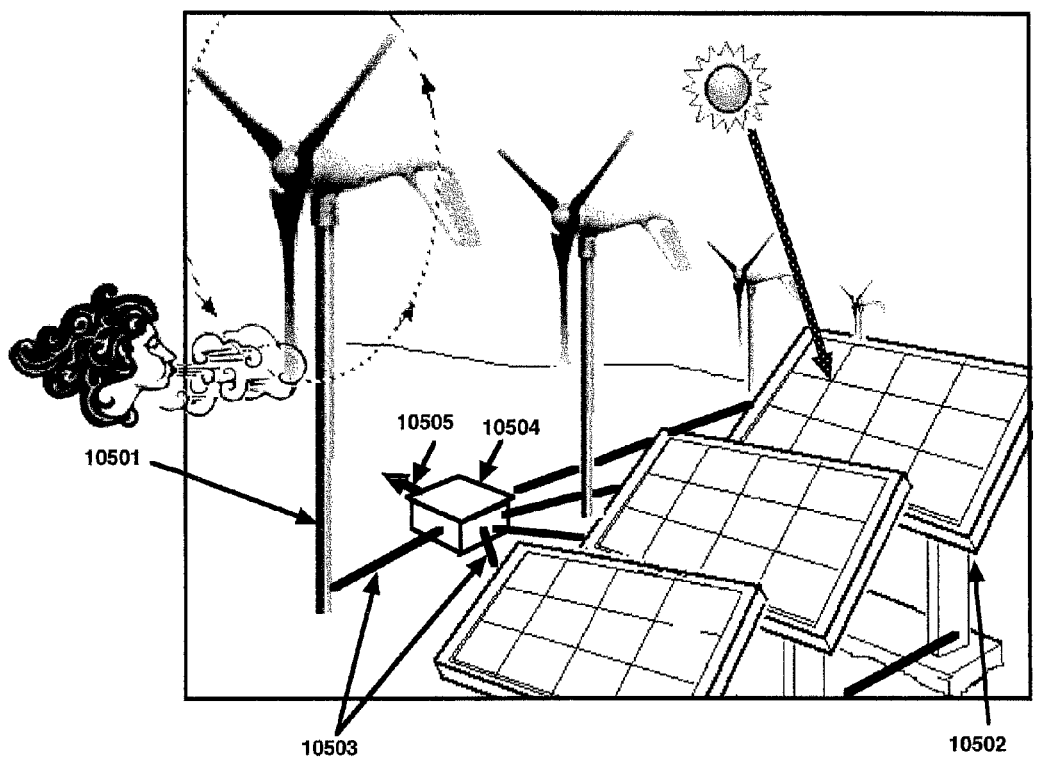
Figure 105 One Embodiment is for Solar Panels to Co-exist with Existing Wind Turbine Generator Wind Farms. (Energy Storage System(s) not shown.)

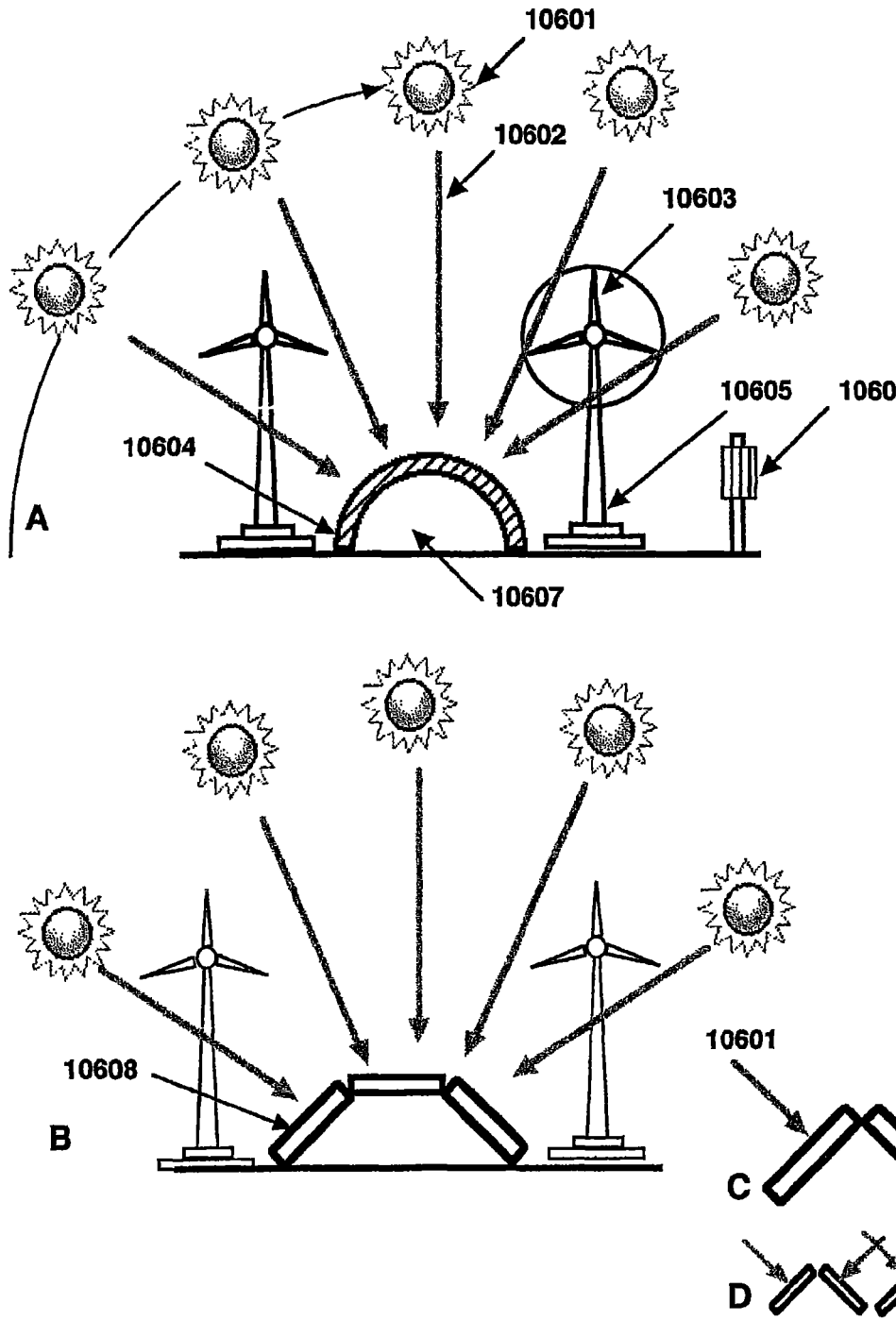
Figure 106 Different Solar Panel Configurations Situated within Wind Farms

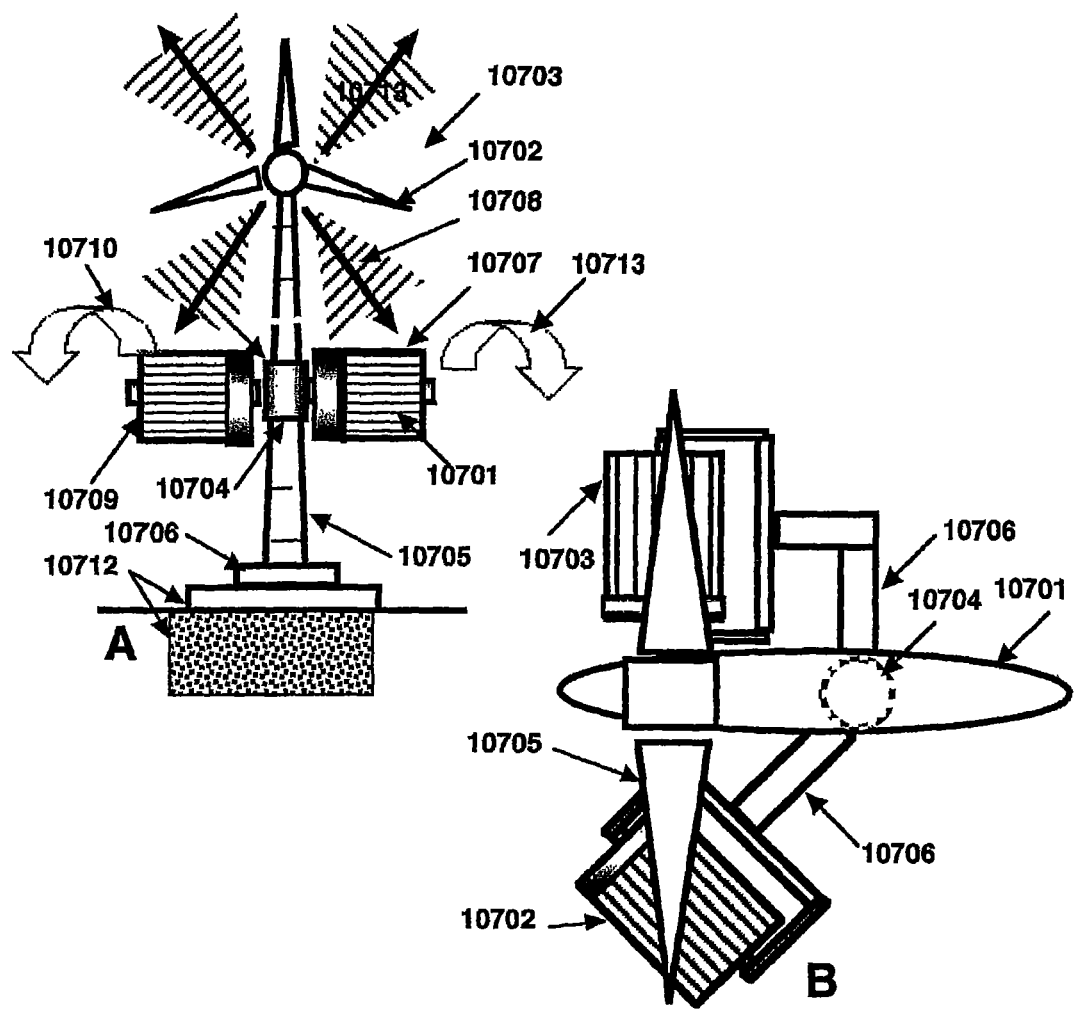
Figure 107 Giant Wind Turbines Air Flow can drive the Embodiment's Smaller Wind Turbines

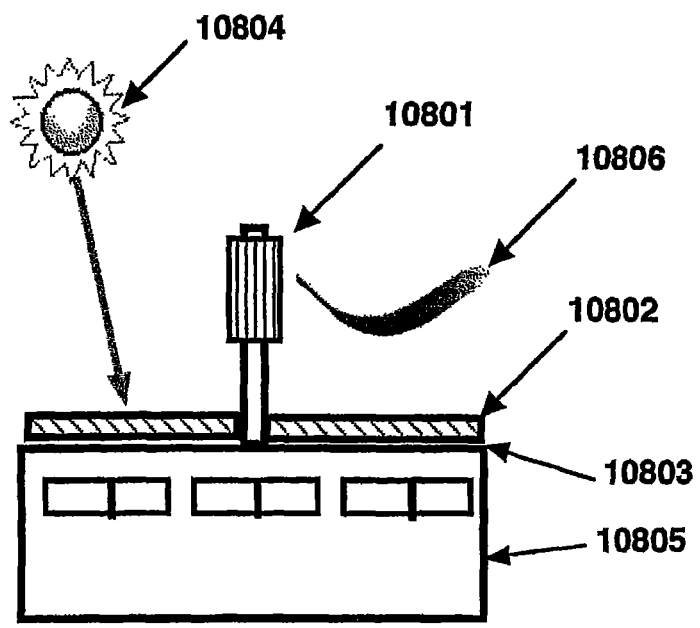
Figure 108 Existing Solar Panels can be integrated into the Embodiment with the addition of Wind Turbines.

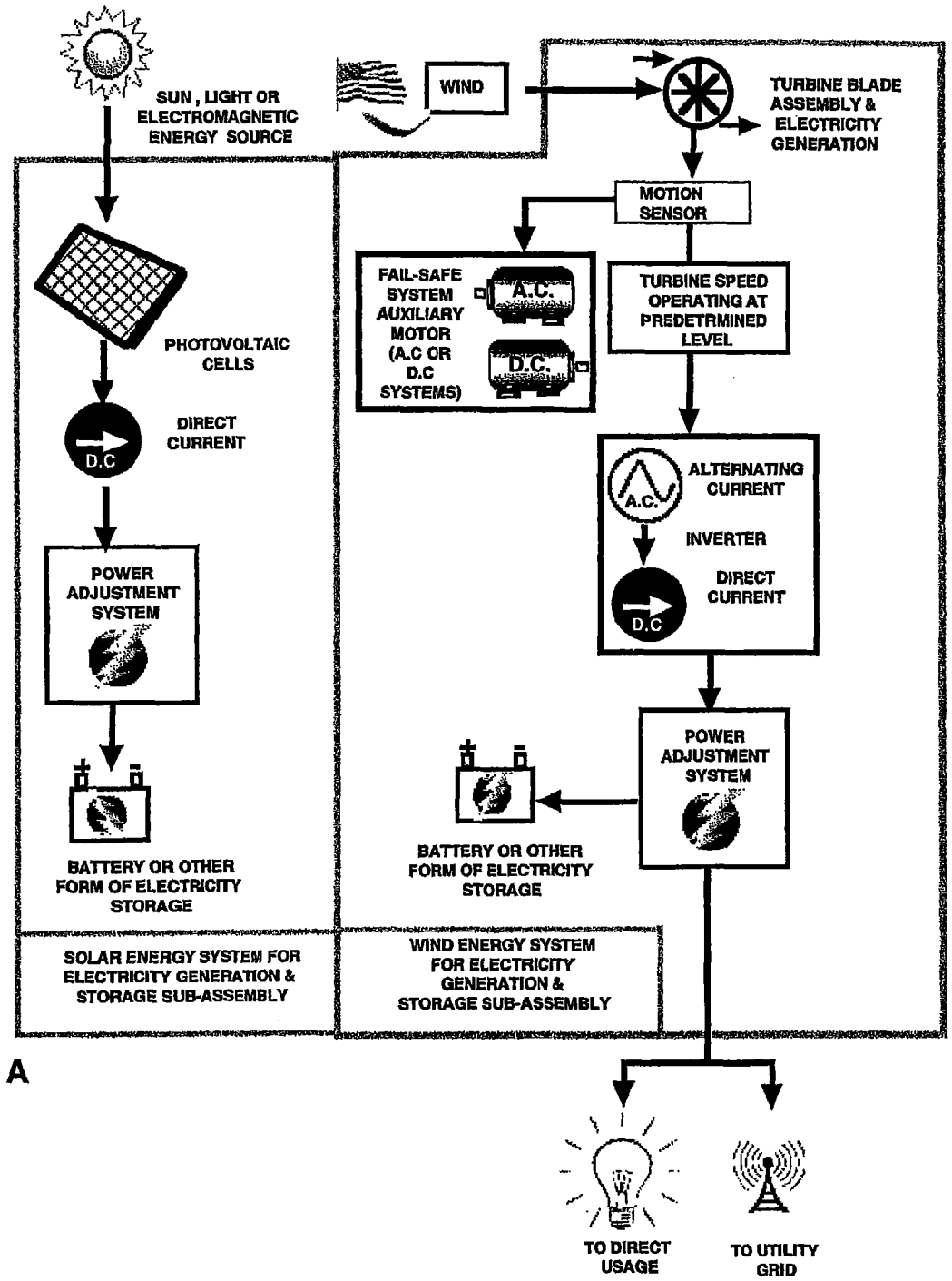
Figure 109A Basic Flow of Generated Electricity when both the Sun and Wind are Available and the Fail-Safe System is NOT Operating.

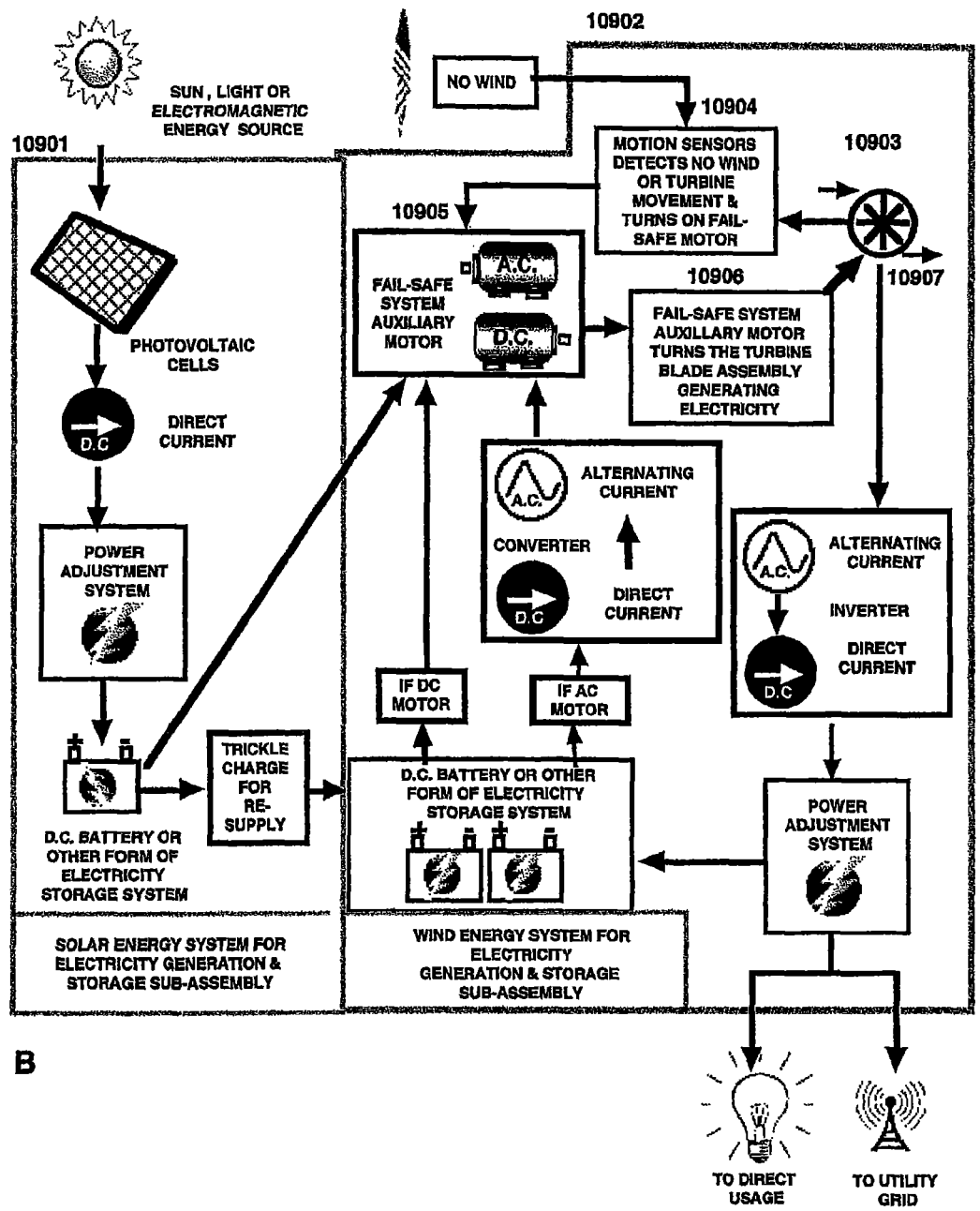
Figure 109B Basic Flow of Generated Electricity when the Wind is not available, but the Sun is Available

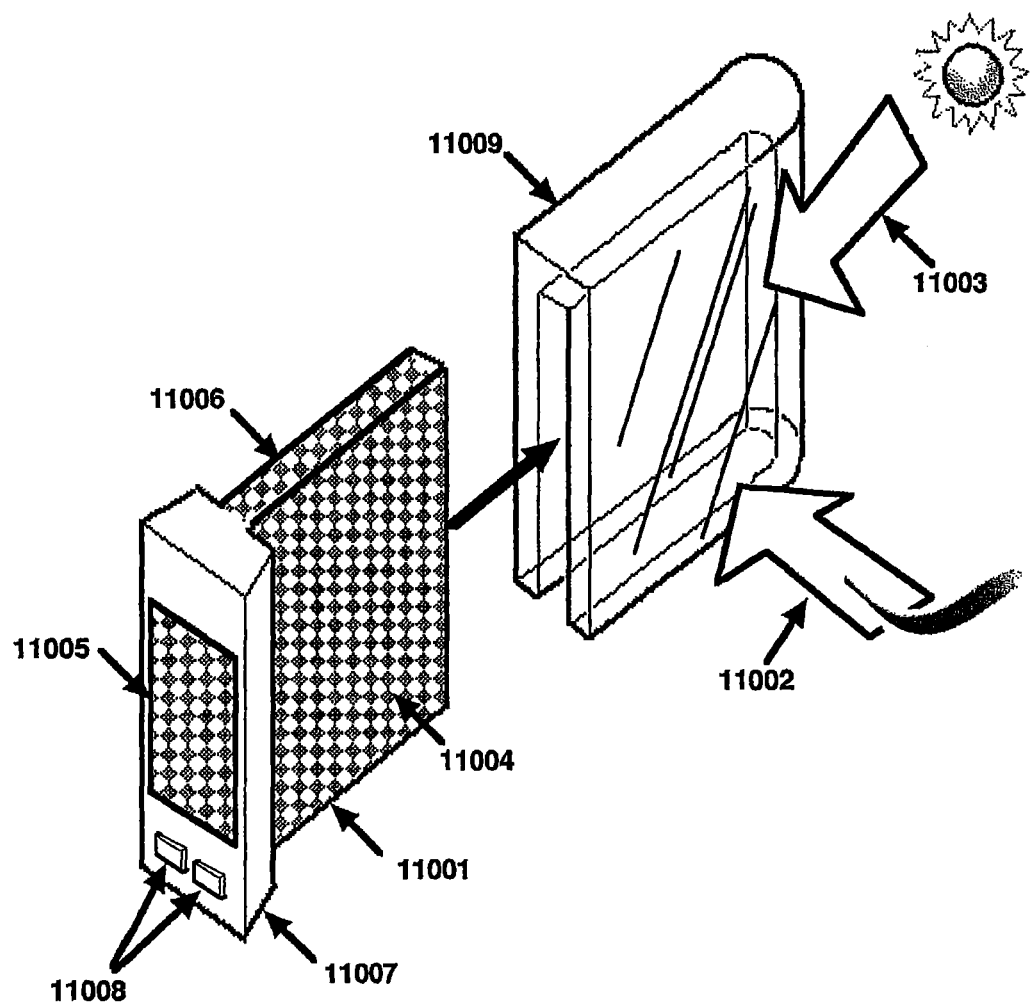
Figure 110 Photovoltaic Covered Turbine Blades

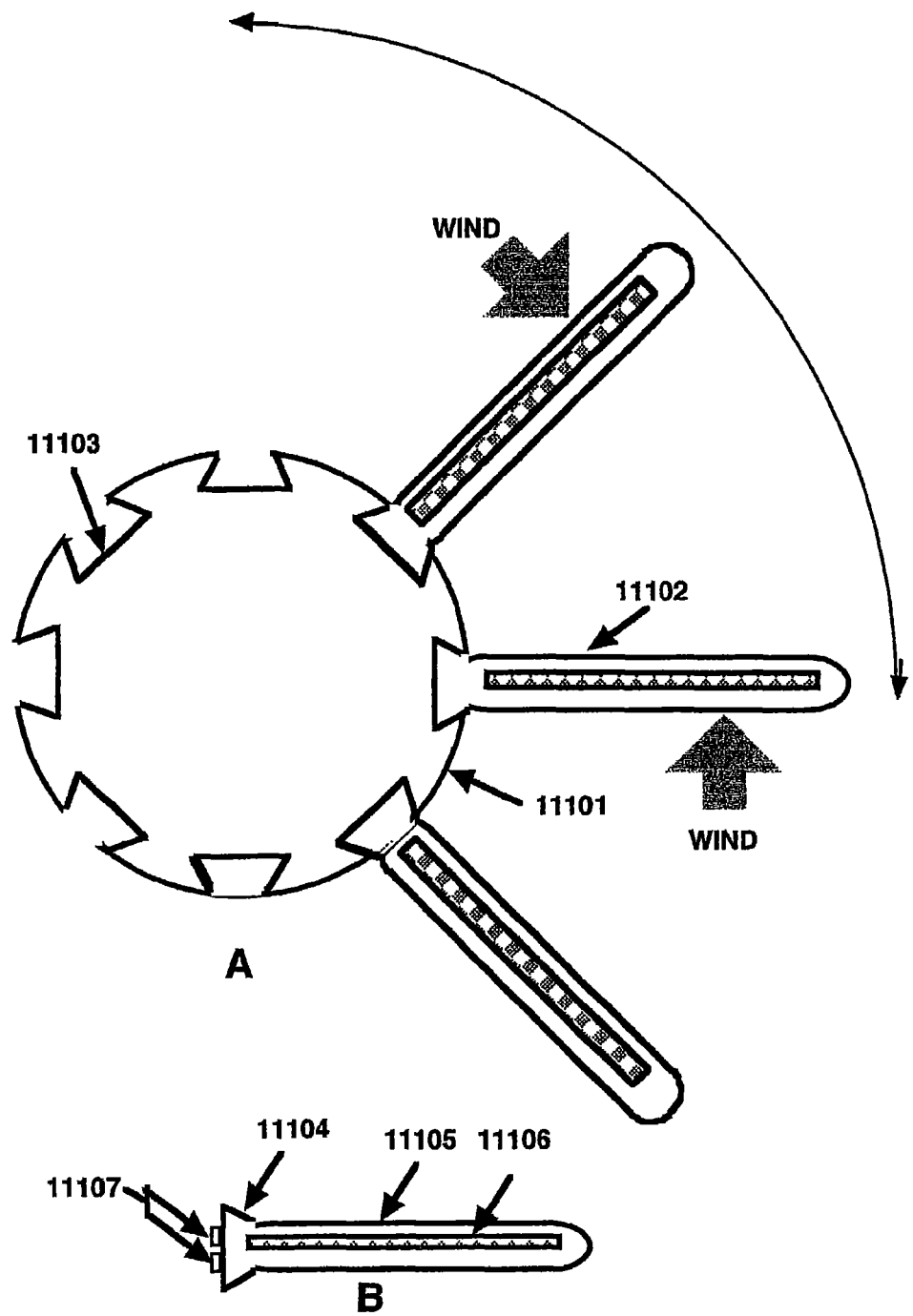
Figure 111 The Locking of the Turbine Blades into the Central Rotating Shaft

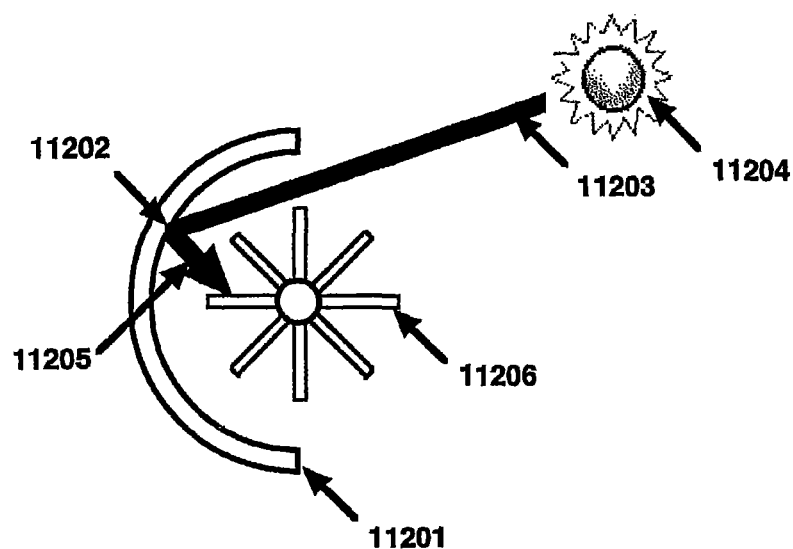
Figure 112 Reflective Solar Concentrator of the Photovoltaic-Covered Turbine Blades

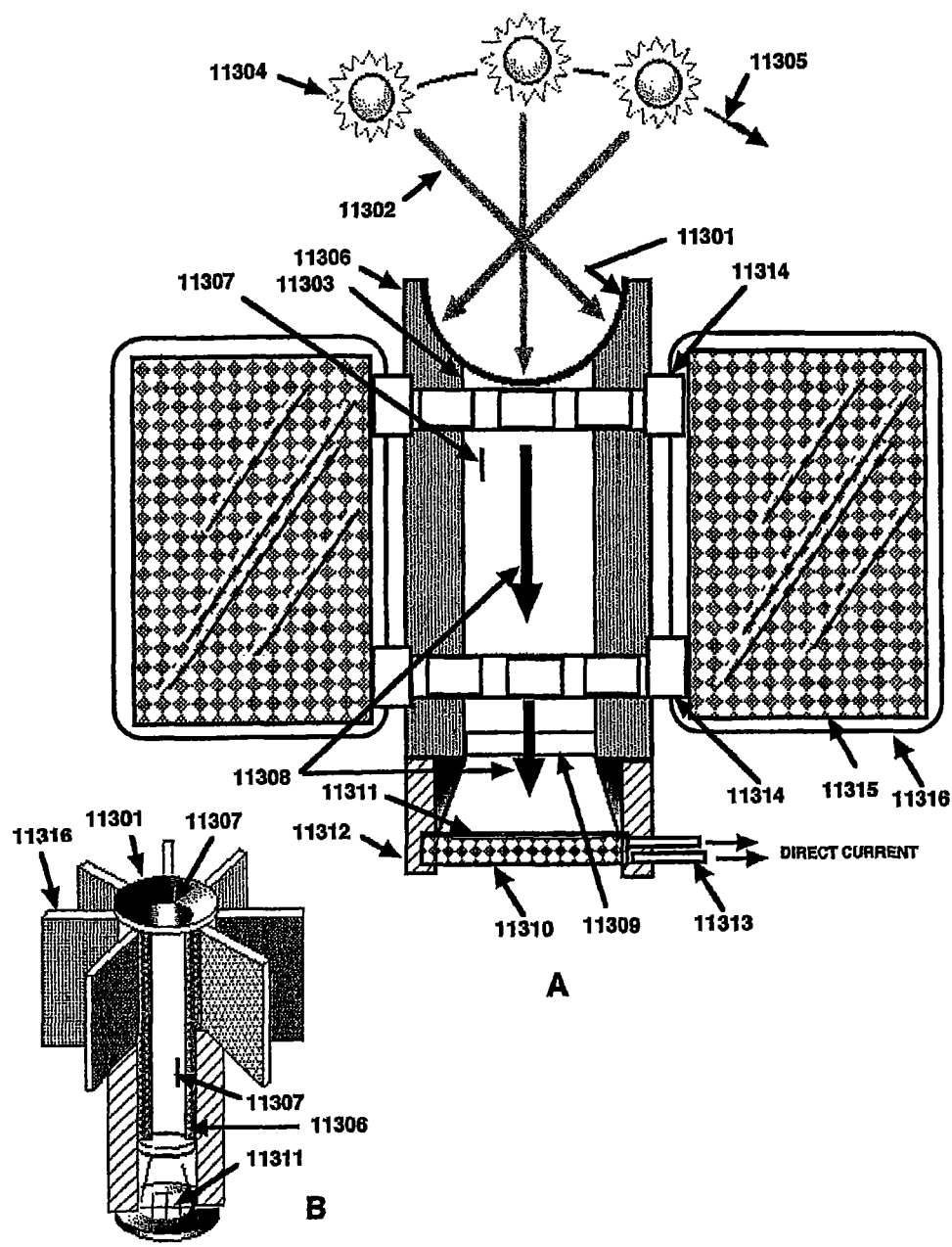
Figure 113 Illuminated Rotating Turbine Shaft

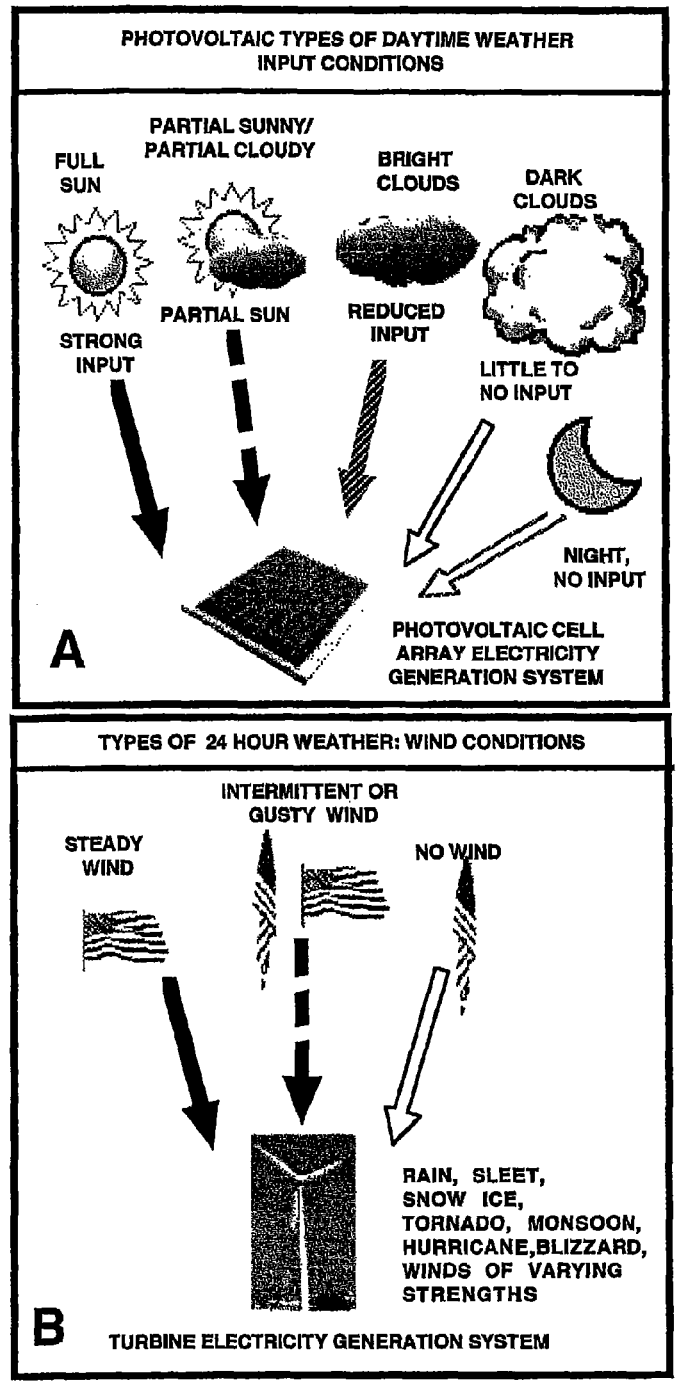
Figure 114 Types of Solar and Wind Conditions the Embodiment Would Encounter

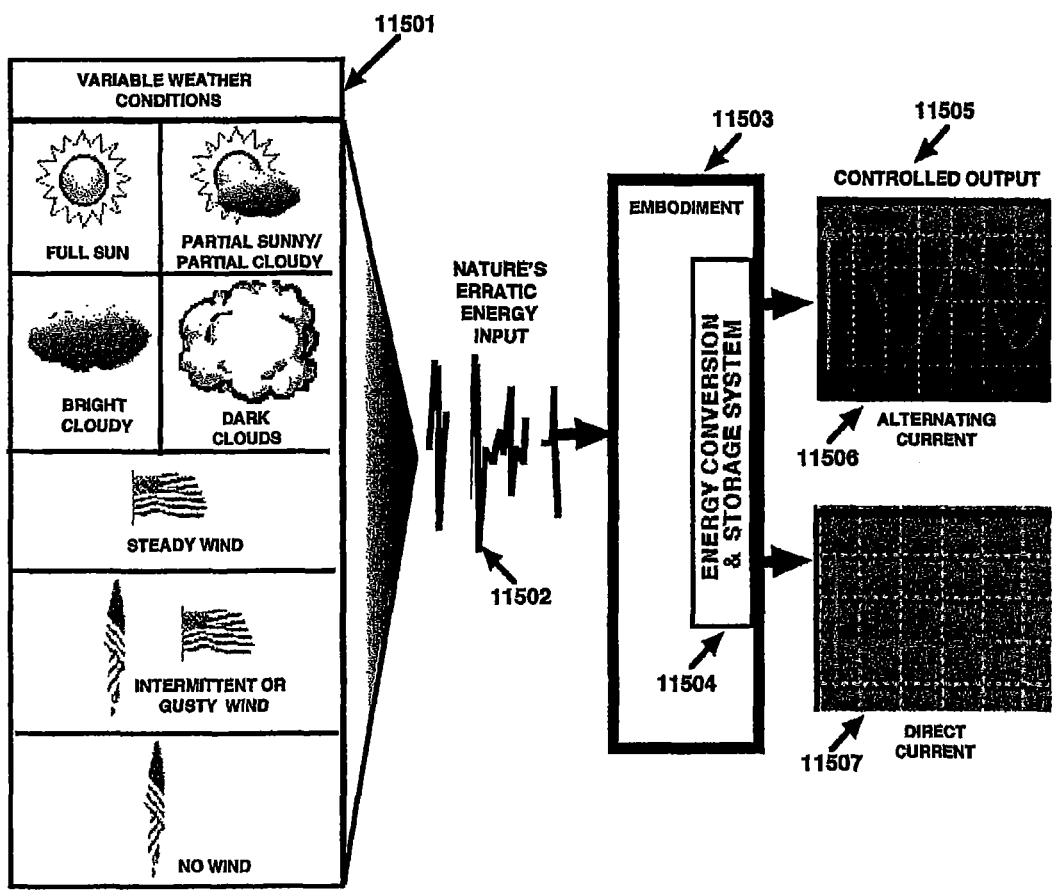
Figure 115 Nature's Erratic Energy Situations

EXTREME WEATHER CONDITION'S EFFECTS UPON ENERGY GENERATION

| SUB-ASSEMBLY | | SYSTEM RESPONSE (GOAL: TO KEEP THE TURBINE GENERATION SYSTEM GENERATING ELECTRICITY 24 HOURS PER DAY, 7 DAYS PER WEEK (24/7) ) | | | |
|---|---|---|---|---|---|
| PHOTOVOLTAIC ELECTRICITY GENERATION | TURBINE ELECTRICITY GENERATION | | | | |
| WEATHER CONDITIONS | | ENERGY CONVERSION & STORAGE SYSTEM: INPUT | | PROCESS | ESTIMATED % OF TURBINE ENERGY GENERATION |
| SUN AVAILABILITY | WIND AVAILABILITY | SOLAR | WIND | | |
| DAYTIME FULL: SUNSHINE | ADAQUATE WIND | + | + | ADDS ELECTRICITY TO SOLAR & WIND ENERGY CONVERSION & STORAGE SYSTEMS. THESE SYSTEMS DISTRIBUTE ELECTRICAL POWER TO UTILITY GRID AND/OR DIRECT USAGE APPLICATIONS | 100% |
| FULL: SUNSHINE | NO WIND | + | - | THE PHOTOVOLTAIC SYSTEM'S POWER IS DIRECTED TO THE ENERGY CONVERSION & STORAGE SYSTEMS WHICH ACTIVATES THE FAIL-SAFE TURBINE DRIVE MOTOR PROVIDING CONTINUOUS GENERATION OF ELECTRICITY. THESE SYSTEMS DISTRIBUTE ELECTRICAL POWER TO UTILITY GRID AND/OR DIRECT USAGE APPLICATIONS | 100% |
| NIGHT TIME NO SUNSHINE | ADAQUATE WIND | - | + | WIND TURBINE'S ELECTRICAL PRODUCTION DIRECTED TO ENERGY CONVERSION & STORAGE SYSTEM. THESE SYSTEMS DISTRIBUTE ELECTRICAL POWER TO UTILITY GRID AND/OR DIRECT USAGE APPLICATIONS | 100% |
| NO SUNSHINE | NO WIND | - | - | THE SYSTEM AUTOMATICALLY WITHDRAWS POWER FROM THE ENERGY CONVERSION & STORAGE SYSTEM THAT WILL ACTIVATE THE FAIL-SAFE TURBINE MOTOR DRIVE SYSTEM WHICH DRIVES THE TURBINE ELECTRICAL GENERATION SYSTEM PRODUCING ELECTRICAL POWER THAT IS DISTRIBUTED TO UTILITY GRID AND/OR DIRECT USAGE APPLICATIONS | 100% |

LEGEND
+ MEANS ADDING TO THE ENERGY STORAGE RESERVES
- MEANS SUBTRACTING OR NOT ADDING TO THE ENERGY STORAGE RESERVES

Figure 116 Chart: Extreme Weather Condition's Effects upon Energy Generation

Figure 117 Chart: Variable Weather Condition's Effects upon Energy Generation

Figure 118 Chart: Cause and Effect Upon the Embodiment's Electrical power Generation Capabilities.

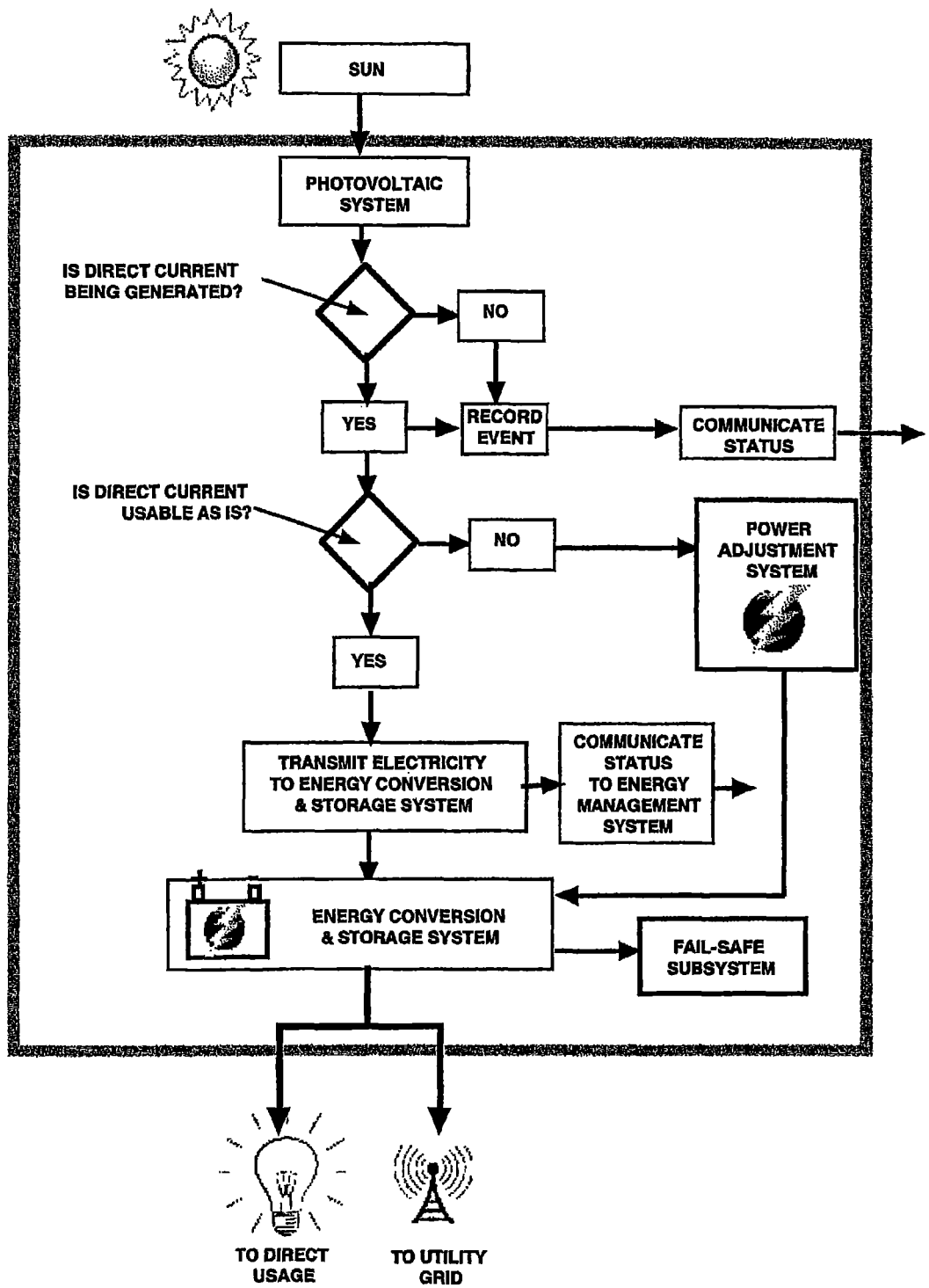
Figure 119 Flow Diagram: Solar System Electricity Generation

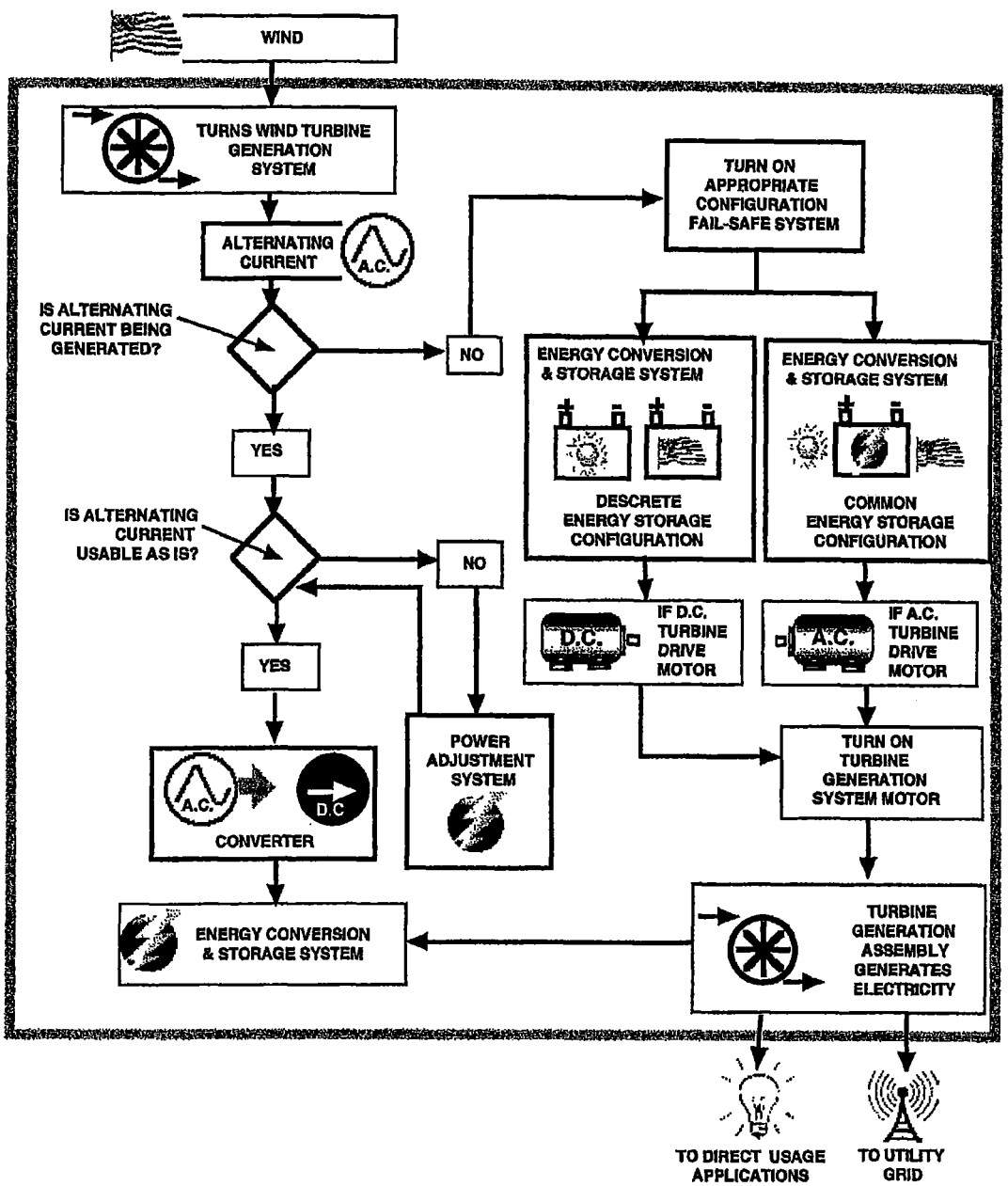
Figure 120 Flow Diagram: Wind Generation Fail-Safe System

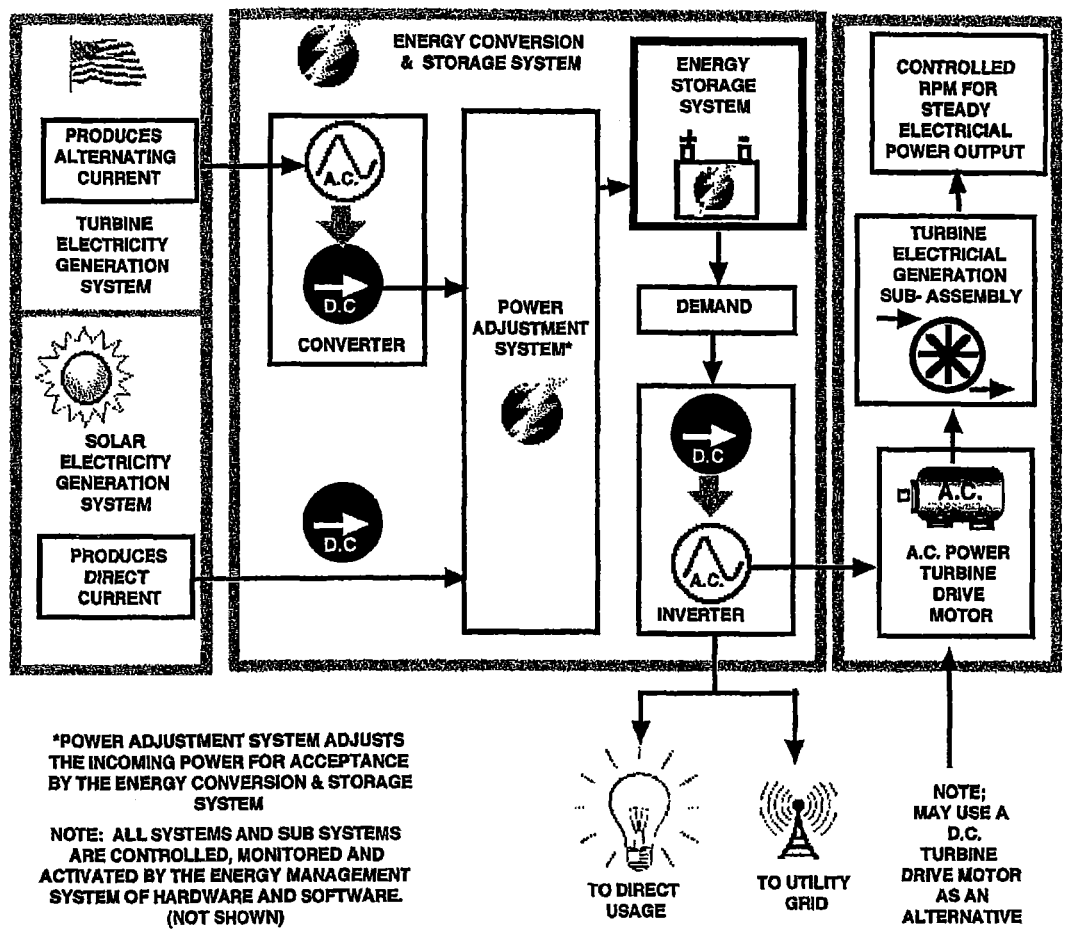
Figure 121 Flow Diagram: Energy Conversion & Storage System Process

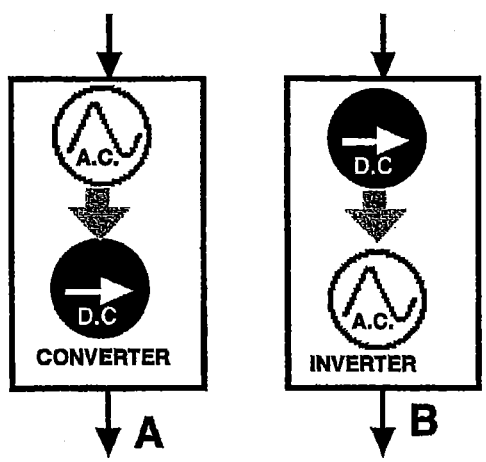
Figure 122 Flow Diagram: Differences in Electrical Conversion

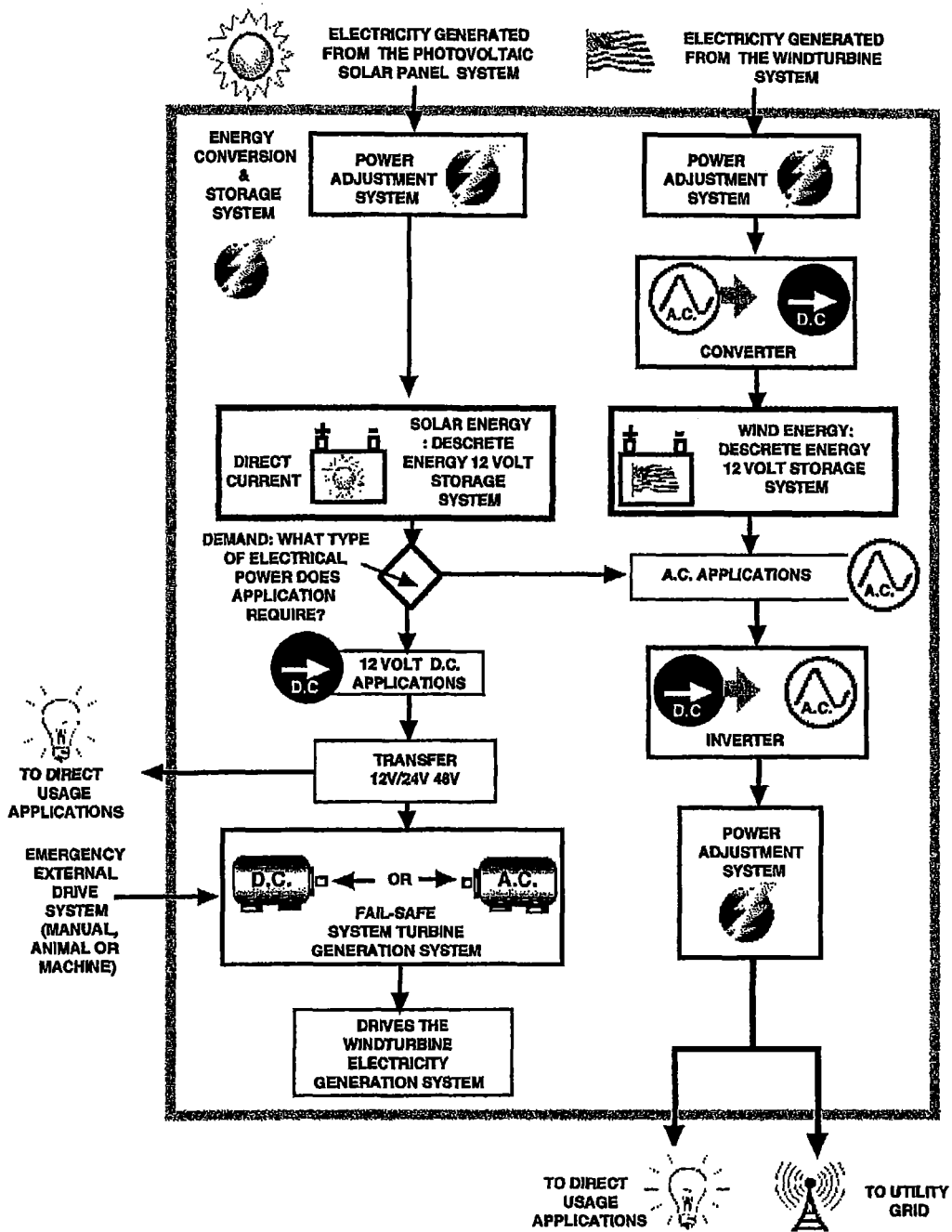
Figure 123 Flow Diagram: Discrete Energy & Conversion Storage

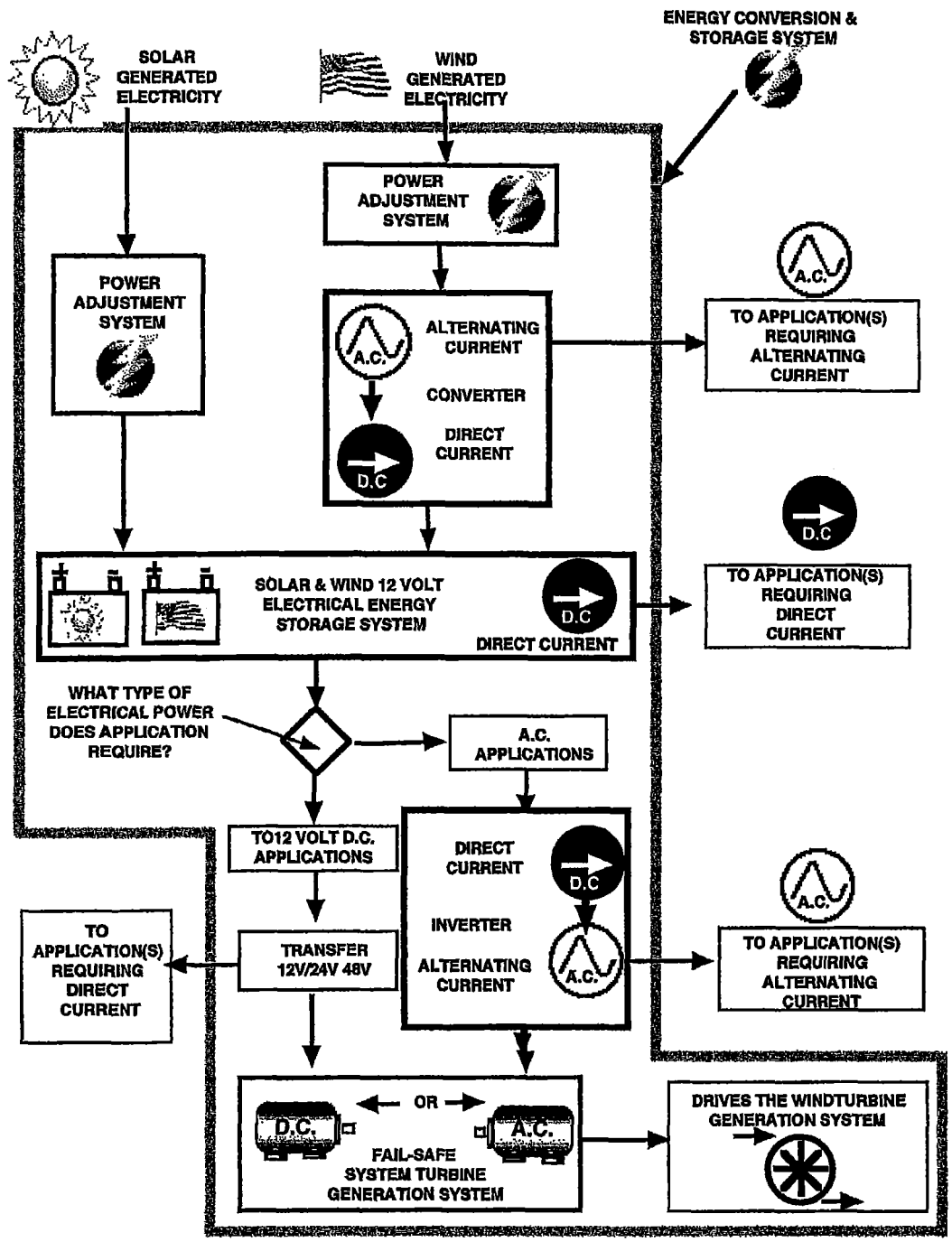
Figure 124 Flow Diagram: Common Energy Storage & Conversion Storage

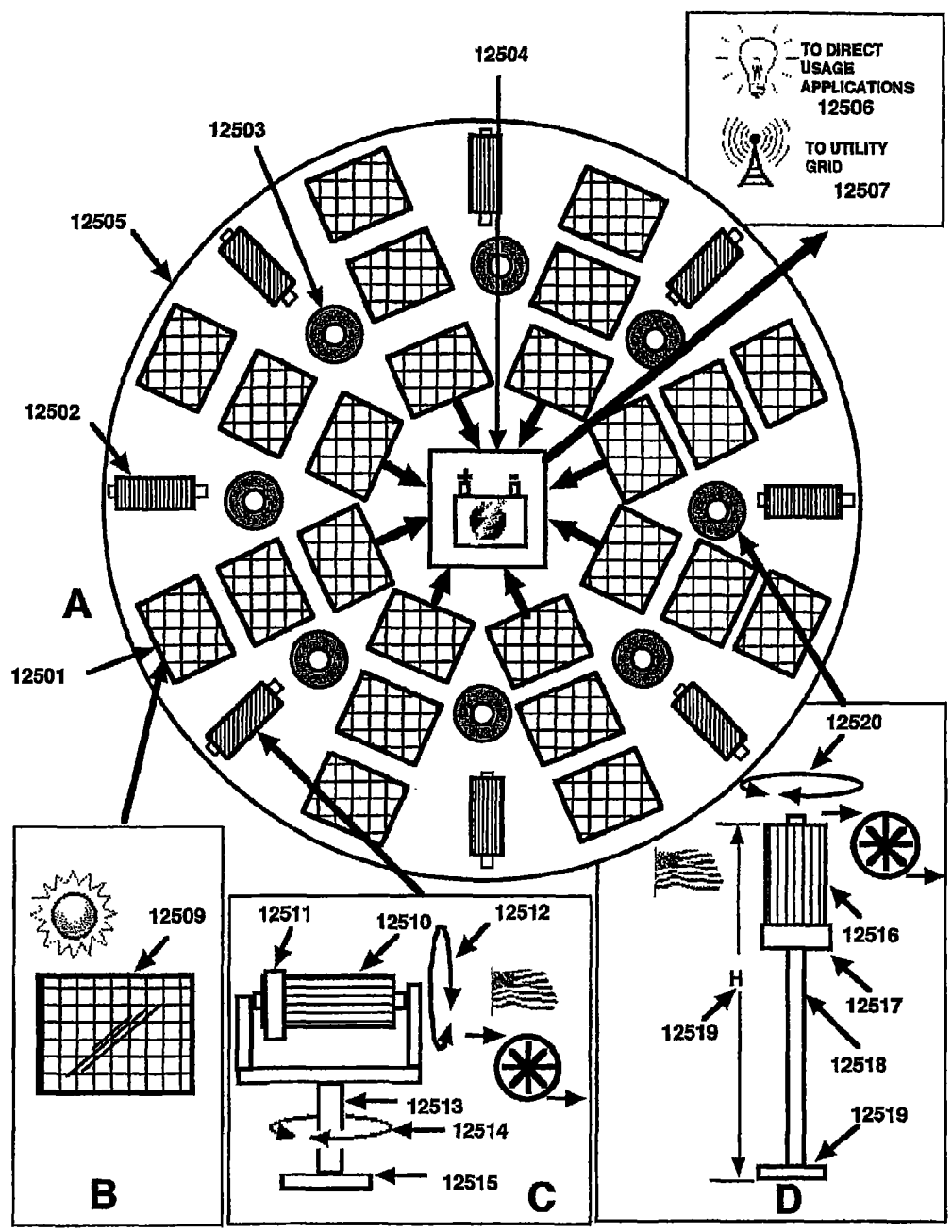
Figure 125 Solar and Wind Farm

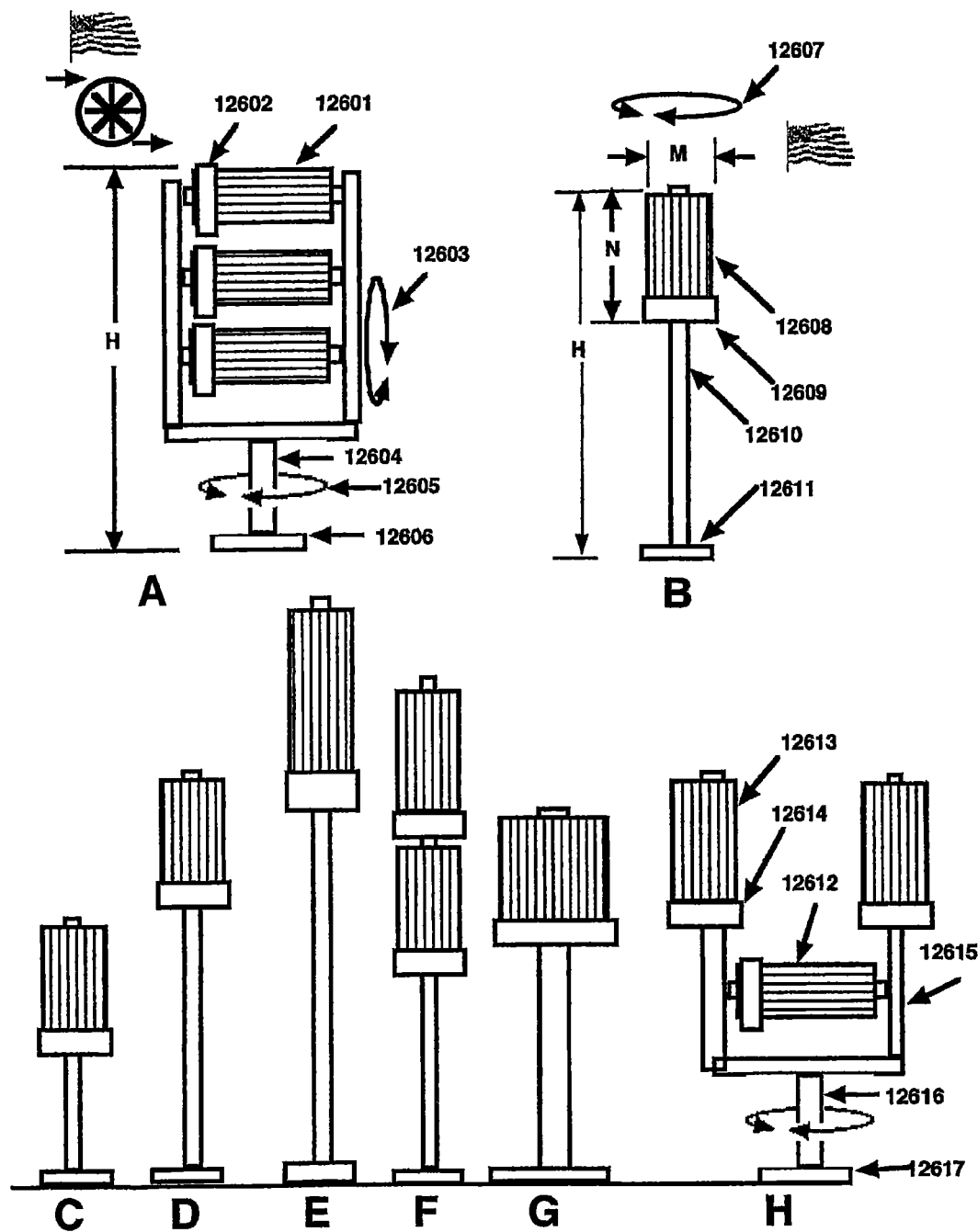
Figure 126 Various Embodiments of the Wind Turbine Assemblies

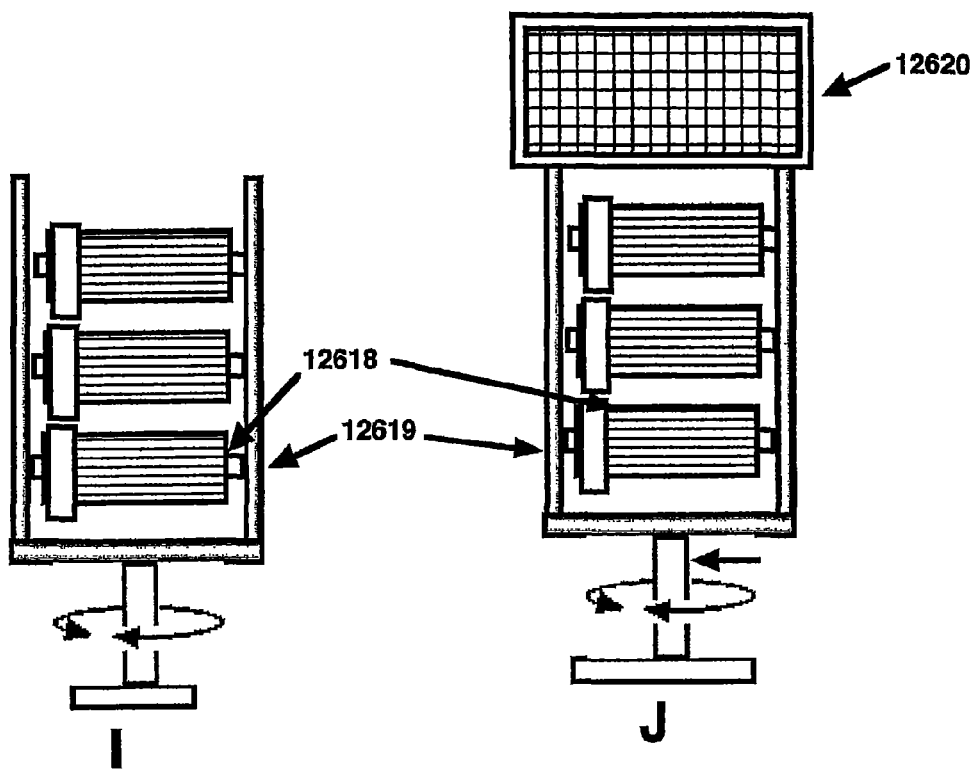
Figure 126 (continued) Various Embodiments of the Wind Turbine Assemblies

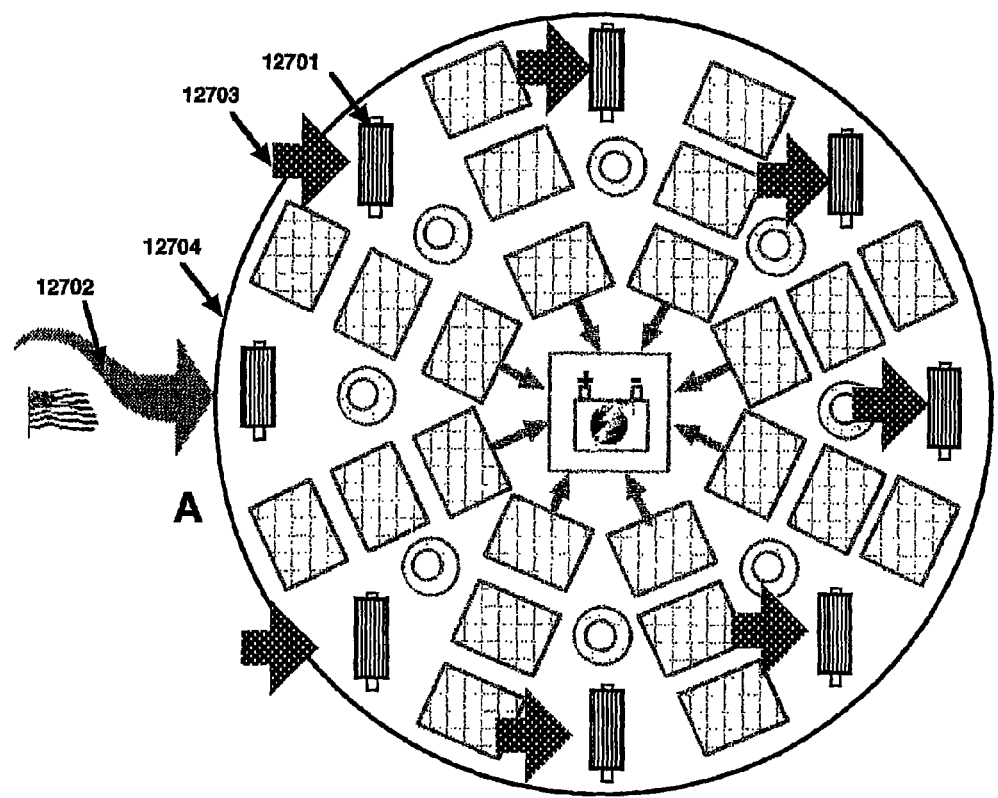
Figure 127 The Effects of the Wind upon Rotating Horizontal Turbine Assemblies

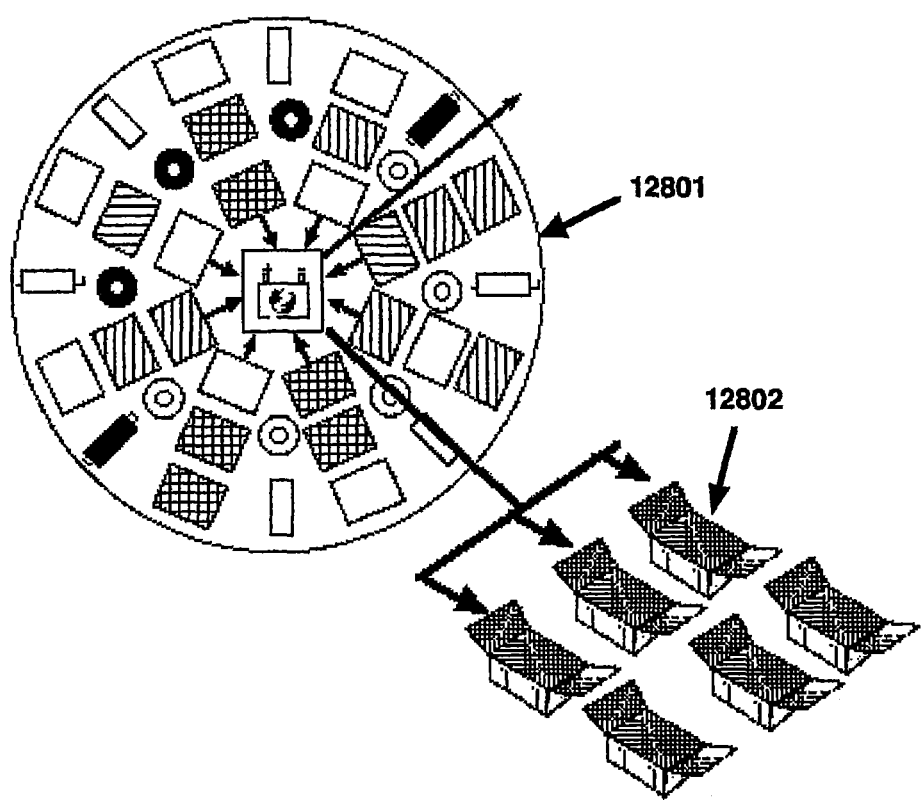
Figure 128 SolarWind Farm Linked into the Portable Solar/Wind Embodiment

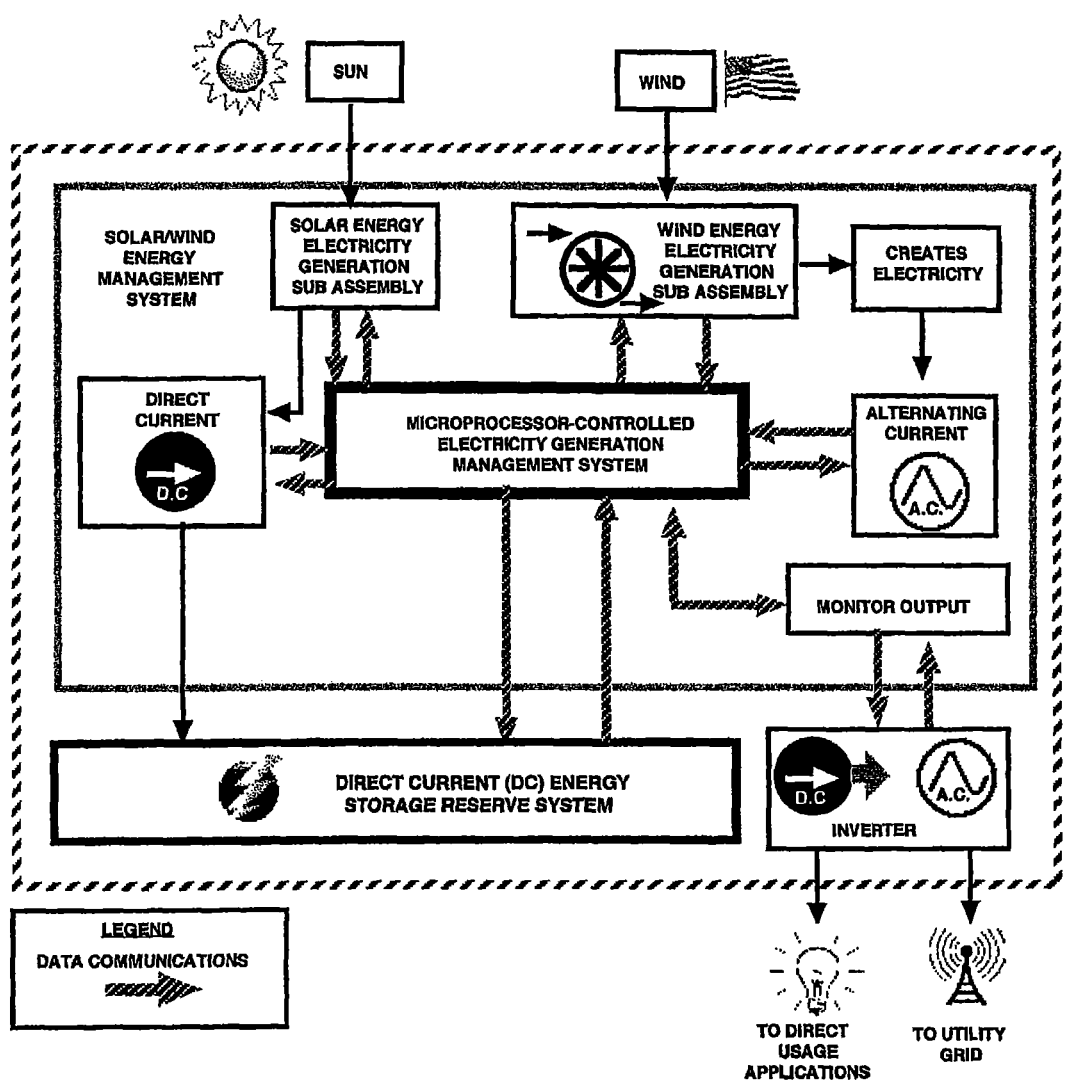
Figure 129 Data Communications when Sun and Wind are Available

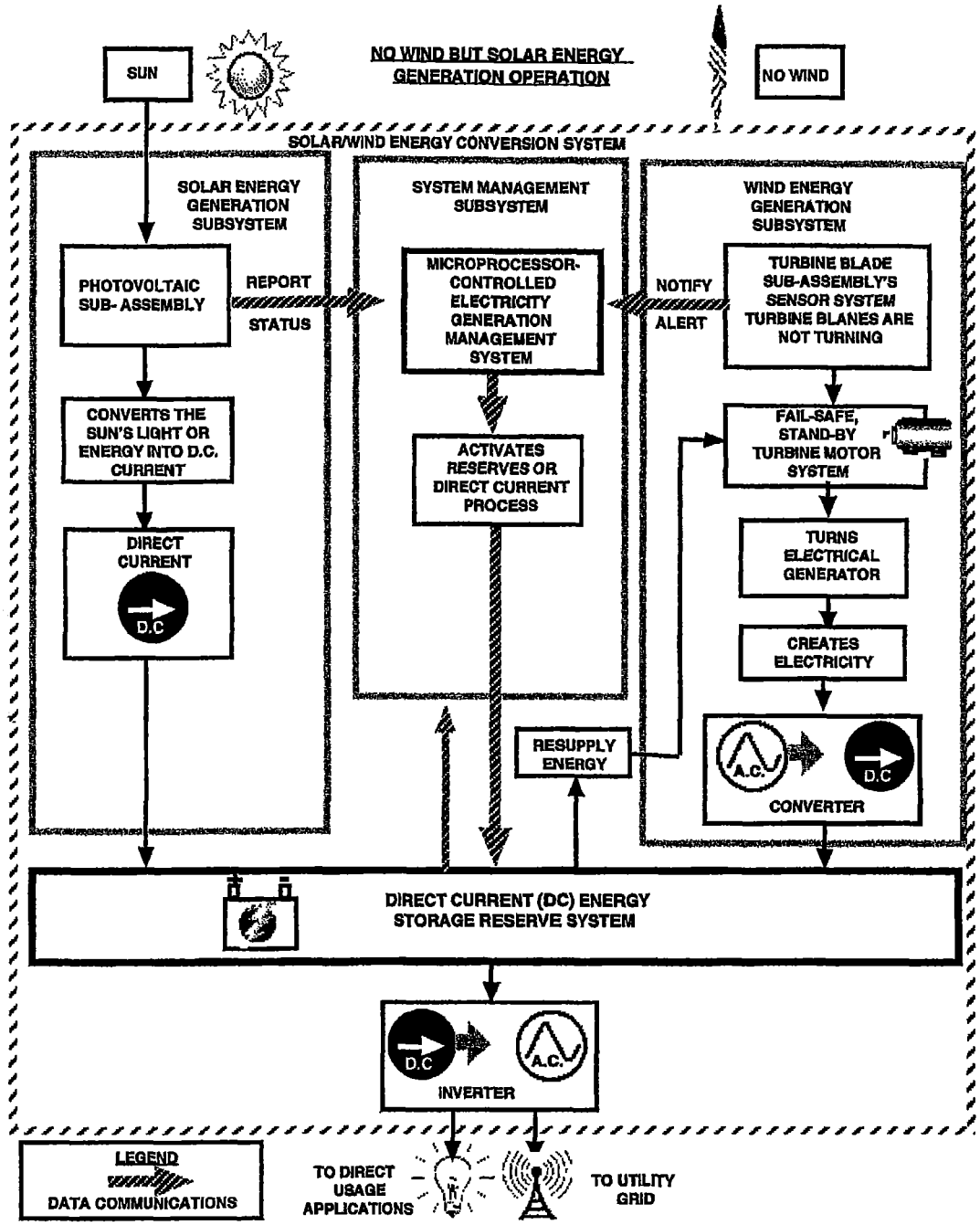
Figure 130 Energy Conversion System: Sun Only, No Wind

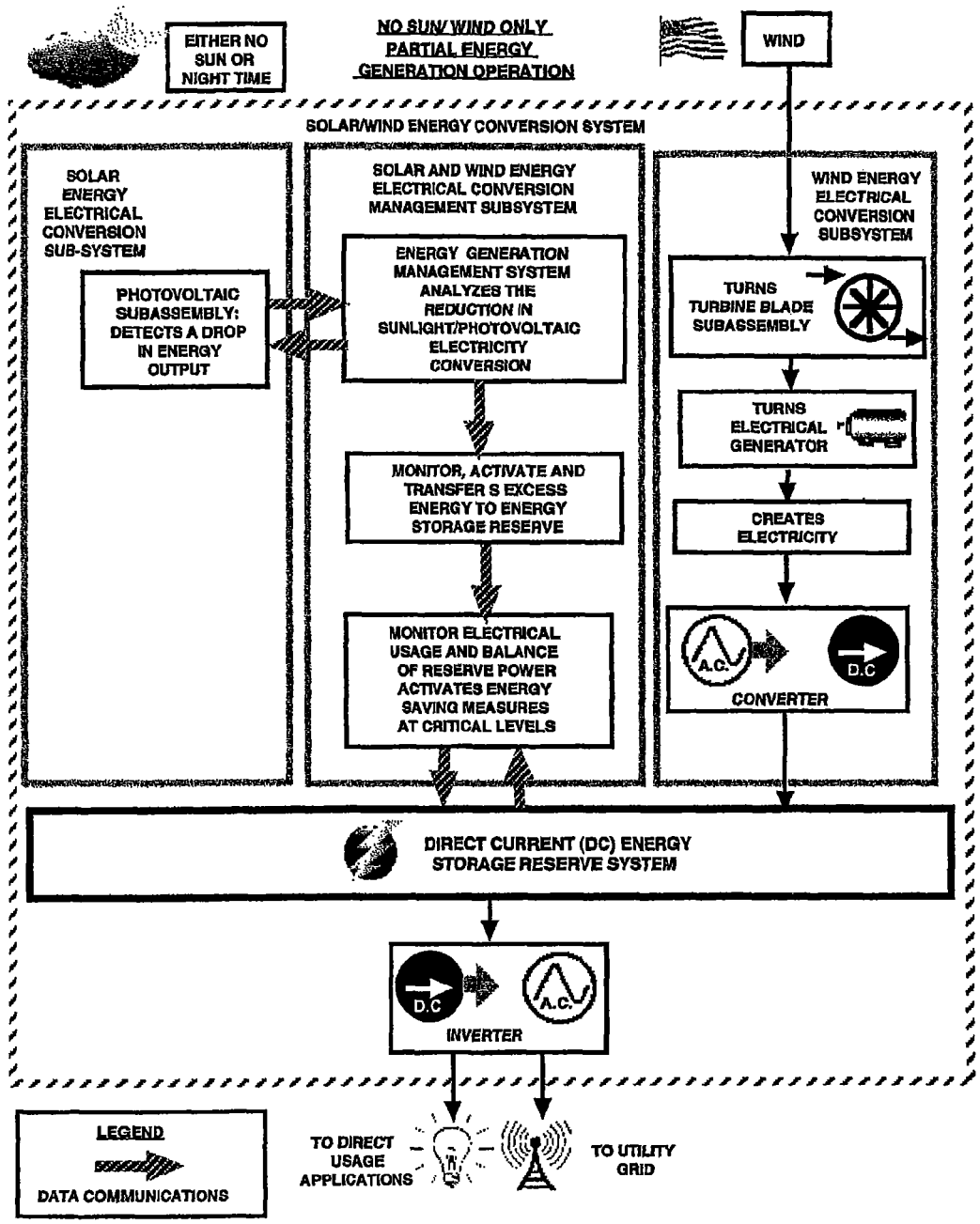
Figure 131 Energy Conversion System: Wind Only, No Sun

DISCRETE TECHNOLOGIES CURRENTLY ON THE MARKET
(EACH HAS LIMITED OPERATION TO GENERATE ELECTRICITY)
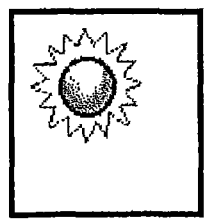
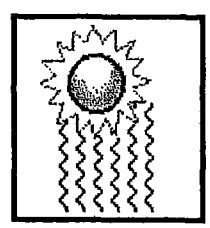
SOLAR SYSTEMS     WIND SYSTEMS     THERMAL SYSTEMS
**THE INTEGRATED EMBODIMENT'S TECHNOLOGIES
FOR THE CONTINUOUS GENERATION OF CLEAN ENERGY**
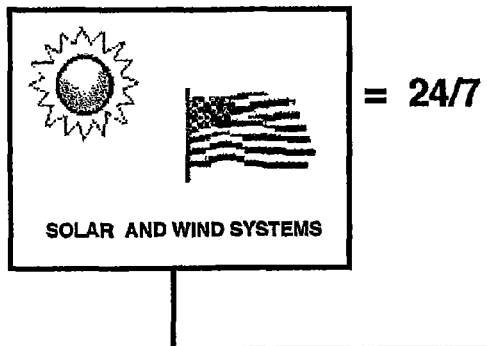 = 24/7
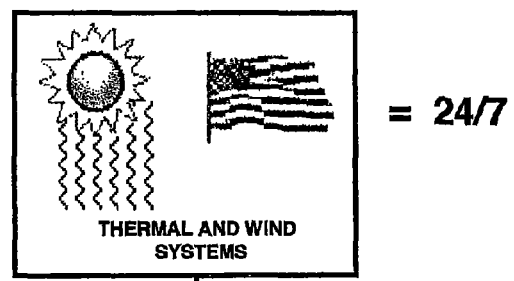 = 24/7
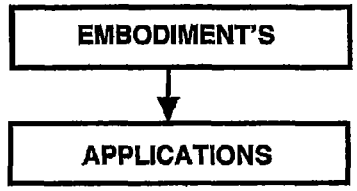
Figure 132 The Basic Concept of the Embodiments

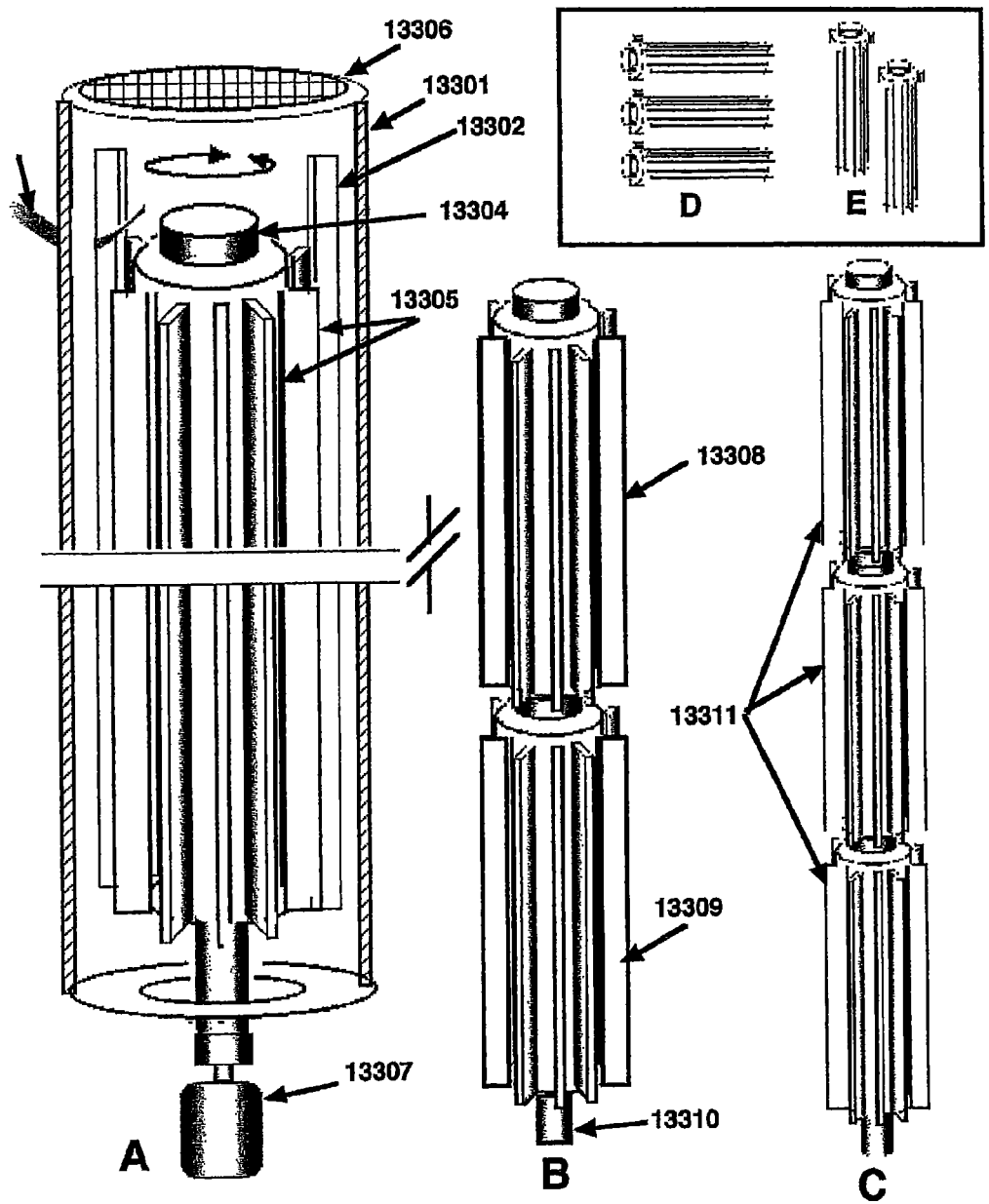
Figure 133 Vertical Turbine Blade Assembly

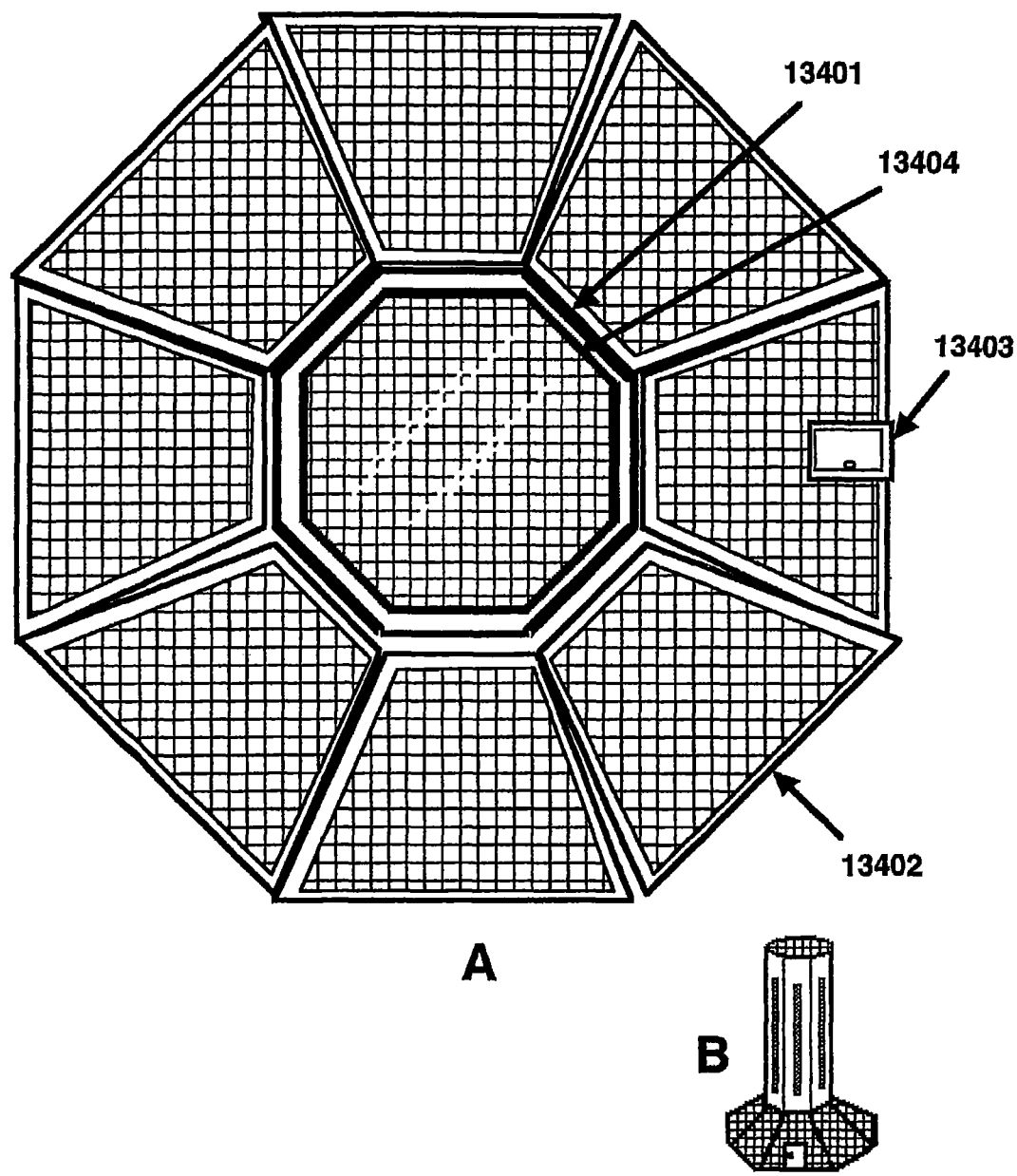
Figure 134 Top View of Solar/Wind Tower

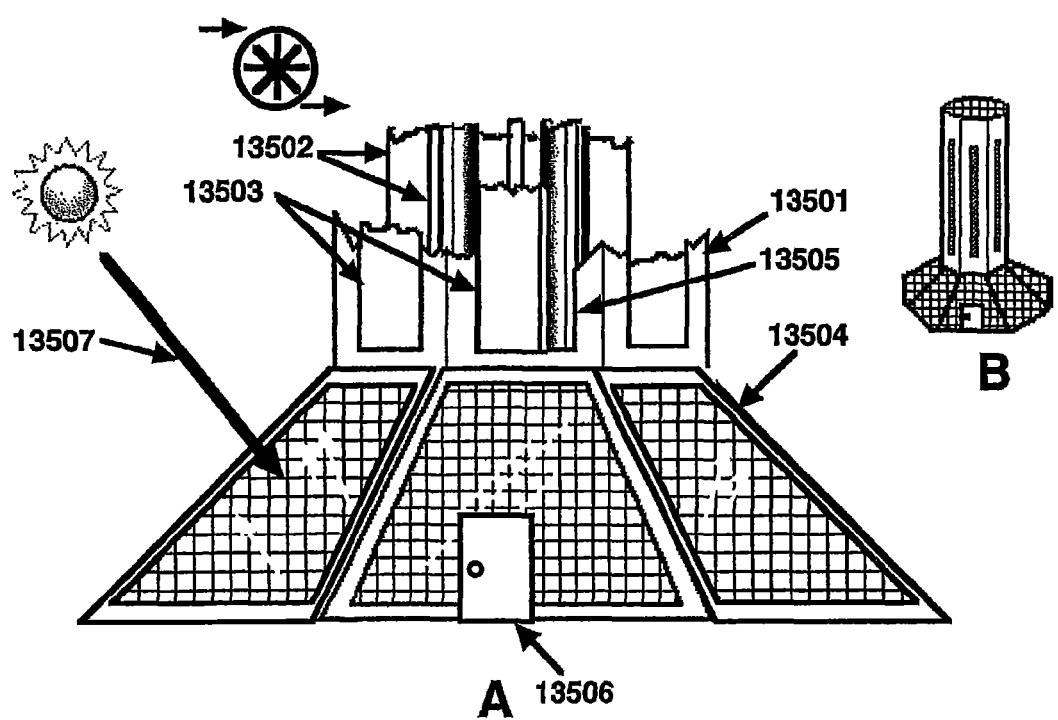
Figure 135 Front View of the Solar/Wind Tower Base

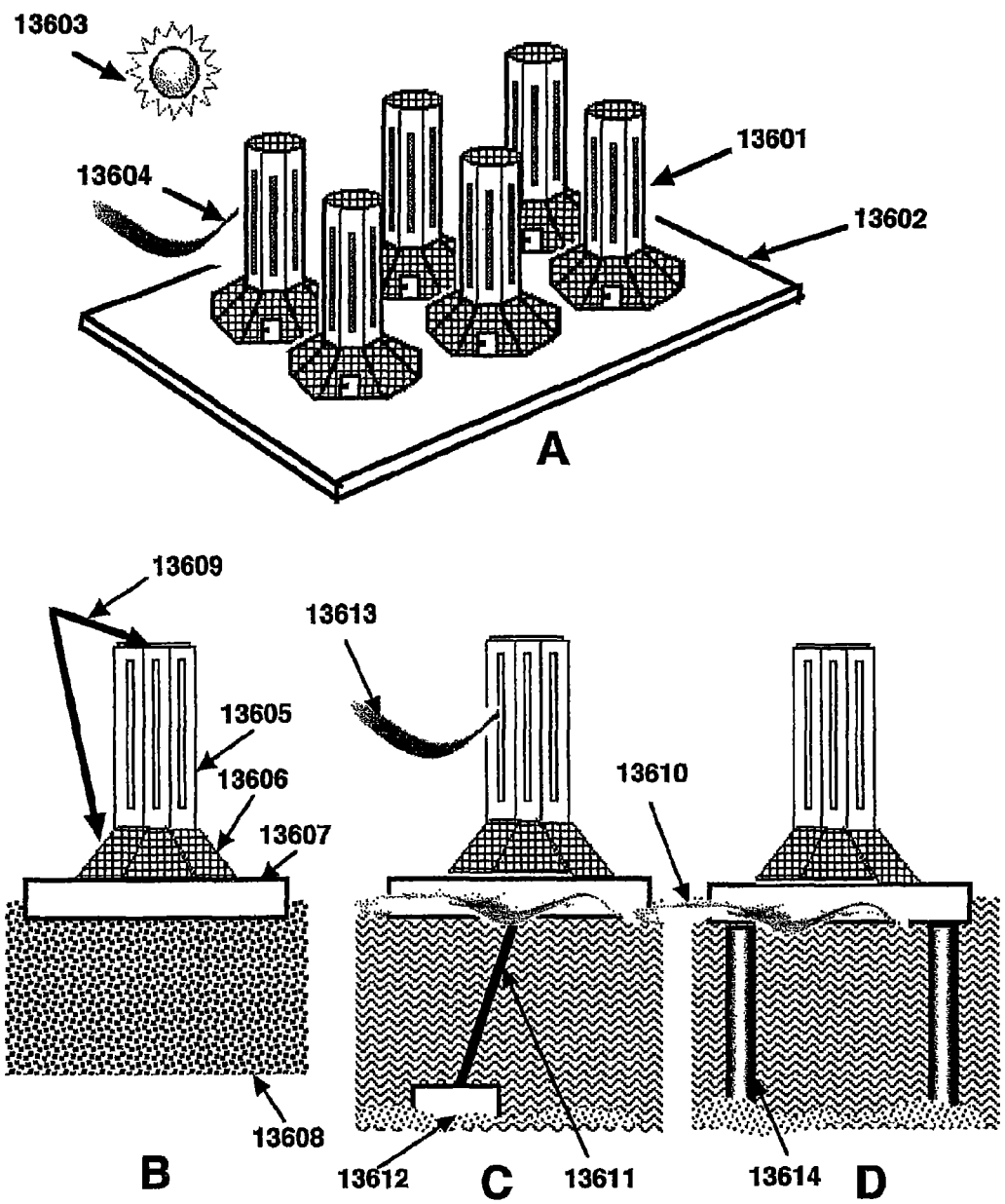
Figure 136 Various Sites for Solar/Wind Farms

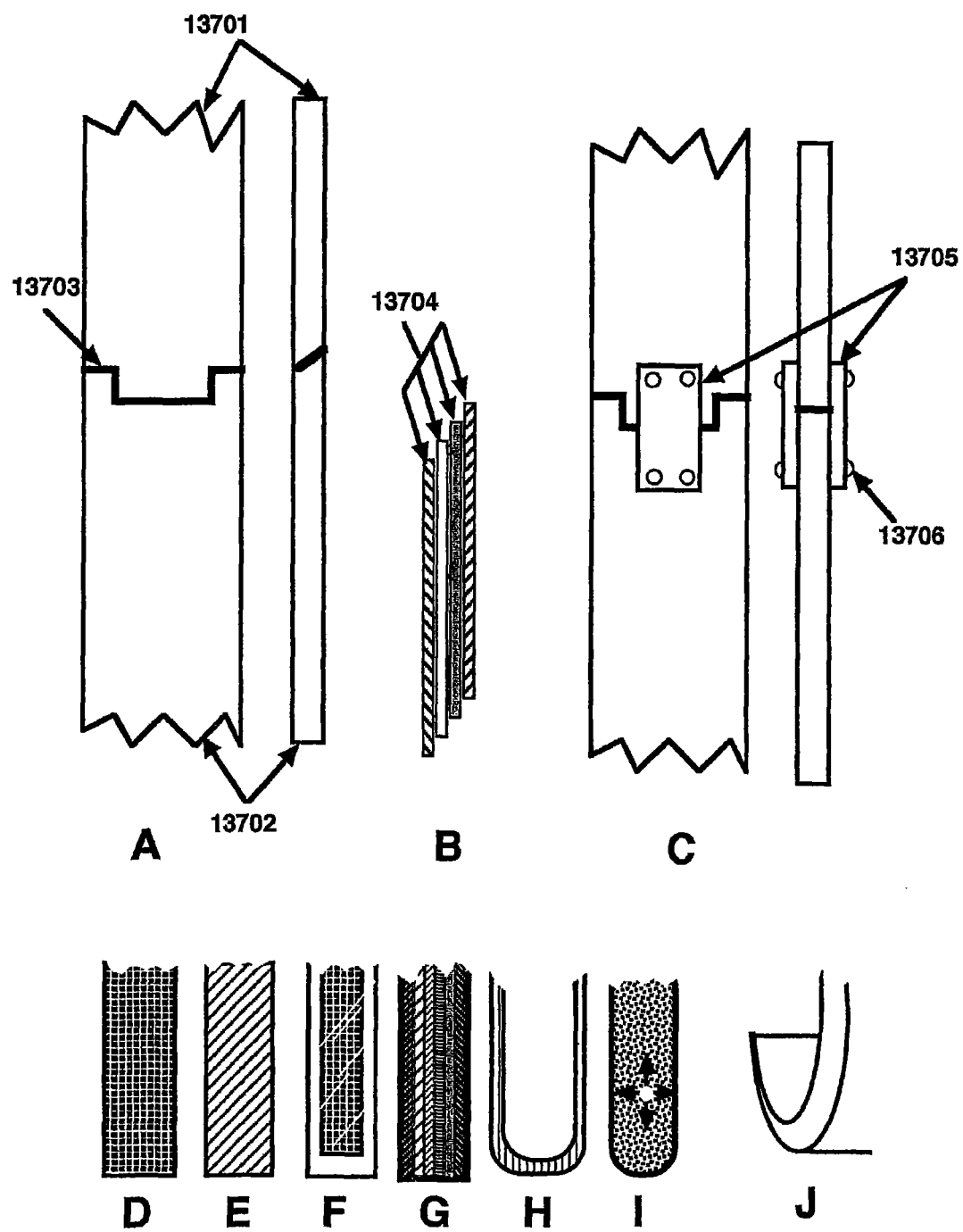
Figure 137 Turbine Blade Construction Options

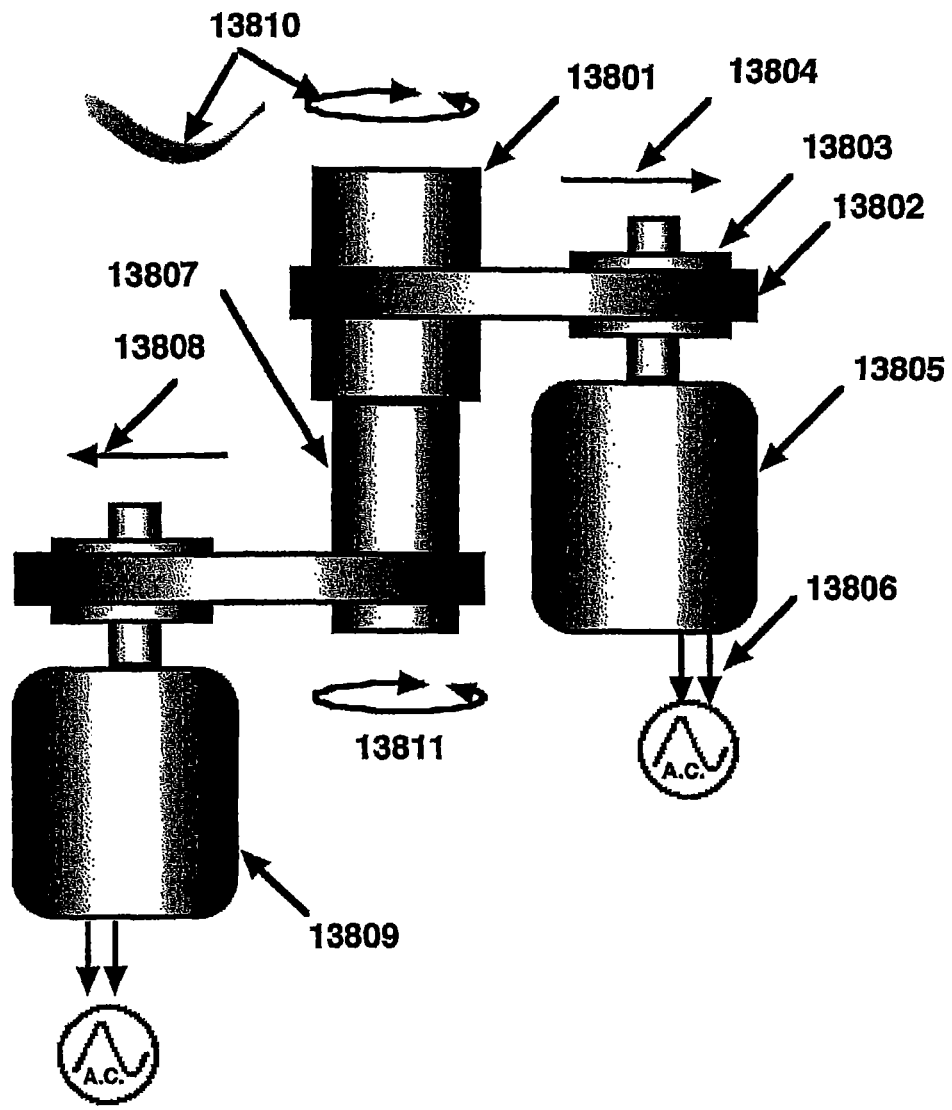
Figure 138 Mechanism for the Transfer of Wind Energy into Electricity

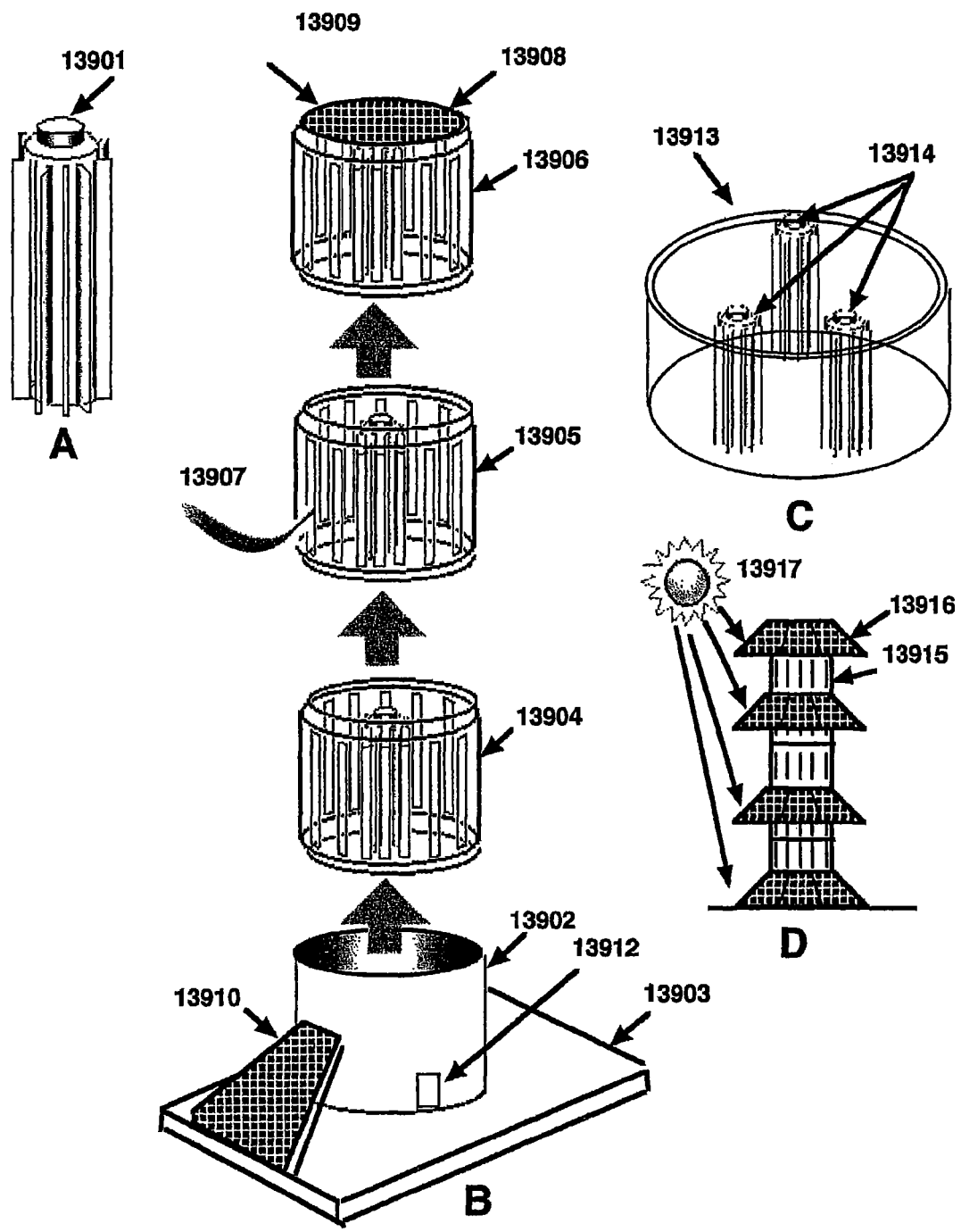
Figure 139 Modular Construction of Solar/Wind Towers

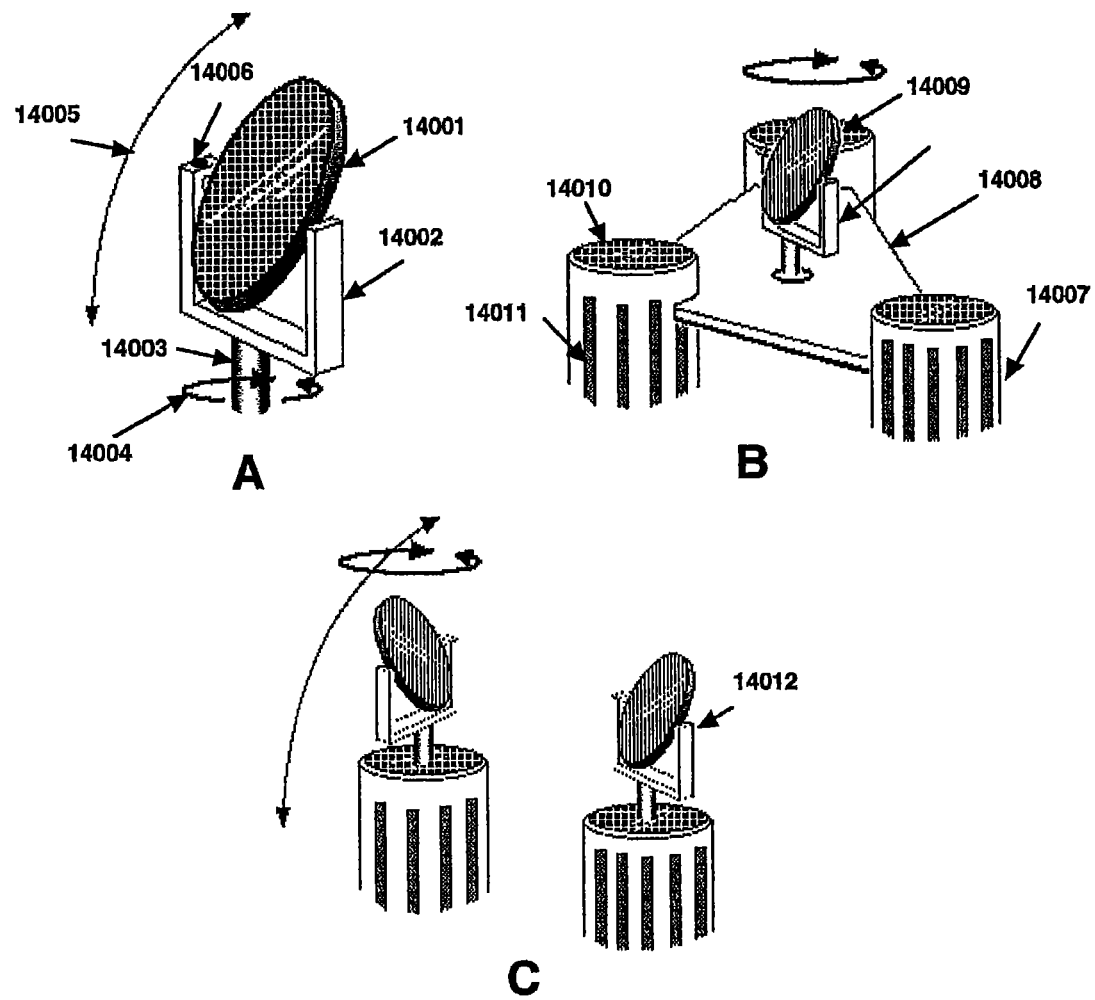
Figure 140 Sun Tracking Solar Panels

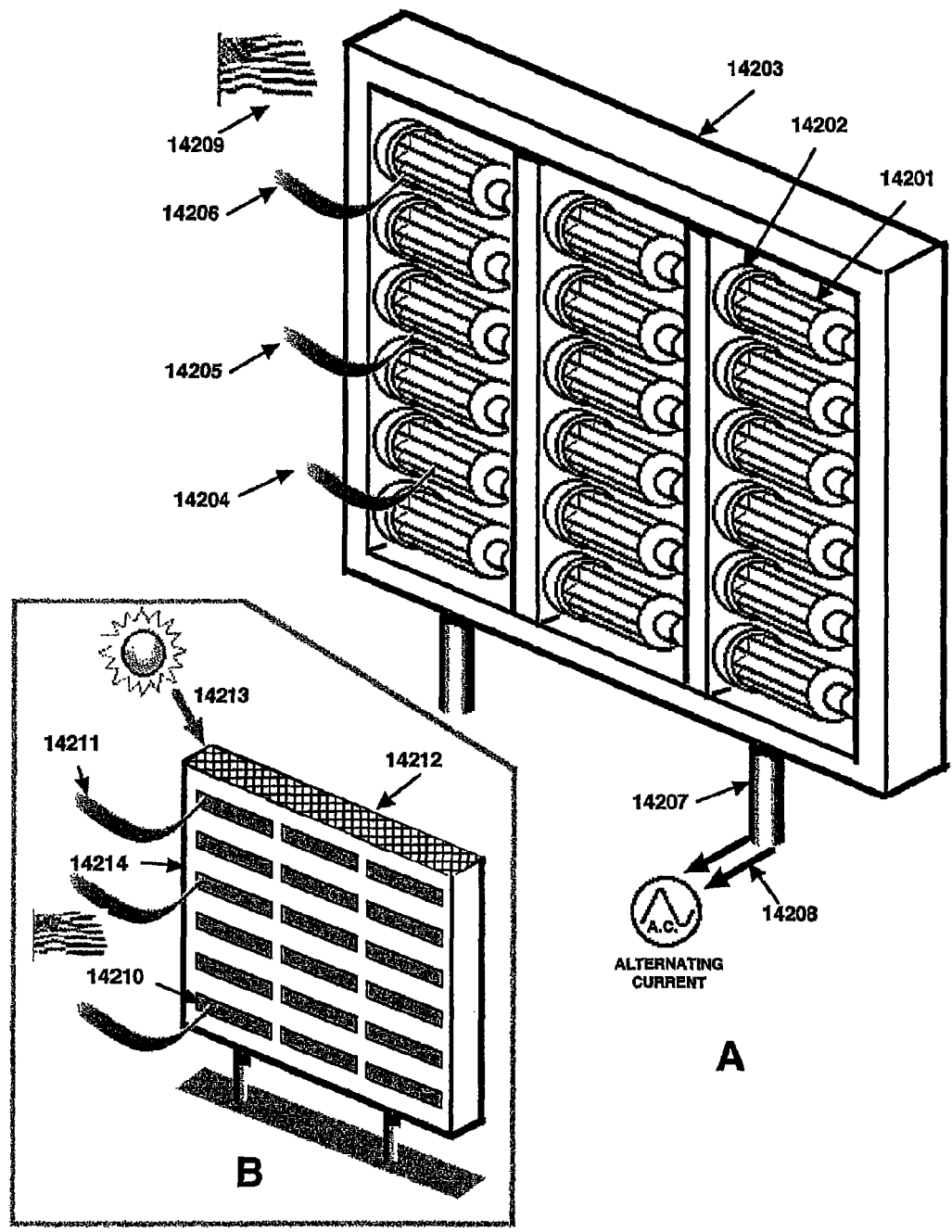
Figure 142 Multiple Wind Turbine Assembly for Wind Farm
(Outer Cover and Vents Not Shown)

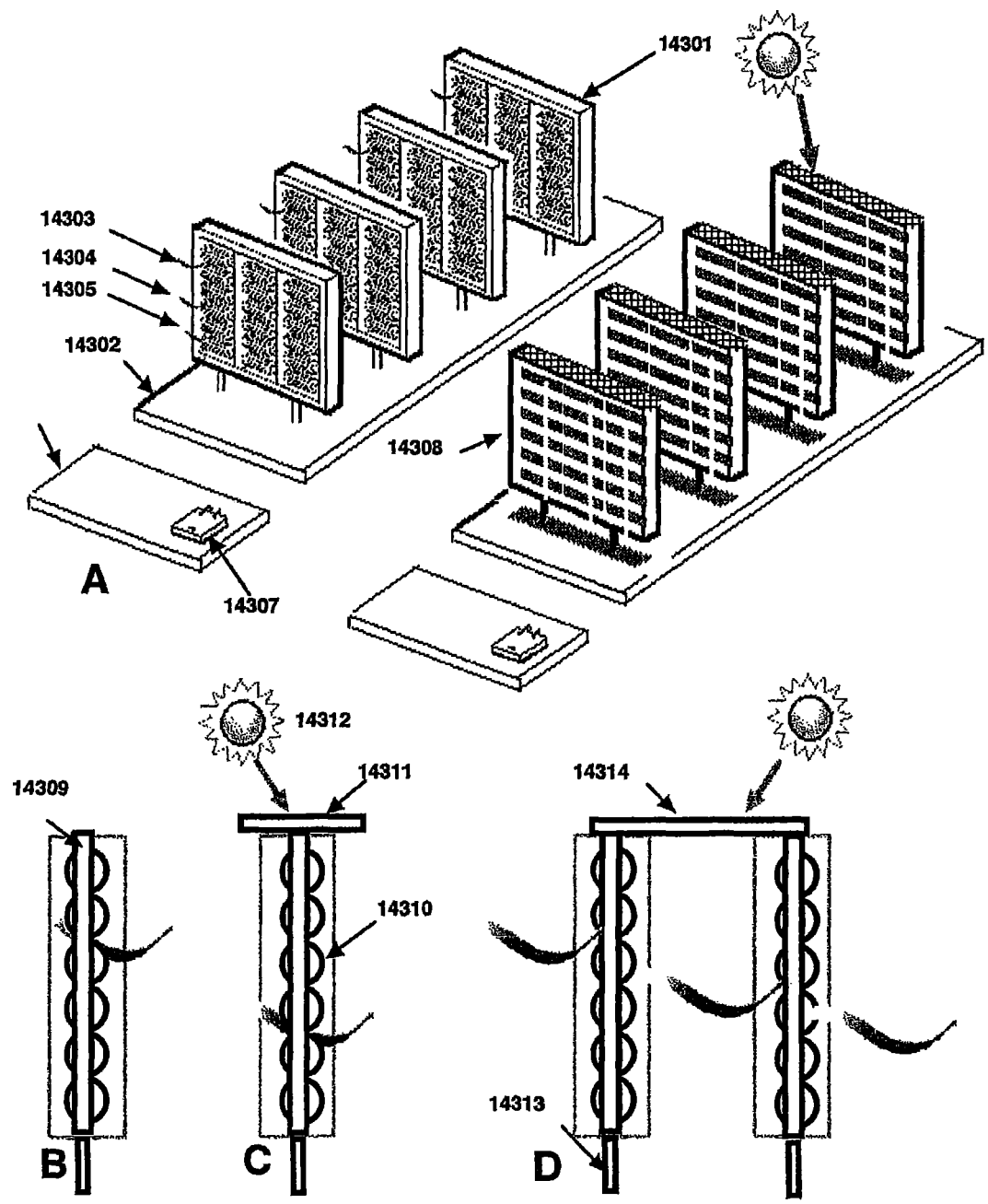
Figure 143 Wind Farm and/or SolarWind Farm

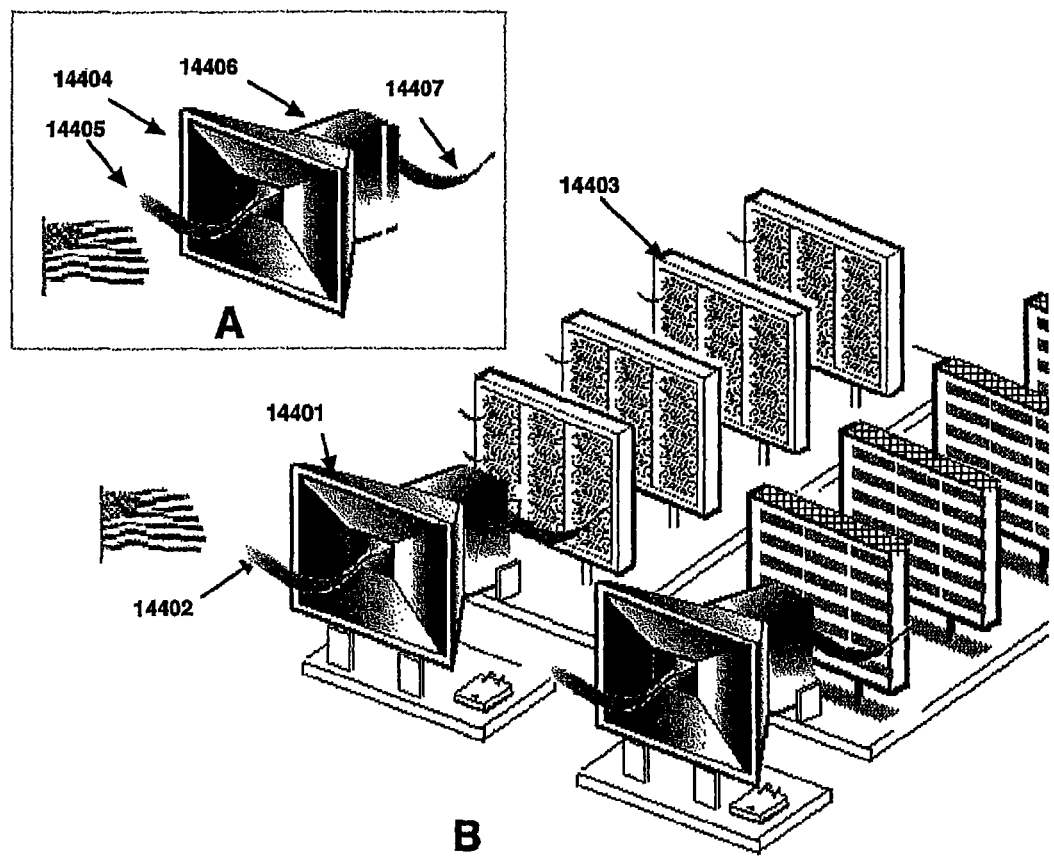
Figure 144 Wind Farm with Venturi Assembly

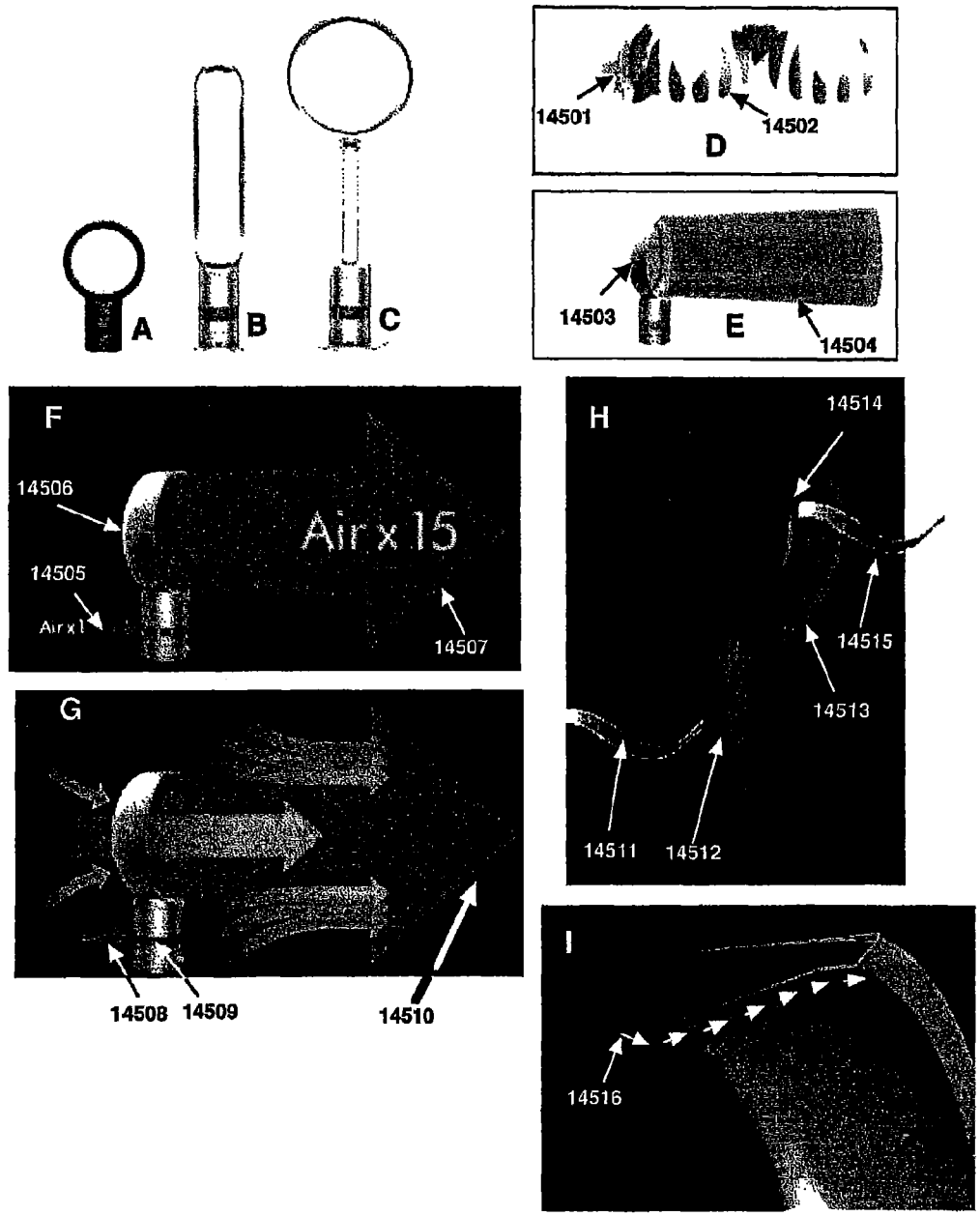
Figure 145 Dyson Air Multiplier System

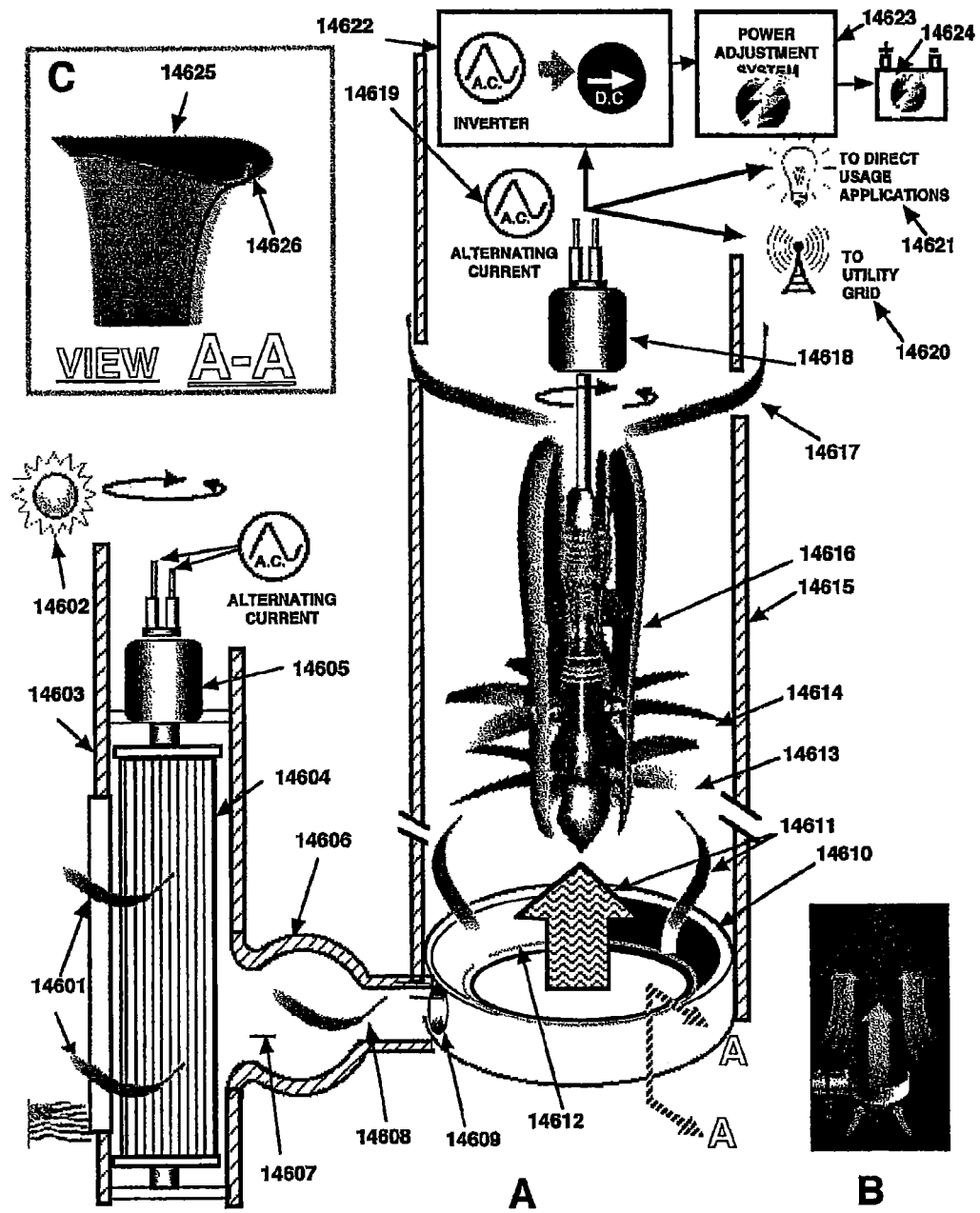
Figure 146 Embodiment(s) with the Air Multiplier System and Second Wind Turbine System

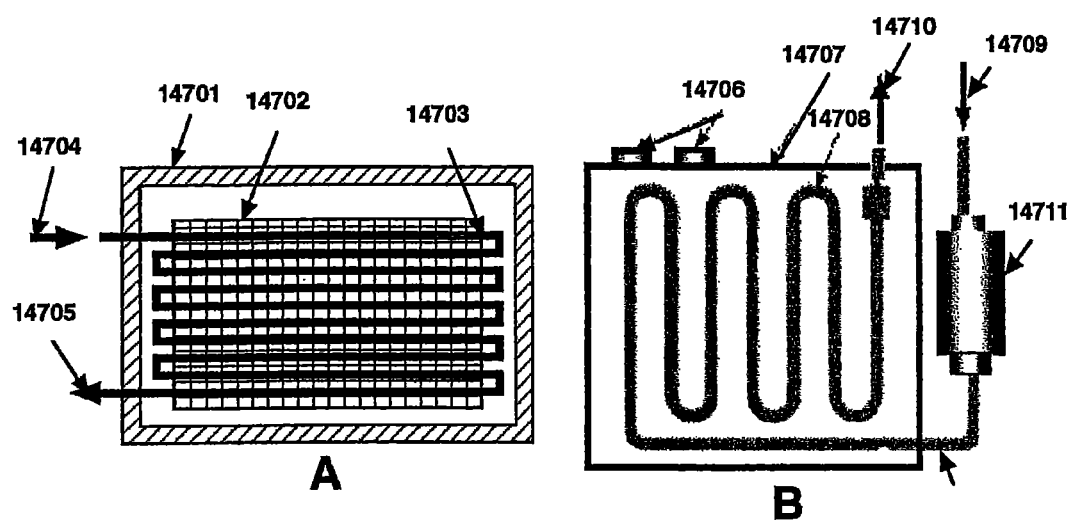
Figure 147 Energy Storage & Conversion Cooling System

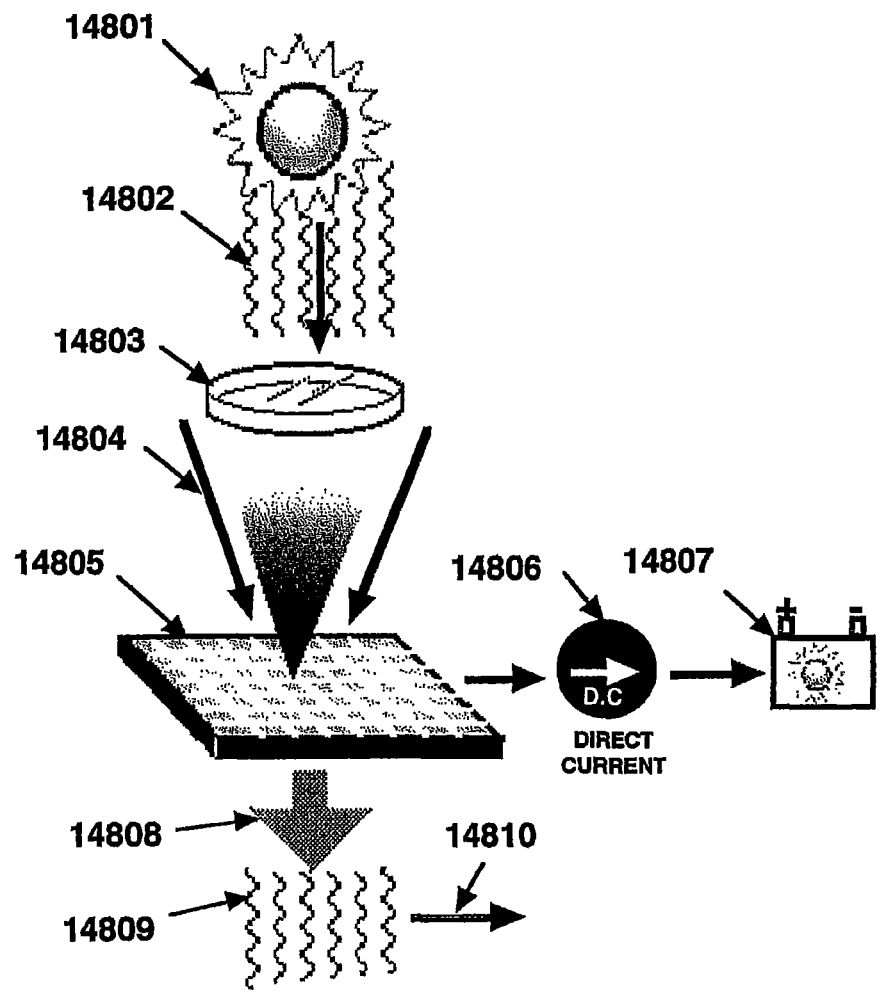
Figure 148  Light Intensification Process to Increase the Photovoltaic Effect

| | | LEGEND: SYMBOLS |
|---|---|---|
| SOLAR |  | SOLAR<br>Solar means energy created by the sun illuminating the earth and includes all forms of electromagnetic wave forms of radiation, i.e., visible light, infra-red, ultra-violet, radio waves, x-rays and gamma rays. |
| |  | PARTLY CLOUDY/PARTLY SUNNY |
| |  | HAZY, MOSTLY CLOUDY BUT BRIGHT |
| |  | CLOUDY, i.e., STORM CLOUDS, HEAVY CLOUDS, ETC.<br>FULL OF CLOUDS OR OVERCAST BY CLOUDS WITH LITTLE TO NO SUNSHINE |
| |  | NIGHT TIME /NO SOLAR ACTIVITY |
| | 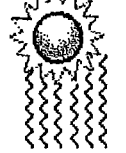 | SOLAR/THERMAL HEAT GENERATION OF ELECTRICITY |
| WIND |  | WIND STEADY |
| |  | LITTLE OR NO WIND |
| |  | GUSTY, ERRATIC BURSTS OF WIND |
| | 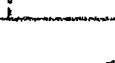 | ANY FORM OF WIND |

Figure 149A  Legend Symbols

ENERGY STORAGE

ENERGY CONVESRSION & STORAGE SYSTEM

A SYSTEM THAT CONVERTS, STORES, ENHANCES, MODIFIES, ALTERS, D.C. AND A.C. ELECTRICAL ENEERGY TO MEET THE NEEDS OF THE SYSTEM AS WELL AS THE END-USER.

BATTERY

REPRESENTS ANY FORM OF STORED ELECTRICAL ENERGY

COMMON STORAGE

REPRESENTS A COMMON STORAGE FORM OF STORED ENERGY THAT IS GENERATED FROM EITHER THE SOLAR SYSTEM, THE SOLAR THERMAL SYSTEM OR THE WIND SYSTEM

DESCRETE STORAGE

REPRESENTS A DESCRETE STORAGE FORM OF STORED ENERGY THAT IS GENERATED FROM A SPECIFIC SYSTEM, I.E., THE SOLAR SYSTEM, THE SOLAR THERMAL SYSTEM OR THE WIND SYSTEM

TYPES OF CURRENT

ALTERNATING CURRENT

Current that regularly reverses the direction of its flow in a repeating, cyclical pattern.

DIRECT CURRENT

Current that flows in one direction. Direct current does not reverse the direction of flow.

CONVERTER — ALTERNATING CURRENT ELECTRICITY IS CHANGED INTO DIRECT CURRENT

INVERTER — DIRECT CURRENT ELECTRICITY IS CHANGED INTO ALTERNATING CURRENT

Figure 149B Legend Symbols

| | |
|---|---|
| TO UTILITY GRID | THE UTILITY GRID IS MAINLY THE ELECTRIC GRID SYSTEM THAT DELIVERS ELECTRICAL POWER TO RESIDENTIAL, GOVERNMENT, MILITARY OR COMMERCIAL FACILITIES. |
| TO DIRECT USAGE | DIRECT USARE ARE APPLICATIONS THAT USE ELECTRICITY. EXAMPLES OF APPLICATIONS ARE: LIGHTING, TOOL OPERATION, BATTERY RECHARGE, HOSPITAL/EMERGENCY ROOM, SANITATION, CLASSROOM, POWER ELECTRONIC, COMPUTER SYSTEMS, FOOD PREPARATION, COMMUNICATIONS, SECURITY, ROBOTIC VEHICLES RECHARGING, VOTING BOOTHS FOR REMOTE LOCATIONS, ELECTRIC WEAPONS, ENTERTAINMENT, ETC. |
| (turbine symbol) | TURBINE BLADES & TURBINE GENERATOR SYSTEM

GENERATES CLEAN ENERGY FROM THE POWER OF THE WIND.

TURBINE DRIVE MOTOR

POWERS THE TURBINE WIND GENERATION SYSTEM DURING PERIODS OF NO WIND OR REDUCED WIND ENABLING THE CONTINUOUS GENERATION OF ELECTRICITY EVEN WHEN THERE IS LITTLE TO NO WIND.

IT IS POWERED BY STORED ENERGY PRODUCED EITHER BY THE SOLAR ELECTRICITY GENERATION SYSTEM OR FROM PREVIOUS EXCESS ELECTRICAL ENERGY GENERATED FROM THE WIND
IT MAY BE EITHER A D.C./DIRECT CURRENT MOTOR & SYSTEM OF AN A.C./ALTERNATING CURRENT MOTOR & SYSTEM. |
| ENERGY STORAGE & CONVERSION SYSTEM | THE ENERGY STORAGE & CONVERSION SYSTEM STORES ELECTRICAL ENERGY PRODUCED BY THE SOLAR, WIND OR SOLAR THERMAL SYSTEMS AND RELEASES IT UPON DEMAND. IT CONVERTS THE D.C. TO A.C. IF REQUIRED. |
| POWER ADJUSTMENT SYSTEM

POWER ADJUSTMENT SYSTEM | THE POWER ADJUSTMENT SYSTEM DETERMINES IF ELECTRICITY IS TO GO TO THE UTILITY GRID OR FOR DIRECT USAGE IN AN APPLICATION.

IT ALSO MONITORS THE ELECTRICITY'S VARIOUS PARAMENTERS, SUCH AS VOLTAGE, WATTAGE, AMPERAGE, LEVELS FOR BOTH A.C. AND D.C. AND FOR A.C.'S CORRECT PHASING IF THE ELECTRICITY IS DESTINED FOR AN UTILITY GRID, OR SOME OTHER DISTRIBUTION NETWORK.

IT ALSO DISTRIBUTES THE STORED ENERGY FOR VARIOUS COMPONENTS OF THE EMBODIMENT(S) AS WELL AS TO A PREDETERMINED CUSTOMER PRIORITY. |

Figure 149C Legend Symbols

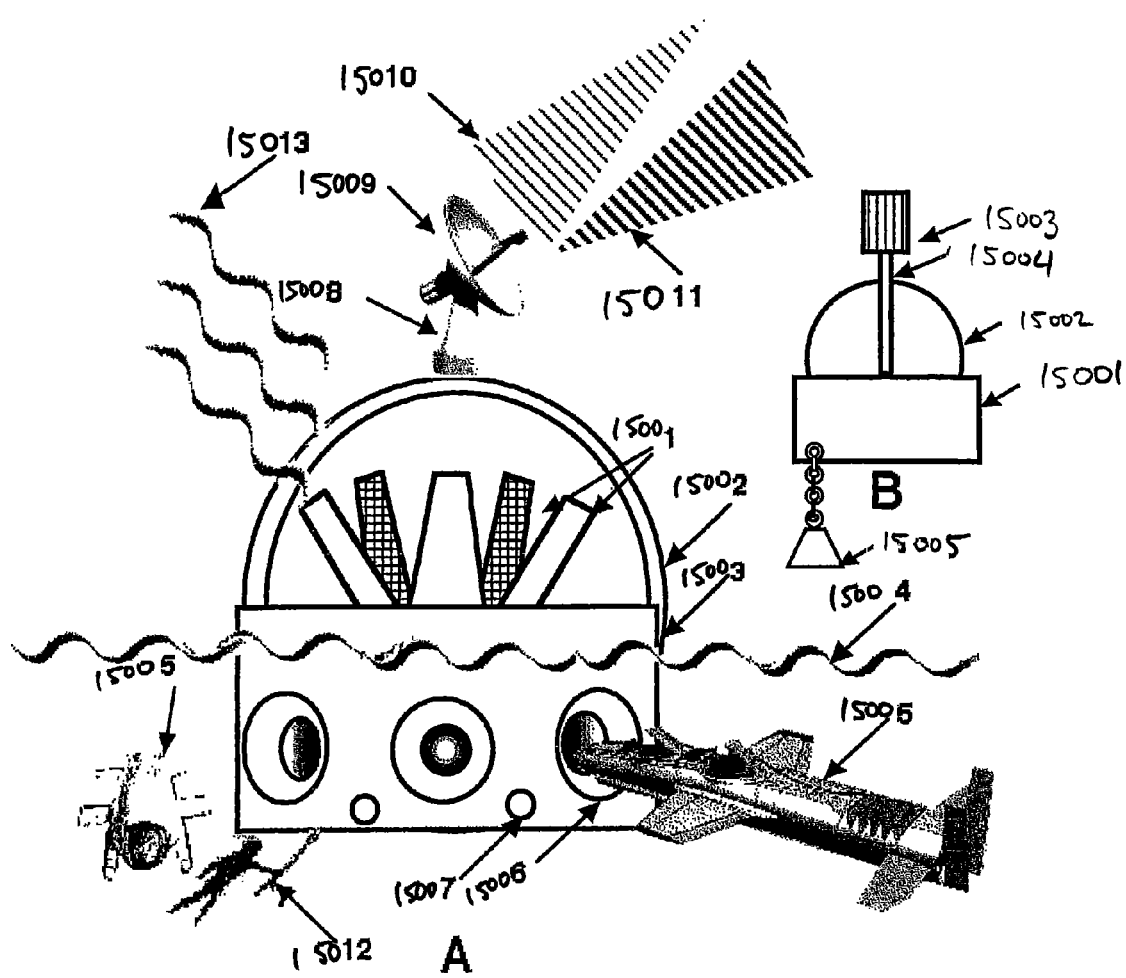
Figure 150  Aquatic Surface Solar/Wind Power Recharging System Module Submersible Solar Power Station for Underwater Habitats

ALL-TERRAIN MOBILE POWER GENERATION SYSTEMS

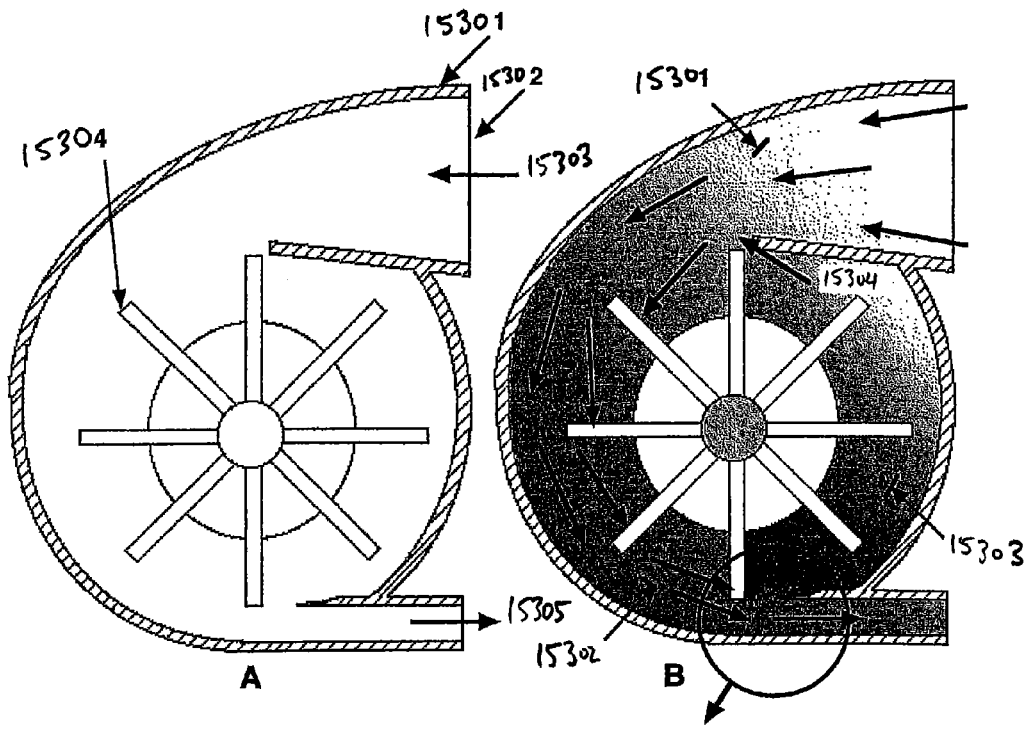
Figure 153
A
Basic Construction and Turbine Pressure Flow
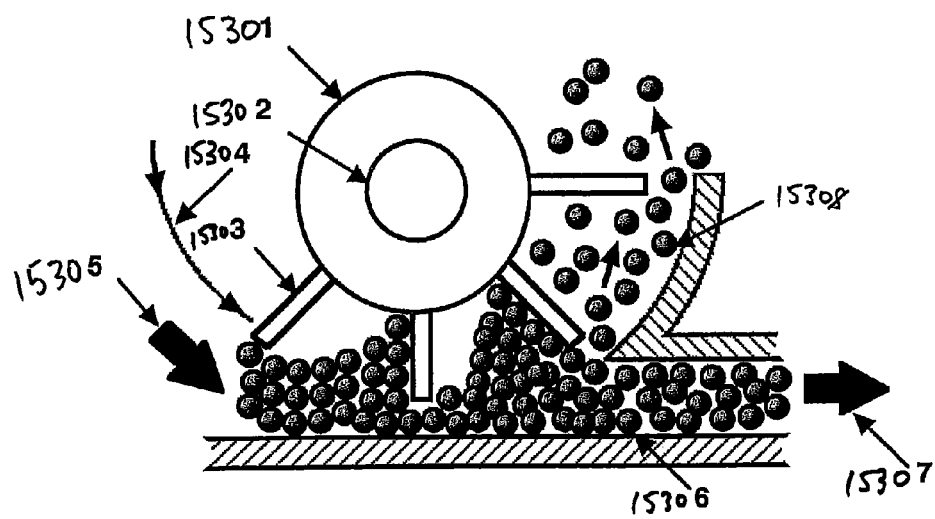
C
Enlarged View of Turbine Pressure Interchange

Double Centerline (two axis) Elongated, Curved and Decreasing Venturi Design to Increase the Pressure of the Incoming Air/Wind Upon the Turbine Blades Basic Turbine Assembly and Pressurized Air Intake Assembly

Alternative Embodiment: Closed Duct System

Typical Cliff (bluff or iceberg)

Typical Wind Patterns Against a Cliff

The Underground Embodiment of the Electricity Wind Generation System

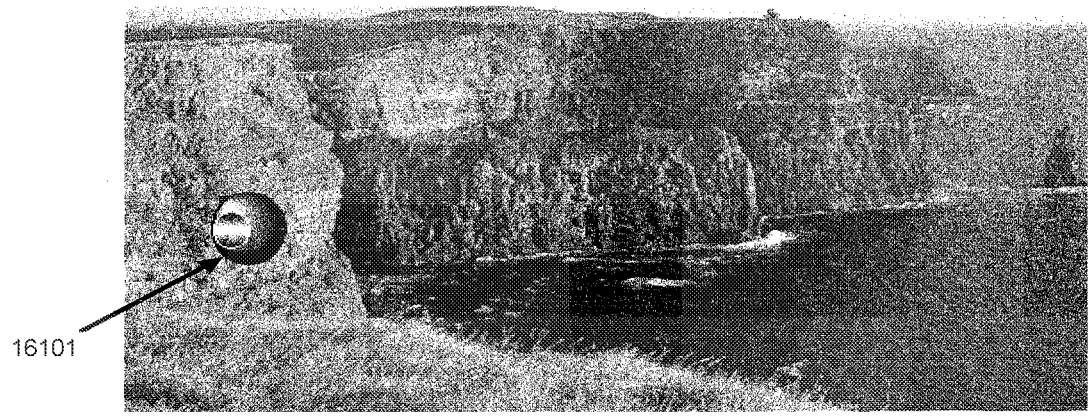
FIGURE 161
Artist's conception of the Described Embodiment Installed on a Cliff's Face.
(Note the uninterrupted cliff's surface. Wildlife protective intake grid on the system is not shown)
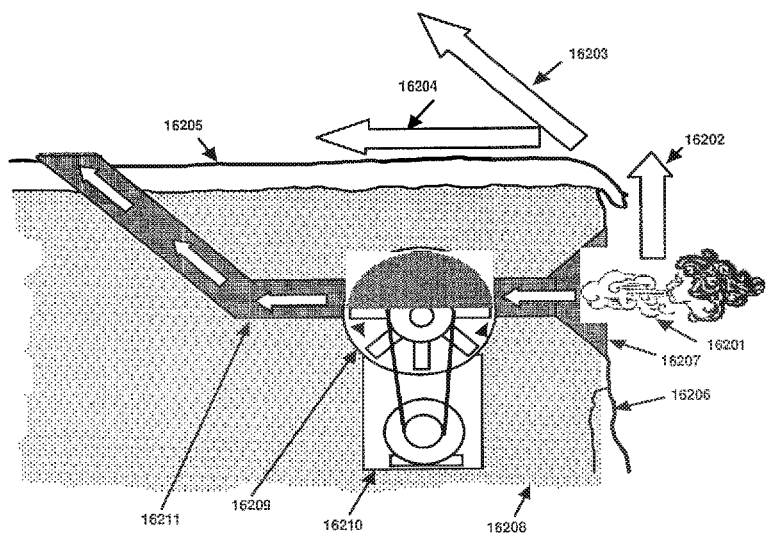
Figure 162 Cross Section of the Cliff's Wind Generation Electrical Systems Figure 163
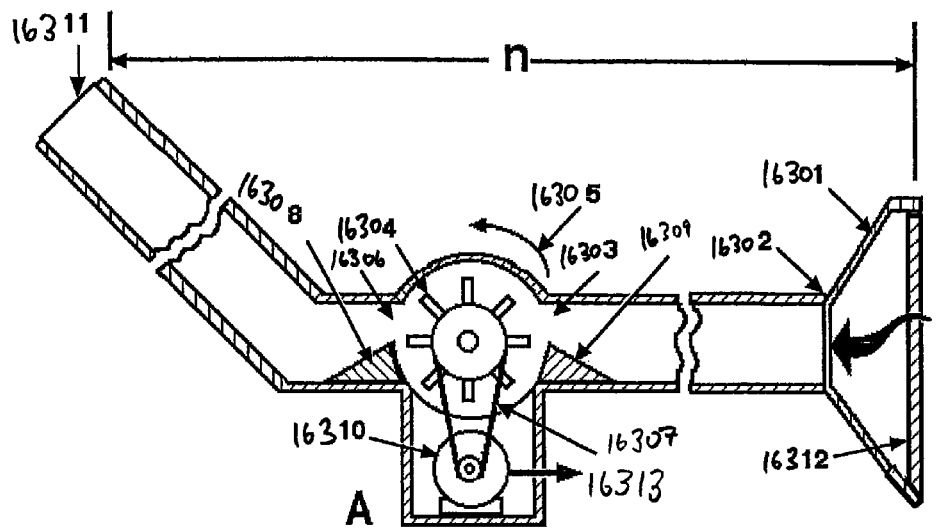
Detail Cross Section of the Wind Generation Electrical System
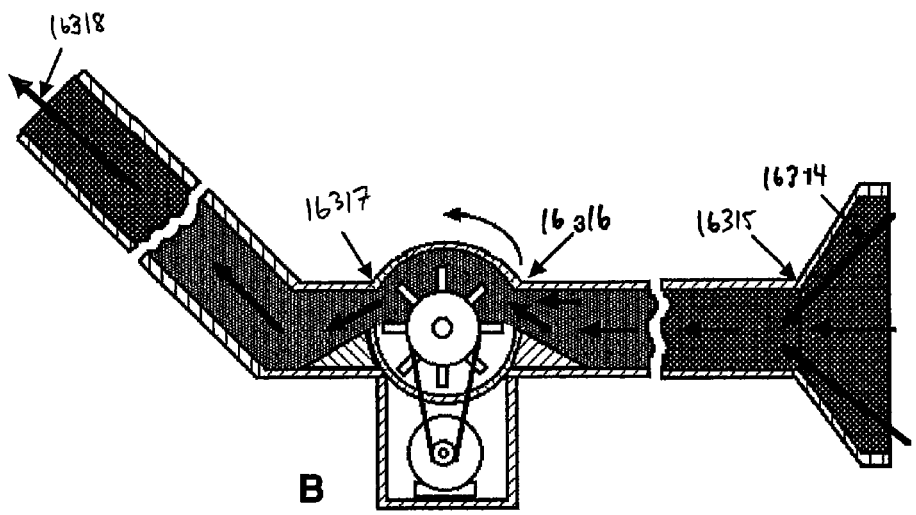
Detail Cross Section of the Wind Generation Electrical System's Wind Pattern

Application Dependent Intake Ducts

Top View of System using a Plurality of Wind/Electricity Generation Systems

SYSTEMS, METHODS, AND DEVICES INCLUDING MODULAR, FIXED AND TRANSPORTABLE STRUCTURES INCORPORATING SOLAR AND WIND GENERATION TECHNOLOGIES FOR PRODUCTION OF ELECTRICITY

CROSS-REFERENCE TO RELATED APPLICATION(S)

This application is related to and claims priority to U.S. provisional applications entitled A System, Method, Procedure and Applications for an Integrated System with Modular, Fixed and/or Transportable Structures Incorporating Solar and Wind Generation Technologies for the Production of Electricity having Ser. No. 61/237,961 by Sant'Anselmo et al., filed Aug. 28, 2009, and Portable Solar Electricity Generation Systems having Ser. No. 61/260,516 by Sant'Anselmo et al., filed Nov. 12, 2009, the contents of which are incorporated by reference herein.

BACKGROUND

1. Field

The embodiments discussed herein are directed to a system, method, and devices related to fixed and transportable structures utilizing solar and wind technologies for generation of electricity.

2. Description of the Related Art

The world's ever-expanding population needs more and more electrical energy in order to power our machines, produce and distribute our products, cook our food, heat our homes, access and store our information, organize our activities, heal our ailing, care for our aged, entertain and communicate with each other and to physically transport our people from one place to another. All of this requires energy . . . a constant demand for reliable energy 24 hours a day, every hour, minute and second of every day of the year and all over the planet! Modern society and livelihood cannot exist as we know it without electricity. FIG. 1 shows energy usage at night in the United States and Central America as seen from outer space. FIG. 2 shows European and Asian energy usage at night as seen from outer space.

According to the U.S. Dept. of Energy, America's 81 million buildings consume more energy than any other sector of the U.S. economy, including transportation and industry.

Currently this demand for energy is dependent in great part on extracting fossil fuels from deep under ground in the form of oil, gas and coal . . . all of which produce various levels of pollution to our air, water and environment having a negative effect upon the health of humans as well as crops, plants livestock and animals.

According to many scientists, this pollution is becoming a factor in the changing climate, global warming or cooling and in turn is having an effect upon our weather patterns and climate changes which, in turn is anticipated to have an effect upon our food supply of fish, livestock and edible plants. However, the need for increasing amounts of energy continues to grow as we add more and more people to the world's population, and add more electronic and electrical devices designed for our comfort, survival, communication, distribution and entertainment.

Yet the need for clean energy is paramount so that we humans do not alter future generations, and acquire unhealthful conditions as we continue to breath ever-increasing exhaust fumes, poison our oceans, plants, wildlife and hence our food sources.

Problems with the Basic Energy Sources: Oil, Gas, Coal

The basic problems regarding fossil based energy sources are: Underground reserves of fossil forms of energy is finite and dwindling, Not replaceable, Increasing in costs of exploration meaning more expensive end-product for the consumer, Not healthful to climates, humans, plants and animals, It may be a major cause of global climate change to the earth's atmosphere, Controlled by many third-world dictators, Too versatile to use for fuel and would be better used in the manufacturing of petrochemical-based products.

Problems with Alternate Sources of Energy

Many companies, using a number of technologies, are exploring various ways of producing additional electrical energy and eventually fossil fuel replacement such as solar power that is limited to the production of electricity only when the sun is available and the current designs require large areas of land for the solar panels.

Wind Generation: Requires specific areas of wind turbulence and large, expensive propeller-driven machines to generate power. Requires frequent and costly maintenance, large areas of land or expensive ocean type support structures.

Wind power, on the other hand, has been used since ancient times to move ships and most notably in Holland where the famous wind mills use the force of the wind to power the process of grinding grain. More recently, wind power has been used to generate electricity using large propeller-driven turbines and the technology is plagued with problems ranging from bug residue to bird collisions. FIG. 3 shows wind power turbines in a "wind farm."

A Global Problem . . . a Global Market

Emerging countries are faced with an overwhelming global concern for raising fuel costs and the dwindling world supply of oil needed to generate clean sources of cheap electricity. Many countries are seeking many different alternative forms of energy generation. This is a problem for both emerging nations as well as those nations with well-established energy generation infrastructures.

Up to this point, fossil fuels such as gasoline, oil, coal and natural gas have powered most of the growth of the world's economies, equipment and living conditions.

Other forms of energy sources such as tides present corrosion and maintenance problems, geothermal requires specific areas for implementation, and biofuels compete with human food requirements.

A Solution

The two major natural energy sources that are in abundance and ecologically friendly are solar power and wind power where man-made systems capture and convert their energy to usable electricity.

Solar energy radiating towards earth provides enough daily energy generated from the sun's rays shining upon a photovoltaic solar panel to produce electricity. It is clean, limitless, quiet, dependable and while the sun generates enough energy to meet the world's energy needs many times over, the challenge is to capture that power for our use at a reasonable cost.

Solar activity is limited to the daytime hours while wind generated electricity is also a competitive source of energy and it too is clean, but must be located is areas of steady wind. The example embodiments combine the advantages of each source of power into either fixed station systems or transportable systems, for example, for quick deployment in military, disaster relief, rural power generation applications.

When it is quickly set up, the example embodiments will generate electricity 24 hours per day, seven days per week (24/7).

The portable or fixed station systems can be applied to a number of different application-dependent locations such as: along highways, railroads, bridges, in, on or adjacent to buildings, etc. and if they generate excess electricity, it can be used directly or resold to others including the utility power grid.

FIG. 4 illustrates one configuration of the embodiment where the two forms of natural energy, Solar and Wind are the primary sources for generating electricity via three core technologies:

Solar Energy, limited operation to the daylight hours

Solar Heat (Thermal) also limited operation to the daylight hours and

Wind Pressure(s) which is able to operate 24 hours per day as long as there is sufficient wind to move the turbine blades and the wind turbine generation system.

In the example embodiments, we are primarily interested in the generation of electricity. However, it is recognized that certain applications can also include different configurations or embodiments for the use of solar energy with the addition of appropriate technology for solar heat generation. These solar configurations may also be combined with an integrated wind power electrical turbine generation system for additional and continuous electricity generation.

The scope of example embodiments integrate various forms of natural occurring energy, i.e., solar photovoltaic 2 and wind 1 and to integrate them into either a fixed structure(s), as shown in FIG. 4A operating along a highway or railway train tracks, for example, or in the transportable embodiment(s) 3 (as shown in FIG. 4B) where they can, for example, be quickly moved by C-130 cargo planes or helicopters into a battlefield support area(s), added to ships, etc. to supply additional energy to support the military's need for electrical power in their operations, information systems, etc. where they operate in a variety of terrain, i.e., desert, jungle, on or under the water of lakes, oceans, etc. It can also be used in a number of embodiments and application for commercial and civilian use as described herein.

Solar Power

The sunlight that reaches Earth's surface delivers 10,000 times more energy than we consume, and solar power technologies aim to harness this potential energy source from space. Solar electric power systems transform the energy in sunlight into electricity. Sunlight is an abundant resource. Every minute the sun bathes the Earth in as much energy as the world consumes in an entire year.

Solar cells employ special materials called semiconductors that create electricity when exposed to light. Solar electric systems are quiet and easy to use, and they require no fuel other than sunlight. Because they contain no moving parts, they are durable, reliable, and easy to maintain.

Solar Statistics

FIG. 5 shows ranges of solar temperature on the Earth.

130,000 TW (Terrawatts) of energy falls on Earth from Sun. That's 1.1 kW/[perpendicular square meter] on the Earth's surface, when sky is clear. (AM1.5 spectrum)

15 TW was the mean total world energy consumption during 2005.

10 kW/person is the mean power (total—electricity, transportation, heating) used in the developed world.

The creation of electrical power utilizing the earth's sun as the original source of energy to generate electricity, has been in its embryonic stages for a number of decades. Recently, the electrical generation technologies are ready for commercialization on a large scale.

Today's solar energy technology converts the sun's light to electricity and absorbs its heat for heating and cooling systems. Large solar plants absorb the sun's heat to power steam turbines that produce electricity.

Present Status of Solar Energy

In 2007, the U.S. solar energy industry saw a promising future. The U.S. is the current world leader in the manufacture of both next-generation thin film technologies and the poly silicon feed stock used in most photovoltaic (PV) applications. U.S. PV manufacturing grew by 74 percent in 2007 and U.S. PV installations grew by 45 percent—both among the fastest growth rates in the world. Globally, the U.S. is the fourth largest market for PV installations behind world leaders Germany, Japan and Spain.

Perhaps surprisingly the United Kingdom (UK) receives 65% of the amount of solar radiation that is received by the south of Spain. The radiation in the UK is made up of direct radiation on sunny days, which accounts for around 40%, and diffused radiation on cloudy days, accounting for 60% of the annual total.

Spring—40 to 50% of domestic hot water requirements

Summer—80 to 90% of domestic hot water requirements

Autumn—40 to 50% of domestic hot water requirements

Winter—20 to 30% of domestic hot water requirements

Solar Power

The sunlight that reaches Earth's surface delivers 10,000 times more energy than we consume, and solar power technologies aim to harness this force. Solar technologies use any light source, however sunlight is "free" and provides heat, electricity, and even cooling for homes, businesses, and industry by conducting electrons across a photovoltaic array like the tiny solar cell in your calculator.

Researchers have optimistically proposed that if they could cover just 0.1 percent of the Earth's surface with highly efficient solar cells they could in theory replace all other forms of energy. At universities around the world, efforts are under way to develop the kinds of advanced solar arrays using nanotechnology and other cutting-edge science that could perhaps accomplish this goal in the future.

Applications of Solar Energy

A combination of solar electric arrays and pool-heating solar collectors were used to provide power and heat to the Georgia Tech University Aquatic Center, site of the 1996 Olympic swimming competition.

Solar electricity has powered satellites since the dawn of the space program. It has run remote communications outposts high in the mountains and turned on the lights, kept medicines cold, and pumped water in rural areas for more than 30 years. Small solar cells are used to power wristwatches, calculators, and other electronic gadgets. More recently, solar electric systems have been used to provide supplemental power to homes and commercial buildings in cities.

Solar electric technology has important roles to play in both the developing and developed worlds. From the farmer irrigating his crops in rural Mexico to an innovative lighting system for an Olympic sports arena, solar electric solutions abound.

Consumers and builders are integrating solar electric modules into their homes and buildings. Innovative solar electric technologies can replace conventional roofing and facade materials in new buildings. Solar electric roofing shingles, for example, are being used in some new residences. In grid-connected applications, solar electricity supplies some of a consumer's energy needs; the local utility provides the rest.

Standalone solar electric systems power a variety of applications far from the reaches of the power grid. These applications include remote communications systems such as television and radio transmitters and receivers, telephone systems, and microwave repeaters. Standalone solar electric power is also used to prevent corrosion of metal pipes, tanks, bridges, and buildings.

Many remote residences worldwide use solar electricity as their source of power. For instance, more than 100,000 vacation homes in Scandinavia rely solely on solar electric technology to run lights and appliances.

Villages around the world are building solar electric systems to bring electricity to their homes and local industries, often for the first time. To make the maximum use of available resources, village power is typically produced by a hybrid power system that combines solar electricity with diesel backup generators and sometimes another renewable energy technology such wind power. Villages also use standalone solar electric systems for pumping water—an application shared by rural farmers and ranchers in the United States.

Description of Forms of Energy Generation

Solar Heat (Thermal)

Electricity is also produced using the energy in the form of heat received from the sun to heat a liquid, mostly water, which is converted into steam which turns a steam generator which then turns a electrical generator producing electricity and in a different embodiment the system is capable of producing usable heat for warming purposes.

Solar Energy

Solar energy produces electricity through the conversion of sunlight into electricity by photoelectric process. There are a number of different forms capable of generating electricity such as, but not limited to photoelectric: cells, modules consisting of a plurality of cells, array of a plurality of modules, thin-film using adhesives or as laminates, special photovoltaic paint and/or fabric(s). FIG. 6 shows solar power collection.

Wind Pressure(s).

Wind pressure(s) turns turbine blades that either directly drives the electrical generator or indirectly drives the electrical generator using a gearbox, for example, to increase or decrease operational speed and the generation of electricity.

In the example embodiments, the wind turbine can continue to generate electricity even when there is no wind as the stored energy in the batteries received from the solar panels can be used to drive the wind turbine generators until the system senses the wind has returned then the stored energy in the batteries is turned to an "OFF" position.

Emerging Solar Technologies: Overview

Solar Photovoltaic: Definition

Photovoltaic ("PV") is the field of technology and research related to the application of solar cells in producing electricity for practical use. The energy generated this way is an example of solar energy (also called solar power).

A solar cell or photovoltaic cell is a device that converts sunlight directly into electricity by the photovoltaic effect. Sometimes the term "solar cell" is reserved for devices intended specifically to capture energy from sunlight, while the term photovoltaic cell is used when the source, i.e., the sun or other forms of light energy, is unspecified.

Therefore, the terms "Solar Panel" and "Photovoltaic Panel" describe two different devices. These terms, however, are often used interchangeably. In this application the terms refer to "the conversion of light's energy into electricity" whereas "Solar Heat" or "Thermal" would refer to using a light source's radiant heat, such as the sun, and heating water for heat or for the steam generation of electricity.

The Solar Industry

Research and development by companies and research labs are continually discovering new techniques and materials that improve efficiencies and cut the cost of capturing solar energy. The industry seeks to commercialize the most promising technology in order to improve delivery of solar power generation for homes, business and government.

Examples of various photovoltaic technologies capable of generating electricity from the sun include making and applying different combinations of materials for thin-film PV applications, solar cooling/heating systems, incorporating PV technologies into building materials for roofing, glass or plastic for windows and even PV paints applied to surfaces.

Other technological areas being aggressively pursued are storage systems (thermal and electrical); solar hybrid lighting; improved PV manufacturing techniques; PV down in the nanotechnology scale; low-cost semiconductor alternatives to polysilicon; and improving solar energy capture and concentration for higher efficiency power systems.

The increasing efficiency of solar energy technologies means we are able to purchase and install photovoltaic panels, knowing we are likely to receive an efficient way of harnessing energy from the suns rays to turn into usable electricity.

The Two Forms of Solar Generation for Electricity.

FIG. 7A Illustrates the sun 701 that radiates 702 upon the photovoltaic cells, modules and array(s) 703 and 704 converting the sun's energy into usable electricity 705.

FIG. 7B Illustrates the sun 706 that radiates 707 upon the solar energy collector's 708 reflected heat 712 and 713 that heats up the incoming liquid (water) 709 as it travels up the intake pipe 710 across 711 the solar collector 708 and down the return 714 as steam 715 and 716 that turns a steam engine 717 which then turns an electrical generator 718 which then produces electricity 719.

Solar Electric (Photovoltaic)

Solar cells, also known as Photovoltaic (PV) cells, do the work of making electricity. photovoltaic devices generate electricity directly from sunlight via an electronic process that occurs naturally in certain types of material. Electrons in certain types of crystals are freed by solar energy and can be induced to travel through an electrical circuit, powering any type of electronic device or storage for later use.

PV devices can be used to power anything from small electronics, such as calculators and road signs up to homes and large commercial businesses. It is an object of the example embodiments to expand the concept of local power generation to supply greater electrical needs than what a single house would use.

Solar Electric Power Systems

Several types of solar electric technology are under development, but four—crystalline silicon (a form of refined beach sand), thin films, concentrators, and thermophotovoltaics—are illustrative of the range of technologies that are capable of generating electricity. Solar cells are connected to a variety of other components to make a solar electric power system functional.

The approach described here (which uses electromagnetic induction to generate an alternating current) is just one way of producing electricity. There are also photoelectric, electrochemical, electromechanical, and thermoelectric phenomena (just to name a few) which can be used to produce an electric charge or direct-current electricity. Batteries are based on chemical reactions. Photovoltaic cells use light waves of specific wavelengths to excite electrons to cross from one layer of a semiconductor to another. A thermocouple can generate a current if the temperature at each junction is different. Fuel cells use hydrogen.

Crystalline Silicon

Crystalline silicon solar cells are used in more than half of all solar electric devices. Like most semiconductor devices, they include a positive layer (on the bottom) and a negative layer (on the top) that create an electrical field inside the cell. When a photon of light strikes a semiconductor, it releases electrons. The free electrons flow through the solar cell's bottom layer to a connecting wire as direct current (DC) electricity.

Some solar cells are made from polycrystalline silicon, which consists of several small silicon crystals. Polycrystalline silicon solar cells are cheaper to produce but somewhat less efficient than single-crystal silicon.

A simple silicon solar cell can power a watch or calculator. However, it produces only a tiny amount of electricity. Connected together, solar cells form modules that can generate substantial amounts of power. Modules are the building blocks of solar electric systems, which can produce enough power for a house, a rural medical clinic, or an entire village. Large arrays of solar electric modules can power satellites or provide electricity for utilities.

Solar Electric Power System Components

In addition to modules, several components are needed to complete a solar electric power system.

Many such systems include batteries, battery chargers, a backup generator, and a controller so that people in solar-powered homes and buildings can turn on the lights at night or run televisions or appliances on cloudy days. Grid-connected systems don't require batteries or backup generators because they use the grid for backup power. Some remote system applications, such as those used to pump water, do not require a backup power source.

Solar electric power systems can incorporate inverters or power control units to transform the DC electricity produced by the solar cells into alternating current (AC) to run AC appliances or for re-sale to a utility grid. Complete systems usually include safety disconnects, fuses, and a grounding circuit as well.

Thin Films

Solar electric thin films are lighter, more resilient, and easier to manufacture than crystalline silicon modules. The best-developed thin-film technology uses amorphous silicon, in which the atoms are not arranged in any particular order as they would be in a crystal. An amorphous silicon film only one micron thick can absorb 90% of the usable solar energy falling on it. Other thin-film materials include cadmium telluride and copper indium diselenide. Substantial cost savings are possible with this technology because thin films require relatively little semiconductor materials.

Thin films are produced as large, complete modules, not as individual cells that must be mounted in frames and wired together. They are manufactured by applying extremely thin layers of semiconductor material to a low-cost backing such as glass or plastic. Electrical contacts, antireflective coatings, and protective layers are also applied directly to the backing material. Thin films conform to the shape of the backing, a feature that allows them to be used in such innovative products as flexible solar electric roofing shingles.

Solar Concentrators

Solar concentrators use optical lenses (similar to plastic magnifying glasses), mirrors or reflective surfaces to concentrate the sunlight that falls onto a solar cell. With a concentrator to magnify the light's intensity, the solar cell produces more electricity. Today, most solar cells in concentrators are made from crystalline silicon. However, materials such as gallium arsenide and gallium indium phosphide are more efficient than silicon in solar electric concentrators and will most likely see more use in the near future. These materials are now used in communications satellites and other space applications.

Concentrators produce more electricity using less of the expensive semiconductor material than other solar electric systems. A basic concentrator unit consists of a lens to focus the light, a solar cell assembly, a housing element, a secondary concentrator to reflect off-center light rays onto the cell, a mechanism to dissipate excess heat, and various contacts and adhesives. The basic unit can be combined into modules of varying sizes and shapes. Concentrators only work with direct sunlight and operate most effectively in sunny, dry climates. They must be used with tracking systems to keep them pointed toward the sun.

Thermophotovoltaics

Thermophotovoltaic (TPV) devices convert heat into electricity in much the same way that other PV devices convert light into electricity. The difference is that TPV technology uses semiconductors "tuned" to the longer-wavelength, invisible infrared radiation emitted by warm objects. This technology is cleaner, quieter, and simpler than conventional power generation using steam turbines and generators.

TPV converters are relatively maintenance-free because they contain no moving parts. In addition to using solar energy, they can convert heat from any high-temperature heat source, including combustion of a fuel such as natural gas or propane, into electricity. TPV converters produce virtually no carbon monoxide and few emissions. They may be used in the future in gas furnaces that generate their own electricity for self-ignition (during power outages) and in portable generators and battery chargers.

Advantages

Solar electric systems offer many advantages. Standalone systems can eliminate the need to build expensive new power lines to remote locations. For rural and remote applications, solar electricity can cost less than any other means of producing electricity. Solar electric systems can also connect to existing power lines to boost electricity output during times of high demand such as on hot, sunny days when air conditioners are on.

Solar electric systems are flexible. Solar electric modules can stand on the ground or be mounted on rooftops. They can also be built into glass skylights and walls. They can be made to look like roof shingles and can even come equipped with devices to turn their DC output into the same AC utilities deliver to wall sockets. These advances mean individual homeowners and businesses can relieve pressure on local utilities struggling to meet the increasing demand for electricity.

More than 30 American states offer grid-connected solar electric systems for feeding any excess power generated by solar electric system produces into the utility grid an arrangement called net metering.

Solar power systems also require minimal maintenance. They run quietly and efficiently without polluting. The example embodiments may be combined with other types of electric generators such as wind, hydro, or natural gas turbines. They can charge batteries to make solar electricity continuously available.

For utilities, large-scale solar electric power plants can help meet demand for new power generation, especially in distributed applications. A solar electric power plant is created from multiple arrays that are interconnected electronically. Solar electric plants are easier to site and are quicker to build than conventional power plants. They are also easy to expand incrementally—by adding more modules—as power demand increases.

Solar electric power systems are good for the environment. When solar electric technologies displace fossil fuels for pumping water, lighting homes, or running appliances, they reduce the greenhouse gases and pollutants emitted into the atmosphere. The use of solar electric systems is particularly important in developing nations because it can help avert the expected increases in emissions of greenhouse gases caused by the growing demand for electricity in those countries.

Solar electric technologies also benefit the U.S. economy by creating jobs in U.S. companies. Exporting solar electric technologies to developing nations expands U.S. markets while protecting the global environment.

Solar Photovoltaic Systems

These operate on the principle of the photoelectric phenomenon—direct conversion of light to electricity. The solar radiation incident upon a silicon-based semiconductor photovoltaic cell produces direct electric current.

Photovoltaic cells are integrated into so-called modules with a voltage of 6-12 V, the electrically interconnected modules form solar array systems with an output voltage of 230 V and more.

Based on the installed capacity a distinction is made between: (1) Household solar systems with a capacity of several W or kW supplying DC to households via a battery, used for lighting and small appliances; (2) Major roof solar systems with a capacity of several kW supplying electricity surpluses (AC) in addition to supply to households to the public network; (3) Solar power plants with a capacity of several MW supplying the whole production to the public network.

Solar Concentration Thermal Power Plants

These operate on the principle of concentrating the sun's rays using mirrors into a small area (focal point) where the produced high heat is used to generate steam and electricity.

Three basic types are used to concentrate solar radiation: (1) Linear parabolic mirrors—concentrate solar radiation into a tube placed in the reflector focal point. Oil flows through the tube getting hot up to 400° C. and the heat is used to generate steam for the turbine connected to the electric generator; (2) Plate parabolic mirrors—concentrate solar radiation into an absorber positioned in the plate focal point. A liquid (oil) gets hot here up to 650° C. and the heat is used to generate steam for a small steam turbine featuring an electric generator; (3) Thermal solar towers—mirrors are arranged into a circle around the tower, being always turned toward the Sun and concentrating sun's rays into a collector (boiler) placed on the tower. Temperatures here come to over 1000° C. The heat is fed through thermo-oil to the steam generator where steam is generated to drive the turbine connected to the electric generator.

Photovoltaic History

The Photovoltaic effect was observed as early as 1890 by Henri Becquerel, and was the subject of scientific inquiry through the early twentieth century. In 1954, Bell Labs, in the United States, introduced the first solar PV device that produced a useable amount of electricity, and by 1958, solar cells were being used in a variety of small-scale scientific and commercial applications.

The energy crisis of the 1970s saw the beginning of major interest in using solar cells to produce electricity in homes and businesses, but prohibitive prices (nearly 30 times higher than the then current price) made large-scale applications impractical.

Industry developments and research in the following years made PV devices more feasible and a cycle of increasing production and decreasing costs began which continues even today.

What are Solar Panels?

Solar based systems collect energy from the sun converting it in two basic methods. They can indirectly generate electricity by capturing the sun's heat that in turn drives a steam engine and an electrical generator or as photovoltaic cells they convert the sun's energy directly into electricity.

There are two main forms of solar cells in existence today, and these are; "solar electricity systems" and "solar thermal systems". The two different technologies allow application-dependent systems to either generate electricity or to heat the circulating water we use for example in heating the water in a swimming pool.

Solar panels that are designed to heat water work almost the same way as the sun heats the air. In a simple example, there is a pipe that runs through the inside of the box. The sun rays heat the air inside the box. The heat in the air is transferred to the pipes then the heat in the pipes is transferred to the water. As cool water is pumped into the inlet pipe the warm water is forced out of the outlet pipe. We can now use this warm water for something like a bath or shower.

These descriptions are only a simple representation of the basic concepts. In practice, solar water and air heaters can be more complex.

Solar Panels for Electricity Generation.

Using solar panels shown in FIG. 8 is a great way to generate clean and renewable electricity to power remote appliances, the average home or business and/or to supplement electricity to an existing electrical utility power grid.

As time goes by, we anticipate that emerging technologies will provide new and more efficient solar panel designs, systems and manufacturing methods. This is making the use of photovoltaic power over fossil fuels, much more viable to electric power companies, commercial applications, homeowners, light manufacturing and office environments.

Solar power collected by an electric company and/or its energy providers who have excess energy, will sell it into the electric company's power grid as a supplement source of energy and the electric company will resell it to their customers. This approach can save the electric companies the need to expand into other costly technologies for the generation of energy.

It is unlikely we will see heavy industry directly using photovoltaic electricity for quite some time due to the much larger energy demand industry requires.

As the technologies surrounding the use of photovoltaic improve, we are likely to see a much greater, widespread use of applications incorporating solar panels and related technologies.

Solar (or photovoltaic) cells, are a very useful way of providing electricity to remote areas (as mentioned earlier), where the use of electricity may be important, yet the laying of high voltage cable may not be viable. The best example of the importance of solar energy to provide electricity in remote locations can be found on satellites. For many years, satellites have been using solar panels to catch the suns rays, in order to provide power to the equipment on board.

Photovoltaic cells can be aligned as an array, as shown in FIG. 8. There are many advantages of using a solar cell array, with various panels fitted along a mounting system. One of the main advantages is that we are able to combine various numbers of cells to provide a greater output of electricity, and this method makes solar electricity a viable option to generate electrical power.

To optimize output from the panels, they should be installed in a south facing sloping roof at an angle between 30° to 45°. If a true south face is not available, a maximum deviation of 15° east or west from a true south orientation is recommended.

The panels can be fitted to a flat area, i.e., a roof with the use of a prefabricated frame capable of providing the panels with the correct angle. In all cases it is preferable to have the angle between 30° and 45°.

FIG. 9 illustrates the basic solar/photovoltaic process.

Solar Panel Construction

Assemblies of PV cells are used to make solar modules and a number of solar/PV modules make up solar photovoltaic arrays.

FIG. 10 illustrates a typical solar photovoltaic panel's array 1001 and construction 1002 where the photovoltaic cells 1004 are protected with a transparent protective material 1003 and a heat absorbing protective backing 1005.

Thin Film Photovoltaic Cells

Third generation technologies shown in FIG. 11 aim to enhance poor electrical performance of second generation (thin-film technologies) while maintaining very low production costs.

Current research is targeting conversion efficiencies of 30-60% while retaining low cost materials and manufacturing techniques. They can exceed the theoretical solar conversion efficiency limit for a single energy threshold material that was calculated in 1961 by Shockley and Queisser as 31% under 1 sun illumination and 40.8% under maximal concentration of sunlight (46,200 suns, which makes the latter limit more difficult to approach than the former).

There are a few approaches to achieving these high efficiencies: (1) Multi junction photovoltaic cell (multiple energy threshold devices); (2) Modifying incident spectrum (concentration); (3) Use of excess thermal generation (caused by UV light) to enhance voltages or carrier collection; (4) Use of infrared spectrum to produce electricity at night.

Thin film technologies include various approaches to converting sunlight into electricity, such as the use of: silicon nano structures; Up/Down converters; Hot-carrier cells; Thermoelectric cells, etc.

High efficiency solar cells are a class of solar cells that can generate electricity at higher efficiencies than conventional solar cells. While high efficiency solar cells are more efficient in terms of electrical output per incident energy (watt/watt), much of the industry is focused on the most cost efficient technologies (cost-per-watt or $/watt). Still, many businesses and academics are focused on increasing the electrical efficiency of cells, and much development is focused on high efficiency solar cells.

Solar Collector Panels for Heat Generation

The use of solar panels to heat water is becoming increasingly popular around the world due to the energy and money saved associated with this method.

A good solar hot water panel system is able to provide an average household with around a third of its annual hot water supply. While this may not sound much, it can reduce energy costs by a considerable amount.

Solar Generation: Heat and Electricity

Solar heating harnesses the power of the sun to provide solar thermal energy for solar hot water, solar space heating, and solar steam generation. A solar heating system saves energy, reduces utility costs, and produces clean energy. FIG. 12 illustrates a basic flow diagram of a solar heat system capable of generating electricity through the use of a steam turbine generator.

The efficiency and reliability of solar heating systems have increased dramatically, making them attractive options in the home or business. But there is still room for improvement. The U.S. Department of Energy (DOE) and its partners are working to design even more cost-effective solar heating systems and to improve the durability of materials used in those systems. This research is helping make these systems more accessible to the average consumer and helping individuals reduce their utility bills and the nation reduce its consumption of fossil fuels.

Wind Power Electricity Generation

Overview

The generation of electrical power utilizing the earth's sun as the original source of energy to generate electricity has been in its embryonic stages for a number of decades. Wind power on the other hand has been used since ancient times to move ships and most notably, the famous wind mills of Holland, where wind was used to power the process of grinding grain.

The wind turbine generator in FIG. 13 converts mechanical energy to electrical energy.

Wind turbine generators are a bit unusual, compared to other generating units ordinarily found attached to the electrical grid. One reason is that the generator has to work with a power source (the wind turbine rotor) which supplies very fluctuating mechanical power (torque).

Wind turbines may be designed with either synchronous or asynchronous generators, and with various forms of direct or indirect grid connection of the generator. Direct grid connection means that the generator is connected directly to the (usually 3-phase) alternating current grid.

Indirect grid connection means that the current from the turbine passes through a series of electric devices which adjust the current to match that of the grid. With an asynchronous generator this occurs automatically.

Generating Electricity at a Wind Power Plant

Wind power plants convert the air flow energy into electricity. The wind power drives the properly adjusted blades of the turbine rotor and makes them turn. The turning force of the rotor is transmitted via a gear or directly to the electric generator, where direct or alternating current is produced. The installed capacity of the largest wind turbines achieves 5,000 kW.

Wind power plants are divided by the magnitude of installed capacity into: (1) Micro sources—with capacities up to 30 kW—generate direct current for charging batteries; (2) Medium-sized power plants—with capacities up to 100 kW—supply alternating current to the network; and (3) Large power plants—with capacities over 100 kW—supply alternating current to the network.

According to the rotor axis position, there are two basic types of wind turbines: (1) With horizontal axis—all major installations; (2) With vertical axis—certain types of minor installations.

Turbines having a horizontal axis may also feature a rotor having one or two blades, but the majority has three blades.

A special group consists of wind power plants installed in coastal waters 10 to 20 miles off the coast. A larger number of wind turbines in a single location make up the so-called wind park or wind farm.

Starting (and Stopping) a Turbine

Most electronic wind turbine controllers are programmed to let the turbine run idle without grid connection at low wind speeds. (If it were grid connected at low wind speeds, it would in fact run as a motor, as you can read about on the generator page). Once the wind becomes powerful enough to turn the rotor and generator at their rated speed, it is important that the turbine generator becomes connected to the electrical grid at the right moment.

Otherwise there will be only the mechanical resistance in the gearbox and generator to prevent the rotor from accelerating, and eventually over speeding. (There are several safety devices, including fail-safe brakes, in case the correct start procedure fails.)

Soft Starting with Thyristors

If you switched a large wind turbine on to the grid with a normal switch, the neighbors would see a brownout (because of the current required to magnetize the generator) followed by a power peak due to the generator current surging into the grid. You may see the situation in the drawing in the accompanying browser window, where you see the flickering of the lamp when you operate the switch to start the wind turbine. The same effect can possibly be seen when you switch on your computer, and the transformer in its power supply all of a sudden becomes magnetized.

Another unpleasant side effect of using a "hard" switch would be to put a lot of extra wear on the gearbox, since the cut-in of the generator would work as if you all of a sudden slammed on the mechanical brake of the turbine.

Preventing "Islanding"

Islanding is a situation which may occur if a section of the electrical grid becomes disconnected from the main electrical grid, e.g. because of accidental or intended tripping of a large circuit breaker in the grid (e.g. due to lightning strikes or short circuits in the grid). If wind turbines keep on running in the isolated part of the grid, then it is very likely that the two separate grids will not be in phase after a short while.

Once the connection to the main grid is reestablished it may cause huge current surges in the grid and the wind turbine generator. It would also cause a large release of energy in the mechanical drive train (i.e. the shafts, the gear box and the rotor of the wind turbine) much like "hard switching" the turbine generator onto the grid would do.

The electronic controller of the wind turbine will therefore constantly have to monitor the voltage and frequency of the alternating current in the grid. In case the voltage or frequency of the local grid drift outside certain limits within a fraction of a second, the turbine will automatically disconnect from the grid, and stop itself immediately afterwards. This is normally done by activating the aerodynamic brakes.

Starting (and Stopping) a Turbine

Most electronic wind turbine controllers are programmed to let the turbine run idle without grid connection at low wind speeds. (If it were grid connected at low wind speeds, it would in fact run as a motor.) Once the wind becomes powerful enough to turn the rotor and generator at their rated speed, it is important that the turbine generator becomes connected to the electrical grid at the right moment.

Otherwise there will be only the mechanical resistance in the gearbox and generator to prevent the rotor from accelerating, and eventually "overspeeding". (There are several safety devices, including fail-safe brakes, in case the correct start procedure fails).

Types of Turbine

There are various configurations and designs for wind generation turbine. Vertical spires, wind mill, spherical and horizontal designs all serve to produce the same result, to push a generator so that it will create electricity.

Wind Generation Problems

More recently, wind power has been used to generate electricity using large propeller-driven turbines as shown in FIG. 13. There are many problems with these propeller-driven turbines such as noise, high initial cost, the turbines must be placed in specific windy areas, aesthetics, size and the turbines require costly maintenance and a thick concrete base to support the heavy weight of the high tower and its torque when operating that these devices generate. The turbine's near-invisible propellers are a hazard to flying birds.

Another problem occurs on wind farms when insects fly into the propellers actually adding a gummy thickness to the props and reducing the air flow. This gummy mess requires a washing system to spray a cleaner onto the blades on a regular periodic basis in order to remove the insect buildup.

SUMMARY

What is needed is an integration of both solar power generation and bi-directional wind power generation technologies into one operating system to compensate for the variables in sunlight and wind power in order to reliably generate usable cost-effective electric power.

It is an aspect of the example embodiments to provide a system and method to integrate both solar and wind power to provide electricity. It is also another aspect of the example embodiments to provide a system and method of only using solar power or only using wind power to provide electricity. For example, it is aspect of the example embodiments to apply portable solar/photovoltaic panels to objects in order to generate electricity. It is aspect of the example embodiments to utilize a wind turbine to generate electricity.

It is another aspect of the example embodiments to allow the system be a fixed station or easily transportable.

It is another aspect of the example embodiments to allow the transportable system to be folded and transported via a cargo airplane, a ship, a train, a truck, a trailer, a helicopter, etc. It is another aspect of the example embodiments to allow the transportable system to manually and automatically unfold and ready itself for electricity generation. It is another aspect of the example embodiments to allow flexible solar panels to adjust based on movement of radiated light.

It is another aspect of the example embodiments to locate the system in areas which are unused such as unused land alongside freeways, highways, railways, on telephone poles, on light poles, underwater, on water, aircraft carriers, on containers on large ships, on tops of large buildings and skyscrapers, roadside barriers, roadway signage, transmission towers, bridges, chimneys, on tops of water tanks, etc. It is another aspect of the example embodiments to manufacture solar film into window shading and awnings and connect the window shadings and awnings to the system.

It is another aspect of the example embodiments to allow the system to provide electricity for remotely located residents, trailers, recreational vehicles, etc.

It is another aspect of the example embodiments to allow fixed stations and transportable stations double for other uses including, but not limited to an office, military operations, a construction site, a communications site, an archeological site, a portable voting site, a disaster relief site, an oil drilling site, a hospital, sleeping quarters, shelter in extreme climates, etc.

It is another aspect of the example embodiments to allow the system to provide electricity for vehicles such as military vehicles, both manned and unmanned, airborne, underwater, and on land.

It is another aspect of the example embodiments to store and sell electricity commercially, sell or trade electricity to a utility power grid, store electricity for later use, use the electricity for local illumination or advertisement, or to power local devices.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which:

FIG. 1 depicts North American and Central American energy usage at night as seen from outer space.

FIG. 2 shows European and Asian energy usage at night as seen from outer space.

FIG. 3 depicts wind power turbines in a "wind farm."

FIG. 4 shows energy generation embodiments including a permanent and a portable embodiment.

FIG. 5 shows ranges of solar temperature on the Earth.

FIG. 6 shows collection of solar power.

FIG. 7 shows two major forms of converting solar energy.

FIG. 8 shows photovoltaic cells in a solar panel array.

FIG. 9 shows how solar energy is captured.

FIG. 10 depicts a typical solar photovoltaic panel and construction.

FIG. 11 shows thin film photovoltaic cells.

FIG. 12 shows how a solar collector panel generates heat.

FIG. 13 depicts wind turbine electricity generators.

FIGS. 14A-D depict different configurations of embodiments of the application.

FIG. 14E provides a table showing how the embodiments of the application are configured.

FIG. 14F provides a flowchart indicating system configuration.

FIGS. 15A-C show detail of solar collector configuration.

FIG. 16 depicts a multiple energy generation system according to an embodiment of the application.

FIG. 16A depicts an inside view of a multiple energy generation system with the solar panels removed.

FIG. 16B depicts a street view of the multiple energy generation system according to an embodiment of the application.

FIG. 16C depicts a multiple energy generation system having a fixed station wind intake extension system.

FIGS. 17A-B depict configurations of solar collectors.

FIG. 18 shows a configuration of a center divider freeway embodiment.

FIG. 18A shows center divider freeway embodiment illumination.

FIGS. 19A-C depict power storage and/or transmission options.

FIG. 20 shows wind directional louver panels.

FIGS. 21A and 21B show under solar panel vents from multiple perspectives.

FIG. 22 depicts associated digital signage embodiments.

FIG. 23 depicts wind turbulence patterns created by buildings.

FIG. 24 shows a computer simulation of a wind's force and turbulence patterns.

FIG. 25 depicts a specially designed building which allows the force of the wind to flow around and over the structure.

FIG. 26 shows four various shapes of building which take into account the pressure of the wind's force.

FIG. 27 shows a building rooftop multiple energy generation system embodiment.

FIG. 27A depicts a set back building corner.

FIGS. 28A and 28B show a system to allow wind pressure to pass through a building and generate electricity in the process from two different perspective views.

FIG. 29A shows the "above grid" commonly used for heating, ventilation, air conditioning ducting, communications, etc.

FIG. 29B shows the "above grid" with an embodiment of the application.

FIG. 29C shows a flow diagram of wind through the building.

FIG. 29D shows a wind turbine generation system for between-the-ceiling.

FIG. 30A-30D depicts modular configuration for solar panel placement.

FIG. 31 also shows a modular configuration for solar panels.

FIGS. 32A and 32B depict flexible and deformable solar panels.

FIGS. 33A-33D show different solar panel configurations.

FIGS. 34A-34F show other geometric solar panel configurations.

FIG. 35 depicts electricity grid distribution.

FIG. 36 depicts space generated electric energy which is sent to an earthbound power grid.

FIG. 37 depicts a portable energy system embodiment.

FIG. 38 shows portability of the energy generation module.

FIG. 39 depicts folded embodiments aboard a C-130 cargo airplane.

FIG. 40 shows a bottom view of the portable structure assembly.

FIG. 40A illustrates multiple views of the portable structure assembly.

FIG. 41 provides an exploded view of the assembled panels and structure of an embodiment.

FIGS. 42A-42F depict assembly and disassembly of a portable embodiment.

FIGS. 43A and 43B depict another portable embodiment.

FIG. 44 depicts an embodiment with a fully deployed solar/wind unit with solar panel shade work area and operational quarters.

FIG. 44A shows manual/semi-automatic portable embodiment setup.

FIG. 44B shows an inflatable balloon functioning as a flexing "muscle" to open a solar module of an embodiment.

FIG. 44C shows inflatable "legs and feet"

FIG. 44D depicts a rail support embodiment.

FIG. 44E shows construction of expandable solar panels.

FIG. 44F depicts unfolded solar panels.

FIG. 44G depicts a solar cube embodiment.

FIG. 44H depicts a model of a fully deployed solar/wind portable housing unit configured as a military field repair facility.

FIG. 45 depicts a portable solar panel.

FIG. 46 shows an embodiment including solar panels covering containers to generate electricity at sea.

FIG. 47 shows an embodiment attached to an aircraft carrier to generate additional electrical and heating energy.

FIG. 48 shows an embodiment with extended solar paneled roadside barriers.

FIGS. 49A-C show multiple views of solar paneled concrete barriers.

FIGS. 50A-50D show multiple views of signage structure solar panels.

FIGS. 51A-51F show a embodiment to utilize a transmission tower.

FIG. 52 depicts a wind gathering system.

FIGS. 53A-53D show photovoltaic wind turbine blades from multiple perspectives.

FIG. 53E shows a parabolic reflecting surface and photovoltaic covered turbine blades.

FIGS. 54A-54H show photovoltaic cells generating electricity while on telephone poles.

FIG. 55A shows an embodiment of the application fitted onto a bridge.

FIG. 58 depicts a solar shade embodiment.

FIG. 59 depicts solar awning embodiments.

FIGS. 60A-60C show solar/photovoltaic window/door panes.

FIGS. 61A-61G depict a water tank solar/wind embodiment.

FIGS. 62A and 62B depict a rural embodiment.

FIG. 63 depicts a trailer/RV embodiment.

FIG. 64 depicts an underwater operation being supplied by a portable floating solar/wind embodiment.

FIGS. 65A-65C depict an aquatic solar-powered recharging station in a closed position.

FIGS. 66A-66E relate to an aquatic solar-powered recharging station in an opened position.

FIG. 67 depicts a helium-filled balloon embodiment for solar-powered mid-air recharging.

FIG. 68 depicts air tanker electrical recharging of a drone.

FIG. 69 depicts mid-air helicopter electrical recharging of a drone.

FIG. 70 depicts surface power source and recharging of robotic or drone systems.

FIGS. 71A and 71B depict an aquatic power recharging module.

FIGS. 72A, 72B, 72C, and 72D show a submersible solar power station.

FIGS. 73A-E show portable and extendible solar panels in connection with military vehicular embodiments.

FIG. 74 depicts a side view of a vehicle including mounted solar panels in stowed and extended positions.

FIG. 75 depicts a front end view of a vehicle including mounted solar panels in stowed and extended positions.

FIG. 76 depicts a cutaway drawing of telescoping solar panels.

FIG. 77 depicts a side view of a vehicle including mounted solar panels with a trailer-mounted erect wind turbine generation system.

FIG. 78 also depicts another side view of a vehicle including mounted solar panels with an extended and erect wind turbine generation system.

FIG. 78A shows portable and extendable solar panels in military example embodiments.

FIG. 78B additionally shows further example embodiments of portable and extendable solar panels in a military application.

FIG. 79 depicts a top view of a vehicle with mounted solar panels in an extended position.

FIG. 80 depicts a top view of a vehicle with mounted solar panels and extended stabilization legs.

FIG. 81 depicts a side view of a vehicle with mounted solar panels and extended stabilization legs.

FIGS. 81A and 81B depict a vehicle with accordion style folding solar panels, where 81A depicts the solar panels in a folded position and 81B depicts the solar panels in an unfolded position.

FIGS. 82A-F depicts foldable parabolic solar panels.

FIGS. 83A-83C depicts an embodiment including an example of interleaved solar panels.

FIGS. 84A and 84B depict fanable solar panels.

FIG. 85 depicts a military vehicle having solar panels attached thereon for generating electricity.

FIGS. 86A-D depict various embodiments for deploying solar panels.

FIGS. 87A-87C depict additional various embodiments for deploying solar panels.

FIGS. 88A-88C depicts an embodiment including utility vehicle that generates electricity.

FIG. 89 shows an embodiment of an inflatable turbine blade assembly.

FIG. 90 depicts a cross-section view of an inflatable turbine blade assembly.

FIG. 91 depicts side view and cross-section view of a single inflatable turbine blade construction.

FIG. 92 depicts a cylindrical embodiment as constructed prior to assembly of the inflatable turbine blades.

FIGS. 93A and 93B depict construction of single inflatable turbine blades.

FIGS. 94A and 94B also depict construction of cylindrical inflatable turbine blades.

FIGS. 95A-95E depict types of inflatable turbine blade construction.

FIGS. 96A-96C depict views of a personal solar electricity generator embodiment.

FIG. 97 shows a wind turbine electricity generator embodiment for buildings or residential applications.

FIGS. 98A and 98B show a wind turbine generator with solar panel additions.

FIGS. 98C and 98D show additional views of a wind turbine generator for buildings and homes.

FIG. 99 depicts an embodiment of a wind turbine generator with a separate solar photovoltaic panel.

FIGS. 100A and 100B show an embodiment with solar panels mounted inside a vehicle's dashboard and rear window.

FIG. 101 depicts a turbine assembly rotatable shroud.

FIG. 102 depicts a turbine assembly with a fixed shroud.

FIG. 103 shows a computer for use with the embodiments of the application.

FIG. 104 shows different configurations of embodiments for Local Area Energy Distribution and Management System.

FIG. 105 shows solar panels co-existing with wind turbine generator wind farms.

Figure 55B:
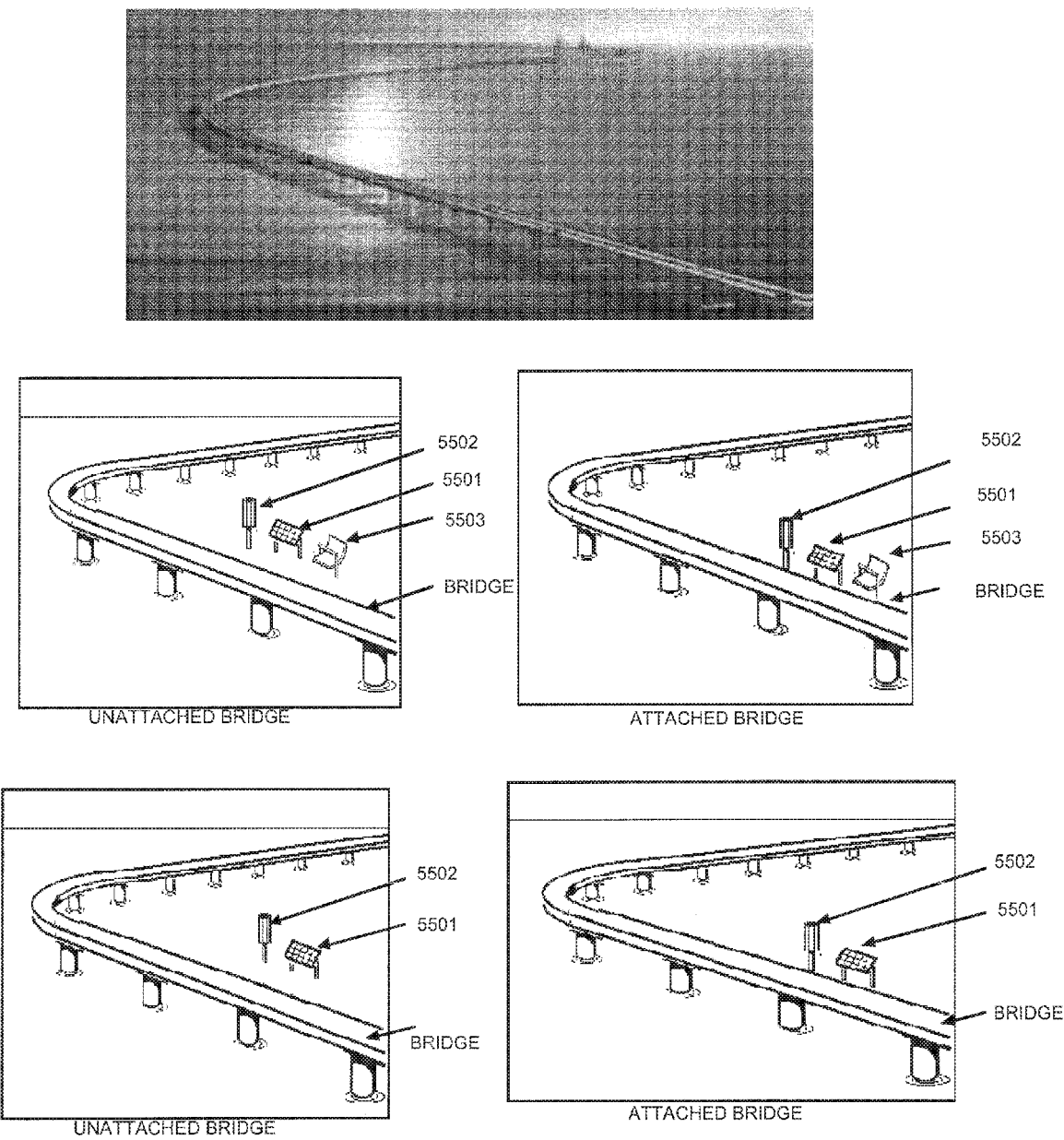
FIGS. 55B-55E show multiple bridges and causeways.
Figure 55C:
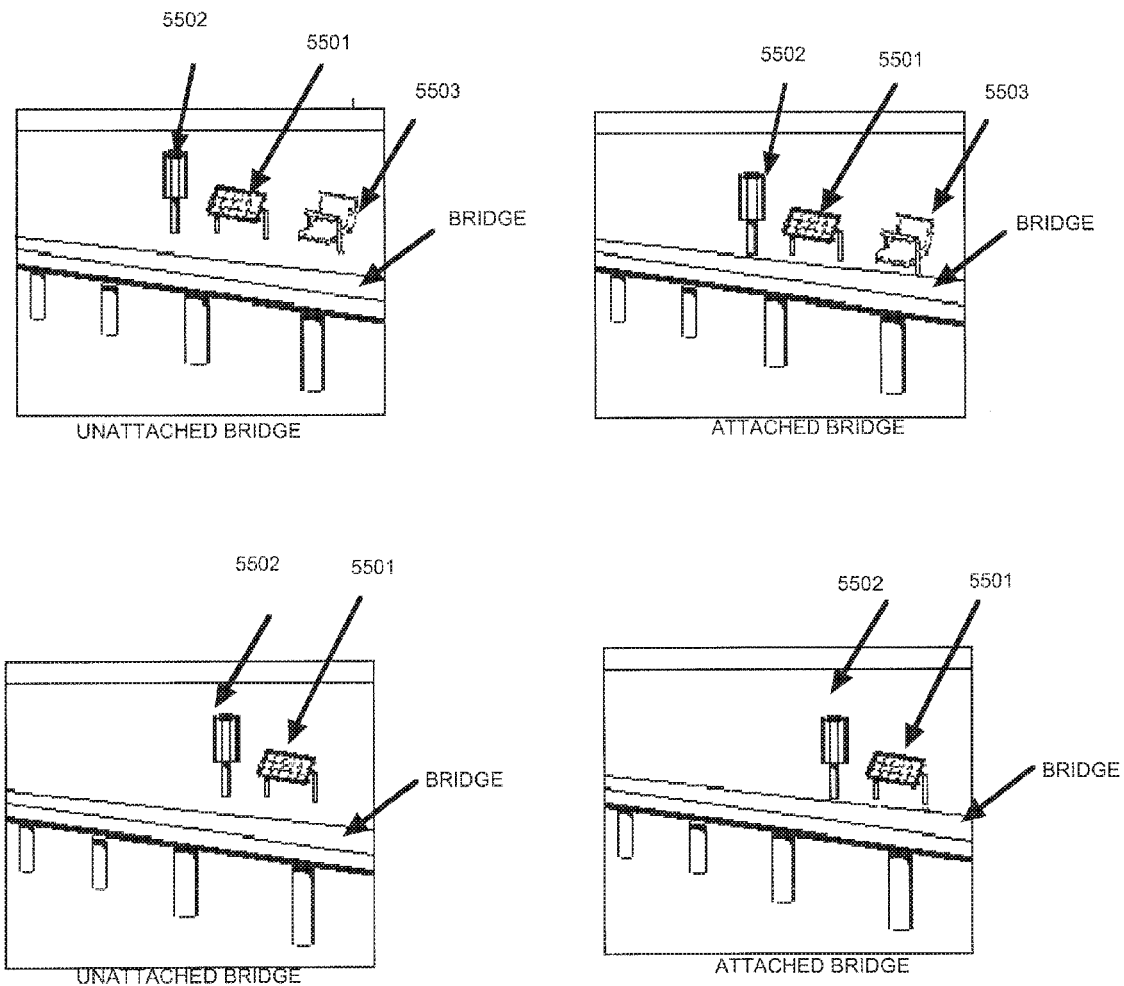
Figure 55D:
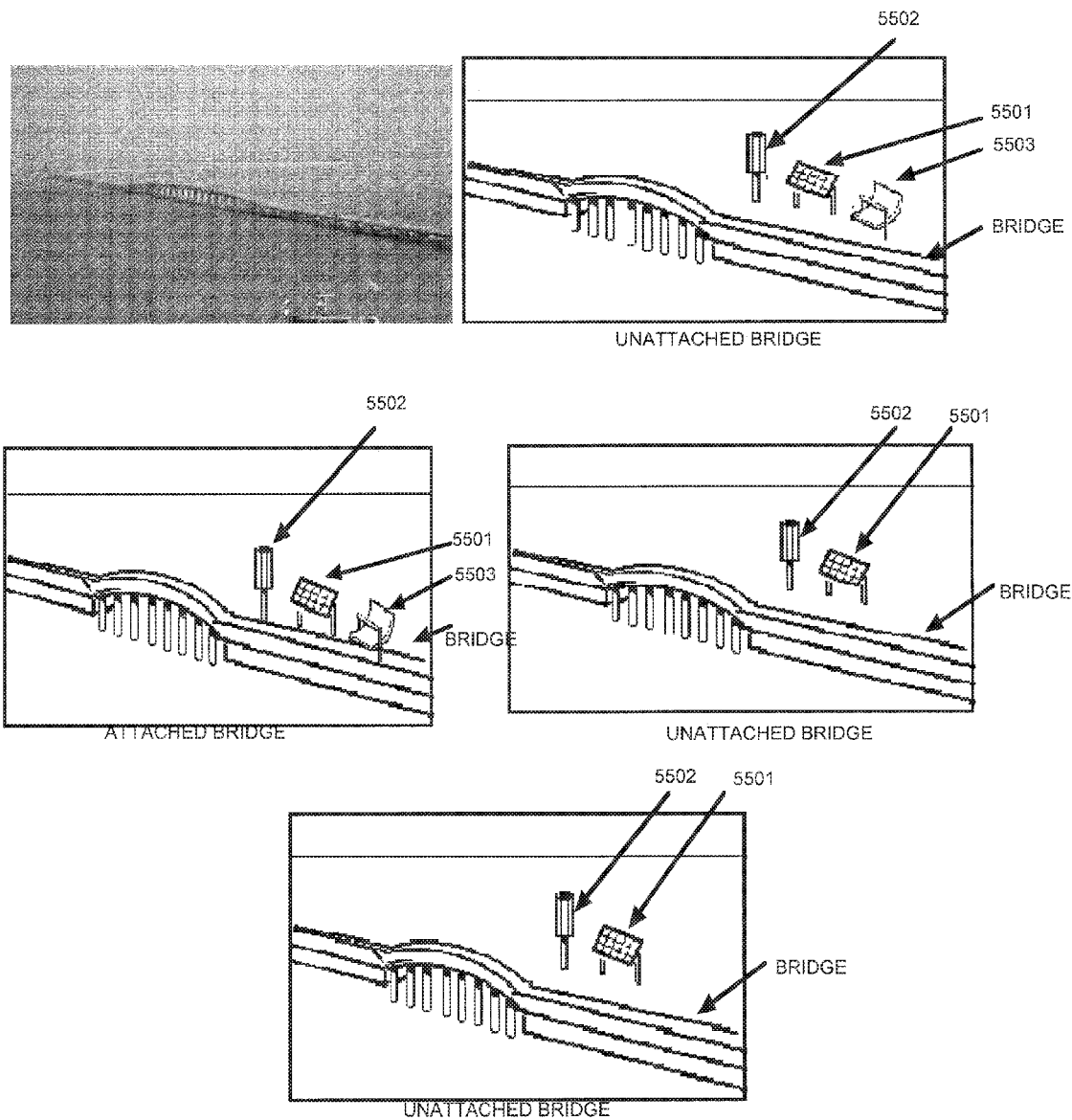
Figure 55E:
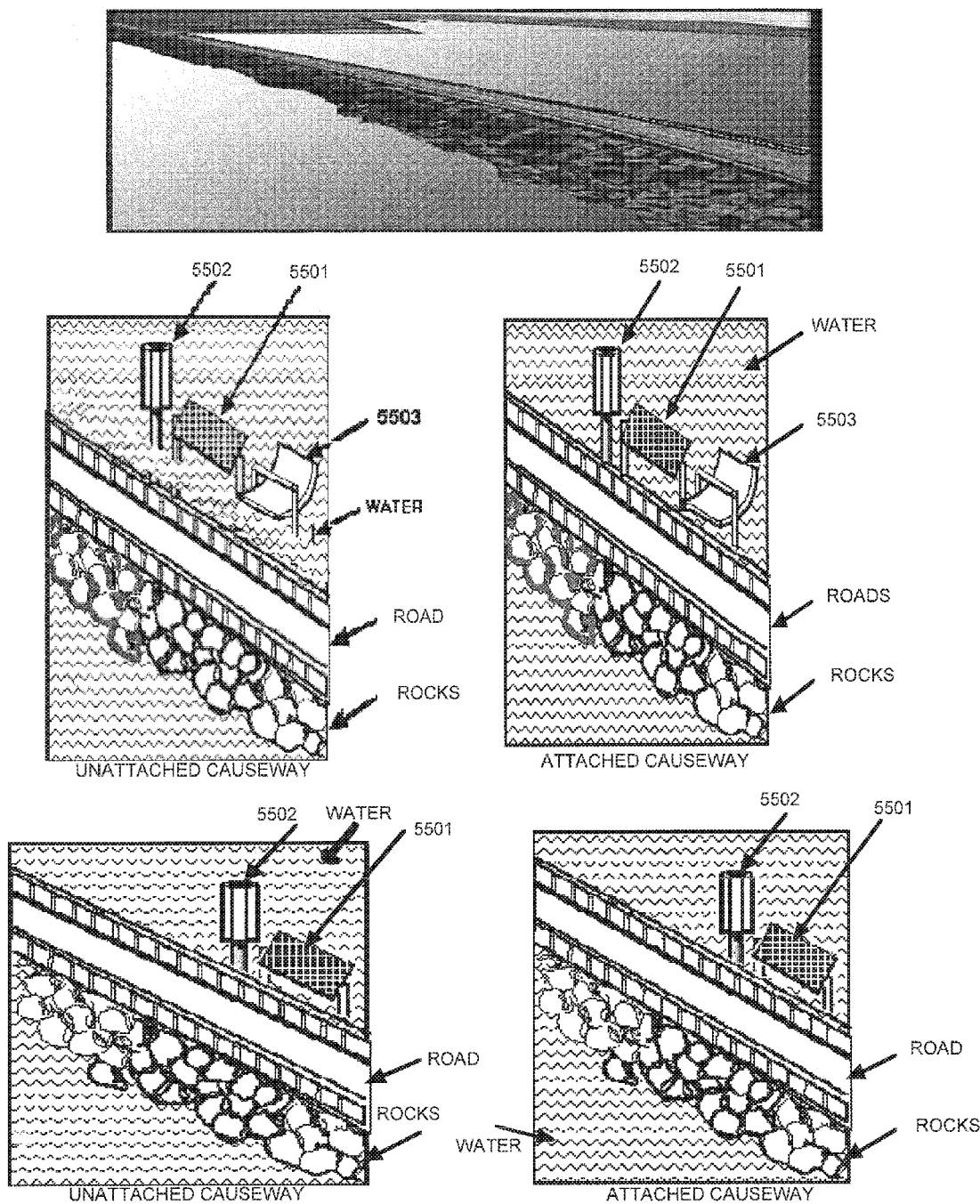

FIG. 106 depicts different solar panel configurations situated within wind farms.

FIG. 107 depicts giant wind turbines air flow which can drive smaller wind turbines.

FIG. 108 shows existing Solar Panels that can be integrated into the example embodiments with the addition of wind turbines.

FIG. 109A shows basic flow of generated electricity when both the sun and wind are available.

FIG. 109B depicts basic flow of generated electricity when the wind is not available, but the sun is available.

FIG. 110 shows photovoltaic covered turbine blades.

FIG. 111 shows the locking of the turbine blades into the central rotating shaft.

FIG. 112 shows reflective solar concentrator of the photovoltaic-covered turbine blades.

FIG. 113 depicts an illuminated rotating turbine shaft.

FIG. 114 shows types of solar and wind conditions the example embodiments may encounter.

FIG. 115 illustrates nature's erratic energy situations.

Figure 117:
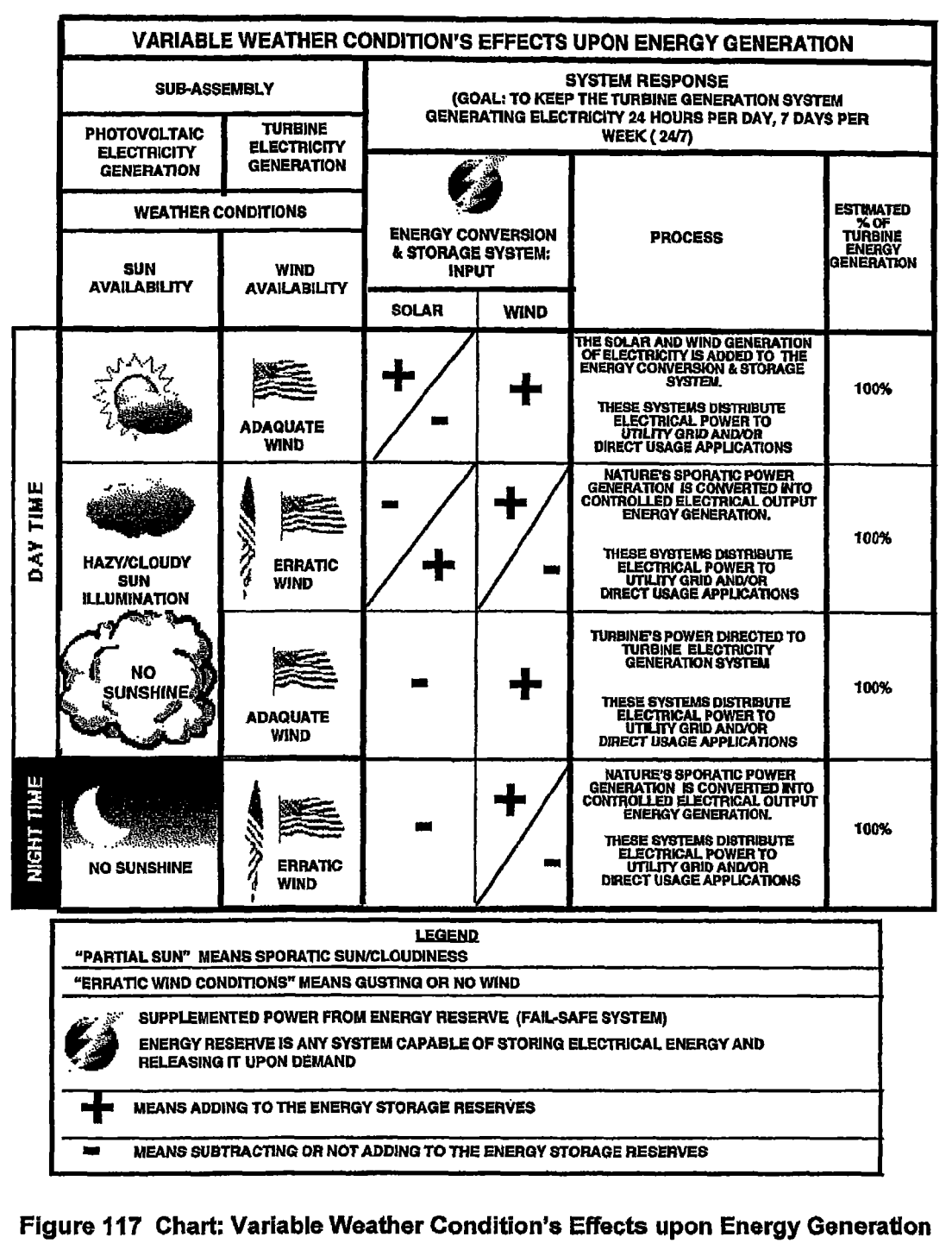
Figure 118:
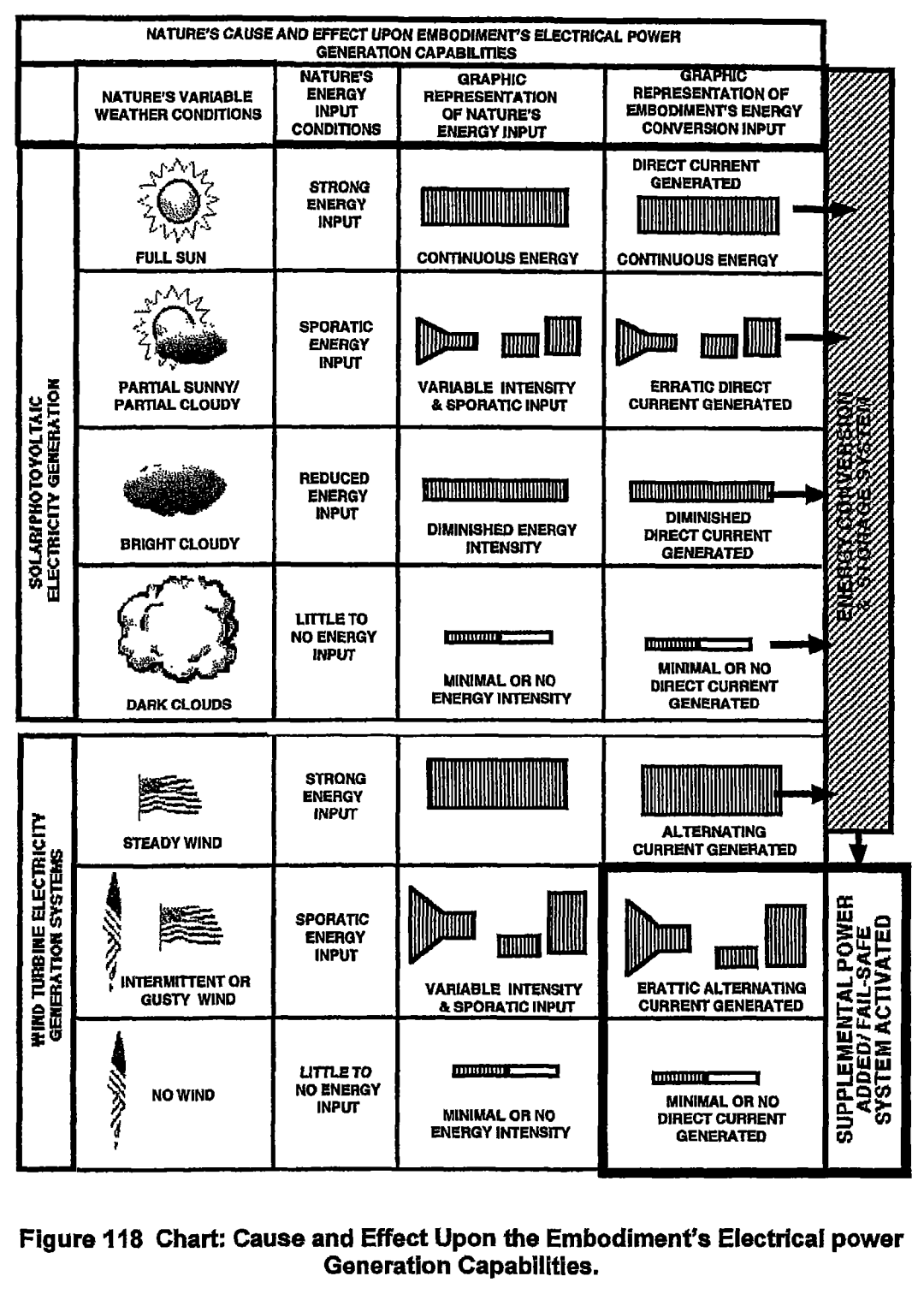

FIG. 116 shows a chart with extreme weather conditions' effects upon energy generation FIG. 117 shows a chart with variable weather conditions' effects upon energy generation FIG. 118 shows a chart with cause and effect upon the example embodiments' electrical power generation capabilities.

FIG. 119 illustrates a flow diagram of solar system electricity generation.

FIG. 120 illustrates a flow diagram of wind generation fail-safe system.

FIG. 121 illustrates a flow diagram of an energy conversion & storage system process.

FIG. 122 illustrates a flow diagram of differences in electrical conversion.

FIG. 123 illustrates a flow diagram of discrete energy & conversion storage.

FIG. 124 illustrates a flow diagram of common energy storage & conversion storage.

FIG. 125 depicts a solar and wind farm.

FIGS. 126A-J show example embodiments of wind turbine assemblies.

FIG. 127 shows the effects of the wind upon rotating horizontal turbine assemblies.

FIG. 128 depicts a SolarWind farm linked into portable solar/wind example embodiments.

FIG. 129 shows data communications when sun and wind are available.

FIG. 130 illustrates example embodiments including an energy conversion system operated only by sun without wind.

FIG. 131 illustrates example embodiments including an energy conversion system operated only by wind without sun.

FIG. 132 illustrates basic concepts of the example embodiments.

FIGS. 133A-E show a vertical turbine blade assembly.

FIGS. 134A-B illustrate a top view of a solar/wind tower.

FIGS. 135A-B show a front view of the solar/wind tower base.

FIGS. 136A-D show various sites for solar/wind farms.

FIGS. 137A-J illustrate turbine blade construction options.

FIG. 138 shows a mechanism for the transfer of wind energy into electricity.

FIGS. 139A-D illustrate modular construction of solar/wind towers.

FIGS. 140A-C show sun tracking solar panels.

FIGS. 141A-F show examples of types of fans and propellers.

FIGS. 142A-B show multiple wind turbine assembly for wind farm.

FIGS. 143A-D illustrate a Wind Farm and/or SolarWind Farm

FIGS. 144A-B show a wind farm with a venturi assembly.

FIGS. 145A-I illustrate a Dyson air multiplier system.

FIG. 146 illustrates example embodiments with a air multiplier system and second wind turbine system.

FIGS. 147A-B show an energy storage & conversion cooling system.

FIG. 148 illustrates an example of a light intensification process to increase the photovoltaic effect.

FIGS. 149A-C depict symbols used throughout the application and definitions thereof.

FIGS. 150A-B illustrate an example of an aquatic surface solar/wind power recharging system module.

FIGS. 151A-B show an example of a submersible solar power station for underwater habitats.

Figure 152:
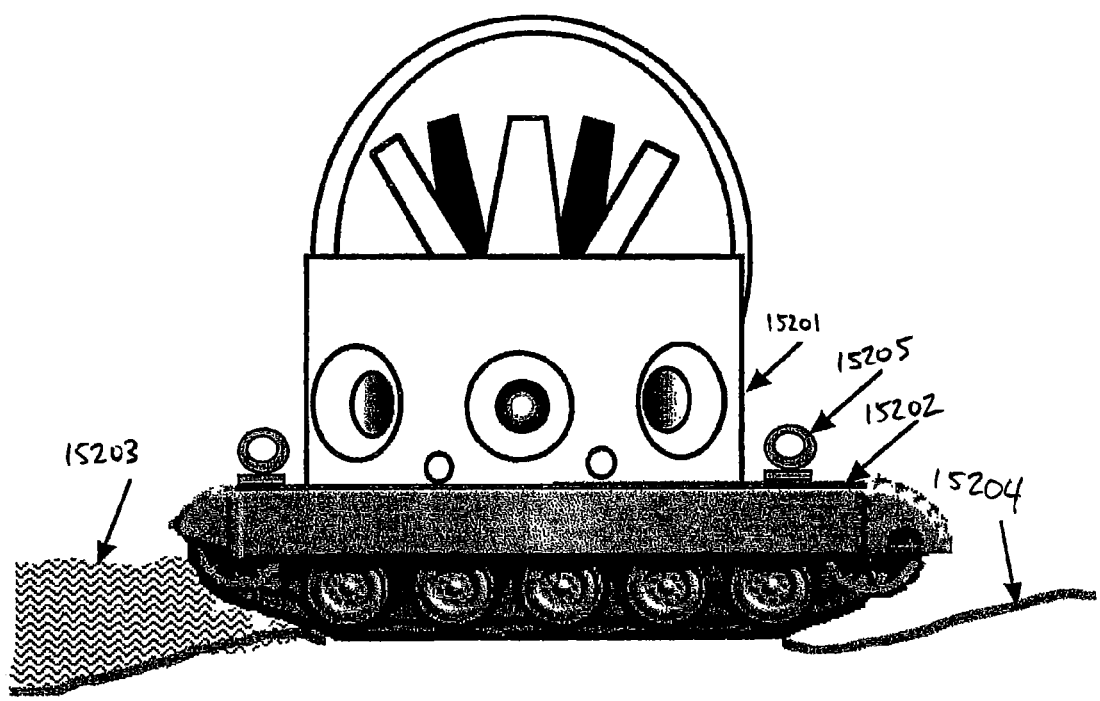

FIG. 152 illustrates an example of an all-terrain mobile electrical power generation system.

FIGS. 153A-B illustrate an example of basic construction and turbine pressure flow.

FIG. 153C shows an enlarged view of turbine pressure exchange.

FIGS. 154A-C illustrate an elongated, curved, and decreasing venturi design to increase the pressure of the incoming air/wind upon the turbine blades.

Figure 155:
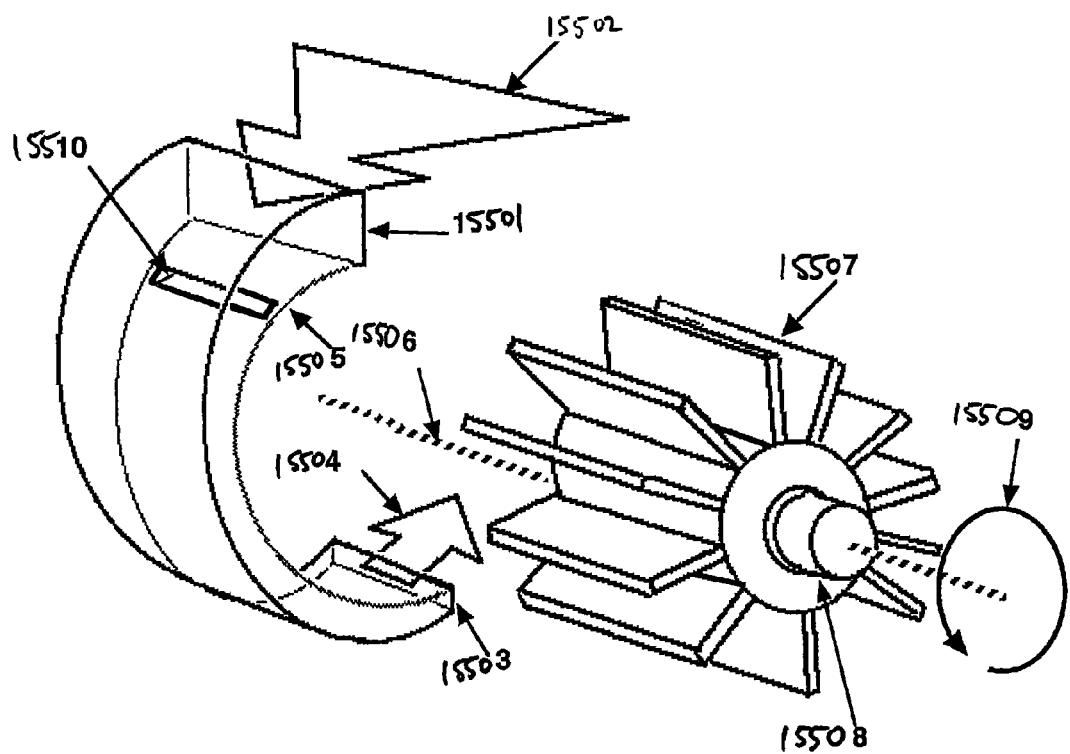

FIG. 155 illustrates an example of a basic turbine assembly and pressurized air intake assembly.

Figure 156:
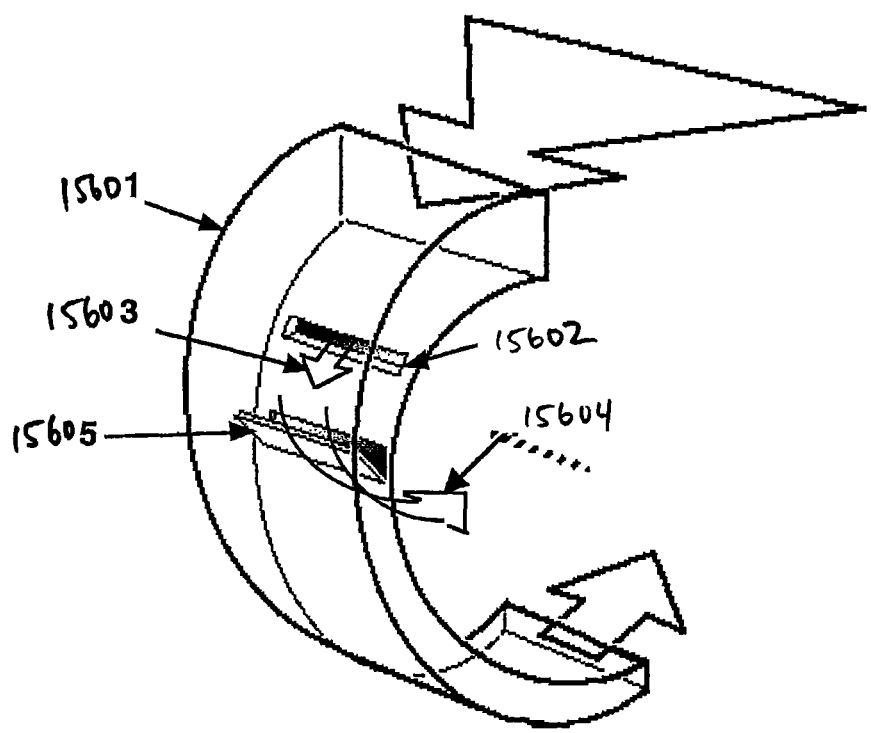

FIG. 156 shows example embodiments of a closed duct system.

Figure 157:
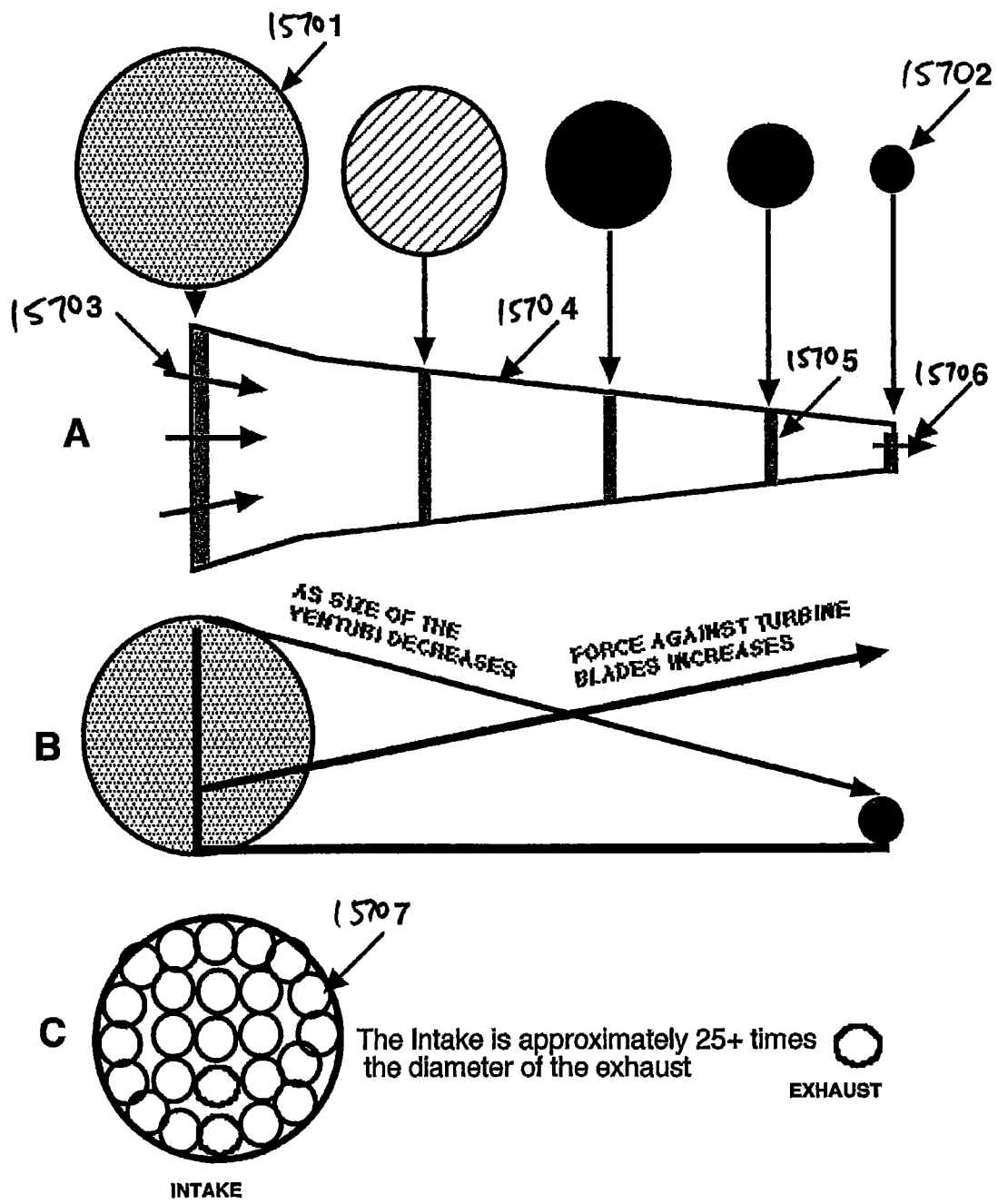

FIGS. 157A-C show additional information regarding example embodiments related to an aquatic surface solar/win power recharging system module.

Figure 158:
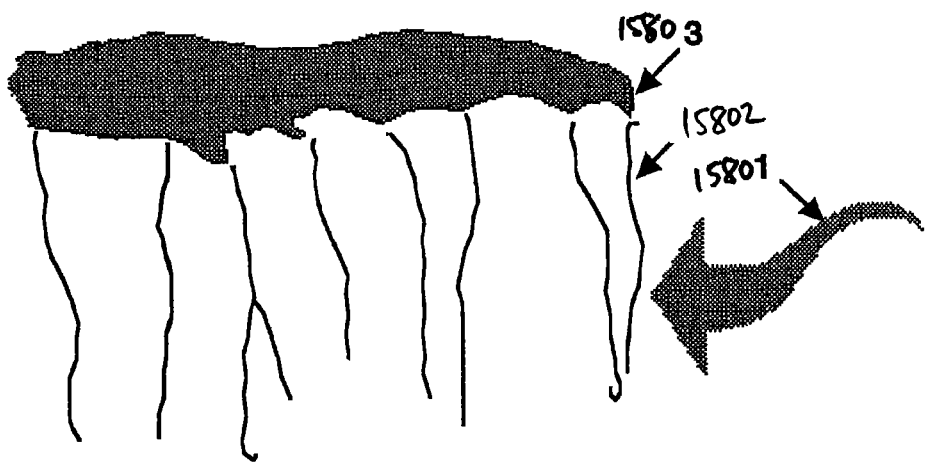

FIG. 158 shows an example of a typical cliff or iceberg.

Figure 159:
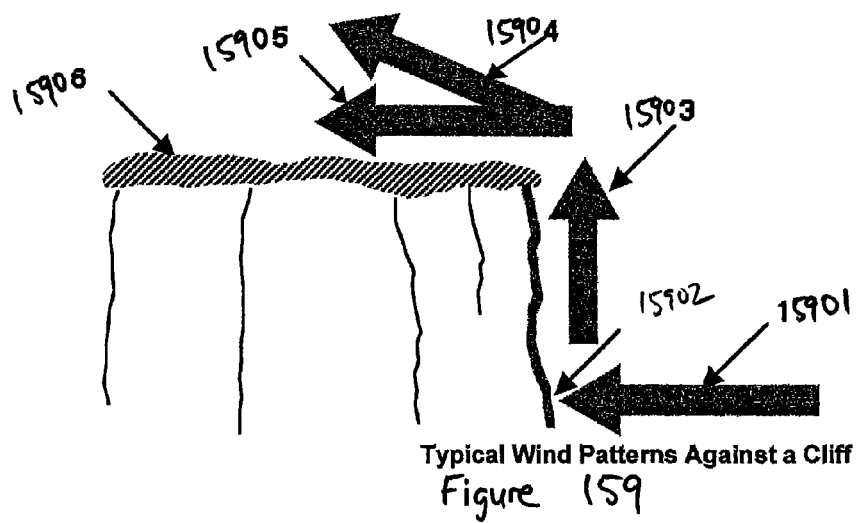

FIG. 159 illustrates typical wind patterns against a cliff.

Figure 160:
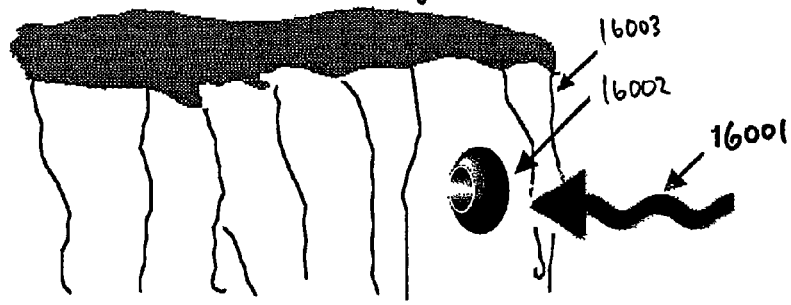

FIG. 160 shows an underground embodiment of an electrical wind generation system.

FIG. 161 shows an example of the wind generation system installed on a cliff's face.

FIG. 162 illustrates a cross section of the wind generation electrical system.

FIG. 163A shows a detailed cross section view of the wind generation electrical system.

FIG. 163B shows a detailed cross section view of the wind generation electrical system's wind pattern.

FIGS. 164A-B show application dependent intake ducts.

Figure 165:
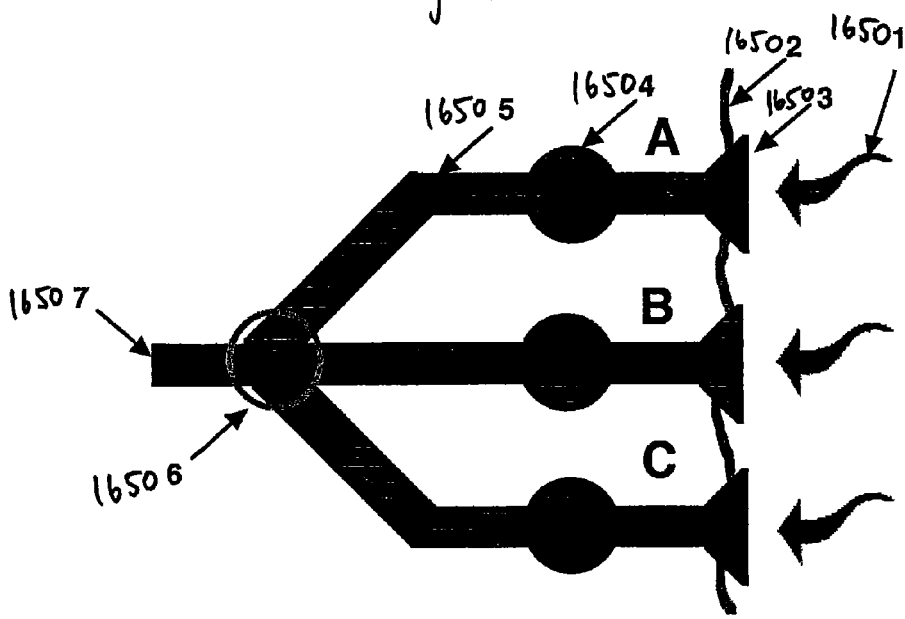

FIG. 165 shows a top view of an example system having a plurality of wind generation electrical systems.

DETAILED DESCRIPTION OF THE PREFERRED EMBODIMENTS

These together with other aspects and advantages which will be subsequently apparent, reside in the details of construction and operation as more fully hereinafter described and claimed, reference being had to the accompanying drawings forming a part hereof, wherein like numerals refer to like parts throughout.

The example embodiments include a system, process and method generating electricity, integrating solar, wind and various other application-dependent optional configurations that enable the system to also generate heat for water and/or warmed air.

The combined use of a solar photovoltaic panel and a solar panel for a hot water heating system, for example, would both generate electricity as well as a heated byproduct(s) and would save on both heat-related energy and general electricity bills or revenues when sold back into the electrical power grid.

The further combination of a solar panel for hot water with other renewable energy technologies, such as solar photovoltaic panels, or a wind turbine generator can work quite well together in providing a source of cheap, clean, and renewable energy for our homes, schools, offices and businesses.

Different Embodiments

FIG. 14 illustrates different example embodiments. FIG. 14A illustrates either a solar panel and/or a photovoltaic panel 1402 affixed to the top of a supporting structure 1403 that receives the sun's energy 1401. FIG. 14B further illustrates a top view of the structure consisting of a combination on one form of panel configurations, where a solar panel 1404 generates heat while a photovoltaic panel 1405 generates electricity.

FIG. 14C illustrates a structure 1408 that combines solar photovoltaic panels 1407 with wind turbine technologies to produce electricity virtually 24 hours a day. The sun shines 1406 on the panels 1407 while the wind 1409 enters a venturi system 1410 and after it turns a turbine generator the spent air exits the structure 1411 & 1412. The structure can also be used to house a work area, supplies, maintenance tools, etc. and an access door is provided 1413.

FIG. 14D illustrates a structure 1416 that combines the photovoltaic structure with a solar collector 1417. The sun shines 1414 on the photovoltaic panels 1415 generating electricity while the solar collector 1417 receiving reflective energy from the sun 1420 focuses the energy onto a fluid filled device 1418, 1419 & 1421 heating the fluid which enter and exits through the supporting structure 1418 & 1419. This fluid system can be configured to take a plurality of passes or move slower through the solar collector, i.e., coiled pipes, to increase the heat level of the fluid. The fluid may also be preheated prior to entering the solar collector in order to quickly increase its temperature.

FIG. 14E illustrates how the various embodiments may be configured to meet specific environmental conditions, available space, budgets, terrain, application(s), etc.

Flow Diagram of the Module

The flow diagram of the system is illustrated in FIG. 14F. Each system can be controlled independently or to work in tandem. Each system is controlled to provide a smooth Phase-in if the electrical energy is channeled into the Utility's power grid. or other such electrical grid.

FIG. 15A illustrates the solar collector 1501 integrated with photovoltaic panels 1502 with a supporting edge on three sides 1503 where the sun's energy radiates upon the panels 1504 and onto the parabolic collector 1405 hitting the heat exchanger system 1407 where water or other suitable fluid enters the heat exchanger 1406 as cool or cold fluid and is heated as it travels across the parabolic mirror and out of the system 1408 and depending upon the type of embodiment, as steam or hot water FIG. 15B illustrates a top view of the collector 1509 and the photovoltaic cell 1510 array 1511 producing electricity. The solar collector heats the cool incoming water 1512 transferring it via a system of pipes 1513 that may be insulated 1514 to a plurality of users 1515.

FIG. 15C illustrates the incoming cold fluid enters the intake 1516 and goes through a coiled heat exchanger configuration 1518 then exits as steam from the outflow 1519 & 1520. This coiled configuration increases the surface area that can be exposed to the sun's heat that is reflected from the solar collector thereby increasing the temperature of the exiting liquid or steam while minimizing its length when a straight tube is used.

Basic Solar Electricity Generation System

Example embodiments of this application include a system that produces electricity from the sun and comprises: the sun, or some other light source, illuminating a plurality of photovoltaic cells which are arranged into a plurality of removable photovoltaic modules that in turn are arranged into one or more removable photovoltaic array(s). The embodiment also incorporates a controller to monitor the flow of electrical current and a microprocessor-based software to manage the time, day, date, energy flow, energy production, energy destinations, and direction of the sun if the solar photovoltaic panels are automated.

The electricity produced is either sent to an application dependent electrical device, an electrical power grid, a solar to earth microwave energy generation system, to supplement other forms of energy generation and/or a rechargeable battery or batteries until it is needed at a later point in time.

The photovoltaic panel(s), depending upon the application can be flat or curved, cylindrical or parabolic. It can be made from any suitable photovoltaic material such as, but not limited to: glass, plastic, fabric(s) metal, photovoltaic paint or combinations of them.

Wind Electricity Generation

Another embodiment includes the system described above with the addition of wind electrical generation technology.

Solar Heat/Steam Electricity Generation

Another embodiment includes the system described above with the addition of solar heat steam generation of electricity.

Integrated Solar, Wind and Solar Heat/Steam Electricity Generation System

Another embodiment includes the system described above with the integration of three forms of electricity generation: Solar, Wind and Solar Heat/Steam technologies.

Fixed Station Embodiments

Two Basic Embodiments Fixed and Portable Construction

Another embodiment incorporates two basic embodiments, the fixed station configuration that is a permanent or semi-permanent structure and the portable configuration.

FIG. 16 illustrates a multiple energy source generation system 1601 that would be constructed alongside roads, highways, freeways, airports, etc. 1609 where the system would utilize available breezes or winds that would enter into the unit through a venturi 1602 and ducting system 1606 that would turn a wind generation turbine to generate electricity as long as the wind continued to push on the turbine's blades. Louvered panels 1604 can also channel breezes or winds from other directions into the internal wind ducting into the wind electricity generation portion of the system.

During the daylight hours (and if there is sufficient light being generated from nearby roadway lights), for example, the photovoltaic solar panels 1603 would also produce electricity. The system's housing can also be used by humans through an access door 1605 to use as a work area, maintenance facility or storage, for example. A curb 1608 and landscaping 1607 can enhance the outer structure if desired.

Shown in FIG. 16A is an inside view of a model of a structure 1610 where the exterior venturi and ducting 1612 directs the wind to the horizontal axis wind turbine blades 1611 turning the wind turbine generator 1616 producing Alternating Current electricity. If this electricity is to be stored it is converted into Direct Current 1613 and stored in the Energy Storage & Conversion system's rechargeable batteries 1614 that generate heat and may be air cooled through open louvers 1615. If the electricity demand requires the stored electricity to be withdrawn from the batteries, it is inverted 1613 back into Alternating Current.]

FIG. 16B shows a street level view of one configuration of the multiple energy generation system.

As shown in FIG. 16C in areas that do not have sufficient ground-level wind to turn the wind turbines adequately, an extension 1611 that leads 1612 into the wind turbine electricity generator can be used and it may be constructed for changing wind directions 1610 where it rotates into the wind. This may be done mechanically or automatically including the use of a wind vane (not shown). The solar panels are illustrated 1613.

Modular Configurations-Mix and Match

Different application-dependent configurations can be incorporated to better conform to local energy needs. For example, in FIG. 17A the structure includes integrated photovoltaic 1701 and wind electrical generation systems with a venturi 1702 that are applied adjacent to remote highways and/or freeways 1708.

As the road approaches a school or manufacturing area, for example, the larger configuration shown in FIG. 17B can be implemented with an integrated photovoltaic 1703, wind electrical generation with a venturi 1709 and a solar collector and heating system 1704 & 1706 where the heated air or water can be piped 1705 & 1707 into and from the adjacent school or buildings through a circulating network of insulated pipes. In the areas where severe snow makes the roads or freeway hazardous, the warmed air, if directed towards the pavement can be used to melt the piled up snow.

If a roadside unit or even a stand alone configuration is located in the center of a crop or orchard, for example, the warm air that is generated by the collector (as well as electrical energy generated from the sun that has been stored) is directed to adjacent crops, and the system can provide warmed air that might be usable to prevent crop damage from occurring due to the onset of a climate change producing sudden frost.

In an area that does not require the solar heat to be used for heating purposes, the solar collector can generate sufficient heat in order to turn a steam generation system to produce additional electrical energy.

Thus, a variety of sources of natural conditions can be integrated to capture power and generate electrical energy, heat or various combinations of them.

Center Freeway Divider Energy Generation Systems

In FIG. 18, the unused center divider strip 1803 between the opposing or adjacent freeway lanes 1804 can also be used to generate power. The structure 1801 is elevated 1802 above the traffic 1812. The top of the structure contains a solar panel.

Adjustable photovoltaic or solar panels 1806 convert the sun's energy 1805 while the wind 1807 enters the structures 1808 through one or more intakes that would turn one or more wind turbines 1809 and the wind 1810 exits through the exhaust vent(s) 1811.

The unit would house batteries, regulators, turbine(s), and various sensors to monitor the activity, computer(s) or electronic devices.

In FIG. 18A the center divider configuration 1813 being elevated 1814 could contain roadway lights 1815 using the day's excess and stored electricity that would illuminate the road's surface 1816 & 1817. This configuration can also be used at highway checkpoints.

The areas under the solar panels may be left open or enclosed. When they are enclosed, the wind turbine is more protected from wild or domestic animals, vagrants, etc. Further, these modules can serve as locked storage facilities for roadside landscaping tools, records or public storage, road maintenance equipment, furniture, etc.

Energy Storage

To smooth out the peaks and valleys created from erratic wind generation and cloudy skies obstructing the sun's energy from shining upon the solar/photovoltaic panel 1902, FIG. 19A illustrates a storage system 1901 including one or more batteries 1903, 1906 & 1908 stored internally, 1903 or underground (1905 or 1904) or outside adjacent to the main structure 1907.

Wind Directional Louver Panels

As shown in FIG. 20, to increase the available wind 2005 and 2006 that flows around the structure 2001 special baffles or movable louvers 2004 which may be motorized, are used to direct more wind energy into the venturi 2003, ducts and hence the turbine.

Under Solar Panel Vents

FIG. 21A illustrates that one or more vents needed 2102 to drive the wind turbine generator(s) can be conveniently placed under the solar or photovoltaic panels 2101 and that wind energy 2104 can be channeled through the vent into the wind turbine generators.

FIG. 21B illustrates a side view of the vent 2102 under the staggered solar photovoltaic panels 2101 and channels 2105 the exterior wind 2104 into the wind turbine generation system.

Associated Advertising and Information System

As a means of either generating additional revenue or to use to obtain a "free" solar power generating system, cities, states, etc. can provide access to freeways and to allow advertising such as illustrated in the following figure.

The preferred advertising would be a digital electronic display as shown in FIG. 22 as 2202 adjacent to the system's structure 2201 and viewed by passing motorists.

In addition to advertising, other auto-related information can be inserted into the display such as: traffic alerts, detour messages, warning notices, missing child alerts, freeway construction, "workers ahead", "Welcome to our City", etc. can be displayed 2203.

Buildings: Updrafts

As higher and higher skyscraper structures are built, they must be built sufficiently to withstand the wind pressure that buffets the sides of the structure. This is shown in FIG. 23. A high wind can move the top floors of taller buildings a few feet at a time in any direction and is a problem for those living or working on the top floors.

To counter this unwanted movement of the building, a heavy "pendulum" structure is located inside the building's basement and acts as a counterweight to the building's movement. Some buildings also use springs and rollers to allow the building to move either under wind pressure or earthquakes.

These systems do not address the force of the wind upon the structure, but instead seek to provide a countermeasure to oppose the wind's force.

The example embodiments of this application take an opposite approach where the wind's force is reduced and utilized to generate electricity.

FIG. 23 illustrates the typical wind turbulence 2301 that occurs around 2304 and over 2303 & 2305 a building 2302.

FIG. 24 illustrates a more complex computer simulation of a wind's force and patterns that create various patterns for turbulence 2403 & 2404 that occurs around and over 2402 a building 2401.

To counter these turbulence wind patterns as well as the force of the wind directly against the building itself, architects design the buildings 2501 so that the wind's pressure flows over and around them 2502 as seen in FIG. 25.

FIG. 26 illustrates some of the world's highest buildings (skyscrapers) and the second building presently under construction, named "Freedom Tower", utilizes twin vertical wind towers on top of the building for generating electricity.

Notice that the wind towers on the top of the Freedom Tower consume up to ⅓ of the total height of the building yet producing only 20% of the building's electrical needs. This amount of dedicated building space, in order to generate electricity, could better serve the economic goals of the owners if it generated leasing revenues.

Building Embodiment

The same basic configuration as shown in FIG. 27 can be mounted on building 2701 roof tops 2704 where the adjustable solar/photovoltaic panels 2702 generate electricity or heat from the sun's energy which also can power a solar collector 2703 for electricity or heat.

These unit's systems can be linked or integrated together 2705 into different application-dependent configurations. Wind hitting the building as an updraft 2708 enters the intake 2709 duct(s) 2707 that channels 2706 the wind into and exits the system 2710 & 2711.

As shown in FIG. 27A, in the event a new building 2715 is being designed and the fixed station 2712 with the solar panel addition 2713 module is integrated and the designer does not want to use an overhanging duct (as illustrated in FIG. 27), the building's top corners can be set back 2720 allowing the updrafting wind 2716 to make the turn from vertical 2716 to horizontal 2718 where it enters the wind tunnel duct 2714 and wind generation system and exiting 2719.

Wind Generated Electricity

Multiple Wind Directions

Example embodiments shown in FIG. 28A provide a series of vents 2802 that surround the building 2801 to accommodate various wind patterns and directions and placed on multiple floors which would allow the wind/air pressure to pass through the building relieving some of the wind's force against and around the building.

This configuration of the example embodiments function like a sieve thereby reducing the wind's pressure against the building except using the wind pressure passing through a series of ducts to turn one or more turbines to generate electricity allowing the wind to pass through the building instead of pushing against it.

FIG. 28B illustrates the wind 2803 entering the louvered 2805 vent 2804 of the building 2801. On its way through the building the wind's pressure will turn one or more internal wind turbines (per floor) generating electricity in the process then exiting through a plurality of exhaust vents 2802.

Above the Ceiling's Grid

FIG. 29C is a flow diagram of the wind through the building. Unlike other emerging systems that take up whole floors that could be better used for leasing income, we anticipate using the existing 3+ feet space ("above ceiling grid") seen in FIGS. 29A and 29B commonly used for heating, ventilation, air conditioning ducting, communications, etc. Of course, if the architect elects to dedicate more space to the system, that can also be accommodated.

FIG. 29C shows this "above the grid" is the area above the office/room's 2913 ceiling's acoustic tile 2911 and 2912 having dedicated ducting 2904 for the incoming wind pressure 2905 that enters the louvered 2903 vent 2902 to be strategically channeled through the building to our turbine electricity generator system(s) 2906 where the automated directional vane 2908 further compressing the incoming air increasing its pressure before encountering the turbine blades 2907 turning the turbine in the process and continuing through the ducting and exiting 2910 the building 2901 through the exit vent 2904.

The screened openings 2902 & 2904 in the sides of the buildings 2901 contain wind pressure sensors that feed data into the software controlling the automated louvers 2903 allowing them to adjust for the external wind pressure and to close in the event of a storm or hurricane. These vents would also have screens on them to prevent birds from perching and/or nesting inside the system's ducting. If it is deemed prudent to keep the vents in an "open" position allowing the force of the storm to pass through the building in order to reduce the wind's force upon the building, then the computer would have the option to stop the turbine or to radically reduce the flow of air so as to not cause damage to the turbine generator.

The automated louvers hydraulically adjust to a number of positions, from closed to open positions and anywhere in between and use a microprocessor-controlled sensor system that analyzes the force of the wind based upon constant flow of data received from a system of strategically placed sensors that monitor which is based upon the force and direction of the wind upon the building. The number of louvers as well as their placement is application dependent and the louvers may be wind-controlled for free movement in any direction or microprocessor-controlled for direction and for closing in extreme wind conditions.

FIG. 29D shows the vertical axis wind turbine system 2914 that is low in height so that it will fit in the available area as the wind 2924 enters the vent 2923 it is transferred to the wind turbine's blades turning the subassembly which in turn transferred the rotational energy to the turbine generator (not shown) via pulleys 2918, belts 2919, 2922 as an example, the wind is exhausted through a vent 2925.

Multidirectional Wind

Wind that is generally coming from one direction can also quickly blow in another direction and hence, a different side of the building. The system can redirect the air via the coordination of different louvers, ducts and diverters 2908 & 2909 to direct the wind to the appropriate turbine generator(s). Reversible turbine blades can also be used to accommodate a change in direction.

The building can also have partial or complete sides covered with photovoltaic cell panels that would also generate electricity from the sun.

Above the Grid/Between the Floor System

The system can accommodate either a horizontal or vertically designed wind powered electrical generation system. In FIG. 29D, a vertical axis 2917 is powering the wind turbine 2914 located between the ceiling (2921) of an office for example, and the floor or roof above (2920).

As the wind (2924) enters the wind guide/venturi duct (2923) it turns the vertical axis wind turbine 2914 (suspended between bearings (2915 & 2916)) and the attached pulley and fan belt (2919 & 2922) that in turn powers the electrical turbine generator and the resulting power is changed from DC (Direct Current) into AC (Alternating Current) by the inverter (not shown) and is sent to either be used immediately, sold to the electricity power grid or stored in the rechargeable batteries for later use.

The spent wind/air is vented (2926) to the outside or in to another wind generation system.

Not shown are the electrical and electronic systems that monitor the electrical generation process.

Modular Units

The modular units can be configured with more than one photovoltaic panel. FIG. 30A illustrates a modular unit 3001 with the solar panels 3002 in a stored position and FIG. 30B illustrates the solar panel 3002 opened 3004 to receive the sun's rays 3003. FIG. 30C illustrates other panels 3002 opening in a hinged fashion where one panel is raised vertically 3004 and then tilted for the best position to receive the sun's rays FIG. 30D illustrates the modular unit covered with solar panels 3002 with clipped corners 3005 to accommodate wind turbines 3006 and wind chamber 3007.

FIG. 31 illustrates the various panels 3102, 3103, 3104, 3105 swung open 3108, 3109, 3110, 3111 and the top panel 3113 in a closed position mounted on a modular unit 3101 as previously described herein with the clipped corners, in example embodiments, to accommodate the venturi 3106 and wind 3107. The panels are hinged 3112 to allow movement.

Flexible Solar Panel(S)

As discussed above, rigid solar panels may be used in a number of applications. Using thin film technologies, photovoltaic fabrics, plastic sheets, etc. as illustrated in FIG. 32A it is feasible to have a "deformable" solar panel 3201 that, receiving data from a sensor (not shown) that sends its data to a microprocessor-controlled series of electronic actuators or stepper motors that extend or retract 3202 the flexible solar panel(s) 3201 in the X, Y and Z axis so that it can deform the solar panel as in FIG. 32B into the most advantageous correct shape in order to receive the maximum heat or energy from the sun 3203 as it moves across the sky.

Other Solar Panel Configurations

Other solar and photovoltaic panels can be designed into various practical and/or aesthetic configurations. FIG. 33A illustrates a spherically designed solar panel using either a coating or flexible solar film formed into a sphere (like a world globe map). In FIG. 33B the solar panel can be designed to close to protect it from the elements. FIG. 33C illustrates the Buckyball configuration and FIG. 33D illustrates the fixed or adjustable solar panels.

The construction of various forms of solar panels can take almost any geometric shape. While others may be more or less efficient at producing energy, some designs would incorporate artistic configurations. FIG. 34A illustrates a Buckyball configuration 3401 while FIG. 34B depicts the Buckyball pattern before it is shaped into the third dimension. FIG. 34C depicts a Plain Dodecahedron, FIG. 34D is Kepler's Stella Octangula, FIG. 34E is Stellated Icosahedron and FIG. 34F is an artistic Kinetic configuration.

Software

System Controls

The system is controlled by computer software executed by a computer that monitors, analyzes and controls the total system and the surrounding environment on an ongoing basis. The software pertains to monitoring, analyzing, and controlling pressure including Water pressure, Water flow, Steam pressure, Water input, Water output, Wind speed (velocity) entering, Wind speed (velocity) exiting, Barometric pressure; temperature including Ambient temperature; Solar; Humidity; energy including Input to total system; Output from total system; Electricity generated; To/from external Power Grid; To/from internal storage batteries; Battery level(s); External power used; external conditions including Wind speed and Wind Direction; turbine including Revolutions per minute (RPM); Input; Output; louvers including Open louvers; Close louvers; Adjust opening of louvers; communications including Sending Status Reports; Receiving programming instructions; date/time information including date/time time stamping; Advertising time; Advertising duration; Advertising location; Alert Duration; message information including Advertising Client; Alert source; Type of alert; Sigalert; Amber Alerts; system information including Electrical equipment; Power equipment; Washing equipment; Time; Frequency; Cleaner level(s); diagnostic information including System(s) check; Maintenance; Repair orders issued; Service; Malfunctions-hardware; Malfunctions-software; Malfunctions-firmware; Analyze all systems; operations including Turn specific equipment, systems, lights, etc. to "on"; Turn specific equipment, systems, lights, etc. to "off"; Turn specific equipment, systems, lights, etc. to "pause"; Receive automatic software updates; energy levels including Remote Operations and Diagnostics Control (shadowing); Systems Integration internal MODULE; and Systems Integration external communications to and from the example embodiments.

System Sensors

The system contains various sensors that monitor the activity, surrounding environment and performance of the basic system, for example: pressure sensors related to Water pressure, Water flow, Steam pressure, Water input, Water output, Wind speed (velocity) entering, Wind speed (velocity) exiting, Barometric pressure; temperature sensors related to Ambient, Solar, Humidity; energy sensors related to Input to total system, Output from total system, Electricity generated, To/from external Power Grid, To/from internal storage batteries, Battery level(s), External power used; external condition sensors related to Wind speed, Wind Direction; turbine sensors related to Revolutions per minute (RPM), Input, Output; louvers sensors related to Open louvers, Close louvers, Adjust opening of louvers; communications sensors related to Sending Status Reports; Receiving programming instructions; date/time sensors related to All systems are time stamped with the time, date, Advertising time, Advertising duration, Advertising location, Alert Duration; messages sensors related to Advertising Client, Alert source, Type of alert such as: Sigalert, Amber Alerts; systems sensors related to Electrical equipment, Power equipment, Washing equipment, Time, Frequency, Cleaner level(s); diagnostics sensors related to System(s) check, Maintenance, Repair orders issued, Service, Malfunctions-hardware, Malfunctions-software, Malfunctions-firmware, Analyze all systems; operations sensors related to Turn specific equipment, systems, lights, etc. to "on," Turn specific equipment, systems, lights, etc. to "off," Turn specific equipment, systems, lights, etc. to "pause," Receive automatic software updates; energy levels sensors related to Remote Operations and Diagnostics Control (shadowing), Systems Integration-internal MODULE, and Systems Integration-external.

Electrical Power Distribution

Typical Distribution

As seen in FIG. 35 showing electricity grid distribution, the excess electrical power generated can be transferred to larger electrical utility grids 3501, 3502, 3503, 3504 as illustrated being placed on a roadside 3505.

Electric utilities harness solar electricity for distributed applications near substations or at the end of overloaded power lines, for example, to avoid or defer costly line upgrades. They use solar electricity during hot, sunny periods when the demand for air conditioning stretches conventional power generation to its limit. The Sacramento Municipal Utility District, for example, uses large solar electric arrays as part of its power generation mix. Utilities also rely on solar electricity to power remote, standalone monitoring systems.

Other Forms of Power Generation Grids

As shown in FIG. 36, a NASA-designed structure, called solar power satellites, will convert sunlight 24 hours per day, 7 days a week into electricity, then use weak, pollution-free, environmentally safe microwave beams to send that energy down to simple antennas anywhere on Earth. The antennas will convert the beams back into electricity and feed it into standard existing power grids at an extremely low cost. Example embodiments discussed below here on earth can supplement the space-generated electricity.

Portable Field Unit and System for the Generation of Electricity

Portable Energy Generation Station Embodiments for Rapid Deployment

Portable Field Units

The basic components of the fixed station embodiment can be reconfigured into a portable module that can be transported by a C-130 Cargo plane, a ship, a train, a truck, a trailer or a helicopter.

FIG. 37 illustrates a portable field unit 3701 that produces electricity (also for cooling) and/or heat from the sun 3703 upon the adjustable solar/photovoltaic panel 3702, The solar heat collector 3704 capturing and concentrating the sun's reflected energy 3705 heats the fluid contained in the center piping system moving it into the structure 3706.

A separate room 3707 contains the wind turbine electrical generation systems 3710 that receive the wind's energy through the venturi intake 3709. Usage is also application dependent in that modules can be configured 3708 for use as offices, communications, radar, kitchen, sleeping quarters, storage, command, hospital, voting, repair facilities, disaster relief, etc. Accommodations such as doors 3711, steps 3712, and windows 3713 can be designed into the portable module. Communications 3715 can be either wireless or hard-wired 3714.

In example embodiments where space is a premium, the wind system can be placed outside of the structure while the inside can be used for personnel activities, such as office(s), maintenance facilities, local population voting, communications, etc.

Modular Heat and Power System for Military Applications

FIG. 38 illustrates a portable field unit 3802 that is airlifted to its intended site by a helicopter 3801.

The basic module being configurable in a number of variations, can also be constructed as a self contained "office" for military operations, construction site offices, archeological "digs" and even portable voting sites.

Using transportation via truck, ship, cargo plane or helicopter, these self-contained modules can be transported to meet a variety of global applications, i.e., desert, Arctic/Antarctic, jungle, oil drilling rigs, etc. where power for energy, communication or to supply energy for human living conditions such as air conditioning, heat, etc. These modules can be linked into larger systems.

To accommodate the ease of transportation, the Solar/Wind unit is portable, lightweight and compact. It uses a unique method of the solar panels folding into a minimum of space to become either its own protective transportation container or as a folded system within a larger shipping container.

FIG. 39 illustrates an anticipated storage of seven folded solar modules stored aboard a C-130 Cargo plane.

FIG. 40 illustrates a bottom view relationship of the folded panels of the portable structure assembly with the various panels. The four solar panels are 4001, 4002, 4003, and 4004 and the two front panels with the doors 4005 and 4006 and the rear panels, 4007 and 4008 with the side panels, 4009 and 4010 and the two floors 4011 and 4012.

FIG. 40A shows multiple views and positions of the portable structure assembly as 40 AA-40AE.

FIG. 41 is an exploded view that illustrates the assembly of the folded and portable embodiment where all panels: four solar panels/roofs, six sides and two floors, are in either a folded (stored or for shipping) position or in some stage in between or when it becomes a fully erected structure because they are all hinged together as a foldable or expandable unit. The panels may be opened by a number of application-dependent methods such direct methods as, manually, a hand crank, hydraulically, electrically or using compressed air or indirectly using an available hoisting or crane device or a combination of methods.

The automatic example embodiments where each panel is semi-self-opening upon the activation of the system. The panels are movable in specific directions. It is opened at its hinges at solar panels 4002 & 4003 which drops the structure's front and rear sides (panels 4005, 4007 and 4006, 4008) toward the ground while panels 4010 and 4009 complete the other two sides of the structure and panels 4011 and 4012 become the floors, the system can be configured with self-leveling feature to provide a stable platform. Panels 4001 and 4004 are the two outer solar panels that may be fitted with an awning to provide protection from the sun.

FIG. 42 A illustrates the portable folding example embodiments when closing of the portable structure as the various panels in a full open position begin to fold. The two outer solar panels 4001 and 4004 are folded downward and the two floor panels, 4011 and 4012 folded upwards. This is also illustrated in a side view in 42D. In FIG. 42B the two outer solar panels 4001 and 4004 are folded against the two long vertical side walls 4009 and 4010 while the two floor panels are also folded against them. FIG. 42 E illustrates a side view of FIG. 42B the front panels 4005 and 4006 (panel 4005 not shown) and the rear panels 4007 and 4008C and D (panel 4007 not shown).

In FIG. 42C with the solar panels 4001, 4009, 4011 and 4012, 4010, 4004 folded together solar panels 4002 and 4003 (with front panels 4005 and 4006 and rear panels 4007 and 4008 (not shown) fold inward 4013.

FIG. 42F illustrates all of the panels in a folded position.

FIG. 42G is a photograph of a scale model.

FIG. 43A depicts example embodiments where the top 4206 and sides 4201, 4202, 4203, 4204 are adjustable solar panels that are hinged 4205. FIG. 43B illustrates the same panels in a folded position and the connecting hinge 4207. The underlying structure of walls and floors are not illustrated.

FIG. 44 shows the fully deployed solar/wind units with solar panel shade work area and operational quarters. Further, FIG. 44 illustrates the fully deployed structure as set up in a field where the solar panels (4402, 4403, 4404 and 4405) are positioned on the top of the structure 4401 to receive the sun's rays 4018. Access doors 4409 and 4410 to the interior of the structure allow for personnel, visitors, medical facilities, etc. to be set up in the field. Drop down canvas tarps 4406 and 4414 would allow work to be done outside in the shade 4412. Additional support 4407 and 4413 with support pads 4408 and 4411 may be used. In the event that the interior space is needed then the wind turbine 4415 and 4416 where the wind 4417 would turn the blades and in turn would turn an electrical generator (not shown) and would be strategically located outside of the structure.

FIG. 44A-A shows the opening sequence of the folded solar panel example embodiments 4419 with its hinges 4420. FIG. 44A-B shows the solar panel 4421 partially opening to a fully extended configuration with the hinges 4420 functioning as both a means of connecting the components together as well as for opening and closing the solar panels. FIG. 44A-C shows the solar panel assembly 4421 in its fully opened position and each solar panel assembly can be integrated through a series of connectors 4422. The set-up may be either a manual/semi-automatic or fully automatic portable module setup after the example embodiments have been transported to its operating site.

FIG. 44B depicts an inflatable balloon functioning as a flexing "muscle" to open the solar module. Further, FIG. 44B illustrates one of the methods that provides for an automatic setup of the solar-power modules where the use of inflatable "raft-like" gas-filled balloon(s), provide the means of automatic expansion of the solar panels into the fully erect position. The goal is to drop the unit via a C130 cargo plane or a helicopter onto the Earth's terrain i.e., desert, cities, suburbs, islands, truck beds, ships, jungles, earthquake relief area, disaster relief area, etc. or through a space vehicle or satellite dropping the power module onto another planet or moon-like satellite and the unit, once settled on the surface, begins to fully assemble itself so that it would begin to receive solar power for energy generation.

FIG. 44B-A illustrates the solar panel structure with locking mechanism 4424 for storage support with the addition of an inflatable tube structure 4423 in a closed folded position.

FIG. 44B-B illustrates the solar panel structure midway through the opening cycle where the balloon expands 4423 from being filled from an on-board cylinder (not shown) with gas i.e., Argon, Oxygen, Helium, etc. forcing the two side solar panels apart bringing the center hinge downward 4425 and the two other hinges are forced upwards (4426 & 4427) thereby dropping the side panels (4428 & 4429).

FIG. 44B-C illustrates the solar panel structure 4430 in a fully opened position where the balloon 4423 can be deflated if desired. The solar panel structure is now in the locked position as the hinges are self-locking. It is notable that the drop-down walls have been omitted for clarity.

FIG. 44C shown inflatable "legs and feet." To assist in the process of opening the portable module structure, the inflatable balloon in FIG. 44C-A illustrates the solar panel structure 4431 with extension legs 4432, also inflatable, and an area that serves as a base or "foot" 4433 for support of the structure while it is in the opening process. FIG. 44C-B is a side view.

Shown in FIG. 44D is rail example embodiments. FIG. 44D-A shows where the photovoltaic solar panels 4436 and structure 4434 are supported onto a wheel and rail assembly 4437 as an example and when the solar panels are moved outward 4439 (either manually, automatically or semi-automatically using either mechanical, hydraulic, electrical or a compressed gas means for power) and all of the solar panels would flatten into a horizontal position.

FIG. 44D-B illustrates an end view of the wheel and rail assembly where the wheel(s) 4435 are attached to the solar panel assembly 4434 by the wheel support assembly 4437 and the wheel's axle 4440 and the whole system rests or moves on a rail 4441.

The rail can also be used to transport the solar panels functioning as a "pallet." Multiple rails can be secured together during transit using a fastener or clip 4442 designed to hold the rails together as one unit.

FIG. 44E shows typical construction of the expandable solar panels. FIG. 44E-A illustrates the complete assembly contained within the outer frame 4443. FIG. 44E-B is an exploded view of a typical construction illustrating the top transparent/translucent protective layer 4444 of glass, bulletproof or bullet-retardant transparent material, plastic, either hard or pliable/flexible, etc; the photovoltaic cells 4445; the insulating filler such as, but not limited to Styrofoam, expandable Polyurethane, or a heat removal systems/material etc. 4446; protective backing sheet 4447 i.e. plastic, fiberglass, carbon fiber, etc.; 4448 embodiments with the inflatable balloon 4446 attached (fasteners, adhesives, etc.); and expandable gas 4447 (Argon, Helium, Oxygen, etc.).

There are times when electrical power is needed quickly for communications, for lighting, etc. Examples are the military, disaster relief, rural areas, camping, exploration, etc.

One of the portable embodiments shown in FIG. 44F is where the solar panels are contained within a folded structure (A) of "n" by "m" dimensions that can be quickly unfolded as in FIG. 44F-B when deployed in the field, plugged into an inverter (for AC current) and power is instantly generated for either immediate use or storage in rechargeable batteries for later use.

FIG. 44F-C illustrates the four-hinged 4455 solar panels 4450, 4451, 4452, 4453 in an open "spread-eagle" position where the hinged solar panels are hinged in the four sides of the center solar panel 4454.

Other embodiments may include solar panels hinged or linked end to end.

FIG. 44G shows unfolded solar panels. This embodiment provides a quick setup procedure and solar panel protection from the elements. It is portable and can be parachuted or delivered by a helicopter. The setup is rapid within 10 to 30 minutes or less.

The solar panels 4456, 4457, 4458, 4459 are affixed to heavy duty drawer slides 4466 (similar to office file cabinets or kitchen drawers) where each solar panel is pulled outward 4462 by its handle 4461 from different sides of the main structure 4465 revealing the solar photovoltaic array(s) 4460. The top solar panel 4463 can have a protective lid (not shown) for protection during transporting or adverse weather conditions. During adverse weather conditions, the panels can be easily secured by closing the solar panel "drawers."

The electrical unit 4464 accommodates power to any compatible electronic device.

This unit may be any convenient geometric shape, i.e. cylindrical, octagonal, spherical, etc.

Not illustrated are the support "feet" the inverted (inside of housing 4465), the rollup cable, the lifting hooks, various optional features such as: the system's controls ("On/Off" switch, lights, control panel, electrical output, electrical storage, etc.) rechargeable batteries and communications system.

FIG. 44H is a photograph of a scale model of the portable embodiment with both the wind and solar systems deployed. This figure shows a solar panel shaded work area and operational quarters.

Individual Solar Panels

Portable and/or Temporary Solar Panels

Most of the discussed example embodiments involve a fixed position solar panel or photovoltaic panels or are "transportable" such as the helicopter transporting a modular configuration. The generation of solar generated electricity can also be achieved through the use of portable photovoltaic panels 4501 as illustrated in FIG. 45 that has a means of lifting the solar panel(s) into position. Although lifting rings 4502 are illustrated, any other device used for lifting the panels, such as, but not limited to handles, hooks, etc. can be used which can also be used to link solar panels together, tie-down for restraints, etc.

The photovoltaic panels have a receptacle added 4503 to allow for a plug 4504 and cable 4505 to be linked to either other portable panels in a series, parallel, etc. energy regulators, or storage batteries, etc.

The applications are numerous and one example is illustrated as an artist's conception in FIG. 46A of the portable solar panels generating electricity for operations or storage when placed upon various containers 4603 being transported on ships 4601 on their journey across the oceans which might take many days of direct sunlight. Uncovered containers 4602 do not generate power.

Upon reaching port side, the panels can be removed and reused for another journey. Any residual power that has been generated and stored in the storage batteries can be used by the company as an extra source of revenue when it is resold to a power grid or private concern.

FIG. 46B is an enlargement of the area 4604 that shows the portable solar panels 4605 and the power cables 4606 that collect the generated electricity.

Energy Corridors
Other Applications

Being a modular unit, many other applications can be possible candidates for the embodiment(s) including use on aircraft carriers, trucks, boxcars, etc. anywhere auxiliary power is quickly needed.

Roadways can be Energy Corridors

This application anticipates that one of the major uses will be for systems to be installed alongside the unused land adjacent to highways, roadways and of course freeways to generate needed electrical energy.

Ships are exposed to both sunlight and wind, sunlight for about 10 to 12 hours per day and wind just about all of the time. The addition of the embodiment can provide the ship's owners with extra sources of revenue.

FIG. 47 illustrates an artist's conception where the modular configuration can be affixed to various locations on a ship. Illustrated is an aircraft carrier configuration 4701 where the system, depending upon the configuration, can supply solar heat 4702, solar electricity 4703, and wind powered electricity 4704, etc.

Solar Paneled Road Barriers

Example embodiments, with the addition of photovoltaic cell array panels can also utilize unused exterior areas adjacent to freeways and highways for the generation of electricity. To protect the photovoltaic cells from environmental damage, the photovoltaic cells 4802 can be protected with translucent glass or plastic such as, but not limited to etched glass, safety glass, Lexan®, etc.

FIG. 48 illustrates the highway barrier 4801 that functions as a counterweight to the solar panels 4802 that may utilize raised supports 4803. A male/female plug arrangement 4804 allows the barriers to be linked together.

Barriers

Example embodiments shown in FIG. 49 include the addition of photovoltaic cell array panels to the concrete (or water/sand filled) barriers 4901 where the solar panels can be affixed to the sides 4902 and 4904 and top 4903 of the concrete barrier 4901. FIG. 49C is a side view with the same callouts as in FIG. 49B with the addition of an optional restraining strap 4905. These solar panels would generate electricity which would be gathered and stored in a battery system, used locally or to resell to the electrical power grid.

Solar Powered Signage

The unused areas on top of freeway 5001 signage 5002 is an ideal location for the placement of solar panels 5003 as FIG. 50A illustrates. The solar panels are placed on top of the signage's structure 5004 and the resulting electricity is used to either power the signage, or to store for transmission for later use or to resell to a power grid.

FIGS. 50 B, C and D illustrate different configurations for mounting the solar panels 5003 above the signage 5002. FIG. 50D also illustrates the addition of lights 5005 for either illuminating the road and/or the adjacent signage.

Transmission Towers
Solar/Wind Transmission Towers

Another underutilized location is the area incorporating transmission towers. The higher elevations of the towers generate more wind and example embodiments take advantage of both the solar energy that radiates upon the tower as well as the passing wind's energy to turn electrical turbine generators. The energy generation module can be positioned at ground level or at any convenient point on the tower.

FIG. 51A illustrates the concept where the transmission tower 5101 has a module 5102 installed and the passing wind 5103 enters the system's ducting turning the internal turbines protected from the elements.

FIG. 51A also illustrates that all or part of the transmission tower can be clad in photovoltaic cells 5104 to generate additional electricity.

This additional electricity can be stored in batteries, sold to private enterprises, local farmers and ranchers or phased into the overhead wires and public power grids.

FIG. 51B also illustrates a module 5102 with a vent 5105 that is extended 5106 to catch the wind 5103 that might be blowing through the tower at higher levels where it enters the system and drives an internal turbine 5107 electrical generator and exits through ducting 5108 to the outside 5109.

FIGS. 51C, D, E and F illustrate different configurations in addition to FIG. 51B's extended ducting concept. FIG. 51C illustrates a bi-directional configuration allowing the wind to enter the system 5102 in two directions 5112 and it is within the state of the art to have a configuration with multiple points of wind entering the system, i.e. two or more ducts per side, one duct on each side, etc. Interior or exterior louvers direct the wind into the system and a venturi 5111 increase the square foot area for catching and increasing the wind's pressure as it enters the system.

FIG. 51D illustrates a venturi system 5111 for catching updrafts while FIGS. 51E & F illustrate a rotatable exterior duct 5113 & 5114 that would catch the wind from a vertical direction.

Detail of a Wind Vent

Various application and budget dependent configurations can be utilized for the capturing and increasing the pressure of the passing wind.

FIG. 52A illustrates an example of a three segment vent system 5201 that captures the passing wind 5202 that enters one of the three segments 5203 where it is channeled downwards 5204 through a "cone shaped" hole and downward through ducting to the electrical turbine generator 5205 & 5206.

Wind Gathering System

FIG. 52B illustrates a three segment vent system 5201 that captures the passing wind 5202 that enters one of the three segments 5203 where it is channeled downwards through one of the three "cone shaped" holes 5204 and downward through ducting to the electrical turbine generator.

FIG. 52C is a cross section that illustrates the outer housing 5201 with the wind entering 5202 hitting the back wall 5205 and being forced downward 5204 through a smaller cone-shaped opening creating a venturi effect as the wind's pressure 5206 is increased as it moves downward through the system's ducting and on to the electrical wind turbine generators.

Photovoltaic Wind Turbine Blades

One enhancement to the wind turbines is to coat the wind turbine blades with photovoltaic material that will produce additional solar-generated electricity as it rotates in the sun.

FIG. 53A illustrates a top view of the wind turbine blades 5301. FIG. 53B is a three-quarter view of the wind turbine blades 5301 with the sun shining upon the photovoltaic material on the turbine blades 5302 while FIG. 53C is a side view of the wind turbine blades 5301. FIG. 53D illustrates the wind turbine blade 5301 with the photovoltaic material applied to the edge 5302 and sides 5303. The solar generated electricity leaves the photovoltaic material via contact, brushes or wire leads 5304. The sunlight illuminates the photovoltaic material 5305.

Photovoltaic Covered Wind Turbine Generator Blades

Example embodiments shown in FIG. 53E include placing photovoltaic material, i.e., thin film, onto the surfaces of the turbine blades (as described in the previous section) and placing the turbine blade assembly 5301 in the center of a support mounted 5307 parabolic shape 5306 that has reflective interior surfaces allows for the sun 5310 to be reflected into the turning turbine blades that are pushed by the wind 5309 turning a shaft 5308 that turns a generator. A large hole (not illustrated) where the support shaft enters the parabolic assembly will allow rainwater, dew, debris such as leaves, etc. to fall to the ground.

Telephone Poles

The vertical area as illustrated in FIG. 54A 5401 of telephone poles is generally unused except for climbing to repair wires or equipment that are attached.

The use of one or more solar panels 5402 that contain photovoltaic cells can utilize this space to generate both electrical energy and become a source of revenue that is sold to public and/or private electrical power grids. Even the top area 5403 of the telephone pole can support a solar panel form of the example embodiments.

FIG. 54B illustrates a telephone pole 5401 that has four solar panels 5402 attached and FIG. 54C illustrates a telephone pole 5401 that has four solar panels 5402 attached with a protective hood 5304 and where one or more of the panels are hinged 5405 allowing one or more solar panel(s) 5402 to be opened for servicing of the inside components 5406 such as, but not limited to, the controlling electronics, the electrical power grid interface, diagnostic communication and performance, etc.

FIG. 54 D,E,F,G & H are examples of different configurations of solar panels that are mounted onto a telephone pole. The top view of a cross-section of the telephone pole 5401 in FIG. 54D illustrates a single panel 5402 mounted onto a telephone pole 5401 while FIG. 54E illustrates two separate panels on one side and the other on the opposite side. FIG. 54F illustrates a corner configuration being affixed on two side of the pole, while FIG. 54G illustrates three panels surrounding the pole. FIG. 54H illustrates four solar panels being affixed to the four sides of a telephone pole. The solar panels can be integrated into performing as a larger and larger system or network, Bridges, Causeways, Rail Sidings, Light Standards There are many suitable locations for the solar/wind modules and the following are some of the many examples of different configurations, i.e., bridges, causeways, rail sidings, light standards, etc. where the system can be used for the generation of electricity and be in remote or in little seen locations presently going to waste. Once installed, electricity can be generated and transferred to the operation of the bridge or causeway and/or sold to public and/or private electrical power grids, FIG. 55A is an artist's conception of a bridge/causeway 5501 and solar panels and/or wind turbine electrical generations systems and previously described herein 5502. FIGS. 55B, C, D, and E are examples of different types of bridges and causeways that can become sites for solar/wind electrical power systems. Although the illustrations depict the systems attached to one or more sides of the bridge structure, it is within the scope of the disclosure to include systems attached to the tops of the bridges to capture both sun and wind.

Alongside Railroad Tracks

Figure 56:
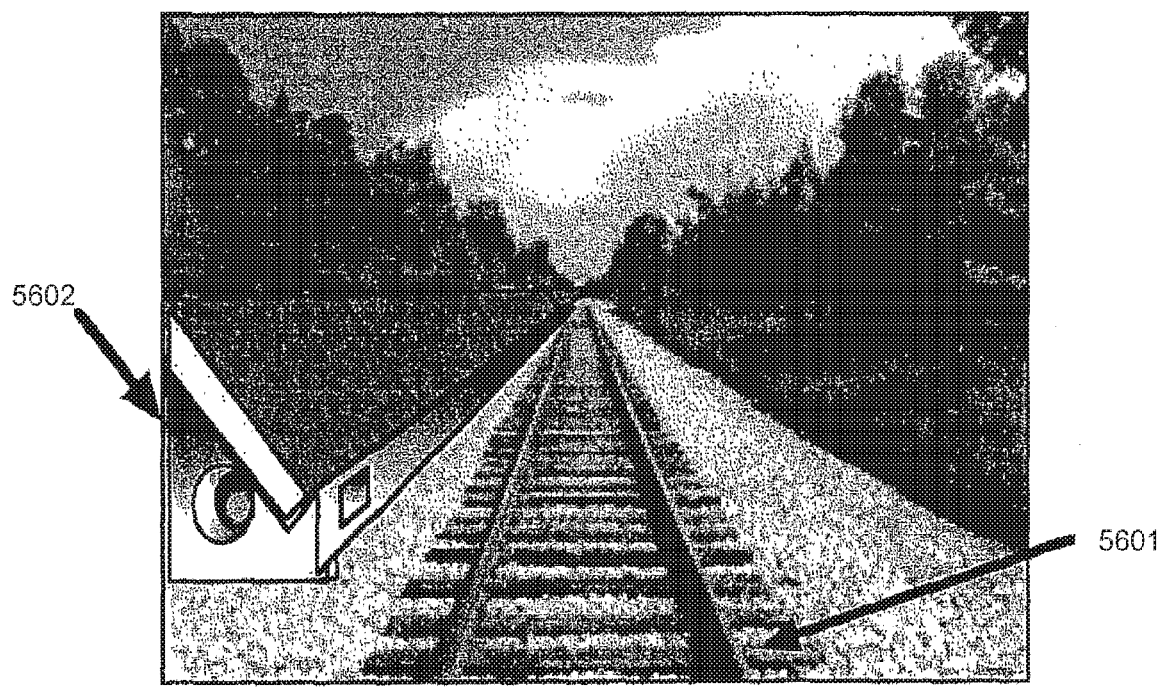
FIG. 56 depicts utilization of railroad track areas for electrical power generation.

The different configurations, as described herein, can also be placed alongside railroad tracks in un-utilized space that would provide solar and wind generated electricity for use and/or sale by the railroad or other commercial enterprise of the electrical power generated from miles of solar/wind generated systems. FIG. 56 illustrates an artist's conception of such an application where the solar/wind systems 5602 are placed alongside the railroad's tracks 5601.

Vertical Space: Light Standards and Chimneys, for Example

Figure 57A:
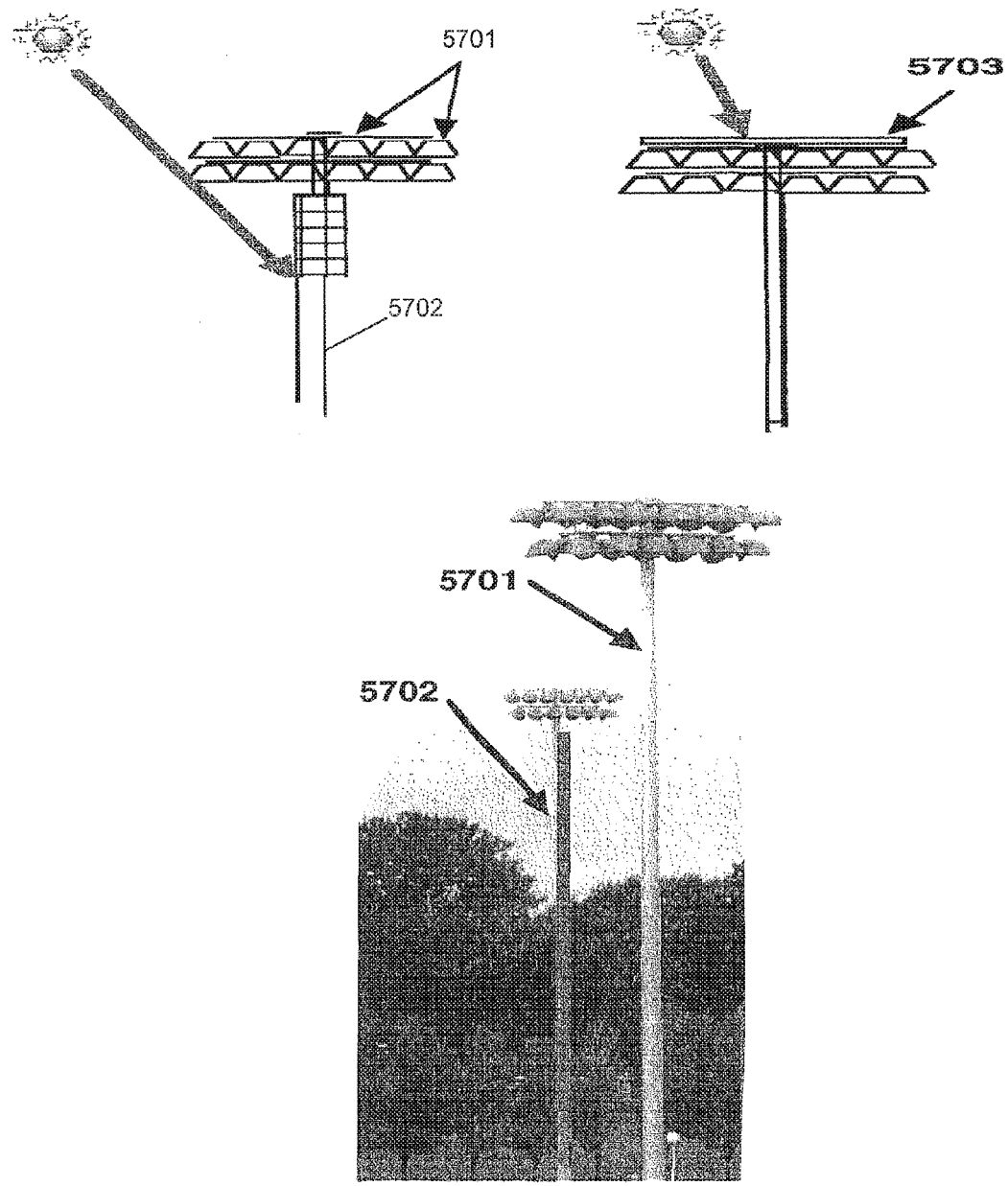
FIGS. 57A-D show utilization of vertical spaces for electrical power generation.

FIG. 57A illustrates a typical light standard 5701 without any system and 5702 with solar panels affixed to the side(s). The wind system is not illustrated.

Figure 57B:
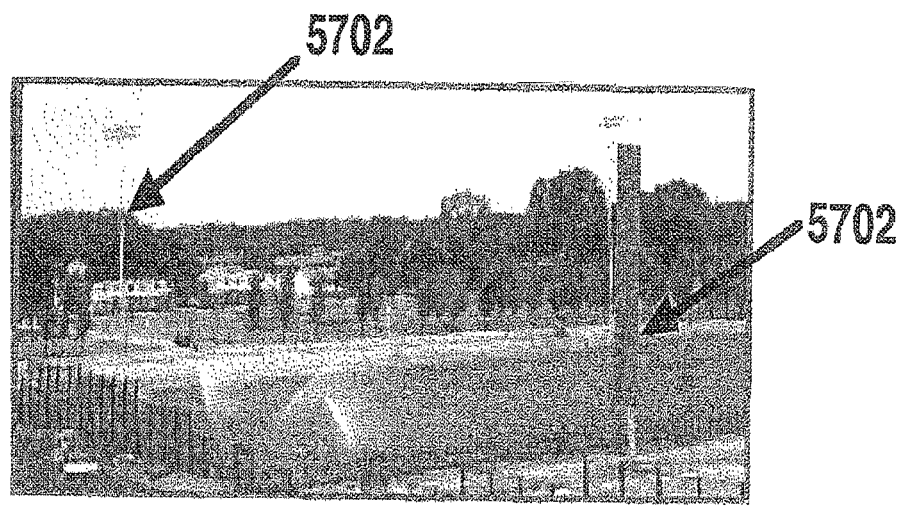

FIG. 57B illustrates a typical light standard 5701 without any system as a sporting event and 5702 with solar panels affixed to the side(s).

Figure 57C:
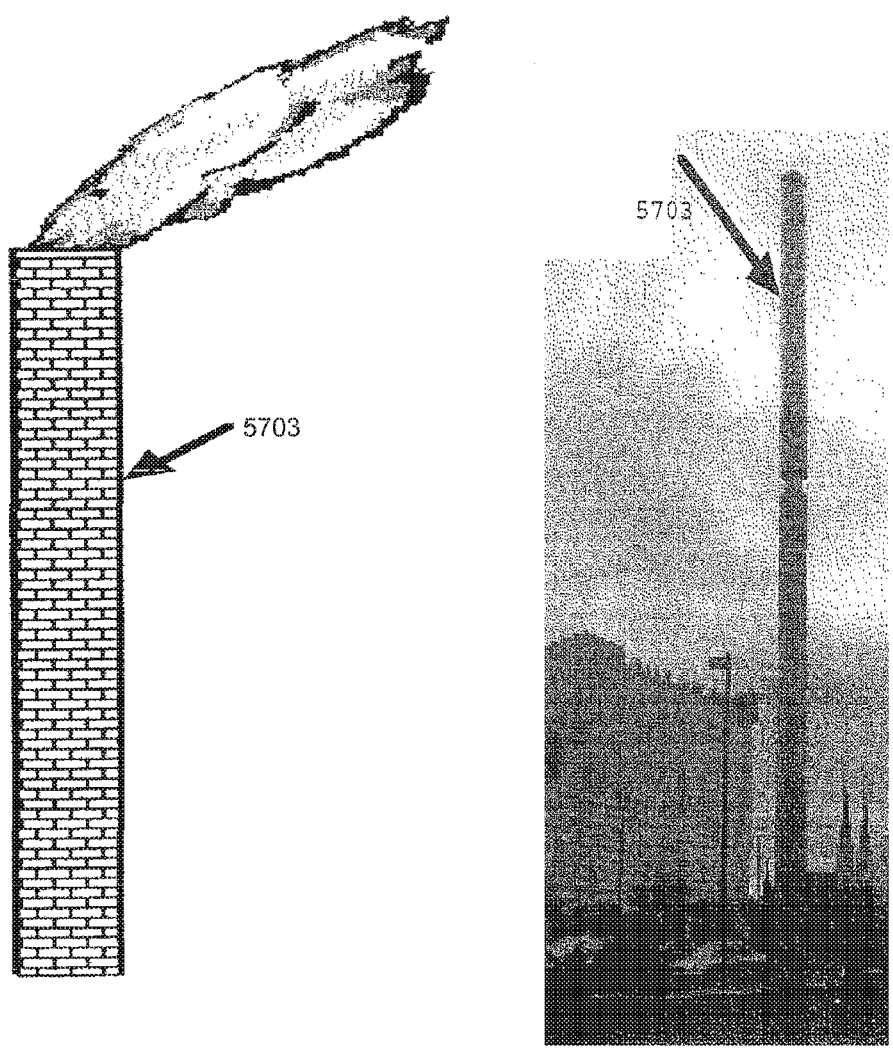
Figure 57D:
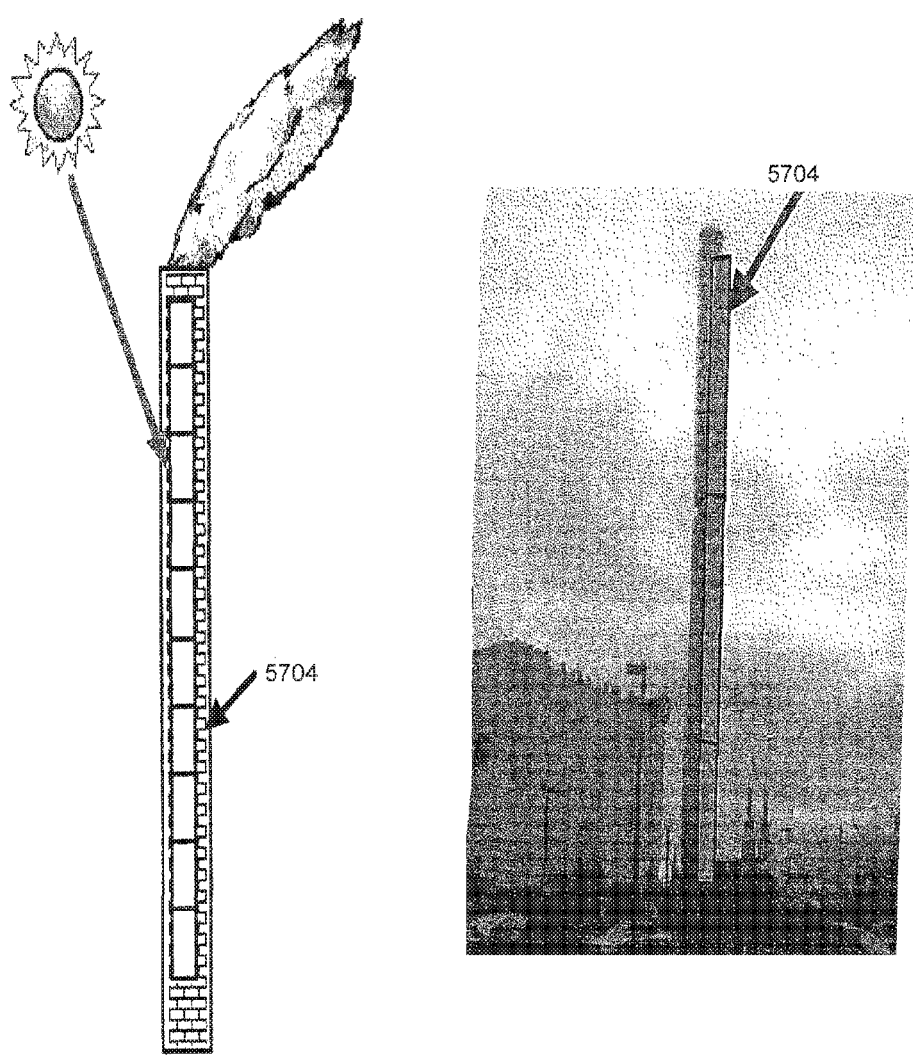

FIG. 57C illustrates a normal chimney 5703 while the same illustration in FIG. 57D for comparison purposes has an artist's conception of a vertical configuration of the example embodiments 5704.

Interior Solar Generation of Electricity

FIG. 58A illustrates an artist's conception for the use of flexible film solar photovoltaic cell 5802 where it is manufactured onto flexible roller 5801 window shade and used as a means of an apartment or home occupant to generate electricity for immediate use or if stored in a battery for later use. This configuration can be either manually operated 5804 or motorized with a remote control command system.

As a decorative application FIG. 58B illustrates that although the front side is facing outwards towards the sunlight, the backside/inside of the shade facing into the room can be made decorative 5803 to accommodate any decor.

FIG. 58C-a illustrates a cross section where the photovoltaic material 5802 receives the light source 5805 and is the only material used in the rollup shade while FIG. 58C-b illustrates a cross section where the photovoltaic material 5802 receives the light source 5805 and is combined with decorative material 5803 or color to enhance the inside of the room.

Solar Awnings

FIG. 59 shows the use of photovoltaic material to generate electricity from awnings where the awning consists of the photovoltaic material generating electricity from a light source/sun as well as for shade underneath.

Solar/Photovoltaic Window/Door Panes

Thin-film photovoltaic cells or material is capable of generating electric from a light source, such as the sun, and is also transparent. It can be used when either "sandwiched" between two panes of glass and used in windows and doors of a dwelling or used when affixed to a single pane of transparent material such as glass also used in windows and doors.

FIG. 60A illustrates a typical skylight and FIG. 59 illustrates typical windows and doors. FIG. 60B is a cutaway view of a double-paned window construction 6001 with the exterior glass pane 6002 facing the outside of the dwelling while the dwelling's interior glass pane 6003 protects the photovoltaic thin-transparent film 6004 that is sandwiched inside.

Solar and/or wind distribution of generated electricity

Rural communities, where each house is not linked to a main water distribution system like in a city, utilize a water storage tank distribution system where the water is pumped uphill, usually during the nighttime hours to a water storage tank, for example, and is stored until needed for distribution to the residences and businesses below.

Example embodiments include providing a structure over the water tank that generates electricity. These embodiments increase the revenue potential of the owner(s) of the water tank system as well as providing cheaper electricity for the same customers served by the water system Integrated System Embodiments FIG. 61A illustrates a typical water tank 6101.

FIG. 61B illustrates the solar photovoltaic panel(s) 6103 and structure 6102 suspended over the water tank 6101.

FIG. 61C illustrates a side view of FIG. 61B having the solar photovoltaic panel(s) 6103 and structure 6102 suspended over the water tank 6101.

FIG. 61D illustrates the solar photovoltaic panel(s) 6103 and structure 6102 suspended over the water tank 6101.

FIG. 61E illustrates the solar photovoltaic panel(s) 6103 and structure 6102 suspended over the water tank 6101 with an external wind electricity generation system 6104.

FIG. 61F illustrates the solar photovoltaic panel(s) 6103 and structure 6102 suspended over the water tank 6101 with an internal wind electricity generation system 6104 with the intake vent 6105.

FIG. 61G illustrates a modular configuration including the solar and wind example embodiment 6106 adjacent to the water tank system.

Note, this solar and/or wind system can also be an embodiment that is applicable to the water tanks on top of buildings that feed water to the tenants below.

Oftentimes, rural communities need electrical power brought into them from great distances and expense. This adds cost to their monthly power bills for decades thereafter.

Example embodiments provides the opportunity for a plurality of residences and commercial businesses to become self-sufficient and self-reliant by capturing the solar energy and the wind energy that is generally prevalent on the tops of hills and mountains and distributing it to the participants or stake holders.

FIG. 62 illustrates that the Solar/wind module can be located at the same location as the water storage tanks that distribute water to their participants.

FIG. 62A illustrates the current system for rural water distribution the water tank 6201 is situated on a hill top 6203 or an area higher than the target users of the water, and the water under pressure, flows (6202, 6204) to the houses below 6205. The cost of the system, tank, pipes, and water is shared by the users.

Using this water distribution system as a business model, example embodiments can do the same with electricity.

FIG. 62B illustrates a hill top 6203 having a water tank 6201 that has one or more solar panel array(s) 6206 supported over the water tank 6207 where the panel's photovoltaic process produces electricity which may be converted from DC to AC in the solar/wind panel controller and management system unit 6208 prior to being distributed (6202 & 6209) to the users 6205. The water lines 6204 are illustrated for reference.

The solar/wind panel controller and management system unit can be configured to integrate the solar/wind electricity and the water.

This system illustrates a single feed from the controller however, within the scope of this embodiment the controller can also be configured to feed separate users or customers with their own individual or separate power lines.

The controller can also monitor each customer's individual power usage for end-of month invoicing. The controller can be designed to incorporate a means of communication to its headquarters for monthly billing, customer name, and even diagnostics if there is a problem or shutdown or interruption of electrical power.

Trailer Embodiments

FIG. 63 illustrates the module 6301 can also be used to supply power, heat and cooling 6302 to those living in trailers 6303 or trailer parks, campgrounds, remote locations, etc.

Hostile Environment Embodiments

Hostile environments as shown in FIG. 64 are where humans need to live in order to survive as well as to work. Electricity is a critically needed component for survival, communications, environmental heating and/or cooling. This embodiment provides a quick means of obtaining that electricity.

Typical hostile environments are:

1. The moon or other planets, 2. Underwater repairs for off-shore oil drilling, bridge repair and construction, disaster exploration, etc., 3. Antarctica: research, exploration, maintenance, service and repair facilities, etc., 4. Digging for ore in mining shafts, etc., 5. Self-operating remote facilities, All of the above hostile environments require electricity for a number of survival conditions, for example, to power electronic and electrical devices, the recharging of batteries, communication, computers, operating machinery, etc. as well as for heating, and cooling. Oftentimes the logistical delivery of liquid-based fuel is not practical either on a short or long-term basis is not feasible or practical. In these situations, portable system embodiments may be ideal for continued operations.

While these hostile environments require both application and environmentally-dependent construction of the modules, i.e. waterproof for underwater, sealed for outer space, weather proofing for Antarctica, the same basic concept prevails and that is to supply the operation with electricity, heating and cooling if desirable.

FIG. 64 illustrates example embodiments for underwater operations where the module 6406 is floating inside a barge or floating device 6402 on the water 6415 and contains solar panels 6401, a solar collector (6403 and 6404) for heat and/or steam electrical generation, internal wind turbine electricity generation system 6405 an external wind turbine electricity generation system 6408 and an antenna 6407 to receive high-energy transmission such as solar energy (outer space-to-earth) or surface-to-surface of microwaves, radio waves, laser beams, etc. where the energy is collected or received and converted back into electricity. The area underwater 6416 contains the living quarters and work location for operating in this environment 6413 where the electricity, heat/cooling, communication and suspension are all linked (6409, 6410, 6411 and 6412) from the surface module platform to the submerged facility with 24/7 access to the inside via a high pressure environment.

Military Embodiments

The Military's use of electric power, particularly on the battlefield, is increasing.

The use of robotics in war has greatly expanded in the laboratories of Iraq and Afghanistan, from the variety of surveillance and de-mining contraptions to the hope for the soon deployment of mobile machine guns. The drone, an unmanned missile machine in the air, is the prime symbol.

Because the use of robotic and drone devices that require electrical power is on the increase, the use of a portable recharging station that is solar-based or a combination of solar and wind generated power is desirable for the recharging of electrical powered plethora of electrical/electronic devices used in, around, under or over the battlefield.

Examples of the new "stealthy" systems, such as, but not limited to electrically powered tanks, "Mules" designed to carry supplies to the troops, lasers, etc. will require frequent recharging of their rechargeable batteries.

These portable embodiments of charging stations will serve this need whether on land, underground, airborne, on water's surface or underwater.

The basic concept for the aquatic solar-powered recharging station is for the solar panels to open in order to receive the incoming light for electricity conversion and close so that they are protected from the harsh elements FIG. 65A illustrates the aquatic charging station module 6501 where the solar panels are in a closed position 6502 and above the waterline 6503 where the whole unit may be anchored to the ocean's bottom with a weight 6506 for example using a marine chain 6505. A plurality of strategically placed docking station(s) 6507 allow for manned and/or unmanned devices, weapons or vehicles to receive an electrical recharge of their batteries simply by "plugging" into the docking area.

FIG. 65B illustrates the solar panel 6502 positioned inside of the hinged 6510 folding support panel 6509. It is recognized that the photovoltaic solar panels may include custom-designed shapes for increased photovoltaic surfaces.

FIG. 65C illustrates the a cutaway view of View A-A with the target robot or manned vehicle "plugged" into the docking station 6507 which is underwater 6503. The communications and power are communicated at the time of docking (6512, 6513 & 6514).

Not shown in the illustration are the electronic: onboard communication systems, the automated docking systems, the external weather control sensors and systems, the available light analysis systems, the inverter systems, the rechargeable batteries, drive-panel motor(s), etc.

FIG. 66 shows an Aquatic Solar-Powered Recharging Station in an opened position.

FIG. 66A illustrates the aquatic charging station module 6601 where the solar panels are in an opened position 6602 and above the waterline 6603 where the whole unit may be anchored to the ocean's bottom with a weight 6606 for example using a marine chain 6605. Strategically placed docking station(s) 6604 allow for manned and/or unmanned devices, weapons or vehicles 6607 to receive an electrical recharge of their batteries simply by "plugging" into the docking area 6604. The protective cap/cover 6608 is attached to one of the solar panels and is activated and positioned by a small electrical motor, so that it is out of the way when opened or in a closed position when the solar panels are secured.

FIG. 66B illustrates the solar panels 6602 in a full-opened position.

FIG. 66C, D & E illustrates a variety of protective cap/cover embodiments that would be extended on the top of a pole 6609 from the main unit 6601 that would protect the solar panels 6602 from the elements and becoming a nesting location for wildlife.

FIG. 66D illustrates one cap-cover embodiments where the cover itself has solar photovoltaic cells 6610.

FIG. 66E illustrates another cap/cover embodiment where the cover is a sphere 6611 to reduce the likelihood of birds sitting on it.

FIG. 67 shows an example of a Helium-filled Balloon Embodiment for Solar-Powered Mid-Air Recharging.

Another embodiment of the solar-powered recharging station module would be for the recharging unit 6701 to be suspended in air, over the earth 6710 either by electrical/gas motors or solar powered motors or by a gas filled balloon such as Helium (6704 & 6705). The Sun's light 6703 would illuminate the solar panels 6702 converting the Sun's energy into electricity where it is stored in rechargeable batteries until needed. An airborne drone 6708 or robotic helicopter would be either manually/remotely flown to the recharging dock or be programmed to automatically seek, position and lock into the recharging station's docking port(s) (6706 & 6707).

On-board GPS (Global Positioning Satellite) would position the incoming drone or helicopter to the floating balloon. In the event the means of suspension is motor-driven then the program would coordinate the two units' location and position them for docking.

FIG. 68 shows an Air Tanker Electrical Recharging of Drones.

There are other embodiments of robotic or drone refueling and that is where the existing Air Force Tankers are modified to contain electricity in rechargeable batteries (that may or may not be generated solely by solar-power as they could be replenished in-flight with the aircraft's fuel power that is generating power of other of the plane's electrical components and assemblies. This illustrates the Air Tanker recharging a drone's batteries in mid-flight using a quick connect/disconnect cable.

FIG. 69 shows a Helicopter Electrical Recharging of Drones.

A drone that needs recharging of its batteries can also, using another embodiment, obtain electricity for a helicopter that is rushed to a secret rendezvous location. This may be done in mid-air or on the ground. The Helicopter has the option of recharging its batteries at a safe location using the solar-powered portable recharging station. In mid-air recharging situations, the drone would be positioned to plug into the extended docking station.

FIG. 70 shows Surface Power Source and Recharging of Robotic or Drone Systems.

Embodiments requiring the recharging of batteries using a solar-powered 7002 portable recharging station module 7001 can also contain the feature for quick manual plug-in 7004 using cables 7003 in the event that power is needed or other batteries need recharging.

Aquatic Solar Power Generation System

There is increased dependence upon electricity to power submersible vehicles and underwater activities such as, but not limited to, construction, maintenance, repair, servicing, inspection, etc. of: off-shore oil rigs, ships' hulls, etc, bridges, piers and pilings, etc. Thus, more and more humans conduct work, research and military operations that require their activities involving under or on the surface of water, i.e., oceans, lakes, etc.

The military conducts a range of underwater activities for frogmen, Navy Seals, exploration, mapping, mining, etc.

Another waterborne area is marine biological research where it is advantageous to live underwater for extended periods of time in order to save diving preparation, costs and time while minimizing the physical stresses upon a diver as they move from the normal surface pressure upon the body to the frequent trips to the depths of the ocean where the pressure against the human body is greatly increased.

This embodiment is directed toward supplying electrical power for recharging aquatic devices for activities that take place either on the water's surface or underwater.

FIG. 71 shows an Aquatic Power Recharging Module-Surface Example Embodiment

FIG. 71A illustrates an aquatic recharging power module that floats in the water 7104 with a dome 7102 that covers the module's housing 7103 protecting the photovoltaic solar panels 7101 from the constant sea spray that could cover the solar panels with "ringlets" from drops of dried water, salt deposits carried in the air by the wind and breezes, bird droppings, etc.

The protective dome 7102 may be made of a transparent plastic, such as Mylar® or Lexan® or even a translucent form of plastic, such as vinyl, that provides a soft luminescent glow inside the dome.

Electric powered submersibles 7105 can dock 7106 at the Aquatic Power Recharging Module and recharge their batteries either by a direct plug-in of the vehicle into the charging station or by a receptacle plug and cable 7116. Communications or energy transmission i.e., in the form of microwaves, etc. to 7111 or from 7110 the recharging station can be handled by an antenna 7106.

Scuba divers 7112 can also recharge their electronic equipment, such as lights, tools, weapons, electronics, etc.

All electrical connections are designed for waterproof and safety from electrical shock.

In example embodiments a parabolic dish is strategically mounted (which itself can be contained within a plastic or canvas dome (not shown) that can send 7111 and receive 7110 digital and/or analog communication signals.

In a modification of the antenna, the parabolic dish can transmit or receive microwave or radio wave forms of energy for conversion to electricity.

FIG. 71B illustrates the addition of a wind turbine system (7113 & 7114), as previously described herein, that would supply electrical power to the rechargeable batteries located below 7115 the dome 7102 in the module's chassis.

FIG. 72 shows example Submersible Solar Power Station Embodiments.

There are many advantages to living within underwater habitats as they provide a living space for divers while working longer hours underwater. FIG. 72A illustrates an underwater (7209 & 7210) habitat 7202 that may be resting on the ocean's floor or suspended/tethered above it.

The module contains increased air pressure 7203 preventing the water from flooding into the living space. A porthole 7204 provides a view. The divers 7207 swim up into or exit from the living quarters/chamber 7208. Various electric-powered vehicles 7206 or hand-held devices (7205 & 7206) can be recharged as needed.

The example embodiments include the dome 7201, in a retracted and secured position, that covers the solar photovoltaic panel and would consist of a transparent or translucent material suitable to withstand the anticipated depth of the habitat.

FIG. 72B is an underwater photograph taken looking upwards showing that sunlight does penetrate the upper layers of water just below the surface. This is important in the event covert operations are in progress and anything that penetrates the water's surface might be discovered. Although the available sunlight is reduced when it reaches the submerged solar panels, various techniques can be employed to increase the sunlight's energy to produce sufficient photovoltaic electricity. Techniques such as using a magnifying lens, more sensitive photovoltaic solar cells, additional use of infra-red radiation, etc. can be used to generate electricity in underwater systems.

FIG. 72C illustrates the underwater habitat with the solar panel protective dome 7201 module (extended) to the water's surface 7209. Communications and the transfer of electricity generated by the photovoltaic modules can be transferred down to the submerged habitat via cable(s) 7212 that is operated by a motorized winch system 7213 for example, that would raise or lower the solar panel module. The divers 7207 & 7208 can recharge their equipment at or near the water's surface.

FIG. 72D illustrates an underwater covert operation of a robotic vehicle and diver.

Portable Solar Electricity Generation Systems

The need for electricity in areas not readily served by an electrical grid system is critical to human survival in our modern age. Whenever a major disaster occurs, relief areas need to generate electricity in order to power the basic devices of life, such as, refrigeration, water pumping, illumination, power for repair tools, medical devices, communications, etc.

Even the military has new uses for electricity in emerging applications in the areas of warfare, reconnaissance, defense systems using robotics, manned and unmanned weapons, drones, humanoids, the "electronic" warrior, quiet electric tanks and "mules," devices that "walk" up a variety of terrains carrying about 300 pounds of a soldier's supplies. Even the need for more electricity for communications and to power and recharge more and more electronic devices, is an increasing requirement and oftentimes a critical necessity.

What all of these devices and systems have in common is an urgent need for electricity. Electricity is needed in a remote area(s) to recharge the devices and/or system's batteries, quickly, without having to string miles of wires, which can be brought down by terrorists, without convoys of trucks supplying and re-supplying the front lines with heavy drums of stored explosive fuel dumps for noisy, fuel-consuming generators.

What is needed is "Instant Electricity Generation™ anytime, anywhere, 24 hours per day, 7 days a week ("24/7") and in the form of systems that can be easily setup in the field within approximately an hour of its arrival and that it begins to generate usable electricity for direct usage or for recharging batteries or other electrical storage devices.

The integration of the embodiments described herein, using specially built trucks that generate, convert and store electricity from readily available natural resources, such as sunlight and wind power.

Once the system is deployed, these embodiments provide examples of portable, mobile, transportable and/or drivable forms of generating instant electricity . . . directly from sunlight or other available light source(s). With the addition of a wind turbine system embodiment, the available wind currents will also generate electricity to recharge needed systems.

Military Applications

As the military develops more and more devices dependent upon electricity, the first need is to bring the power generation process to the field applications instead of these electrical weapon systems, i.e., electric vehicles or other electronic/electrical devices, to the rear areas for electrical recharging of their batteries. Portable and mobile energy re-supply systems keep the military's resources advancing, therefore, continuing the pressure on the enemy.

The second need for electricity is to provide electrical power for the daily living conditions in the support areas, such as, illumination, medical devices, powering tools, electronic surveillance systems, etc.

To accomplish this, example embodiments provide a completely mobile system that includes: (1) the main vehicle-mounted solar and/or wind electrical generation unit capable of operation 24/7, (2) A plurality of mobile Electricity Supply Vehicles that carry rechargeable batteries to the electrical needs of the battlefield. These Electricity Supply Vehicles may be manned, robotic or remotely controlled.

The portability features of these embodiments enhances the immediate availability of electricity (without stringing miles of wire cables or transporting and storage of flammable fuels to drive generators) to: Rural areas, to a disaster area such as earthquakes, tornado, flood, etc. to provide quick setup and relief and to Provide the Military's new generation of electrical powered weapons, either at the front lines (in order to keep them going forward in an attack mode) or when they are being serviced in the safety of a rear position.

FIG. 73 shows Portable and Extendable Solar Panels in a Military Application.

Energy Generation Units

FIG. 73A shows that when the Energy Generation Unit vehicle arrives at a safe location site, i.e., a safe distance from a battlefield, the crew begins to set up/extend the solar panels, which may be hydraulically, electrically or manually powered 7302. In these example embodiments, the two lower solar panels (7301 & 7308) raise into an upright position, two more solar panels (7307 & 7303) are also extended 7306 from the first two panels (7301 & 7308) hydraulically, electrically or manually powered system(s).

The sun 7304 (or other light source) illuminates the photovoltaic cells of the solar panels generating direct current that is used either as Direct Current (DC) or it flows to an inverter and is converted to Alternating Current (AC) which is stored in the vehicle's rechargeable batteries 7305.

Energy Supply Vehicles

As a part of the energy delivery system specially-built all terrain, Energy Supply Vehicles, may be built. In one configuration the Energy Supply Vehicles may be constructed similar to a tank without the weapons and gun turret, and depending upon the terrain, they may have tank tracks, wheels for land, be amphibious for water operations such as landing craft or even have aquatic versions (above or submersible) and are configured with a plurality of rechargeable storage batteries. In aquatic embodiments the rechargeable energy may be obtained from ships at sea, special buoys anchored or floating in the water.

The major purpose of Energy Supply Vehicles, being smaller vehicles than the Energy Generation Unit/vehicle shown in 73B is to 7311 & 7315 transport 7312 the energy (electricity) generated and stored in the Energy Generation Unit/vehicle's rechargeable batteries 7305 into the Energy Supply Vehicle's rechargeable storage batteries 7316 which, in turn is transported 7312 to the electric vehicles and/or devices 7314 seen for example in 73C needing the electricity in other parts of the remote and/or hostile area(s) 7313.

Energy Supply Vehicles of course may be manually driven. However, newer technologies enable the Energy Supply Vehicles to be remotely guided-even software self-driven (robotic) or remotely guided to its destination(s) depending upon the system requirements for navigating the terrain. They may also incorporate (GPS) Global Positioning System and related device(s) for position/destination determination along with electro-optical vision systems for digital "sight" vision software.

When the Energy Supply Vehicle(s) having delivered the stored electricity to the energy-depleted target, returns or retraces its path back to the Energy Generation Unit and recharge batteries, thereby repeating the process as often as necessary.

Other Applications

The Energy Supply Vehicles may also carry other non-electrical supplies, such as food, water, medical supplies, ammunition, etc. in addition to the needed electricity.

As mentioned, the basic vehicle can be a modified tank without the armament or even a "Ripsaw™" vehicle for fast delivery of energy to where it is needed. (The Ripsaw MS1 is an unmanned tank that can exceed sixty miles per hour and easily climbs 3-foot concrete barriers, among other obstacles. The Ripsaw MS1 is an unmanned ground vehicle built by two brothers in Maine. In its current form, it has a 2000-pound capacity, which opens the possibility [for many different types of rechargeable batteries] as well as carrying weapon systems. The Ripsaw could potentially be used in any application normally reserved for a tank.

FIG. 73B illustrates the basic concept of one embodiment for the portable generation of electricity where the Energy Generation Unit a tractor/truck 7319 for example, that pulls the trailer 7321 containing the solar panels in a stored position for traveling 7320 including inside an air transport cargo plane such as a C-130 or helicopter.

FIG. 73C illustrates one such electrically driven robotic vehicle.

FIG. 73D shows an Energy Supply Vehicle 7315 that is configured to carry an plurality of rechargeable batteries 7316 that transfer its stored electricity to/from the rechargeable batteries or other such electricity storage device, through receptacles 7317 and cables 7318.

FIG. 73E shows a truck/tractor and trailer example embodiment 7301 that has been configured with solar panels on the top surfaces 7302 that receive energy from a light source, i.e., the sun 7303 and the ability to process wind either from a stationary position or when traveling. When the vehicle is in motion, the onrushing wind caused by the vehicle's forward motion 7304 flows around the vehicle and is caught by deflectors 7307 and directed into the wind duct 7305 venturi and wind turbine generation system located inside the trailer. When the trailer is parked in a position favorable to catching the wind 7306 and/or its telescopic 7309 vertical axis wind turbine blade assembly 7310 which is extended in order to capture the wind that is passing at a higher level. The electricity generated is stored in rechargeable batteries of the Energy Conversion & Storage System. All systems operations are monitored and the data is sent to the driver located in the cab. Further data can be transferred to headquarters.

FIG. 74 shows a Side View of the Vehicle—with Mounted Solar Panels in Stowed and Extended Positions.

FIG. 74 illustrates example embodiments of a side view of the trailer 7401 portion of the Energy Generation Unit with a plurality of the solar panels 7402 and the wind turbine 7405 in a horizontal stowed position where the wind turbine support pole 7404 is resting in its support cradle 7406 & 7407 that also doubles as the solar panel's lockdown 7406 and are secured in its solar panel storage housing assembly 7403.

Illustrated is the counter-weight 7410 example embodiment including the electrical generator and electronic control systems where the support pole, pivoted at a support bracket 7408 & 7409 swings downward into a vertical position. Note: the pivot point may be at either end of 7408. An inverter 7413, rechargeable batteries 7411 and cable connection receptacles 7412 are located under the trailer's bed 7401.

FIG. 75 shows a Front End View of the Vehicle—with Mounted Solar Panels in Stowed and Extended Positions.

FIG. 75 illustrates a front view of the Energy Generation Unit 7511 with the solar panels 7501 and 7502 having been fully extended 7507 from their retracted position(s) on their respective guide rails 7506 and illuminated by a light source, which in this application is the sun 7508. The central solar panel 7503 is on top of the solar panel protective and storage assembly structure.

The panels may require a support system 7515 to relieve the weight's stress on the guide rails or for long duration(s) of usage. The wind turbine 7510 is shown in a horizontal stowed position. On the other side of the trailer, the solar panels 7504 and 7505 are partially being moved into position while the sun or other source of illumination 7509 activates the photovoltaic solar panels. For reference purposes the tires 7512 the electrical receptacles 7513 and the various rechargeable batteries 7514 are illustrated.

FIG. 76 illustrates a cutaway drawing of telescoping solar panels. In particular, FIG. 76 shows the "telescoping" of two or more solar panels 7601 (similar to a kitchen drawer or a file cabinet drawer) where the inner panel(s) 7603 are free to move 7604 into, a stored position, and out of its support housing 7602 when it is in an extended position.

FIG. 77 illustrates a side view of the Energy generation Unit 7701 with the solar panels in a stowed position 7708 and the wind turbine 7702 in an erect position having pivoted 7704 vertically. The wind turbine assembly is held in place with guide wires 7705 that are secured into the ground 7707 and the turbine electricity generator 7706 may also be secured into the ground, either manually or by automatic screws.

FIG. 78 illustrates a side view of the Energy Generation Unit 7801 with the wind turbine assembly 7804 in an erect position 7806 having been pivoted at its hinge 7805 and telescopically raised 7807. In this example embodiment the turbine generator 7808 is located under the bed of trailer 7801. The solar panels are stored 7802 and locked 7803 in their traveling position.

FIG. 78A additionally shows portable and extendable solar panels in a military application. 7809 shows solar panels in an extended position. 7810 shows solar panels in a folded position. 7811 is a wind turbine in a folded position. Additionally, a variety of manned or robotic energy delivery vehicles 7812 may be included.

FIG. 78B additionally shows further example embodiments of portable and extendable solar panels in a military application. The wind turbine 7802 is in an erect position and the solar panels are in an extended position 7809. Furthermore, a variety of manned or robotic energy delivery vehicles are included 7812. A solar panel arranged vertically 7813 on an additional truck is shown in the background.

FIG. 79 shows a Top view of the vehicle with mounted solar panels 7901-7905 in an extended position with the wind turbine in the vertical position 7907 and the smaller solar panel 7906 on the roof of the truck/tractor 7908.

FIG. 80 is a top view of the Energy Generation Unit with solar extended panels 8001, 8002, 8004 and 8005 (solar panel 8003 may be stationary) and its trailer 8008 with its solar panels extended into the horizontal position and with a plurality of with stabilization legs 8010 and 8011 extended 8007 to support the wind turbine assembly 8009. The solar panel on the roof of the cab is also shown 8006.

FIG. 81 is a side view of the vehicle 8101 with the solar panels in a stowed position and with extended 8106 stabilization leg(s) 8104 and support assembly 8102 and 8103. As an optional configuration, a vertical adjustable support 8107 and 8108 can be added to the leg in order to add support to the solar panels when they are in the extended position. The support assembly can be stowed in a secure position 8108.

Further example embodiments including the example shown in FIG. 81A includes the use of vehicle-mounted accordion-style folding solar panels that provide more surface area per vehicle.

FIG. 81A illustrates the use of vehicle-mounted 8109 accordion-style folding solar panels stowed for transportation that includes the left side solar panel assembly 8110 and the right side solar panel assembly 8111.

FIG. 81B illustrates the use of vehicle-mounted 8109 accordion-style folding solar panels in an extended position that includes the left side solar panel assembly 8110 moving into position and the right side solar panel assembly 8111 fully extended. Optional vertical supports 8112 may be used.

Further example embodiments to the portable vehicle energy generation include the use of a parabolic mirror/solar panel(s) seen in FIGS. 82A-82E. This configuration may be limited in its diameter by the width dimensions of the vehicle and/or its trailer. To increase the size of the parabolic mirror, the folding of the total assembly is a solution to this problem.

These example embodiments include constructing the solar parabolic photovoltaic array system (or any other application-dependent shape) mirror or panel to fold into itself. This is accomplished in FIG. 82A which illustrates the extended position where one section of the assembly is slightly smaller 8202 and the other being slightly larger 8201. FIG. 82B illustrates the two sections 8203 and 8404 that pivot 8205 and fold (or "nest") within each other, FIG. 82C illustrates the two sections 8207 and 8208 in the nested position.

FIG. 82D illustrates the truck and trailer configuration 8211 where the sections are secured in a nested position 8209 for transportation purposes while FIG. 82E illustrates the system in an extended position 8210. FIG. 82F shows another configuration where the solar panel(s) are hinged at the top of a truck/trailer. The right side shows the solar panel folded and the left side is extended in to its operating position.

These solar assemblies can be fixed into a permanent position where they just rotate in a closed or extended position or they can also be mounted on a motorized universal ball joint assembly to allow for the tracing of the sun's changing positions. This may also be enhanced using a GPS system for determination of the vehicle on the earth's surface and calculation of the sun's position. This may also be accomplished using various light sensors that determine the sun's solar radiation intensity.

Another example embodiment shown in FIG. 83A-83C includes interleaved solar panels, similar in construction to a vegetable strainer. FIG. 83A illustrates a partially opened position of the solar panels, FIG. 83B illustrates the solar panels fully opened and FIG. 83C illustrates the solar panels in a closed position.

Another embodiment illustrated in FIG. 84A includes portable/transportable solar panels using a fan-like 8401 configuration that radiates from a central point 8402 holding assembly while FIG. 84B illustrates the tilting 8404 of the assembly from the vertical position 8405 for better positioning towards the sun 8403 or other light source.

Further example embodiments of the transportable solar panels shown in FIG. 85 includes the attachment of photovoltaic solar panels 8502 onto various roofs of vehicles, such as, but not limited to military 8501 or emergency type vehicles. Various forms of protective coverings are available such as soft coverings such as canvas or hard covering such as metal or any suitable plastic. The solar photovoltaic panels can also be covered with a camouflage pattern. The vehicles of course would have all of the other necessary compatible assemblies of the example embodiments, such as, but not limited to, rechargeable batteries, inverter, microprocessor based control systems, etc.

Inflatable Solar Panels

As thin-film (light-sensitive) or solar paints that function as photovoltaic cells become more efficient, various applications using these technologies can be incorporated and are in keeping with the embodiments as described herein for both fixed station and portable energy generation systems. FIG. 86A illustrates the rear view of a truck and trailer 8601 that is configured to both generate and deliver electrical power in the field. The trailer has been modified with a rack structure 8602 with a plurality of inflatable solar panels that are stowed 8604 for transportation (may be deflated or inflated depending upon the available space), a solar paneled roof 8603 that covers and protects from the elements the other solar panels while the right side of the trailer depicts the solar panels 8605 in an inflated 8606 and extended 8607 position.

FIG. 86B illustrates an embodiment where the inflatable panels have inflatable vertical supports 8608 to keep them in a horizontal position.

FIG. 86C illustrates an embodiment where the inflatable panels are supported by an extended (or swing) arm 8607 that supports a plurality of rollers or rings 8609 (like a shower curtain or drapes) capable of traveling along the extended arm where they support 8610 the inflatable solar panels.

FIG. 86D illustrates an embodiment where the swing arm 8611 for various reasons is shorter that that shown in FIG. 86C and the inflatable panels are opened in an accordion fashion 8612.

FIG. 87A illustrates an embodiment where the inflatable panels are extended using a plurality of wheels 8713 that is extended or retracted using either cables and a winch configuration and an optional ramp 8714.

FIG. 87B illustrates an embodiment where the inflatable panels 8715 are manually placed upon the ground and connected to each other 8716 and they in turn are connected into the trailer's electrical storage or other rechargeable batteries 8717.

FIG. 87C illustrates a top view of a vehicle (truck and trailer) 8718 with the trailer being covered with a solar panel 8720 and two supporting "arms" that pivot 8719 on the left side in a closed position and on the right side 8721 in an opened position where the photovoltaic/light sensitive assembly is attached on a flexible material such as, but not limited to vinyl or fabric which is exposed to a light source such as the Sun.

Utility Vehicles

FIG. 88A shows a Utility Vehicle 8801 such as a Cushman™ or an electrical golf cart that functions as a platform for the transportation of electricity generation using solar panels 8802.

FIG. 88B shows a Utility Vehicle 8801 that functions as a platform for the transportation of electricity generation using two solar panels 8803 and/or wind power 8804 (either a vertical or a horizontal axis turbine fan (not shown) or a propeller-driven configuration).

FIG. 88C shows a Utility Vehicle that functions as a platform for the transportation of electricity generation using four solar panels 8805-8808 locked into position and/or wind power.

Inflatable Wind Turbine and Blades

Keeping within the various embodiments of this document is an embodiment that provides for an inflatable turbine fan.

Wind turbines are designed to exploit wind energy. A wind turbine installation consists of subsystems to catch the wind's energy, point the turbine into the wind, convert mechanical rotation into electrical power, and systems to start, stop, and control the turbine and its activity.

Many energy generation applications require both portability and the need to produce electrical energy locally, in order to power various types of devices that require electricity such as: instrumentation, illumination, heat, cooling, communications, security, etc.

Up to this point, turbine fans are made of various metals such as steel, aluminum etc. These are too heavy and bulky to take on a hike, mountain climbing, or for military applications to name a few examples.

Thus, example embodiments include making the turbine fan out of material other than metal(s) and making it compact, foldable, lightweight yet still functional.

Example embodiments incorporate the use of an inflatable turbine and blades that can be deflated and folded for ease of transportation, for example different sizes such as:

Small versions of the inflatable turbine blade assembly for backpacks, hiking, mountain climbing, expeditions, etc.

Medium versions of the inflatable turbine blade assembly for SUV transportation, camping, etc. space exploration on other planets, etc.

Large versions of the inflatable turbine blade assembly for truck mounted wind/electrical generation applications for disaster relief, C-130/helicopter transportation, military field operations, etc.

MATERIAL: The turbine blades and associated components are made of an expandable material, such as, but not limited to vinyl, rubber, synthetic rubber, etc. constructed in such a manner as to contain the pressure of the internal gas creating an expandable form.

INTERNAL GAS: The embodiment is inflatable with any form of air, gas (oxygen, nitrogen, helium, etc.) that may be available.

SHAPE: The inflatable shape of the turbine blade assembly can be any suitable manufacturability shape capable of containing the internal gas with sufficient rigidity so that the incoming wind exerting pressure against the plurality of turbine blades will rotate it.

CONFIGURATIONS: The inflatable shape of the turbine blade assembly can be any geometric shape, such as, but not limited to:

Vertical turbine blade assembly,
Horizontal turbine blade assembly,
Cylindrical turbine blade assembly
Spherical turbine blade assembly
Spiral turbine blade assembly.

CHARACTERISTICS: The inflatable shape of the turbine blade assembly can be any shape that can fit the following criteria:
Foldable,
Collapsible,
Expandable,
Gas/Air-filled,
Gas-expelled, (for re-folding)
Rotatable.

FIG. 89 illustrates one type of example embodiment, a gas-filled (inflated) vertical turbine blade assembly where the incoming wind 8901 and 8902 exerts pressure upon the plurality of turbine blades 8903 and 8906 causing the turbine blade assembly to rotate 8904. The top 8905 and bottom 8907 end caps may be either inflatable as part of the turbine blade assembly or it may be a separate unit that also may be made of an inflatable or solid material. The whole assembly is suspended upon a support 8908 with bearings (not shown) that allow for an internal rotating axle 8909 that in turn drives the electrical generator.

FIG. 90 illustrates a cross-section of one type of example embodiment, a gas-filled (inflated) vertical turbine blade assembly made of a non-porous material such as vinyl 9001, for example, with a plurality of turbine blades 9002 that either have been formed as part of a larger assembly or attached 9003 using an adhesive glue, chemical(s) or "welded" as individual turbine blades and a plurality of slots that accommodate the attachment of the turbine blades and to facilitate the flow of the unit's internal gas 9004 into each turbine blade 9002. The external gas 9006 is inserted into the turbine blade housing assembly through an attached valve assembly 9005.

FIG. 91 illustrates the body of an inflatable turbine blade 9102 as one type of embodiment that also illustrates the surrounding tab 9101 for attachment to the main support of the turbine assembly for attachment i.e., gluing, etc.

View A-A in FIG. 91 illustrates a cross-section of one type of embodiment, a gas-filled 9106 (inflated) vertical turbine blade 9103 assembly that is made of a flexible vinyl and attached through a slit 9105 in the material 9104.

FIG. 92 illustrates a cylindrical embodiment 9201 as constructed prior to assembly of the inflatable turbine blades with slots 9202 in the material that correspond to the plurality of turbine blades and where the slots allow for the internal gas pressure to expand into the various turbine blades. Also shown is the gas intake valve 9203 that allows gas to inflate the turbine blades and support housing.

FIG. 93 illustrates one method of the construction of an inflatable turbine blade.

FIG. 93A illustrates an exploded view of the inflatable turbine blade 9301 with the end caps 9302 and 9303 fold lines and attachment tabs 9304-9407.

FIG. 93B illustrates an orthographic view of the inflatable turbine blade material 9301 prior to folding with the attachment tabs 9302-9305.

FIG. 94A illustrates another embodiment using a spherical type of construction seen as 9401. FIG. 94B illustrates one section 9401 of the sphere positioned on the "X", "Y" and "Z" axis and where the turbine blade 9402 is illustrated traveling from the top (i.e., "North Pole") to the "equator".

Types of Inflatable Turbine Assembly Construction

FIG. 95 illustrates a variety of embodiments and the typical construction, such as the example of a turbine assembly's core collapsible 9504 turbine blade support cylinder or housing shown in FIG. 95A (shown without the attached or molded turbine blades) where the core's frame 9501 includes a wire support that may be any application-dependent shape, i.e., circles/rings or including a spiral. This frame is then covered with a non-porous material capable of sustaining a gas under pressure for extended periods of time. This inflatable gas enters through an air valve 9503 and top 9502 and bottom 9505 end caps give it further rigidity.

FIG. 95B illustrates another form of construction of a collapsible turbine blade assembly that is made of a non-porous material that forms both the turbine blades and the core housing where the body 9506 is designed to incorporate a plurality of turbine blades 9508 that have a material on their sides 9507 that also becomes a barrier for the pressurized gas. The assembly has end caps 9511 and 9512 and is supported by a bearing 9509 on a rotatable shaft 9510 that turns the electrical generator to produce electricity.

FIG. 95C illustrates another form of construction of a collapsible turbine blade assembly where the individual segment containing 5 turbine blades 9513 for example, might be made as a wire frame. This configuration, of course, can have a plurality of turbine blades. The area for the pressurized gas 9514 is illustrated to indicate where the pressurized gas would be located. FIG. 95D illustrates the next phase where a plurality of wire frames (or frames if made of other materials) would be positioned on top of each other 9515 and covered with the non-porous material that binds them together. This is illustrated in FIG. 95E where the frame 9516 is covered by the non-porous material 9517.

Turbine Blade Erection/Assembly:

INFLATE: There are a number of methods of inflating the turbine blade assembly, such as, but not limited to: human lung power, foot powered air pump, hand powered air pump, cylinder with compressed gas or gasses, motorized air compressor, electrical air pump, etc.

DEFLATE: To deflate the turbine blade housing and assembly the simple positioning of the valve into an open position will release the internally trapped gas allowing for collapsing and/or folding of the turbine assembly.

OTHER INFLATABLE COMPONENTS: Other components may also be inflatable such as a wind tunnel and a venturi.

MISCELLANEOUS: The supporting rods can be made of carbon fibers and telescopic to conserve space.

A plurality of inflatable turbine blades can be integrated into a portable power grid for localized usage and storage of electricity.

The inflatable turbine blade assembly can be combined with flexible solar photovoltaic cells, affixed to or part of a surface such as, but not limited to: fabric, rubber, thin films voltaic, etc. to produce additional electrical energy.

Individual/Personal Solar Electricity Generator

Oftentimes when an individual is in the field, electricity is needed to power electronic devices needed for heating, boiling water, etc.

Thin-film solar photovoltaic cells are improving their efficiency and because of their flexibility can be conveniently stored for backpack transportation. FIG. 96A illustrates a personal solar electricity generator made of thin-film photovoltaic cells 9602 that can be rolled for storage in a tube and unrolled for use 9603. The generated electricity (DC) is captured from the sun or other light source 9607 and through a plug 9604 and cable 9605 goes to an external inverter 9606 (which may be housed internally within the storage tube) where it is changed into Alternating Current (AC) then on to either storage batteries or to power an application.

FIG. 96B illustrates a personal solar electricity generator made of thin-film photovoltaic cells in the shape of a pyramid illustrating the four sides of the pyramid's base while FIG. 96C illustrates the device capturing the sun's energy 9608 and sending the Direct Current to an inverter where it is changed into Alternating Current (AC) then on to either storage batteries or to power an application.

Building Solar and Wind Turbine Generator System

Further example embodiments include the wind turbine(s) turning either by the external wind or expelling a building's exhaust gasses or heat. This rotation can be captured using a generator that converts the rotation into electrical energy. FIG. 97 illustrates the basic concept of the wind turbine's 9701 shaft 9702 mounted onto an electricity generator 9703 for the production of electricity for applications in either buildings or residential applications. The system's controls 9704 monitor the flow of energy to and from the storage batteries, power grid, etc. via a cable/power link 9705. A plurality of turbine generator assemblies 9706 and 9707 can be integrated either in series or parallel configurations.

Because the rotation of the wind turbine fluctuates, the electricity generated also fluctuates. To smooth out these fluctuations the addition of solar panels in a number of embodiments will add more energy to the combined system, especially during the daylight hours when humans going about their daily activity need the peak usage. A number of solar panel embodiments using various geometric shapes can be configured in tandem, as previously described herein, with the turbine blade assembly and some examples are illustrated below. Further, a number of turbine generation embodiments can be made, i.e., vertical wind turbines, horizontal wind turbines, etc. in addition to the spherical wind turbine configuration.

FIG. 98A illustrates an external view of the wind turbine 9801 electricity generator system without the solar panel additions. As the wind 9803 pushes against the turbine's blades, the turbine assembly rotates 9802. The complete system is mounted onto the roof of the building and held in place with metal flashing 9805 and fasteners 9804.

FIG. 98B illustrates an external view of the wind turbine electricity generator system with the solar photovoltaic panel addition 9806, which allows for water, moisture and drainage.

FIG. 98C illustrates an external view of the wind turbine electricity generator system with the solar photovoltaic panel addition 9808 surrounding the base (in an apron configuration) of the turbine assembly.

FIG. 98D illustrates an external view of the wind turbine electricity generator system with the solar photovoltaic panel addition 9809 surrounding the turbine assembly (in a hat-like configuration) of the turbine assembly.

FIG. 99 illustrates a separate solar photovoltaic panel 9904 addition to the turbine generator assembly 9901, both mounted onto a roof 9905 for example, where the wind 9902 turning the turbine generates electricity that goes to either the rechargeable storage batteries 9903 or to a power grid 9908 (either the public utility power grid or a local power grid used within the building or residential facility). Simultaneously, the sunlight 9906 illuminates the solar photovoltaic panel(s) 9904 generating Direct Current (DC) which is sent to the inverter 9907 changing the Direct Current into Alternating Current (AC) where generated electricity goes either to the rechargeable storage batteries 9903 or to a power grid (either the public utility power grid or a local power grid used within the building or residential facility).

Solar panel for vehicle dashboard and rear window

As an example of generating and supplying electricity while in the field, a military vehicle can be configured to incorporate solar panels inside the vehicle specifically on the dashboard as seen in FIG. 100A and the rear window areas in FIG. 100B.

FIG. 100A illustrates the vehicle's front window 10001 (windshield) with a plurality of photovoltaic cells 10005 placed upon the surface of the dashboard 10003 and in front of the steering wheel 10002. The sunlight or other light source 10004 entering the vehicle's window activates the photovoltaic process generating electricity. (Connections not shown). Other areas on the vehicle can also be used to accommodate solar panels such as, but not limited to: the roof, hood, fenders, etc.

FIG. 100B illustrates the vehicle's rear window 10006 where the sunlight or other light source 10007 entering the vehicle's rear window activates the photovoltaic process on the photovoltaic panel(s) 10008 generating electricity that is collected and flows through the cable 10009 and 10010 to the energy rechargeable storage battery for later discharge or usage. Similar embodiments would be applied to the vehicle's side windows. In this embodiment the solar photovoltaic panels can be flexible, where they roll up and down as needed or they are linked to open and close in an accordion or "Venetian blind" manner.

FIG. 101A illustrates a transparent drawing of example embodiments where the turbine blade assembly 10102 is positioned on top of bearings and is contained within a rotatable 10104 housing or shroud 10101 that has a vane 10105 positioned in such a way as to force the shroud assembly to rotate 10104 in either direction from the pressure of the wind 10103. The rotatable shroud housing assembly always turns with the changing direction of the wind 10107 allowing the changing direction of the wind to enter the intake 10106 which in turn travels into the turbine blade wind chamber applying increased pressure upon one side of the each of the rotating turbine blades which in turn rotates upon its axle 10108 that turns the wind generator (not shown) producing electricity.

This is better illustrated in the cross section View A-A in FIG. 101B where the rotatable shroud housing 10101 accommodates the incoming wind 10107 that enters the system intake 10106 and is channeled 10109 using a venturi effect to increase the pressure into the turbine blade assembly chamber forcing 10105 the turbine blade assembly 10104 to rotate. The exhausted air 10110 exits the turbine blade assembly chamber through an opening 10111. A governor assembly (not shown) might be incorporated into the system if the shroud is spinning out of control due to high and erratic winds. The direction of the housing can also be controlled using a motorized system to turn the housing into the proper position for the wind to enter the turbine blade chamber.

FIG. 102A depicts a turbine blade assembly 10202 which is partially enclosed with a cover or shroud 10201 minimizing the wind's power against incoming turbine blades. FIG. 102B illustrates a side view of the cover/shroud 10201 and turbine assembly 10202 which is mounted onto a rotating shaft 10203.

Figure 103:
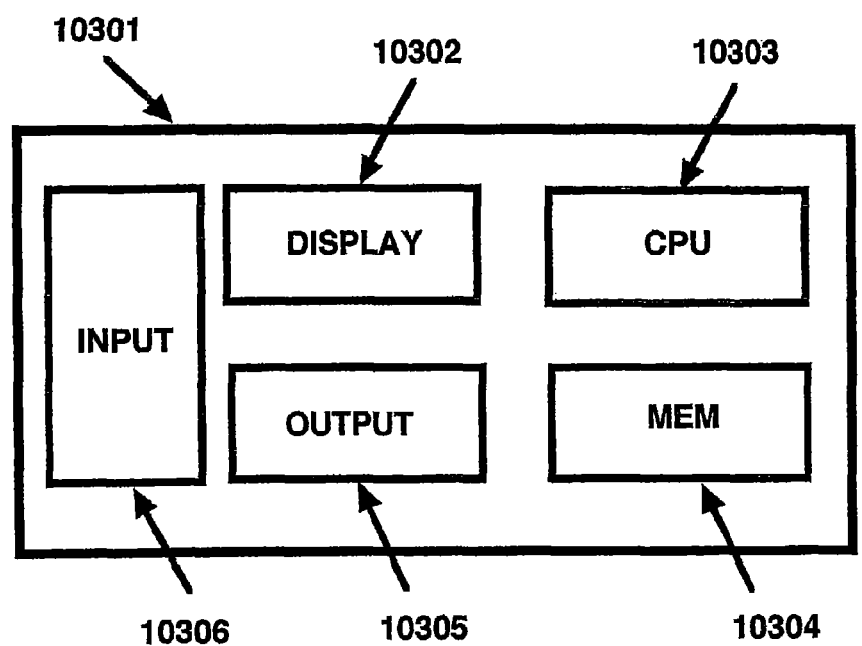

The embodiments of this Application may be controlled by a computer as is shown in FIG. 103. This figure shows a computer which enables interaction to operate any of the software and control systems discussed in the application. A user may utilize a computer 10301 similar to that which is shown in FIG. 103. The computer 10301 shown in FIG. 103 may include a display 10302, and includes a processing unit, 10303, memory 10304, and an input device 10305.

The system of FIG. 103 includes non-transitory permanent or removable computer readable storage, such as magnetic and optical discs, RAM, ROM, etc. on which the process and data structures of the embodiments can be stored and distributed. The processes can also be distributed via, for example, downloading over a network such as the Internet.

Different Configurations of Example Embodiments

Power Management System

It is anticipated that different model configurations of the embodiments will be added from time to time and may include different configurations of the basic system that will need to function in a coordinated manner. These may be a Local Area Network, such as might be found on a battlefield consisting of a few facilities or a Wide Area Network as might be found when the systems are installed in a disaster scenario.

To compensate for this situation and need for different configurations of example embodiments to be integrated into a larger system in order to provide electricity where it is needed, will require a Power Management System that functions like a "traffic cop" coordinating the various demands for electricity with the available power being generated and with the types (A.C. or D.C./12 volt, 24, volt, etc.) and the amount of energy being stored at any given point in time.

FIG. 104 shows a Local Area Network of the example embodiments' portable systems of various facilities incorporating the solar panels for electricity generation and various configurations of portable wind turbine structures. FIG. 104A is a horizontal wind turbine generator 10402 with its two supporting structures 10401. FIG. 104B illustrates a vertical wind turbine 10403 and a single support structure 10404. FIG. 104C shows a horizontal turbine blade assembly 10405 supported by a single support 10406. FIG. 104D shows a turbine blade horizontal turbine blade assembly 10409 supported by a single overhead support 10408.

FIG. 104E illustrates a Water Treatment, Processing and Sanitation facility application 10413 while FIG. 104F shows a command facility with four wind turbines in combination with full solar panel array 10412 and FIG. 104G illustrates a hospital on the system with two wind turbines in combination with full solar panel array 10411 for energy generation.

Also, the area that requires still more power being generated, can create an adjacent turbine wind farm 10410 and even incorporate additional solar panels 10414 dispersed between the wind turbine assemblies. FIG. 104J shows a horizontal wind turbine configuration 10415. These diverse configurations with their different forms of power generation, and shifting demands for energy require an electronic Energy Management System 10417. FIG. 104K shows a three vertical axis turbine configuration operating a portable module for Computers & Communications.

Modern Three-Bladed Wind Turbine

Turbines used in wind farms for commercial production of electric power are usually three-bladed and pointed into the wind by computer-controlled motors. These have high tip speeds of over 320 km/h (200 miles per hour), high efficiency, and low torque ripple, which contribute to good reliability. The blades are usually colored light gray to blend in with the clouds and range in length from 20 to 40 meters (65 to 130 ft) or more. The tubular steel towers range from 60 to 90 meters (200 to 300 feet) tall. The blades rotate at 10-22 revolutions per minute. At 22 rotations per minute the tip speed exceeds 300 ft per second. A gearbox is commonly used to step up the speed of the generator, although designs may also use direct drive of an annular generator. Some models operate at constant speed, but variable-speed turbines, which use a solid-state power converter to interface to the transmission system, can collect more energy. All turbines are equipped with shutdown features to avoid damage at high wind speeds.

Advantages of the Three-Blade Wind Turbine

Variable blade pitch, which gives the turbine blades the optimum angle of attack. Allowing the angle of attack to be remotely adjusted gives greater control, so the turbine collects the maximum amount of wind energy for the time of day and season.

The tall tower base allows access to stronger wind in sites with wind shear. In some wind shear sites, the wind speed can increase by 20% and the power output can increase by 34% for every 10 meters in elevation.

Such an example system has high efficiency, since the blades always move perpendicular to the wind, receiving power through the whole rotation. In contrast, all vertical axis wind turbines, and most proposed airborne wind turbine designs, involve various types of reciprocating actions, requiring airfoil surfaces to backtrack against the wind for part of the cycle. Backtracking against the wind leads to inherently lower efficiency.

The face of a horizontal axis blade is struck by the wind at a consistent angle regardless of the position in its rotation. This results in a consistent lateral wind loading over the course of a rotation, reducing vibration and audible noise coupled to the tower or mount.

Disadvantages of the Three-Blade Wind Turbine

The tall towers and blades up to 45 meters long are difficult to transport. Transportation can now amount to 20% of equipment costs.

Tall Horizontal axis wind turbines (HAWTs) are difficult to install, needing very tall and expensive cranes and skilled operators.

Massive tower construction is required to support the heavy blades, gearbox, and generator.

Reflections from tall HAWTs may affect side lobes of radar installations creating signal clutter, although filtering can suppress it.

Their height makes them obtrusively visible across large areas, disrupting the appearance of the landscape and sometimes creating local opposition.

Downwind variants suffer from fatigue and structural failure caused by turbulence when a blade passes through the tower's wind shadow (for this reason, the majority of HAWTs use an upwind design, with the rotor facing the wind in front of the tower).

HAWTs require an additional yaw control mechanism to turn the blades and nacelle toward the wind.

In order to minimize fatigue loads due to wake turbulence, wind turbines are usually sited a distance of 5 rotor diameters away from each other, but the spacing depends on the manufacturer and the turbine model.

Existing or New Large Wind Turbines

The example embodiments described herein may also be integrated into existing wind turbine farms such as the one in San Gorgonio, Calif. near Palm Springs as shown in FIG. 105A where large turbine generators made by companies such as General Electric, are positioned over the surface of the land with a large amount of space between them to enable each turbine generator to have enough air flow sufficient to turn the three propellers or rotor blades that are positioned 30 to 40 feet in the air supported by steel towers embedded into 25 foot deep concrete pad. The tips of the rotor blades move at speeds estimated at 200 RPM.

The land space between the turbine generators towers is calculated at a distance of 5 rotor diameters apart and this unused land is generally going to waste.

FIG. 105B illustrates a typical large three-rotor blade wind generation system. These are among the largest wind turbines in the world towering 200 to 300 feet in height. The propellers move at 20 to 25 RPM.

FIG. 105C shows an artist's conception for the use of this unused land by installing solar panels 10502 between the existing wind turbine generators 10501. The energy converted into electricity by the solar panels is transferred 10503 to the Energy Conversion & Storage system 10504 of the embodiment via a network of cables 10505 and is eventually sent to the direct user application(s) or the utility grid for immediate use.

The solar panels in the illustration are depicted to be flat, but as illustrated in the next FIG. 106, a variety of solar panel configurations may be constructed and in keeping with example embodiments.

Different Embodiments

In FIG. 106A, The photovoltaic solar panels shown are curved or arced 10604 (like a Quonset hut) located among the turbine generators 10605 and may be constructed of any convenient and advantageous geometric configuration either fixed/stationary position or even with motorized or mechanical means for tracing/tracking the sun's daily path 10601 across the sky for better direct light source 10602. They would of course not interfere with the flow of wind into the propellers 10603. Smaller turbine fan generators 10606 may also be implemented in keeping with the embodiments to capture the wind at lower levels or even the after wash of air generated from the larger turning turbine fans operating in the region. The area under the solar panels 10607 may be used for growing crops, storage, shelter, etc.

FIG. 106B illustrates another stationary solar panel configuration of a top and two side solar panels 10608 while Figures C and D illustrate the sun or other energy source illuminating the solar panels (arrows) in a 45-degree angle for example. The solar panels may be positioned in any of the three axes of "x", "y" and "z" for better strategic access to the light source as well as being mobile for solar tracking configurations.

Giant Wind Turbines

The prop or rotor blade wash of air emanating from the large rotor blade's rotational movement from the larger wind turbines populating a wind farm, can be used to drive smaller wind turbines as described in example embodiments. They can also integrate solar generation of electricity for continuous operation as previously described herein.

FIG. 107A illustrates a front view of a wind turbine base 10706 having a supporting vertical pole 10705 with a propeller 10702 rotating circle or area of travel 10703. Mounted below the rotating propeller's area of travel is another example embodiment of a plurality of smaller wind turbines 10701 and 10709 assemblies mounted onto the vertical pole with a clamp or supporting structure 10704.

As the large propeller is turned by the wind, the propeller's prop wash 10708, the flow of air generated from the propeller's rotation 10707 also drives 10710 and 10713 the plurality of smaller wind turbines supported underneath on the main propeller support structure or they may even be located in the adjacent areas that are subject to the propeller's prop wash of air. The base of the structure is generally a large and deep cement pad 10712

The smaller wind turbines could also be integrated to the surrounding solar panels as described herein providing the generation of continuous energy 60/24/7™ or in some locations 60/60/24/7™ (602/24/7)™.

FIG. 107B illustrates a top view of the large wind turbine 10701 showing the positions of the smaller wind turbines embodiments 10702 and 10703 mounted onto supporting structures 10706 which in turn are secured onto the vertical tower 10704 of the supporting structure 10706 positioned away from the propeller blades 10705 to accept the maximum air flow generated from the propeller's prop wash.

In the event that the weight of the smaller wind turbines causes the tower to become unstable or to produce a strange torque, three small turbine systems may be used in a triangular position. (Not illustrated).

Existing Solar Panel Installations Supplemented with Wind Generated Electricity

Owners of buildings with solar panels already in place can supplement their electricity generated from the solar panels by using the wind system(s) example embodiments described herein.

FIG. 108 shows another example of the versatility of the example embodiments including a wind turbine embodiment 10801 supplementing existing solar panels 10802 already positioned on a building's 10805 rooftop 10803. As the sun's light 10804 illuminates the existing solar panels producing electricity, a portion of the stored excess electricity activates the wind turbine's fail-safe system at nighttime and when there is no available sun or anytime during the day when the wind is below predetermined levels. The Fail-Safe system would allow electricity to be generated 24/7 for peak nighttime demands or on cloudy days when the solar panels may be producing less than the desired amount of electricity.

The Fail-Safe Subassembly

FIG. 109A is a flow diagram of the normal operation where there is sufficient sunlight during the peak daytime hours to generate electricity through the photovoltaic effect as well as sufficient wind to turn the turbines so that they can generate electricity. Note that the Fail-Safe system 10901 is not operating because there is sufficient external energy for normal operations of the example embodiments.

FIG. 109B is a flow diagram illustrating the interaction between the two subsystems, i.e., the Solar Energy Generation & Storage Subsystem 10901 and the Wind Energy Generation & Storage Subsystem 10902 specifically when there is no wind or less wind, the motion sensor 10904 will activate the Fail-Safe system because it will detect the change in the turbine's rotary RPM motion, i.e., turning slower, and will activate the Fail-Safe subsystem's auxiliary turbine motor 10905 to increase the speed 10906 of the turbine generator 10903 so that it will operate the wind turbine 10907 adequately to continue to produce usable electricity.

In this situation, the motion sensor 10904 system includes an interior motion sensor, to detect the RPM speed of the rotating turbine, and an exterior motion sensor that detects the wind's force or pressure on the exterior of the example embodiments.

The lack of movement in the turbine generation subassembly 10907 "alerts" the Fail-Safe auxiliary motor system 10905 to turn on its motor (either an A/C/motor or a D.C. motor) that activates the turbine generation subassembly to again produce electricity. When the wind speed is again sufficient, the exterior wind motion sensor verifies that the wind is blowing and can take over the turbine generation assembly so that it is operating at its normal speed, and turns off the Fail-Safe auxiliary motor system. This changeover between the wind and the stored power can occur many times per hour and is specifically wind-dependent.

Unlike either an individual solar panel installation generating electricity which is limited to the daylight hours or the various wind based systems for generating electricity, these example embodiments include a system that by combining the two forms of clean/natural electricity generation into one integrated system using the previously stored power generated from either the solar or wind electrical storage enables the total system to operate in a continuous manner generating electricity when there is no sun nor any wind.

The Fail-Safe system activates the auxiliary motor 10903 so that it turns the turbine blades generating electricity as if there were sufficient wind. When the wind picks up turning the turbine blades, speed sensor(s) 10905 notify the Fail-Safe system to turn off. The Fail-Safe system can be designed to use either a motor that operates on D.C./Direct Current 10906 or a motor that uses A.C./Alternating Current 10907. If the D.C. motor were used, it would draw its power from the solar system's battery or energy storage system 10908. As an alternative, it could also draw power from the wind system's D.C./Direct Current energy storage system 10909.

If an A.C./Alternating Current motor 10910 is used, the Fail-Safe system would draw power from its batteries or energy storage system which is in D.C./Direct Current 10911. The electricity goes through a converter 10912 changing the D.C./Direct Current to A.C./Alternating Current which would then operate the turbine auxiliary drive motor 10913 which is turning the turbine subassembly generating electricity as if the wind were pushing against the turbine blades.

This process of supplementing power generated from the solar side of the example embodiments controls the erratic and fickle wind pressure needed to drive a turbine system for steady generation of electricity. As an option, the batteries or energy storage system periodically transmits its energy from the solar battery to the wind turbine's battery system, i.e. a trickle charge to maintain the electrical storage at a predetermined level.

Photovoltaic Covered Turbine Blades

Wind turbine blades systems are generally located outside and in windy and sunny areas.

Another feature of the example embodiments includes incorporates the wind turbines located in sunny areas so that the sunlight illuminating the turbine blades containing photovoltaic cells strategically mounted onto the various surface(s) of the turbine blades will generate additional electricity as they turn. Electricity that can be used for storage, usage, applications, utility grid or in the Fail-Safe system that will turn the wind turbines assemblies.

Electricity can be used in the Fail-Safe system to turn the Wind Turbine Generation system when there is little or no available wind keeping the flow of erratic wind driven electricity being produced at a constant current flow rate. Thus, the example embodiments provide a means to generate both wind and solar electricity from the same unit.

FIG. 110 illustrates an individual turbine blade assembly 11001 that is generally exposed to the outside weather conditions including the forces of the wind 11002 and the sun 11003, covered with photovoltaic material (cells) 11004 on a plurality of sides 11005 and 11006 that is generally exposed to the outside weather conditions including the sun. The turbine blade illustrated is angled 11007 for a more secure positioning from its rotating centrifugal forces when mounted onto the main rotor shaft during its rotation. Electrical contacts 11008 transfer the electricity generated by the photovoltaic cells to the battery or other energy storage system(s) or direct to the end application(s).

To protect the photovoltaic material from rain, for example, the entire turbine blade assembly can be encased in a clear plastic 11009 (allowing the light to illuminate the photovoltaic cells) that may be either manually formed, injection molded, dipped or even encased using blister pack technologies. Further, the clear plastic can incorporate UV inhibitors that would extend its durable life under the ultra-violet rays of the sun.

The Locking of the Turbine Blades into the Central Rotating Shaft

The individual turbine blades may be mounted in a number of ways including being molded or welded onto the rotating shaft, with fasteners such as screws, or with locking inserts. Of the various means of attaching the turbine blades to the rotating shaft, the interlocking feature illustrated is the safest to counter long-term centrifugal forces due to rotation as well as the easiest to assemble and remove in the need for servicing.

FIG. 111A shows the rotating shaft 11101 with the turbine blade locking notches 11103 and the turbine blades inserted 11102 into the locking ring/shaft.

FIG. 111B shows the detail of a turbine blade 11105 with the matching locking area 11104 and a top panel of solar cells 11106 and the photovoltaic cells' electrical contacts 11107.

Reflective Solar Concentrator of the Photovoltaic-Covered Turbine Blades

There is a need to increase the available light that is received by the rotating photovoltaic cells covering the turbine blades. This can be achieved using a curved reflective surface positioned so that incoming light is reflected by the curved surface onto the photovoltaic surface generating electricity whether the turbine blades are rotating from the pressure of the wind or are stationary when there is no available wind. Further, the curved reflective surface will illuminate more of the backside of the turbine blades that are normally in the shadow area, therefore, the photovoltaic cells are producing more electricity per unit of time.

FIG. 112 shows the addition of a curved or parabolic shaped mirror 11201 that reflects 11202 the incoming 11203 sunlight 11204 onto the backside 11205 of the photovoltaic covered turbine blades 11206.

Illuminated Rotating Turbine Shaft

Further example embodiments include the utilization of the turbine shaft for the collection and transmission of light in order to illuminate another photovoltaic surface enabling still more electricity to be generated from the available light.

FIG. 113A shows the solar collector 11301 mounted on the top of the rotating shaft 11306 receiving the sun's 11304 rays 11302 as it travels across the sky 11305 which are directed downward 11308 through the illuminating shaft 11303 to one or more optical lens 11309 illuminating the photovoltaic surface 11310 and 11311 which are held in place by 11312. 11307 can be either a hollow shaft or it can be comprised of a fiber optic material to better control the flow of light to the photovoltaic surface below.

Once the electricity is created by the Photovoltaic cells the direct current is transferred either to an application such as the Fail-Safe turbine generator motor or to the Energy Conversion & Storage System (Not shown).

Other items shown for reference purposes are the ball bearing retaining ring 11314, the turbine blade's photovoltaic surface 11315 and the turbine blade photovoltaic surface's clear plastic protective unit 11316. FIG. 113B is a three-dimensional cutaway view with the same items using the same callouts as FIG. 113A.

Types of Solar and Wind Conditions the Example Embodiments Would Encounter

The embodiments are designed to compensate for the weather variables from wind and sunlight that would have an effect upon the system's ability to generate a steady flow of usable clean energy.

FIG. 114 A shows the four variables of full sun, partial sun, hazy/bright to little or no sun as would be encountered at night when there is any sunlight available for illumination.

FIG. 114B shows the three variables of steady wind, intermittent or gusty wind conditions to little to no wind activity.

Variable Weather Conditions

Nature each day and from each moment-to-moment produces variable weather conditions that are erratic. These variable conditions have an effect upon the electricity generated and hence the performance of solar energy generation as well as those pertaining to wind generation. That is why when the systems are separate they cannot produce a steady flow of usable energy. It is the function of the combined and integrated solar and wind energy generation systems to "even out" the erratic weather conditions for the production of usable, continuous and stable electrical energy.

FIG. 115 illustrates the identified weather conditions 11501 anticipated to have an effect upon the example embodiment(s). These variables produce an erratic flow of usable energy 11502 for conversion purposes. It is the purpose of the example embodiment(s) 11503 to manage this erratic energy input and to provide a smooth controlled and steady source of clean, non-polluting energy for use in a variety of applications including energy conversion from A.C. to D.C or vice versa 11504 producing an application-dependent source of controlled, dependable electrical power 11505 either as Alternating Current 11506 or as Direct Current 11507.

Weather and the Effects Upon the Embodiment(S) and the Generation of Electricity The weather has profound effects upon the stability of generating electricity. On the solar side, the sun is either full on a cloudless day or it encounters some form of obstruction in the form of haze, fog, clouds, etc. On the wind generation side the wind is variable in intensity going from full wind to gusty wind to low wind to no wind and oftentimes will do this within a five-minute period. The following charts illustrate and organize some of these variables. Only when these variables are understood, can a reliable system for the generation of electricity become feasible.

FIG. 116 shows a chart of extreme weather conditions' effects upon energy generation.

FIG. 117 shows a chart of variable weather conditions' effects upon energy generation.

FIG. 118 shows a chart of cause and effect Upon the embodiments' electrical power generation capabilities.

The Solar Panel Subsystem

The Photovoltaic cells arrayed into the solar panels are a subsystem of the example embodiments. Its main function is to produce and store electricity for the operation of the Fail-Safe system. In the likely event that the exterior wind conditions either abate or slow down below the systems minimum operational level sufficient to generate electricity, it will provide electricity to the Fail-Safe system in order for it to continue the operation of the adjacent wind Turbine Generation Assembly to generate continuous electricity.

FIG. 119 shows a Flow Diagram of the Solar System Electricity Generation System where it generates and stores electrical power for a variety of applications including providing the power to drive the Fail-Safe system that in turn drives the Turbine Generation Assembly.

FIG. 120 is a flow diagram: Wind Generation Fail-Safe System depicting the two different basic configurations of the embodiments' electricity storage. The Solar and Wind subsystems each has its own separate discrete power storage system 12001 or where the power storage system includes one common form 12002 of electricity storage that has been generated from both the Solar and Wind subsystems. Once the power is in a stored position, the method of retrieval, i.e., D.C. or A.C power withdrawn, to operate the Fail-Safe System is a function of the type of electrical drive motor the Fail-Safe system is using, i.e., an alternating current motor or a direct current motor.

FIG. 121 is a Flow Diagram of the Energy Conversion & Storage System's process of energy management collects the incoming electricity, stores it until it is needed, converts it to the demand application (A.C. to D.C. or D.C. to A.C.), adjusts, if needed, its power levels monitoring the energy flow, directs the correct level of power to the application, creates a log of all activity, periodically reporting the status to the Energy Management System (not shown), reports all service, maintenance and repairs due or needed, provides the energy flow to each application for invoicing or analysis purposes, conducts triage in the power distribution based upon a predetermined set of priorities.

FIG. 122 illustrates example embodiments having a Converter System and an Inverter system. The Converter System in FIG. 122A changes the Alternating Current to Direct Current for applications demanding D.C. electricity and for electricity storage for later use.

The Inverter FIG. 122B does just the opposite function changing the Direct Current into Alternating Current to either drive A.C. applications, such as supplying the Utility Grid with electricity or to power the Fail-Safe motor that turns the Turbine Generator System.

It is recognized that in the future, devices, when invented, may be capable of short-term or long-term A.C. storage. These A.C. storage devices may be integrated into this application and example embodiments.

Discrete Energy & Conversion Storage

It may be desirable to design example embodiments with a plurality of discrete energy storage systems; one dedicated to the solar produced electrical energy and the other dedicated to the wind turbine generated electrical power. FIG. 123 is a flow diagram of the system using two discrete, but integrated electrical storage systems. This integration allows for the addition or exchange of electricity when one system or the other requires additional energy to meets energy demand(s).

Common Energy Storage & Conversion Storage

The alternative to the separate discrete Energy Conversion & Storage Systems is to design a system that incorporates common Energy Conversion & Storage Systems where either the solar energy's conversion to Direct Current is added to the common Energy Conversion & Storage Systems as well as the Alternating Current type of electricity that is generated by the wind turbine system after it is changed into Direct Current by a Converter subsystem. It is then stored in the common Energy Conversion & Storage System.

FIG. 124 is a Flow diagram of the Energy Conversion & Storage System.

FIG. 125 depicts a Solar and Wind Farm.

Solar "Farms" are groups of solar panel systems that generate power from the sun, converting the sun's energy into usable electricity.

Solar farms exclusively use photovoltaic solar panels to generate electricity or the sun's thermal energy to heat a fluid that drives a steam engine that turns a generator to produce electricity.

A major limitation is that solar energy can only be generated when the sun is shining which is limited to about 6 to 8 hours of sunlight per day and at nighttime or on cloudy days the solar system is not operational at all. No sun=no energy=no electricity being produced.

Wind "Farms" are groups of wind turbine systems that generate their power from the wind to convert the wind's energy into usable electricity.

Wind Farms mainly incorporate large three-bladed propeller turbine systems to generate electricity, such as those in the San Gorgornio Pass, in Southern California.

Wind Farms are costly to construct and maintain and are limited to producing electricity whenever the wind is active. No wind=no energy=no electricity being produced.

The Solar and Wind Integrated System

The example embodiments integrate both the solar technologies with various wind technologies, as described herein, and can be constructed on a large scale for the generation of continuous electricity and would not be dependent upon either the sun's or the wind's availability because the solar and wind integrated system shifts electrical power to which ever system's operational demands require. For clarity of reference we shall refer to this integrated version of the example embodiments as "SolarWind Farms™" a trademark owned by the inventors of this application.

SolarWind Farms™" are designed to operate and provide continuous energy 60/24/7™ or in some locations 60/60/24/7™ (602/24/7)™ hours per day, for example:

No wind=automatic transfer of solar or reserve stored power to drive the Turbine Generator=electricity being produced.

No sun=Wind system still operational=electricity being produced.

No sun/No wind=automatic transfer of solar or reserve stored power to drive the Turbine Generator=electricity being produced.

FIG. 125A illustrates one configuration of a SolarWind Farm where the designated surface 12505 such as fixed concrete pad or a floating anchored barge that is constructed to accommodate a variety of energy producing systems working in a coordinated manner and in tandem, such as, but not limited to a plurality of solar panels 12501 including photovoltaic cells, modules and arrays plus the various wind generation systems 12502 and/or 12503, that are all linked into the Energy Conversion, Storage & Management Subsystem 12504 that controls the input and output of the individual subsystems as well as the entire SolarWind Farm site. The solar panels may be fixed in a position or radiate from the center. They may be mechanized to track the sun's changing overhead position for maximum energy intensity. The SolarWind Farm's electricity may be stored, used directly in a variety of applications 12506 or transferred to an electricity grid or network 12507.

FIG. 125B shows a typical solar panel 12509 in the SolarWind Farm while FIG. 125C shows a single horizontal wind turbine assembly 12510 that rotates when the wind's force activates it. When the wind is not strong enough or stopped, the wind turbine motor generator 12511 draws power from the electrical energy subsystem to power the wind turbine as if the wind were turning it and electricity is generated without the wind being present.

The whole assembly can be either fixed in position or so that it rotates 12514 on its base 12515 and/or support subassembly 12513 into the shifting wind. The device's rotation may be done mechanically, electrically, electronically or manually.

FIG. 125D shows a typical vertical wind turbine assembly 12516 that rotates 12520 when the wind's force activates it. When the wind is not strong enough or stopped, the wind turbine motor generator 12517 draws power from the electrical energy subsystem (not shown) to power the wind turbine as if the wind were turning it and electricity is generated without the wind being present.

The turbine wind generation system is supported by a vertical support 12518 that is mounted on a base 12519.

Winds are mostly thought of as being close to the ground and that is because we can feel the wind's pressure and temperature. However, in the generation of electricity the SolarWind Farm is concerned with catching the wind whether it is high or low to the ground. For this reason the vertical height H 12520 of the support structure and turbine can be of any application and/or site-dependent height for maximum effect.

FIG. 126 shows various configurations of the example embodiments. FIG. 126A illustrates a plurality of horizontal wind turbine assemblies 12601, wind turbine motor generators 12602 that can rotate independently from each other 12603. The height of the structure H is variable.

The whole assembly can be either fixed in position or so that it rotates 12604 on its base 12605 and/or support subassembly 12606 into the shifting wind. The device's rotation may be done mechanically, electrically, electronically or manually.

FIG. 126B shows a typical vertical wind turbine assembly 12608 that rotates 12607 when the wind's force activates it. When the wind is not strong enough or stopped, the wind turbine motor generator 12609 draws power from the electrical energy subsystem (not shown) to power the wind turbine as if the wind were turning it and electricity is generated without the wind being present. The width M and the length J of the Turbine Generation Assembly are variable. The height of the vertical support 12610 mounted on its base 12611 is also variable.

FIGS. 126C, 126D and 125E depict the varying heights to capture the wind blowing at various levels from the ground.

FIG. 126F shows a plurality of wind turbine assemblies on the same vertical support structure.

FIG. 126G illustrates a wide vertical example embodiment while FIG. 126H shows a combination wind turbine system utilizing a plurality of vertical wind turbine assemblies 12613 and 12614 with a plurality of horizontal wind turbine assemblies 12612 all supported by a structure 12615 that may be designed to rotate into the wind 12616 al mounted on its base 12617.

FIG. 126I shows the wind turbine example embodiments in a plurality configuration 12618 supported by a structure 12618 while FIG. 128J shows example embodiments with the photovoltaic solar panels 12620 affixed to the topside.

Rotating Horizontal Turbine Assemblies

The horizontal wind turbine generation system embodiments as illustrated in FIG. 127 as 12701 being "rotatable" can be designed to shift its direction towards the direction of the incoming wind 12702, 12703 as illustrated in the example embodiments located on a SolarWind Farm™ 12704.

SolarWind Farm Linked into the Portable Solar/Wind Example Embodiments

FIG. 128 shows the integration of the SolarWind embodiment 12801 with the portable embodiment 12802 to produce electricity to remote villages, as an example.

The Transmission of the Electrical Energy

The integration of the electricity can utilize any form of application-dependent carrier, i.e., copper wire, fiber optics, plasma wires, microwave, radio waves, etc.

The Integration of the Three-bladed Wind Turbine with the SolarWind Example Embodiments The SolarWind Farm example embodiments can also be incorporated in, on, around and among the existing large three-blade propeller driven wind turbine systems as a retrofit addition to supplement and/or produce additional electricity generated from the wasted land surrounding the Three-Bladed Wind Turbines, which is currently not being used.

The example embodiments are controlled by a microprocessor-based system that manages the data generated by various application-dependent sensors or detectors that monitor both internal and external events occurring in, around and adjacent to the example embodiments.

Various external weather conditions that are monitored are: amount of solar energy available, amount of direct current converted into electricity, temperature, wind speed, amount of alternating current converted into electricity, etc. Examples of the types of internal system data managed within the embodiment are: RPM speed of the turbine generator subassembly, types, amounts of current entering, transferring, storing, and exiting various components and subassemblies, demand(s), time, anticipated weather conditions, etc.

FIG. 129 is a Flow Diagram of the example embodiments' data communication system response when the sun and wind are both available to produce electricity.

FIG. 130 is a Flow Diagram of the embodiments' data communications system response when the sun is available to generate photovoltaic electricity, but the wind is calm, stopped or below predetermined levels for generating alternating current electricity.

FIG. 131 is a Flow Diagram of the embodiments' data communications system response when the sun is not available to generate photovoltaic electricity, but the wind is turning the turbine generator subsystem at or above its predetermined levels for generating alternating current electricity.

FIG. 132 shows conventional technologies as being separate and discrete technologies and systems, i.e. either all solar systems with daylight limitations or all wind systems with limitations of erratic wind patterns. However, the example embodiments integrate two or more diverse technologies into one system to compensate for the problems with conventional systems, thereby producing continuous electricity.

Large-Scale Vertical Axis Embodiments as Applied to Solar/Wind Farms

Where there is a need for electricity and the building of "Energy Farms" on unused land, i.e., large-scale embodiment(s), combining systems that convert both the sun's daily energy with the wind's presence into usable electricity can be accomplished through the use of the example embodiments, and is a viable alternative to strictly all solar or wind only farms.

FIG. 133A illustrates a front view of the example embodiments as a large structure, "n" by "m" by "z", in the form a silo-like protective shroud 13301 that has a plurality of vertical openings with optional wind directional vanes 13302 that allow the incoming wind 13303 to turn the vertical axis' 13304 wind turbine's blades 13305, supported at both ends (not shown). The roof or top area can also be used with a solar panel 13306. Instead of using one large wind turbine blade assembly, a two independent wind turbine blade assembly configuration may be used where the two independent wind turbines are rotating on two independent vertical axles, one inside the other, or two separate systems 13308 and 13309 as shown in FIG. 133B. A plurality of turbine blade assemblies can be configured to work in tandem 13311 as FIG. 133C illustrates. There are also different example embodiments of a plurality of horizontal wind turbines in a stacked position, in FIG. 133D and in a vertical standing position. FIG. 133E.

To increase the production of electrical energy per square area of land-usage, solar panels may be installed either on, adjacent or surrounding the structure.

FIG. 134A shows a top view of large-scale example embodiments 13401 surrounded by solar photovoltaic panels 13402 including the one on the top of the structure 13404. An access door is shown 13403.

FIG. 134B shows a ¾ view of the large-scale example embodiments.

FIG. 135A shows the front view of the solar/wind tower 13501, with its wind turbine assembly 13502 inside, surrounded by the wind vane shroud openings 13503 and where the whole structure, in this example, is surrounded by a plurality of solar panels 13504 that convert the sun's light 13507 into electricity as previously described in example embodiments. An access door 13506 is provided for maintenance and repair access FIG. 135B shows a ¾ view of the large-scale example embodiments.

Site Locations

The Solar and Wind farm configuration using a plurality of the example embodiment(s) is suitable for land, sea and outer space on other planets or satellites as long as there is a sufficient breeze or wind currents. FIG. 136 show various configurations for the example embodiment(s) with FIG. 136A having an artist's concept for a typical multiple group of the large-scale solar/wind example embodiments 13601 that derive power to produce electricity from the sun 13603 and the wind 13604 and where the whole plurality of the example embodiment(s) is situated upon an area of land 13602.

FIG. 136B is a side view of the example embodiments having a wind turbine tower 13605 with its surrounding solar panels assemblies 13606 that captures the sun's energy 13609 when situated on a concrete pad 13607 on land 13608.

FIG. 136C is a side view of an aquatic 13613 configuration of the example embodiments having a solar and/or wind turbine tower tethered 13611 and anchored or weighted 13612 onto the ocean's (or lake's) bottom.

FIG. 136D is a side view of an aquatic configuration of the example embodiments having a solar and/or wind turbine tower secured onto pilings 13614 onto the ocean's (or lake's) bottom, reservoirs, levees, aqueducts, etc.

Turbine Blade Construction

One of the major problems with the three-blade propellers is their length. They require a large tractor/trailer rig to move it to the assembly site. This transportation cost according to various studies amount to 20% of the total construction cost just for transportation. As a feature of the example embodiments and to reduce the transportation cost of the turbine blade assembly, a modular design is preferred.

FIG. 137A shows a front and side view of a typical large-scale turbine blade 13701 joined 13703 to another typical large-scale turbine blade.

FIG. 137B shows one form of making these turbine blades and that would be to use a series of different materials or layers bonded/fused/glued, etc. together 13704 (similar to the construction of skis).

FIG. 137C shows the two parts being joined using a supporting plate 13705 and fasteners 13706.

FIGS. 137D through 137J show various forms of wind turbine blade construction used by the example embodiments and may be application-dependent for strength, flexibility, and lightweight requirements as needed.

FIG. 137D is a turbine blade covered with photovoltaic cells.

FIG. 137E represents a solid turbine blade made from metal, plastic, etc.

FIG. 137F is a turbine blade covered with photovoltaic cells that in turn are encased in clear plastic.

FIG. 137G is a turbine blade made of laminated layers of composite materials placed either vertically, horizontally or diagonally upon each other and fused by heat and pressure in the same manner as the construction of a hockey stick. This includes a honeycomb form of construction.

FIG. 137H are turbine blades that are both laminated layers of composite material that is similar to FIG. 137G but has been shaped by heat and pressure and molds.

FIG. 137I shows a gas inflatable turbine blade that would be lightweight as long as it is under pressure.

FIG. 137J shows the construction of a turbine blade that has a strong outer shell of a composite material or fiberglass and a soft interior of plastic foam. This construction would be similar to that of a surfboard or a honeycomb form of construction.

FIG. 137K represents a curved turbine blade as wind turbine blades can be straight, curved or twisted like an airplane propeller.

There are a number of methods of converting wind energy into electricity and FIG. 138 shows a mechanical approach for a multi-vertical axle embodiment. As the wind turns 13810 the turbine blades, (not shown) its vertical axle rotates in a direction turning a mechanical linkage, i.e., gears, belts, 13802, pulleys 13803, etc., which in turn rotates the axle of an electrical generator or alternator 13805 which when rotating produces alternating current 13806.

In the double vertical axle configuration, an inner vertical axle 13807 (with its own turbine blades—not shown) attached would rotate 13811 independently of the outer shaft 13801, which in turn rotates the axle of an electrical generator or alternator 13809 which when rotating produces alternating current.

The example embodiments may be designed to rotate in the same direction by fixing the wind turbine blades in the same direction or counter-rotate if the wind turbine blades were located in opposite directions. The same wind-force would rotate the two turbine assemblies in opposite directions. This approach might be used to counter any negative build-up of rotating forces upon each axle.

This approach can be used for a plurality of vertical axels within one vertical shroud.

Modular Construction

These example embodiments may be constructed as each individual component is put in place, or may be constructed from pre-assembled modular unit(s) brought to the construction site. This minimizes the transportation of many individual components, allows for clean assembly and testing at the factory.

FIG. 139 shows an exploded view of a finished solar/wind tower using the modular process for construction.

FIG. 139A illustrates a typical vertical axle wind turbine assembly (generator assembly not shown).

FIG. 139B shows an exploded view of the modular construction of a plurality of self-contained modular vertical axel wind turbines 13904, 13905 and 13906 being the top module with the solar panel roof 13908 that receives sunlight 13909. The modules are lifted into position using either a crane or a helicopter.

The plurality of modules rest upon the base module 13902, with its access door 13912, most likely, but not necessarily built upon a concrete pad 13903. Surrounding the base is a plurality of solar panels 13910 strategically placed to receive the sun's light.

FIG. 139C shows a plurality of vertical wind turbine segments 13914 within each module 13913.

FIG. 139D shows a plurality of solar panels 13916 that are mounted onto the modular wind turbine segments 13915 so that they can capture more of the sun's light 13917.

Example embodiments would also work with a solar thermal system for the generation of electricity and/or heat either alone or in tandem with photovoltaic solar panels.

Sun Tracking Solar Panels

The top surfaces of the wind turbine system example embodiments comprising the wind farms can be used for a variety of solar panels to capture more of the sun's energy.

FIG. 140A illustrates a solar panel 14001 system on a rotating 360 degree 14004 structure 14002 in the "X" axis as well as rotating in the "Y" axis 14005. An available light sensor 14006 can detect the sun's light intensity to direct the positioning of the solar panel.

FIG. 140B illustrates a tracking solar panel system 14009 that is placed on top of a connecting structure 14008 of a plurality of vertical wind turbines 14007 above the wind vanes 14011 that also contain individual solar panels 14009, 14010.

FIG. 140C illustrates a tracking solar panel system 14012 placed on the top of each wind turbine embodiment.

Propellers and Blades

Example embodiments may use a number of different configurations of wind turbine blades or propellers. The selection of the proper propeller to be used in the example embodiments is application-dependent.

Figure 141:
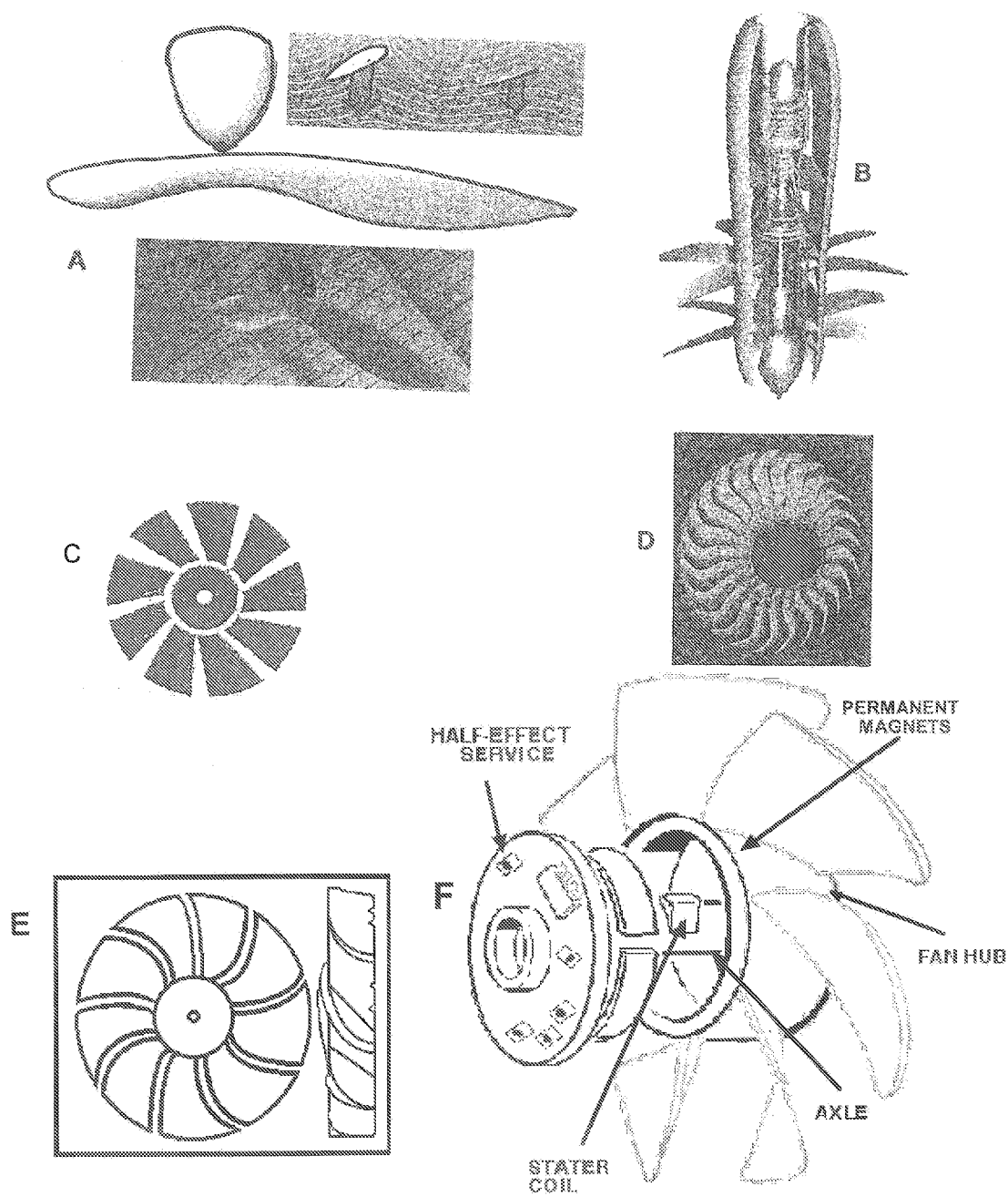

FIG. 141 illustrates a variety of samples to illustrate the point. FIG. 141A shows a single propeller.

FIGS. 141B through 141F are other varieties that can be incorporated into the example embodiments.

Wind Walls on Wind Farms

When the wind turbine example embodiments are vertically stacked and held in place as a plurality of wind turbines and this assembly is combined with another plurality of the similar assemblies, which are grouped together, a very large-scale wind farm can be constructed. This would become more efficient in capturing the wind's energy since it would capture the low wind moving across the ground, the high winds and those in between.

FIG. 142A shows a typical Wind Wall Unit 14203 (with the outer protective covering and wind vanes removed) elevated from the ground on structural supports 14207 including a plurality of wind turbine example embodiments 14201 that may be either integrated and/or connected with other wind turbine assemblies or they can be operated independently from each other and wind turbine generators 14202 that captures variations in wind 14209 levels, i.e., the low wind moving across the ground 14204, the high winds 14206 and those in between 14205. The resulting action produces alternating current 14208.

FIG. 142B shows a typical Wind Wall Unit with the outer protective layer 14214 along with a plurality of wind vanes 14210 that capture and compress the incoming wind. On the roof or top of the structure, optional solar panels 14212 may also be incorporated to convert the sun's energy 14213 into electricity.

FIG. 143A illustrates example embodiments in a wind farm configuration, where in this drawing the example embodiments 14301 are positioned in concrete 14302, for example in a line, but may be horizontally or vertically staggered, one to the other, in order to capture more of the available prevailing winds at different levels from the ground 14303, 14304, 14305. An underground Energy Storage and Conversion System 14306 processes, manages and stores the generated electricity until it is needed. 14307 is an access door to the underground facility.

14308 illustrate the example embodiments with its protective cover and wind vanes along with one configuration of solar panels.

FIG. 143B shows a single plurality of wind turbines vertically supported 14309.

FIG. 143C shows a single plurality of wind turbines 14310 vertically supported with solar panels 14311 on top that capture the sun's energy 14312.

FIG. 143D shows a single plurality of wind turbines vertically supported 14313 with solar panels 14314 spanning one wind wall structure and another providing both additional support as well as a surface for collecting the sun's energy. Although it is shown in the drawing as a horizontal surface, it may also be angled to capture move of the available sun's energy as a series of "A" frame construction.

The illustration depicts the wind walls in single file which is one option. Other options, not shown, are where the wind walls are position in a staggered configuration, either horizontally and/or vertically, to allow for more wind to reach the wind wall, radial configuration to capture wind from any direction.

Example Embodiments Using Large-Scale Venturi Systems

It is desirable to both capture the available wind and to increase its force or pressure. This can be done using a device that gathers a large area of the incoming wind and forcing/compressing in down into a smaller area, thereby increasing it's per square inch force.

FIG. 144A shows such a device as a leading structure of "n" by "m" by "z" that functions as a venturi. A wide area of the device 14404 catches the wind 14405 as it enters the device and is compressed and guided into the duct 14406 and exits 14407 into the wind turbine areas.

FIG. 144B shows such a device 14401 as a leading structure of "n" by "m" by "z" that functions as a venturi catching the wind 14402 when positioned in front of one or more of the Wind Wall embodiments 14403 (with the protective covers and wind vanes removed).

The large-scale venturi can be designed as a single attached system to each Wind Wall or it can be designed to serve one or more wind walls.

Example Embodiments Using an Air Pressure Multiplier System

There is a technology incorporated into a "bladeless" fan that does not have a typical propeller fan blade to push the air outward.

Named "The Dyson Fan" it has a conventional motor and fan blade in the base. The air flows from the base into the upper ring structure. The magic is in the ring structure, where the air flows out a slit around the front edge of the ring.

Here, a process called inducement is put to work. The air flowing out of the slit recruits surrounding air because of the configuration of the slit. So now there is more air flowing through the ring structure than there would be from the base fan alone. Dyson claims that inducement creates 15× amplification in airflow. Hence, the name "Dyson Air Multiplier".

FIG. 145A shows a typical Dyson fan that is short in stature and produces a cylinder of air.

FIG. 145B illustrates a vertical fan producing a vertical column of air.

FIG. 145C shows a taller version of the device that, because of its circular shape, also produces a cylinder of air.

FIG. 145D shows the typical buffeting or "chopping" 14502 of the air when a typical fan blade 14501 is used.

FIG. 145E shows the difference between the typical fan's buffeting as illustrated in FIG. 145D and the smooth flow of cylindrical air 14504 produced by the circular ring design 14503.

FIG. 145F shows the incoming air 14505 being multiplied 15 times 14507 as it exits the circular ring 14506.

FIG. 145G shows how the incoming air 14508 entering the vents of the base 14509 and exiting the ring increases the airflow 14510 through the inducement process.

FIG. 145H is another example of the process where the incoming air 14511 entering the vents of the base 14512 and exiting the ring 14513 from the ring's air exit slit 14514 increases the airflow 14515 through the inducement process.

FIG. 145I is a detail cross-section of the circular ring showing the narrow circular slit 14516 located in the ring and where the air (series of arrows) exits from the device.

What makes this design of particular interest is the increase in force due to the inducement as well as the "smoothness" of its air flow and its 15 times (Dyson's claim) increase in air flow.

FIG. 146 shows the implementation of the air multiplier ring integrated with the wind turbine example embodiments where the incoming wind 14601 from the exterior of the system 14602 enters wind turbine housing 14603 forced against the wind turbine blades 14604 turning the wind turbine generator 14605 producing Alternating Current.

After the incoming wind has been used to turn the wind turbine, it exits the wind turbine area into an air chamber 14606 that functions as a venturi 14607 increasing the air's pressure 14608 before it enters a second assembly 14615 which has a opening 14609 into the air multiplier ring 14610 where it exits from the air multiplier ring 14612 mixes with additional air through the inducement effect 14611 driving a propeller(s) 14613/14614 of a second wind turbine system 14616 which may be either a horizontal or vertical axis embodiment.

After the air's pressure has been used to drive the wind turbine system generating electricity 14618 it exits the housing 14617.

The resulting electricity, Alternating Current 14619, is then sent either to the utility grid, 14620, direct usage 14621 or if destined to be stored through an inverter 14622 converting the Alternating Current into Direct Current then onto the Power Adjustment system 14623 and then into the Energy Storage & Conversion system 14624.

FIG. 146B is a graphic image of the air multiplier effect and direction.

FIG. 146C View A-A is a cross section of the air multiplier ring 14625 illustrating where the pressurized air exits the system 14626

Energy Storage & Conversion System

It is anticipated that considerable heat may be generated in the electricity recharging process.

There are two possible options for reducing this heat build-up.

The removal of the heat, i.e., cooling the area or utilizing the excess heat in some manner.

Cooling the Area

This heat can be exhausted into the exterior using a number of existing cooling or refrigeration technologies, cooled by placing below ground, the use of air condition/refrigeration devices and systems, evaporators, cooling coils using recirculating coolant within or adjacent to the rechargeable batteries and the use of cooling fins.

Using the Heat

The heat generated by the recharging process can be captured and used to pre-heat the circulating fluid in a thermal electricity generation system.

FIG. 147A shows an example of cooling the energy storage area 14701 or batteries 14702 using refrigeration coils 14703 placed adjacent to the rechargeable batteries, for example, where the cold coolant is pumped by a motor and it enters the system 14704 and the warmed coolant is removed 14705 along with the excess heat. The excess heat can either be vented to the exterior or it can be used to preheat the fluid in a thermal solar heat generation system or a solar collector that turns the heat into steam and drives a steam generation system.

FIG. 147B shows a rechargeable battery 14707 that has the refrigeration coils placed inside the batteries where a motor 14711 pumps the cold coolant 14709 and it enters the system and the warmed coolant 14708 is removed 14710 along with the excess heat.

Light Intensification Process to Increase the Photovoltaic Effect

As almost every boy who has played with a magnifying glass knows, one can start a fire by focusing the sun's rays onto a small dry area.

FIG. 148 shows this process, which is similar in that the sun's rays 14801 contain energy in the form of heat and light 14802 that radiates towards the Earth on a daily basis. The insertion of a suitable application-dependent magnifying lens 14803 capable of concentrating 14804 the sun's energy onto an array of photovoltaic cells 14805 thereby increasing/multiplying the sun's energy and the potential for more electricity being generated per unit of area. This process produces Direct Current 14806 that is either used, stored 14807 or changed into Alternating Current through the use of an inverter prior to use in Alternating Current applications. The excess heat generated 14808 and 14809 is either used in another heat-related application 14810 or cooled using mechanical or natural air conditioning system(s).

As noted above, FIGS. 149A-C include symbols and definitions of the symbols used throughout the application.

The following provides discussion of example embodiments of a AQUATIC SOLAR/WIND ELECTRICAL POWER GENERATION & STORAGE SYSTEM.

Electrically-powered systems and vehicles used in aquatic environments cannot depend upon shore-based power generation systems to re-supply needed electrical power, tens, hundreds or thousands of miles from land. Yet the growing demands for electrically powered aquatic devices such as: watercraft, weapons, sensors, electronics and habitats that require electricity, to name a few, is increasing. This embodiment provides remote, ecological-friendly electrical power and storage using solar photovoltaic cell system and/or wind for electrical power generation, from any body of water, i.e., oceans, lakes, etc. independent of any land-based power generation and distribution sources. Three different versions of these power generation systems are mentioned herein: a) the systems that are capable of floating upon the water's surface and b) the systems that can be submerged below the water's surface and c) these are the major configuration systems that can be maneuvered horizontally upon the surface of land as well as water or under the surface when submerged.

Surface and Subsurface Aquatic Charging Stations

As Man continues to expand his exploration of the vast surface as well as the depths of the oceans that cover the majority of this planet is growing need for electricity is paramount.

More and more aquatic devices are introduced into the oceans, lakes and rivers incorporating various electrical and/or electronic systems and subsystems, the need increases for remote forms of water-borne power generation and storage systems in order to extend the device's performance range, operational life and capabilities.

Devices such as, but not limited to: aqua-robots, ocean floor sensors, motorized/electrical aqua vehicles, attack vehicles, various S.E.A.L. operations, robotic explorers or crawlers, even deep sea diving and aquatic habitats, submarine launched vehicles, etc. all requiring increasing amounts of electricity to power the various electronic, electrical, sensors and monitoring devices, motorized systems and weapons far from land-based systems.

Therefore, to increase the usefulness as well as the operational ranges of aquatic devices, there is a need for a system to generate electricity and store electrical power until it is needed while being remote from any land electrical power station or replenishing supply ship.

Electrically-powered systems and vehicles used in aquatic environments cannot depend upon shore-based power generation systems to re-supply needed electrical power, tens, hundreds or thousands of miles from land. Yet the growing demand for electrically powered devices such as: watercraft, weapons, sensors, electronics and habitats, to name a few, is increasing. This embodiment provides remote, ecological-friendly electrical power and its storage using solar photovoltaic cell system and/or wind for electrical power generation, from any body of water, i.e., oceans, lakes, etc. independent of any land-based power generation and distribution sources.

Four different versions of these power generation systems are mentioned herein:

SURFACE: the systems that are capable of floating upon the water's surface,

SUBMERGIBLE: the systems that can be submerged below the water's surface,

SURFACE AND SUBMERGIBLE: those systems that can be maneuvered between both the surface as well as under the surface, and MOBILE/ALL TERRAIN: where the power generation system having tractor treads and/or wheels can be moved onto beaches, shorelines, into jungles, etc. or submerged off shore.

Commercial Applications

With increased dependence upon electricity to power submersible vehicles and various underwater commercial activities, such as, but not limited to, construction, maintenance, repair, servicing, inspection, etc. of:

Off-shore oil rigs

Ship's hulls, etc.

Bridges, piers and pilings, etc.

Where electrical power at sea or on lakes is needed to operate electrical powered vehicles, to power equipment, to provide light in work areas, for motion picture filming, etc.

Further, more and more humans are beginning to perform work, conduct research and carry out military/marine operations that require their activities either underneath or upon the surface of bodies of water, i.e., oceans, lakes, etc.

Military Applications

The military conducts a range of underwater activities for frogmen, including exploration, mapping, mining, repair, service, maintenance, lighting, etc. as well as Navy Seals using motorized propulsion systems to move them to their destination.

Marine Research Applications

Another growing waterborne area involves marine biological research where it is advantageous to live underwater for extended periods of time in order to save diving preparation, decompression time, and associated costs. This minimizes the physical stresses upon a diver as they move from the normal surface pressure upon the body to the depths of the ocean where the pressure against the human body is greatly increased.

The Problem

The problem is to provide electricity through a non-nuclear (lessens the value to a terrorist, for example) aquatic-based energy generation system capable of charging various electronic or electrical devices and systems and of which will enable the transfer the stored electricity to compatible vehicles and devices independent from any land-based sources of power generation.

Further, if there were a military mission that is covert in nature, the submerged aquatic power generation system configuration can be pre-positioned and submerged for later use by Navy Seals.

The Solution

To create an aquatic self-contained solar and/or wind powered electrical charging station (ECS) that can generate as well as store electricity until needed.

Approach

There are three basic aquatic charging stations embodiments:

SURFACE ONLY SYSTEMS: Fixed and floating upon the surface of the water,

SUBSURFACE ONLY SYSTEMS: Submerged below the surface of the water mainly used for covert operations, exploration or for aesthetic purposes and COMBINED SURFACE AND/OR SUBSURFACE SYSTEMS: These systems can operate either upon the surface in safety or submerged when weather or danger is anticipated.

ALL-TERRAIN MOBILE POWER GENERATION SYSTEMS These power generation systems can travel on land as well as in the water.

Basis:

Aquatic Surface

The surface of a lake or ocean has an almost constant wind for turning wind generation systems and/or daily sunlight that would provide electrical power via photovoltaic cells, for example.

Sub-Surface Sunlight

We have noticed that sunlight penetrates to about 30 feet below the surface of the ocean or lake, diminishing in intensity as the depth becomes greater. This below-surface area of water receives sufficient energy to provide a subsurface system (an electrical generation operating just below the waves and out of sight from any shore based patrols, for example) capable of generating electrical power via photovoltaic cells, as an example.

This embodiment is directed toward supplying the electrical power for recharging aquatic devices and systems for activities that take place either upon the surface, underwater or on land.

FIG. 150 shows an Aquatic Power Recharging Module-Surface Embodiment.

FIG. 150A illustrates an aquatic recharging power module that floats in the water 15004 with an optional dome 15002 that covers the module's housing 15003 protecting the photovoltaic solar panels 15001 from the constant sea spray that could cover the solar panels with "ringlets" from drops of dried water, salt deposits carried through the air by the wind and breezes, bird droppings, etc. The dome may be configured with an optional cleaning system to periodically wash the outer surface. It is also recognized that the dome may be electronically/electrically operate during peak hours of sunlight.

The protective dome 15002 may be made of a semi-transparent plastic, such as Mylar® or Lexan® or even a translucent or transparent form(s) of plastic, such as a polycarbonate material, that provides a soft luminescent glow inside the dome from the sun's harsh light rays 15013.

The dome may be pressurized/depressurized with air or any suitable gas for increased rigidity when underwater or to withstand the elements.

Human operated, automatic or robotic electric powered aquatic submersibles 15005 can dock 15006 at the Aquatic Power Recharging Module and recharge their batteries.

Scuba divers 15012 can also recharge their electronic equipment, such as lights, tools, weapons, electronics, etc. simply by plugging into a plurality of electrical sockets 15007.

Another option is for applications when time is of the essence, a Navy Seal or Frogman in an underwater vehicle can swap his used batteries from his underwater vehicle 15005 for newly recharged batteries at the recharging station. This quick exchange enables the Frogman to continue on his mission while his spent batteries are being recharged for the next time they are swapped.

All electrical connections are designed for waterproof and safety from electrical shock.

The electricity from the solar panel system (with its inverters, etc.) may be configured to generate other forms of converted energy, i.e., radiation, such as microwave or radio waves, etc. that can be reconverted back into electricity minimizing underwater electrical shock to systems, devices and humans.

In another embodiment a parabolic dish 15008 & 15009 is strategically mounted (which itself can be contained within a plastic or canvas dome (not shown) that can send 15011 and receive 15010 digital and/or analog communication signals or additional energy from satellite microwave or other forms of transmitted energy. That relay system status, diagnostics, etc. and receive instructions for operations, etc.

In a modification of the antenna, the parabolic dish can transmit or receive microwave or radio wave forms of energy for conversion to electricity.

FIG. 150B illustrates the addition of a wind turbine system 15003 & 15004, as previously described herein, that would supply electrical power to the rechargeable batteries located below 15001 the dome 15002 in the module's chassis. A plurality of optional weights 15005 or anchors can be used for permanent or semi-permanent mooring or to prevent the counter-rotation of the dome assembly when the wind turbine is turning. The wind turbine assembly 15003 can be designed either as a fixed assembly or one that telescopes into the dome 15001 for ease of transportation and rough windy seas. To prevent counter rotation of the complete system when the dome assembly unit is floating in water, motors, weights or a rudder can be used as well as a counter-rotating wind turbine assembly.

Figure 151:
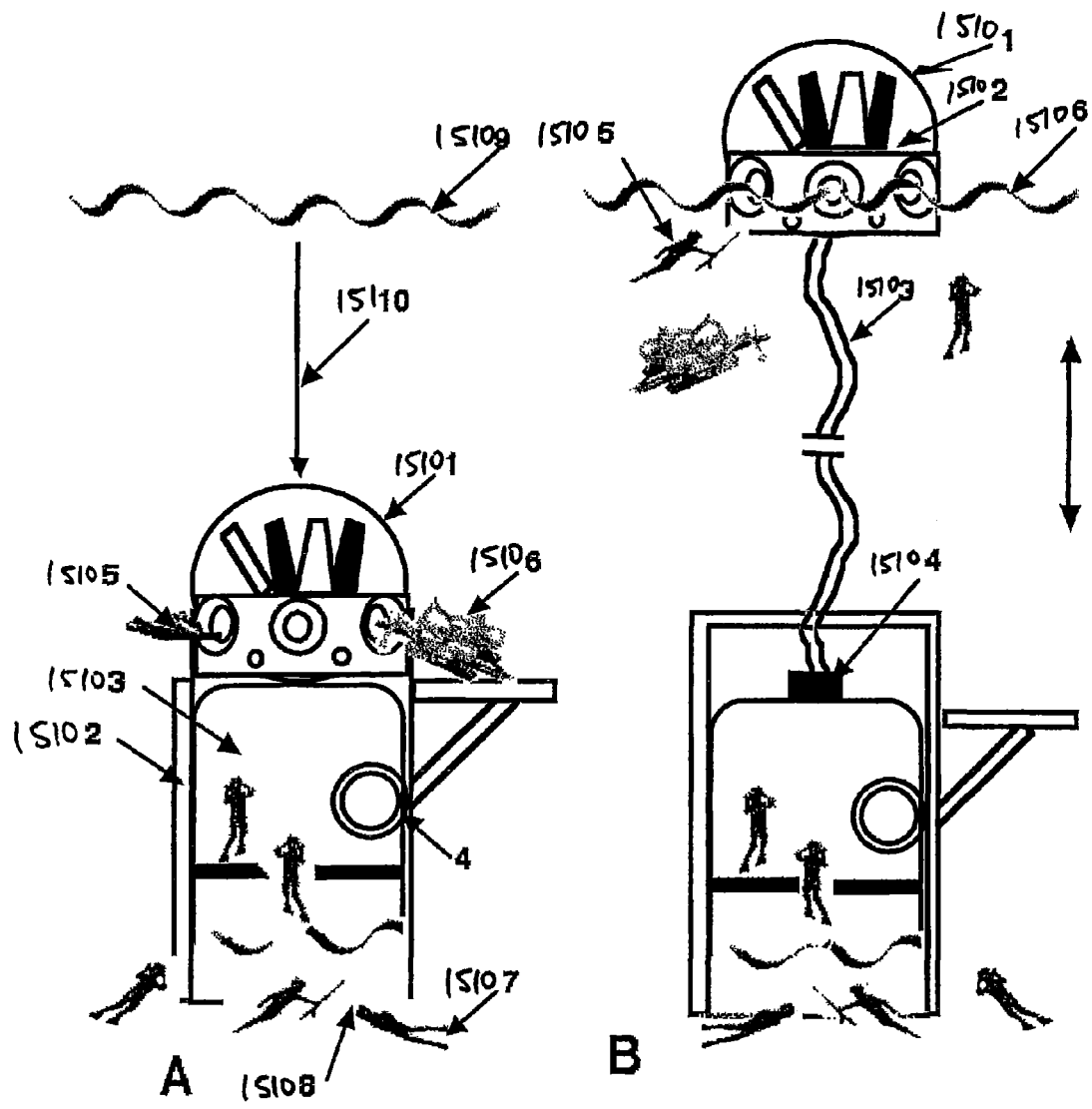

FIG. 151 shows a Submersible Solar Power Station Embodiment

There are many advantages to living within underwater habitats as they provide a living space for divers while working longer hours underwater. FIG. 151A illustrates an underwater 15109 & 15110 habitat 15102 that may be resting on the ocean's floor or suspended/tethered above it. The module contains increased air pressure 15103 preventing the water from flooding into the living space. A porthole 15104 provides a view. The divers 15108 swim up into or exit from the living quarters/chamber. Various electric-powered vehicles 15105 & 15106 can be recharged as needed.

This particular embodiment includes the dome 15101, in a retracted and secured position that covers the solar photovoltaic panel and would consist of a transparent or translucent material suitable to withstand the anticipated depth of the habitat.

FIG. 151B illustrates the underwater habitat with the solar panel 15102 dome 15101 module (extended) to the water's surface 15106. Communications and the transfer of electricity generated by the photovoltaic modules can be transferred down to the submerged habitat via cables 15103 that is operated by a motorized winch system 15104 that would raise or lower the solar panel module. The divers 15105 can recharge their equipment at or near the water's surface.

The system can be configured a number of ways where the different embodiments are within the scope of this application.

Pressurized Dome

The dome can contain either normal air under pressure or the dome can be pressurized with an inert gas that would not effect the operation of the solar panels. This gas pressure can be adjusted for the external pressure upon the dome.

Security

Security Plugs

The electrical plugs can consist of a number of different combinations providing unique pin-to-plug spatial configurations that would prevent unauthorized outsiders from stealing the stored electricity. These pin to-plug security configurations can also incorporate a number of security technologies as keypads, hand geometry, code words, password data strings, etc. that are pre-set or changed prior to usage via data communication links.

Planned Explosion

In the event the enemy captures the military embodiment of the Aquatic Power Recharging Module, the module and to prevent them from using the system, it can be configured to explode when a given signal is either transmitted to the module or it can be set to explode by an underwater Frogman or Navy S.E.A.L. using a predetermined password.

FIG. 152 show ALL-TERRAIN MOBILE POWER GENERATION SYSTEMS.

With the addition of a chassis 15202 to the dome assembly the system 15201 can become mobile and depending upon the application, the dome assembly can be fitted with pontoons for floating, wheels, (consisting of a variety such as: using inflatable tires, or metal spring loaded rims, etc.), half-tracks or full tracks for land, shore or off-shore travel 15203 & 15204 or combinations thereof. Special eyelet for hooks can provide a means of either parachuting from a plane or airlifting from a helicopter to remote locations. This embodiment can be a complete system per each means of mobility as well as being one segment, i.e., ½, of a larger array and have applications in disaster relief situations as well as these applications that describe examples of applications herein, i.e., the military, commercial and research usage.

Double Axis, Elongated Decreasing Venturi Design to Increase The Pressure and Performance of the Incoming Air/Wind Upon the Turbine Blades.

This embodiment may be used in any of the suitable applications of this document. FIG. 153A illustrates the embodiment's housing 15301 intake venturi/vent 15302 with the incoming air 15303 (at the "12 'o clock" position). The turbine blade assembly 15304 rotates as the increased wind pressure pushes against the blades until it reaches the bottom of the cycle where it exits from the housing assembly through the exhaust port 15305.

FIG. 153B illustrates the increased air pressure (red) being weaker at the entrance 15301 and stronger as it moves down the duct 15302. When the pressure reaches the bottom (at the "6 'o clock" position) there is an exchange of the air pressure as most of the pressure goes out through the exhaust system (15305 see FIG. 153A) while the remaining or residual air is recirculated, but at a lower pressure 15303 and joins the incoming air 15304 either by the force of the incoming air "pulling or the rotating turbine blades pushing the residual air into the main duct repeating the cycle.

This area is circled and enlarged in FIG. 153C and illustrates the turbine blade assembly 15301, the turbine blade assembly's axle 15302, the turbine blade 15303 the direction 15304 and force 15305 of the wind/air, which is illustrated as black spheres pushing against the turbine blades, until most of them 15306 exit out of the exhaust port 15307. Some of the reduced air pressure, as mentioned, is re-circulated 15308 until it enters the main incoming body of air adding to its pressure and force.

Most of the rotational pressure in this illustration takes place on the left side of the system where it is increased and conversely, decreased on the right side forcing the turbine blade assembly into a rotational movement. This rotational movement of course is geared or belted to pulley(s) that drive an electrical generator producing electricity.

Figure 154:
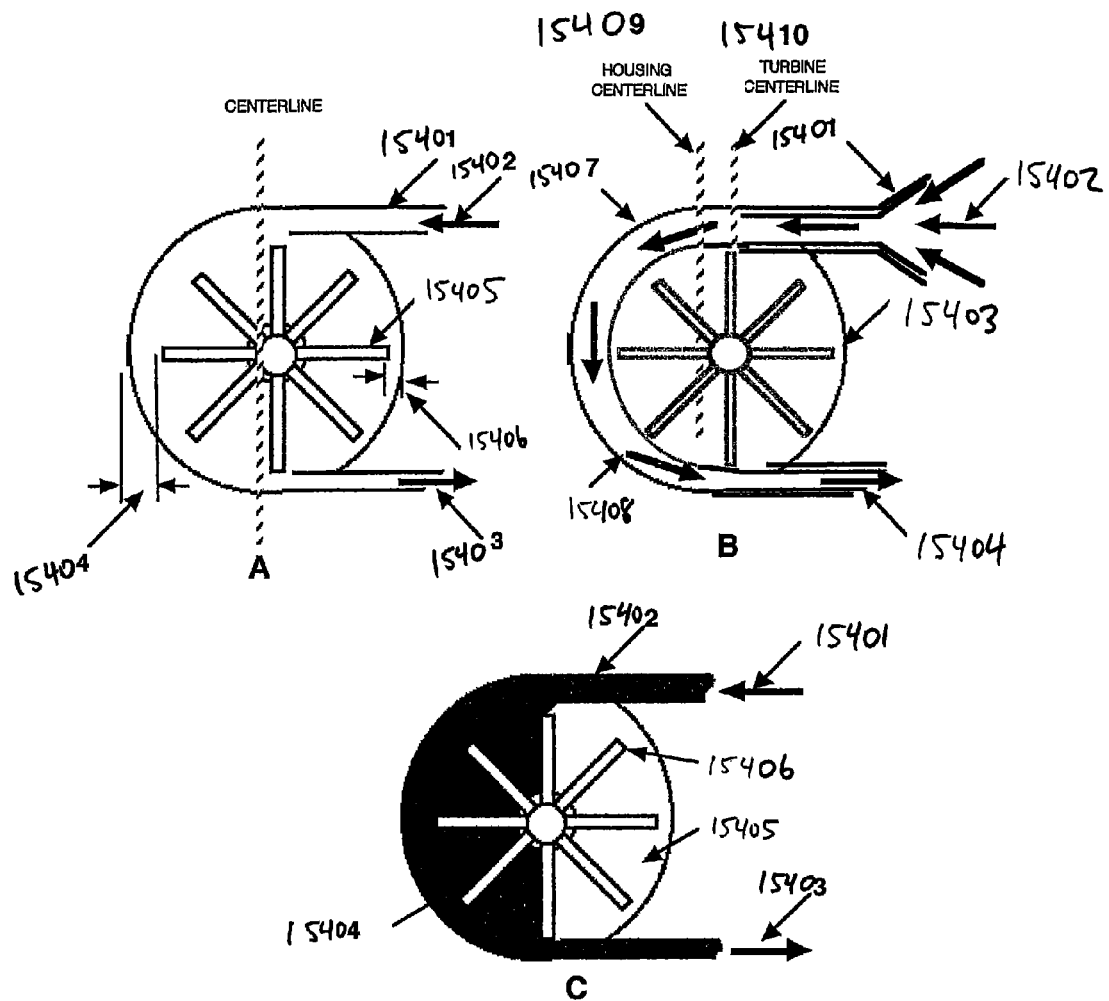

FIG. 154 illustrates Double Centerline (two axis) Elongated, Curved and Decreasing Duct/Venturi Design to Increase the Pressure of the Incoming Air/Wind Upon the Turbine Blades.

This design enables the normal air pressure against the turbine blades to be increased using two different methods that can be used in tandem or separately. The first would be to construct a venturi system 15401 as the initial component of the embodiment where the incoming air 15402 enters the system and that it captures a large volume of air at the intake and forces or compresses it into a smaller volume with greater force against the turbine blades.

The turbine blade assembly, unlike normal housing-to-turbine blade assembly configurations where the centerline is common to all rotating components, this embodiment incorporates two different centerlines (FIG. 154B 15409 &

15410) which may be parallel in the "x" dimension (as illustrated), or in the "y" dimension (not illustrated), or even in the "z" dimension (also not illustrated) or various combinations thereof. One centerline is for the housing structure while the other centerline is for the turbine blade assembly 15405. This offset arrangement provides more space on one side 15404 of the housing than the other 15406. This additional space is created by the use of an elongated, curved venturi where the internal dimension 15407 is greater than the area further downstream 15408 as illustrated in FIG. 153B.

FIG. 154C illustrates the path that the incoming air 15401 will take as it pushes against the decreasing sides of the housing 15402 while increasing its force 15404 and rotating the various turbine blades 15406 and exits through the exhaust 15403. On the opposite side, the air pressure has decreased 15405 as it rotates beck to the top.

FIG. 155 shows Basic Turbine Assembly and Pressurized Air Intake Assembly.

This is a three-dimensional exploded view of the turbine blade assembly's housing/duct system. The incoming wind/air 15502 enters the intake port 15501 where it encounters a venturi effect that reduces the available are for the wind forcing the molecules closer together while at the same time increasing the force or pressure. This increased pressure is what turns the turbine blade assembly 15507 that is geared to an electrical generator (not shown) from the turbine blade's rotating shaft 15508 & 15509. Most of the spent wind/air 15504 exits from the exhaust port 15503. The turbine blade assembly centerline is indicated 15506. The outer edge of the turbine blade assembly path is open (no bottom to the duct) to the rotating turbine blades 15505. The residual air that is not forced out of the exhaust port 15503 exits back into the main duct 15510 adding to the incoming wind/air.

FIG. 156 illustrates an Alternative Embodiment: Closed Duct System.

An alternative embodiment and unlike the open bottom duct design (closed on three sides and open to the turbine blade assembly design), this embodiment 15601 uses a closed duct (closed on all four sides) and strategically placed intake fins or louvers 15605 that channels the high pressure velocity of air directly into the turbine blade assembly 15604 for higher rotation and performance.

Conversely, the residual air 15603 exiting from the spent turbine blades enters this duct 15602 through the residual air vent.

FIG. 157A illustrates the curved venturi duct in a straightened position 15704 where the intake 15701 is the larger diameter/circumference to accommodate the incoming wind 15703 and the smaller circumference 15702 is at the exhaust end 15706. Others sections are illustrated to depict the reduction in size as the venturi moves the increased wind's force toward the exhaust end.

FIG. 157B is a crude graph illustrating the increased force against the turbine blades as the diameter of the duct becomes smaller.

FIG. 157C illustrates an example of the intake area 15707 available to catch the wind is 25+ times the exhaust area. This compressing (25 to 1) of the incoming wind increases the available force for rotating the turbine blades.

The following provides a discussion of example embodiments of a Submerged or Surface Electrical Power Generation System using Wind Pressure Against Cliffs. This is a system, method and process of generating electrical power from unused wind pressure that pushes against the vertical surface of cliffs.

Cliffs, are defined as "high steep face of rocks" and "bluffs" are defined as perpendicular front as a coastline" either made of dirt, rocks or ice. Icebergs before they break off the main body of a glacier, for example would also be included in these embodiments and for the sake of this document, bluffs, icebergs will be referred to as being part of a "cliff."

Cliffs generally have a constant pressure of wind blowing against their vertical surface most often from winds that travel across the ocean or lakes. Other forms of wind pressure against cliffs occur in the canyons of mountains. This particular embodiment is a system for utilizing this wind pressure against the sides of the cliff in order to turn an electrical generation wind system. The resulting electricity that has been generated can be used immediately, stored in batteries or sold to the local power grid company for revenue, offsets or barter.

The embodiments of this system can be placed in areas above ground that are not aesthetically offensive or within a mountain pass for example. One configuration of the system is where it is placed unobtrusively underground thereby retaining the aesthetics of the landscape or for use of the top surface, for example, as a golf course or even to supply energy to habitable structures built upon the surface of the cliff.

FIG. 158 illustrates a typical cliff (or bluff or even an iceberg) 15802 made of rocks or various composition of dirt/ice with its surface 15803 of grass or in the case of icebergs, ice, for example, where the cliffs vertical/perpendicular surface is facing a steady amount of wind 15801. These cliffs may be located at the ocean's shore, for example.

FIG. 159 Illustrates typical wind patterns against a cliff where the wind generally comes straight across the open plains, lakes or ocean 15901 where it hits the surface of the cliff 15902 and spreads outward mainly moving into a vertical direction 15903. When the wind reaches the top of the cliff, it flows either upward 15904 at a ricocheting angle or parallel 15905 to the ground 15906.

FIG. 160 illustrates the underground embodiment of the electricity wind generation system where the incoming wind 16001 bumps against the cliff 16003 where a portion of the wind enters the system's intake duct 16002.

FIG. 161 is an artist's conception of the described embodiment 16101 installed on a cliff's face. Note the uninterrupted cliffs surface. No large rotating wind turbine farms to spoil nature's view or to harm flying birds.

FIG. 162 Illustration of a cross section of the underground 16208 wind generation electrical system where in incoming wind 16201, 16202, 16203 & 16204 hits the cliffs face 16206 where a portion of the wind enters the system's intake vent 16207 where it is compressed forcing the rotation of the turbine wheel located in the turbine wheel assembly 16209 that has a plurality of radial fins fixed onto a rotating axel/shaft that has a pulley of "m" ratio attached. This turbine assembly is pushed/rotated by the wind's pressure where afterwards the wind then re-expands exiting the system 16211 onto the surface of the cliff 16205. As the turbine wheel spins it turns another pulley of "n" ratio connected to a generator 16210 thereby generating electricity. Note; the rush of air pressure across the surface of the cliff will tend to "suck" out the exhaust air due to its decreased pressure.

FIG. 163A illustrates a detail cross section of the wind generation electrical system that consists of an intake assembly 16301 that is large at the intake end to capture more wind and narrow at the trailing end producing a "venturi" effect thereby increasing the pressure of the incoming wind as it travels down a duct system 16302 where the wind 16303 encounters another optional restricting protrusion 16309 producing a second venturi effect. As the increased wind pressure enters the turbine assembly it rotates 16305 the turbine blade assembly 16304 and exits the system re-expanding from its compressed state 16306 & 16308 and exits the system through the exhaust ducting 16311.

The rotating turbine blade wheel assembly 16304 has a plurality of radial fins fixed onto a rotating axel/shaft that has a pulley (it may also be a gear type system) of "m" ratio attached.

As the turbine wheel assembly spins it also turns another pulley, of "n" ratio, connected to a rotating belt 16307 (or if gears are used instead of pulleys, a geared fan belt connecting the gears) to a generator 16310 thereby generating electricity 16313 that is either used immediately, stored in rechargeable batteries (not shown) or transferred or sold to a local power grid system. (the control and management system is not shown for ease of illustration).

The embodiment illustrates a protective grid 16312 to prevent wildlife and birds in particular, from being harmed or nesting in the system. This protective grid may consist of many different forms of application dependent configurations such as, but not limited to vertical, horizontal or movable louvers, screens, bars or various combinations thereof, as well as sloping sides eliminating a horizontal surface for drainage and/or any potential wildlife standing or nesting.

FIG. 163B illustrates a detail cross section of the wind generation electrical system's wind pattern and illustrates the air flow caused by the incoming wind 16314 that is compressed by the shape of the ducting 16315 which is further compressed prior to its entering the turbine blade assembly 16316 and decompressed 16317 as it exits the system 16318.

Figure 164:
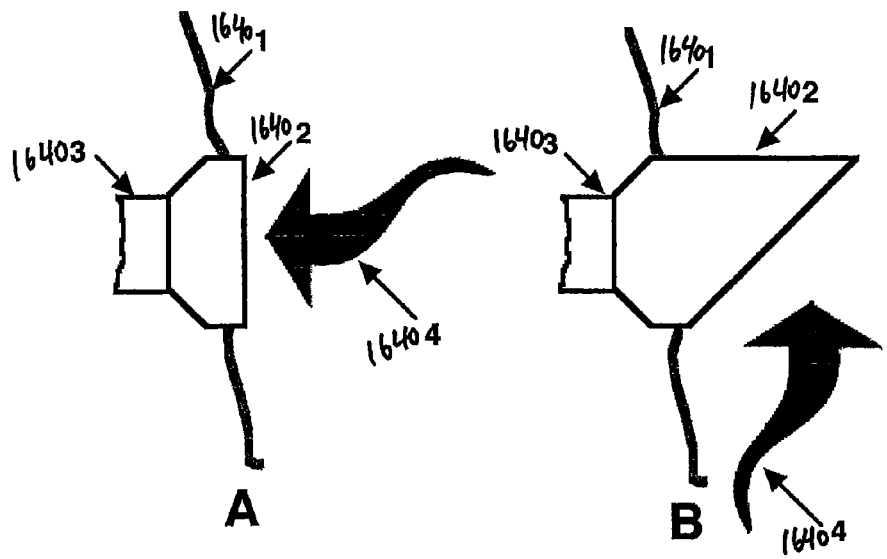

FIG. 164 illustrates application dependent intake ducts which can take a number of configurations and two are illustrated here as examples. FIG. 164A illustrates the wind 16404 entering a flush ducting 16402 set into the face of the cliff 16401. The connecting ducting 16403 is shown for reference purposes.

FIG. 164B illustrates the wind 16404 entering a protruding ducting 16402 set into the face of the cliff 16401. The connecting ducting 16403 is again shown for reference purposes.

FIG. 165 illustrates the top view of a system using a plurality of wind/electricity generation systems 16503, 16504 & 16505 that are connected together in such a manner as to provide multiple inlets in the cliff 16502 for the incoming wind 16501. A common exit system 16507 can be used.

In another configuration, if there is sufficient wind another turbine assembly can be used at the common area 16506 just before the air is exhausted from the entire system.

Construction: Underground

The system can be installed a number of ways. One easy method is to dig a ditch, lower the complete system and/or its components into the ditch and when the system is ready to begin operations cover the ditch.

Another method is to tunnel from one or more ends and install the system by assembling its components and sub-assemblies within the excavated tunnel.

Construction: Above Ground

Another similar embodiment would be to install the system near the cliffs updraft and position it upon the surface of the ground. This would be an easier option, however it may have to be enclosed in a building or other protective form of construction.

The many features and advantages of the embodiments are apparent from the detailed specification and, thus, it is intended by the appended claims to cover all such features and advantages of the embodiments that fall within the true spirit and scope of the embodiments. Further, since numerous modifications and changes will readily occur to those skilled in the art, it is not desired to limit the embodiments to the exact construction and operation illustrated and described, and accordingly all suitable modifications and equivalents may be resorted to, falling within the scope of the embodiments.

What is claimed is:

1. A system, comprising:
   a solar power unit generating electricity from sunlight using panels that adjust relative to sunlight;
   a wind power unit generating electricity from wind currents using a turbine;
   a Supplemental Fail-Safe system which activates a motor in the turbine generator to generate electricity;
   a shifting unit shifting the electricity produced by the first solar unit to drive the Supplemental Fail-Safe system to generate continuous electricity during periods without wind;
   a battery storage system storing electricity from the solar power unit and the wind power unit;
   a combining unit selectively combining electricity from any combination of the battery storage system, the solar power unit and the wind power unit to output continuous electricity to produce output power from the system;
   a power management system directly supplying power to the turbine selectively from any combination of the solar power unit, the battery storage unit and a power grid to keep the turbine turning when wind power is insufficient to generate electricity to ready the turbine to generate electricity when wind is sufficient;
   a sensor means including hardware and software for monitoring weather conditions, monitoring and controlling the system, and communicating conditions of the system to a remote location; and
   a solar/thermal steam heat system generating electricity using a solar collector that is one of cylindrical and parabolic and focuses received sunlight captured by the solar collector onto one of a straight, curved and coiled mechanism containing a liquid that when heated changes to steam, activating a steam turbine generator and one of outputting and storing electricity,
   wherein a wind turbine is kept turning by electricity selectively from any combination of the solar means, the storage means and a power grid when wind is insufficient.

2. A system producing electricity, comprising:
   a first solar unit capturing radiated light from a light source, the solar unit including a plurality of solar photovoltaic cells arranged into modules, which are arranged into arrays as solar panels, the photovoltaic cells converting the light into electricity and adjusting position relative to sunlight;
   a second wind unit operating independently from the first solar unit, the wind unit including a wind guide causing input wind to directly turn a turbine generator indirectly through a Supplemental Fail-Safe system which activates a motor in the turbine generator to generate electricity;

an electricity generation unit accepting the electricity from the solar unit and the wind unit and one of outputting electricity either as direct or alternating current and storing the electricity in batteries or another storage device;

a shifting unit shifting the electricity produced by the first solar unit to drive the Supplemental Fail-Safe system to generate continuous electricity during periods without wind;

a processor-based controller, various application-dependent sensors and a software management system stored on a non-transitory computer readable medium that allows remote commands to be sent to the system and periodically communicates a system status, an operational performance, and a security status to a remote location;

a sensor means including hardware and software for monitoring weather conditions, monitoring and controlling the system, and communicating conditions of the system to a remote location; and a solar/thermal steam heat system generating electricity using a solar collector that is one of cylindrical and parabolic and focuses received sunlight captured by the solar collector onto one of a straight, curved and coiled mechanism containing a liquid that when heated changes to steam, activating a steam turbine generator and one of outputting and storing electricity, wherein the turbine is kept turning by electricity selectively from any combination of the first solar unit, the batteries and a power grid when wind is insufficient.

3. A system, comprising:

a solar means for converting one of solar light and heat energy into electricity and that adjusts relative to sunlight;

a wind means for converting wind energy into electricity and having a venturi to increase wind pressure of the wind energy;

a Supplemental Fail-Safe system which activates a motor in the turbine generator to generate electricity;

a shifting unit shifting the electricity produced by the first solar unit to drive the Supplemental Fail-Safe system to generate continuous electricity during periods without wind;

a combining means for integrating the electricity from the solar means and the wind means to constantly provide an electricity output;

a storage means for storing the electricity;

a conversion means for converting the electricity from one of direct current to alternating current and alternating current to direct current;

a supplemental means for providing the electricity output when the solar means and the wind means are unable to produce electricity;

a sensor means including hardware and software for monitoring weather conditions, monitoring and controlling the system, and communicating conditions of the system to a remote location; and a solar/thermal steam heat system generating electricity using a solar collector that is one of cylindrical and parabolic and focuses received sunlight captured by the solar collector onto one of a straight, curved and coiled mechanism containing a liquid that when heated changes to steam, activating a steam turbine generator and one of outputting and storing electricity, wherein a wind turbine is kept turning by electricity selectively from any combination of the solar means, the storage means and a power grid when wind is insufficient.

4. The system of claim 1, wherein the system further comprises a supplemental power unit controlled by a software management system to continue to operate the wind power unit when unable to generate electricity due to a lack of wind currents.

5. The system of claim 4, wherein the supplemental power unit is a Supplemental Fail-Safe Power Generation system comprising an alternating or direct current motor, powered by electricity and one of intermittently and continuously driving the wind power unit when unable to generate electricity due to a lack of wind currents.

6. The system of claim 1, wherein the solar power unit further comprises solar panels capable of motorized movement to track moving sunlight in orbit and the wind power unit includes an adjustable wind turbine, the wind turbine telescopable and rotatable 360 degrees about an axis.

7. The system of claim 1, wherein the system is housed within a modular structure and the structure is located one of adjacent to and within a freeway, railroad tracks, an area used for parking of vehicles, an area used for vehicle transportation, an area used for recreation and an area with passersby.

8. The system of claim 1, wherein the solar power unit and the wind power unit are housed one of within and upon a portable modular structure moveable to a location by one of a helicopter, ship, cargo airplane, truck, train, and any vehicle designed to move equipment.

9. The system of claim 1, wherein the system is enclosed one of within and upon a structure having wheels.

10. The system of claim 9, wherein the structure having wheels is a truck and trailer capable of transporting the system.

11. The system of claim 10, wherein the continuous electricity is used to operate at least one of a physical facility, a robotic electric military vehicle, an electric robotic military tank, a supply carrying device ("mule"), a drone, and another electrical power-assisted device having one of rechargeable batteries, storage devices and systems operated on land or water and carrying electrical energy from the truck and trailer to other devices or systems.

12. The system of claim 1, wherein the system is one of buoyant and submersible.

13. The system of claim 12, wherein the system when submersible is anchored to one of land, an ocean floor and a lake floor.

14. The system of claim 1, wherein the system is part of a larger solar/wind farm having a plurality of components capable of capturing sunlight and passing wind currents to output continuous electricity.

15. The system of claim 6, wherein the wind turbine includes at least one propeller.

16. The system of claim 1, wherein the wind turbine includes solar panels attached thereon.

17. The system of claim 6, wherein the solar panels are protected by bulletproof material.

18. The system of claim 17, wherein the solar panels are foldable and fold outward to generate electricity and fold inward for storage.

19. The system of claim 15, wherein the wind turbine includes a plurality of ducts directing the wind currents.

20. A system, comprising:

a solar power unit generating electricity from sunlight using panels that adjust relative to sunlight;

a wind power unit generating electricity from wind currents using a turbine;

a Supplemental Fail-Safe system which activates a motor in the turbine generator to generate electricity;

a shifting unit shifting the electricity produced by the first solar unit to drive the Supplemental Fail-Safe system to generate continuous electricity during periods without wind;

a battery storage system storing electricity from the solar power unit and the wind power unit;

a combining unit selectively combining electricity from any combination of the battery storage system, the solar power unit and the wind power unit to output continuous electricity to produce output power from the system;

a power management system directly supplying power to the turbine selectively from any combination of the solar power unit, the battery storage unit and a power grid to keep the turbine turning when wind power is insufficient to generate electricity to ready the turbine to generate electricity when wind is sufficient;

a supplemental power unit controlled by a software management system to continue to operate the wind power unit when unable to generate electricity due to a lack of wind currents; and a sensor means including hardware and software for monitoring weather conditions, monitoring and controlling the system, and communicating conditions of the system to a remote location;

a solar/thermal steam heat system generating electricity using a solar collector that is one of cylindrical and parabolic and focuses received sunlight captured by the solar collector onto one of a straight, curved and coiled mechanism containing a liquid that when heated changes to steam, activating a steam turbine generator and one of outputting and storing electricity, wherein the system is one of buoyant and submersible, wherein the solar panels are protected by bulletproof material.

\* \* \* \* \*